United States Patent [19]
Oshima et al.

[11] Patent Number: 5,881,038
[45] Date of Patent: Mar. 9, 1999

[54] METHOD AND APPARATUS FOR PREVENTING ILLEGAL COPY OR ILLEGAL INSTALLATION OF INFORMATION OF OPTICAL RECORDING MEDIUM

[75] Inventors: Mitsuaki Oshima, Kyoto; Yoshiho Gotoh, Osaka, both of Japan

[73] Assignee: Matsushita Electric Industrial Co., Ltd., Osaka, Japan

[21] Appl. No.: 423,668

[22] Filed: Apr. 18, 1995

Related U.S. Application Data

[63] Continuation-in-part of Ser. No. 281,337, Feb. 27, 1994.

[30] Foreign Application Priority Data

| Apr. 18, 1994 | [JP] | Japan | 6-104879 |
| Nov. 17, 1994 | [JP] | Japan | 6-283415 |
| Dec. 28, 1994 | [JP] | Japan | 6-327963 |
| Feb. 1, 1995 | [JP] | Japan | 7-15318 |
| Feb. 3, 1995 | [JP] | Japan | 7-16865 |

[51] Int. Cl.⁶ .................................................. G11B 7/00
[52] U.S. Cl. ........................... 369/59; 369/84; 369/58; 369/54; 369/47
[58] Field of Search ........................ 369/84, 83, 85, 369/97, 58, 47, 48, 49, 50, 54, 59, 32, 60, 124; 360/48, 53, 39

[56] References Cited

U.S. PATENT DOCUMENTS

| 509,382 | 4/1893 | Kinnard . | |
| 4,681,588 | 7/1987 | Kumatani et al. . | |
| 5,224,087 | 6/1993 | Maeda et al. | 369/54 |
| 5,323,367 | 6/1994 | Tamura et al. | 369/58 X |
| 5,541,904 | 7/1996 | Fite et al. | 369/54 X |

FOREIGN PATENT DOCUMENTS

| 0 411 961 A2 | 2/1991 | European Pat. Off. . |
| 57-120269 | 7/1982 | Japan . |
| 58-165794 | 11/1983 | Japan . |
| 59-168939 | 9/1984 | Japan . |
| 60-145501 | 8/1985 | Japan . |
| 63-148421 | 6/1988 | Japan . |
| 1-311472 | 12/1989 | Japan . |
| 3-66062 | 3/1991 | Japan . |
| 3-159429 | 7/1991 | Japan . |
| 4-172623 | 5/1992 | Japan . |
| 5-266576 | 10/1993 | Japan . |
| 5-325193 | 12/1993 | Japan . |
| 6-12677 | 1/1994 | Japan . |
| 6-150317 | 5/1994 | Japan . |

OTHER PUBLICATIONS

Neal Koblitz "Elliptic Curve Cryptosystems" Mathematics of Computation, vol. 4X No. 177, Jan. 1987, pp. 203–209.

*Primary Examiner*—Muhammad N. Edun
*Attorney, Agent, or Firm*—Lowe, Price, LeBlanc & Becker

[57] ABSTRACT

A recording and reproducing system for performing the reproduction using an optical recording medium. A physical feature of a ROM type disk is extracted and enciphered before being recorded in an optical disk. The cipher reproduced and converted into a plain text physical feature, which in turn, is compared with the physical feature information detected from the ROM disk. When both are coincident with each other, the operation of the system stops, thereby preventing the use of an illegally duplicated disk. The physical feature information, recorded on a magnetic recording layer 4 of the optical recording medium 2, is reproduced by an optical head 8 and compared with the information measured by a physical feature information detector, thereby detecting a duplicated medium.

16 Claims, 131 Drawing Sheets

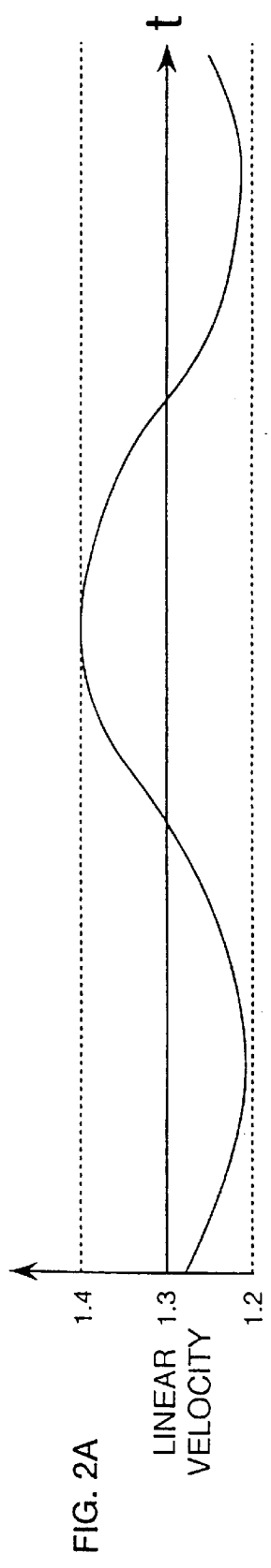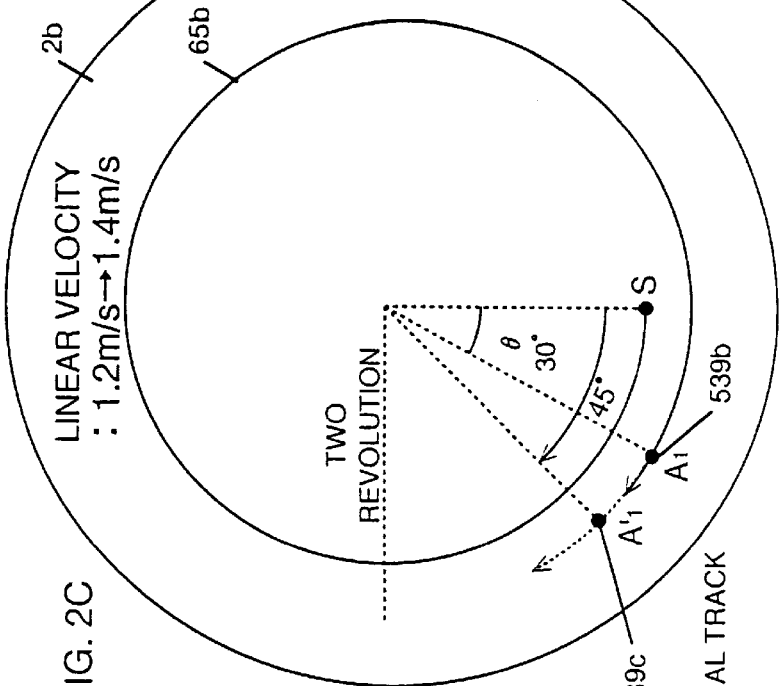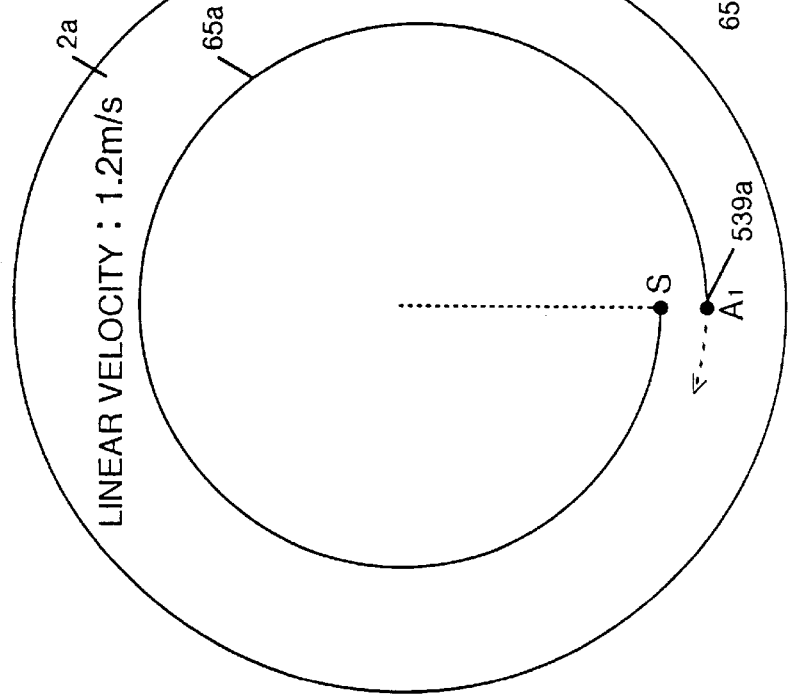

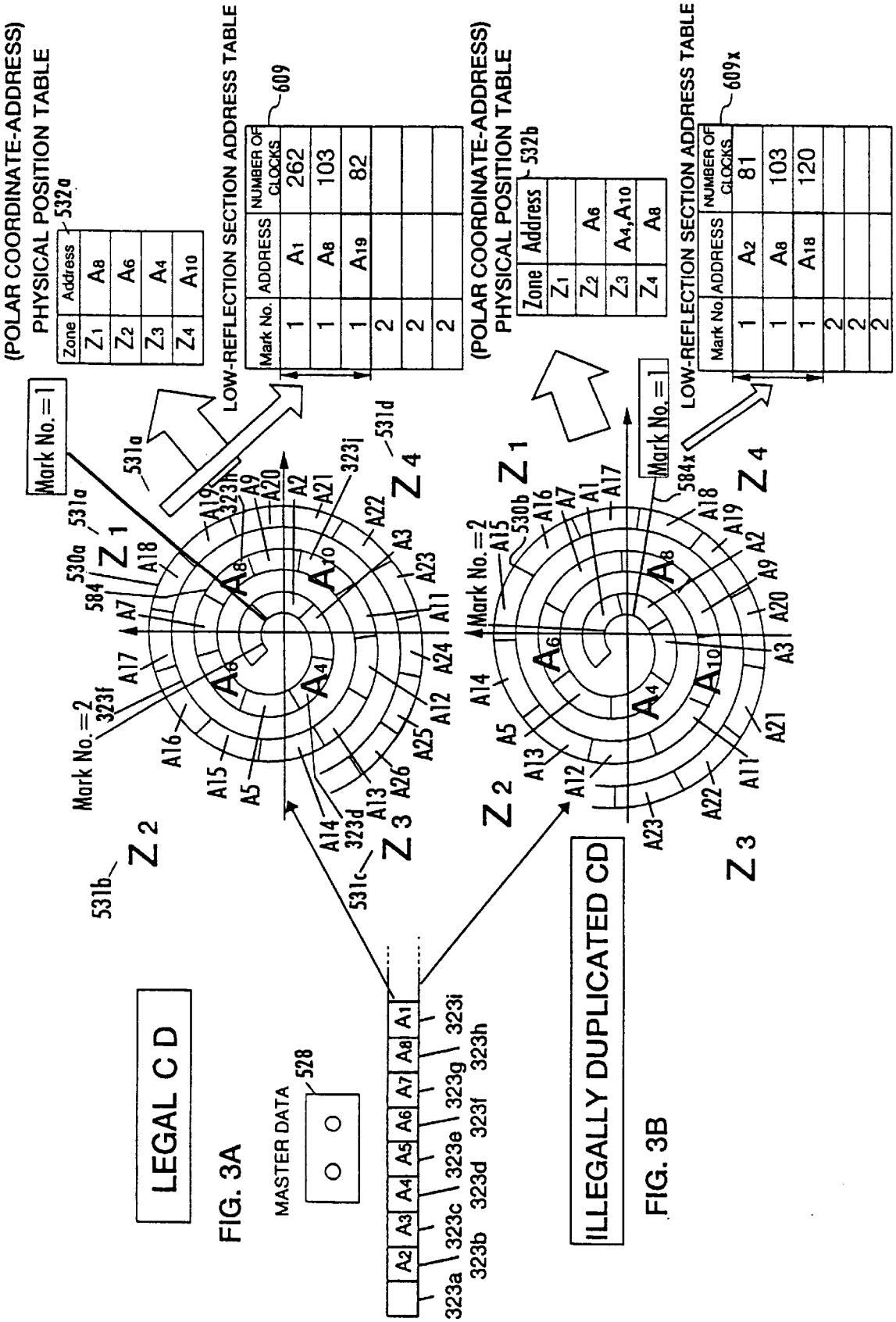

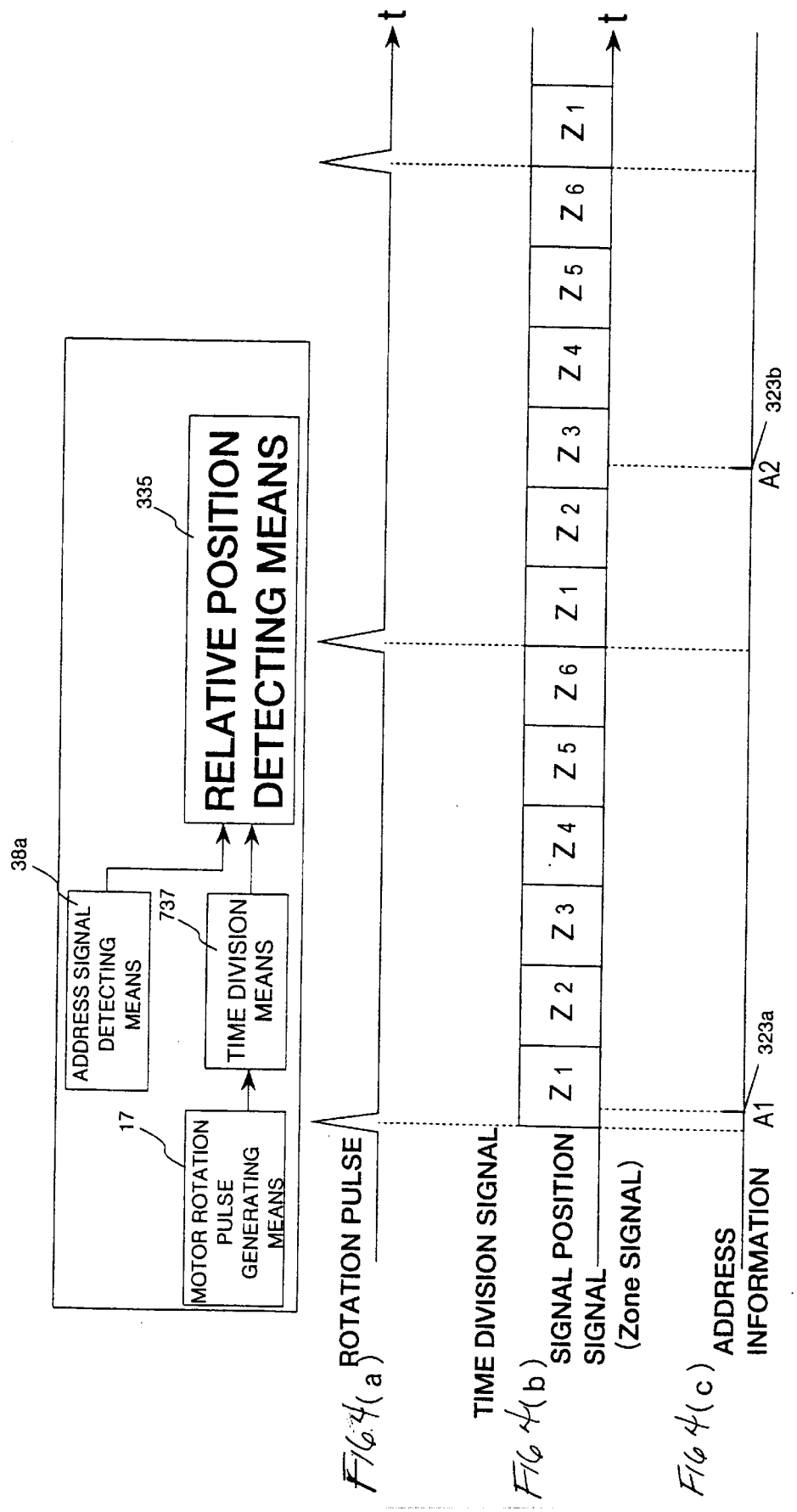

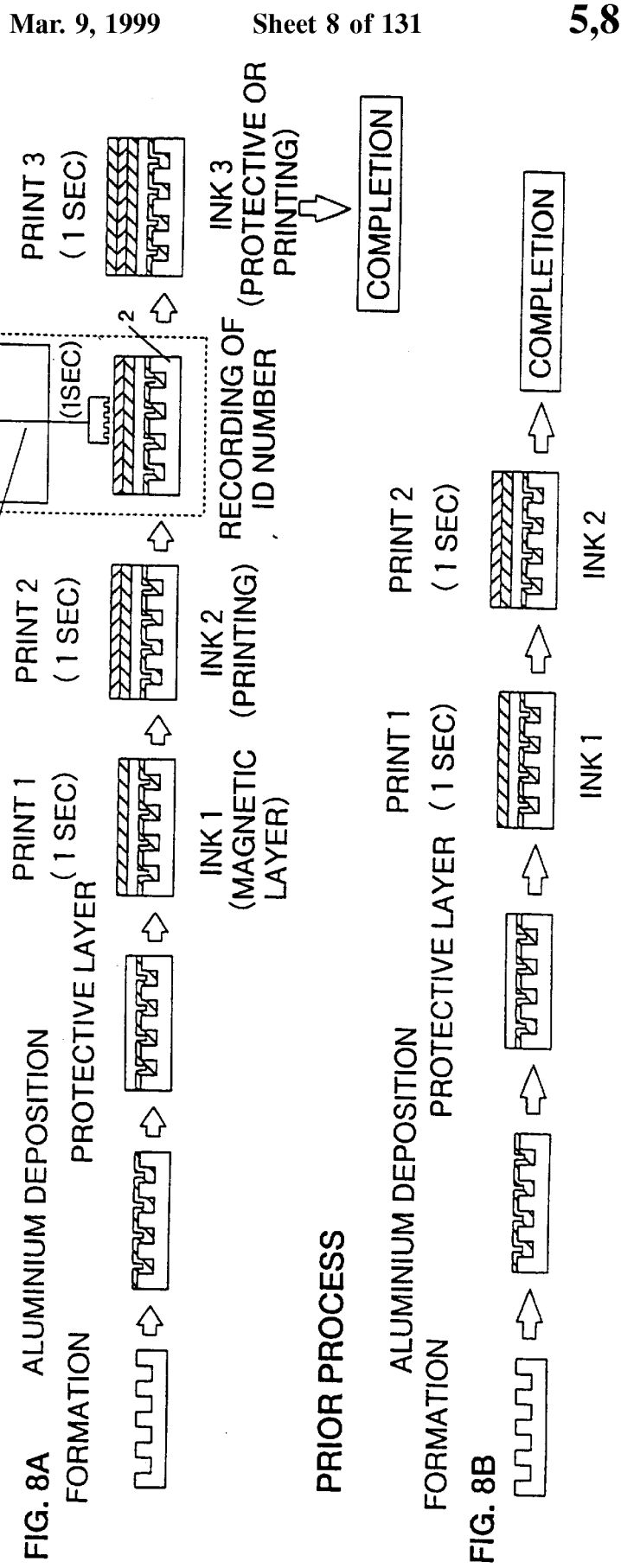

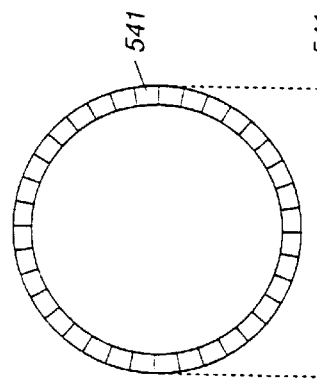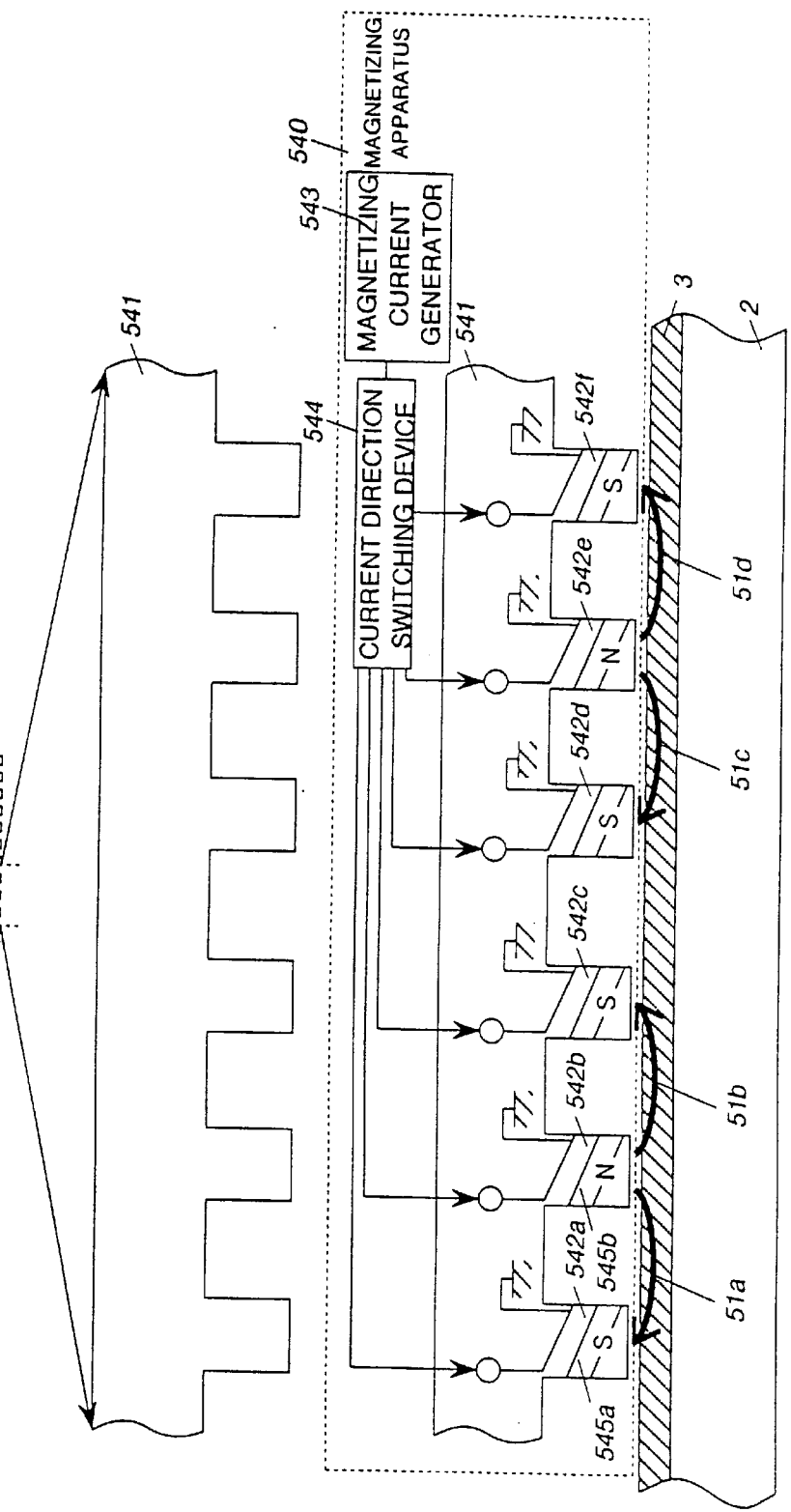
FIG. 9A TOP VIEW
FIG. 9B SIDE VIEW
FIG. 9C
FIG. 9D

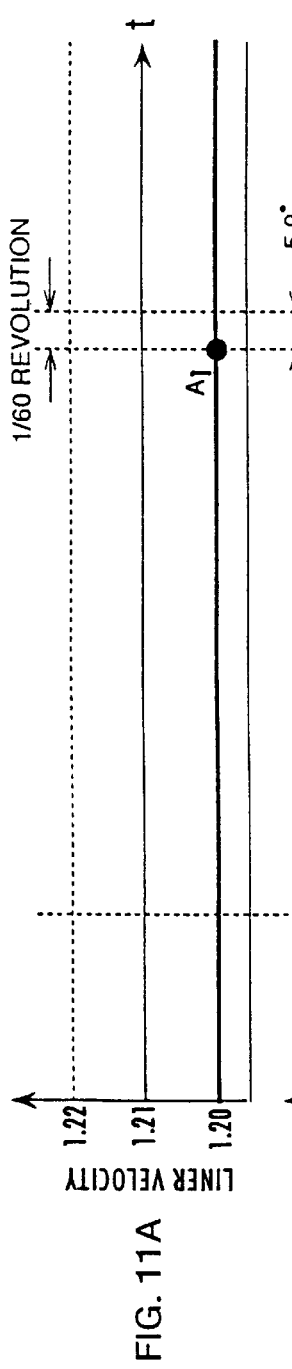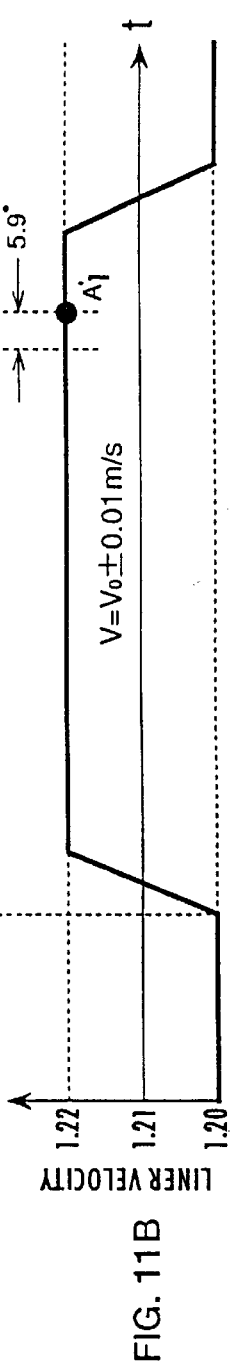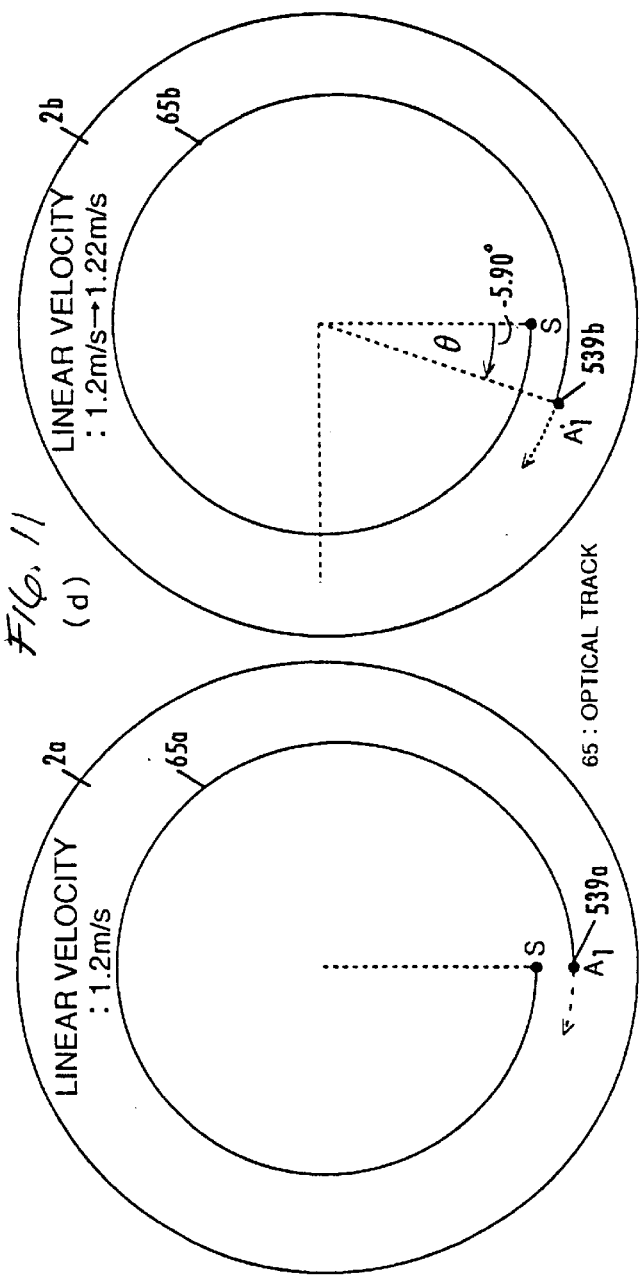
FIG. 11A
FIG. 11B
FIG. 11C

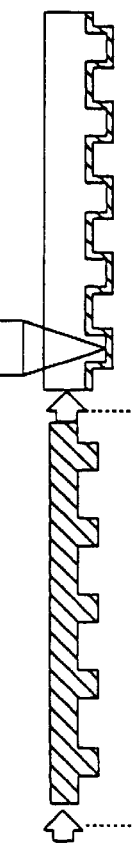
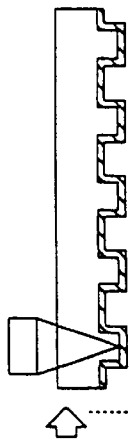
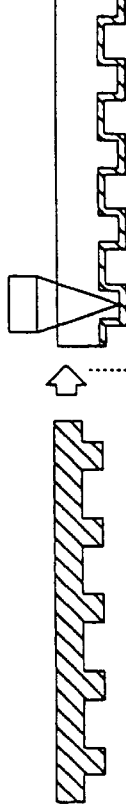
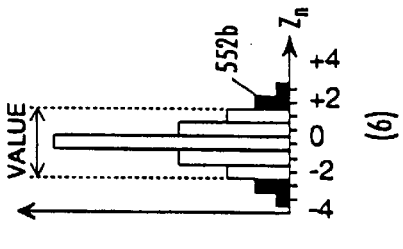
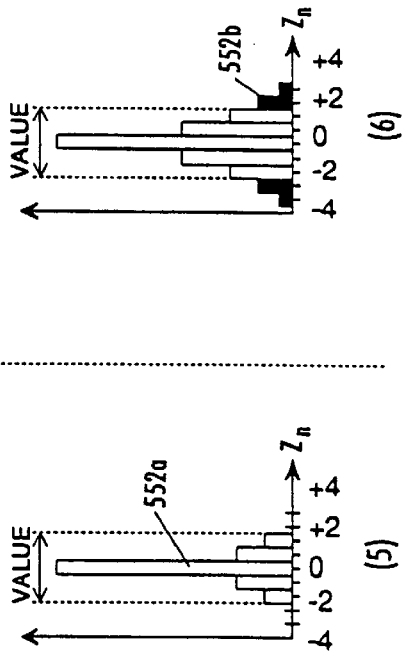
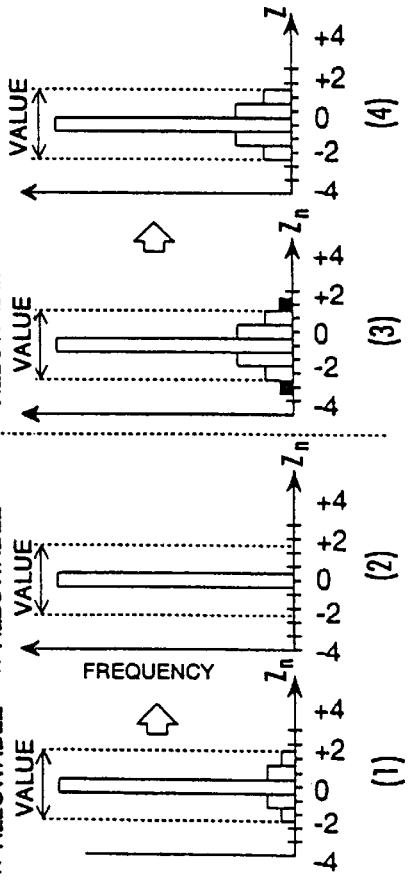
FIG. 12A  LEGAL ORIGINAL RECORD
FIG. 12B  REGAL FORMED DISK
FIG. 12C  ILLEGALLY DUPLICATED ORIGINAL RECORD
FIG. 12D  ILLEGALLY DUPLICATED FORMED DISK

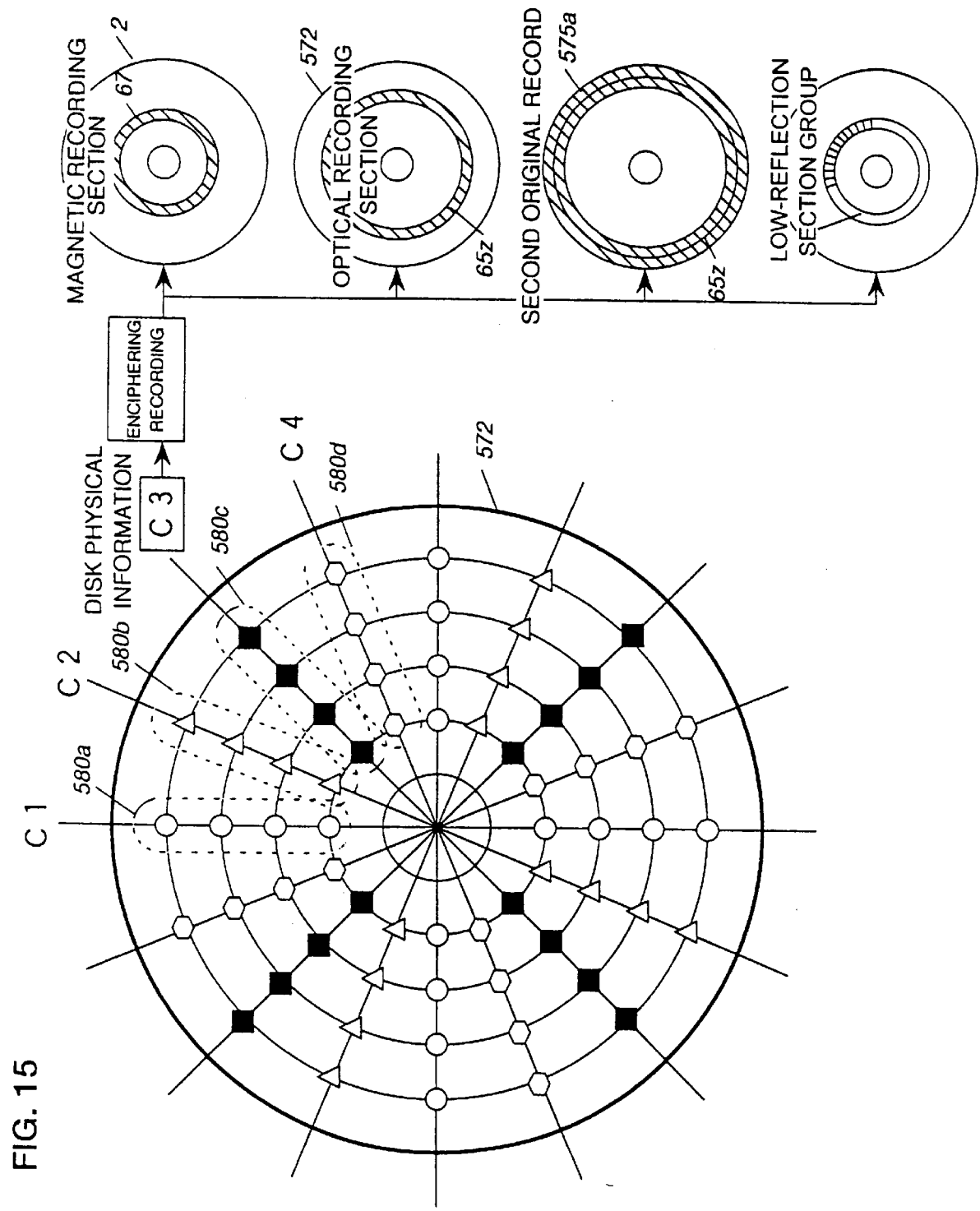

REFERENCE PHYSICAL ARRANGEMENT TABLE 532a

| ADDRESS | ANGLE | DEVIATION m | ALLOWABLE VALUE |
|---------|-------|-------------|-----------------|
| An | Zn | 0 | |
| | | ±1 | Pn(1) |
| | | ±2 | Pn(2) |
| | | ±3 | Pn(3) |
| | | | |
| | | ±m | Pn(m) |

535 CHECK SECTION → CHECK

MEASURED DISK PHYSICAL ARRANGEMENT TABLE 556a

| ADDRESS | ANGLE | DEVIATION m | NUMBER |
|---------|-------|-------------|--------|
| An | Zn | 0 | 100 |
| | | ±1 | 8 |
| | | ±2 | 6 |
| | | ±3 | 3 |
| | | | |
| | | ±m | |

FIG. 19A
IN THE CASE OF NO ECCENTRICITY
FIG. 19B
IN THE CASE OF ECCENTRICITY
EXAMPLE OF CALCULATION OF ECCENTRICITY BY THREE POINTS
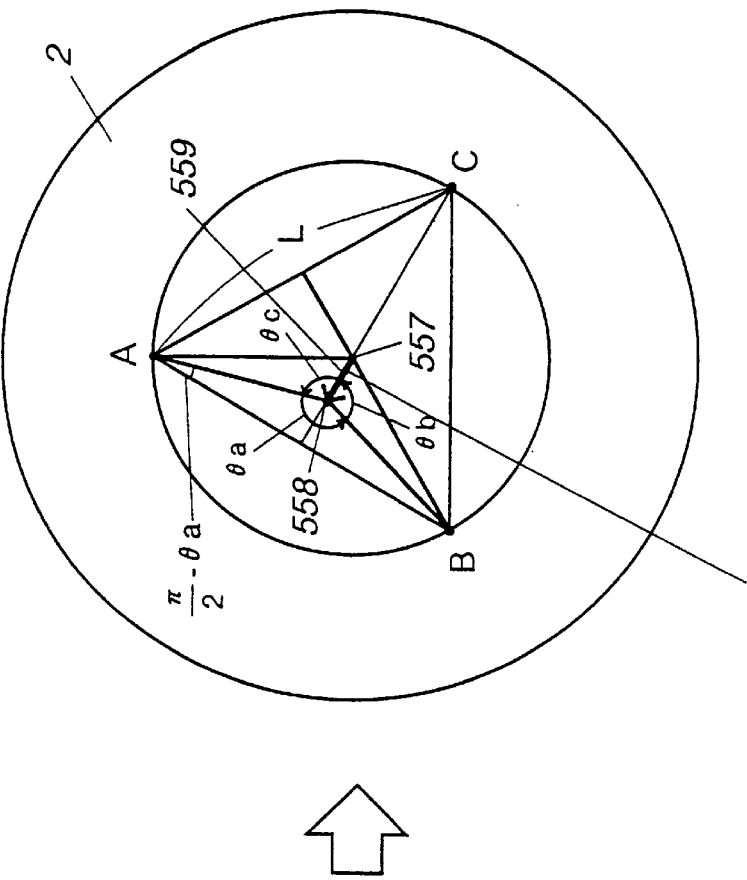
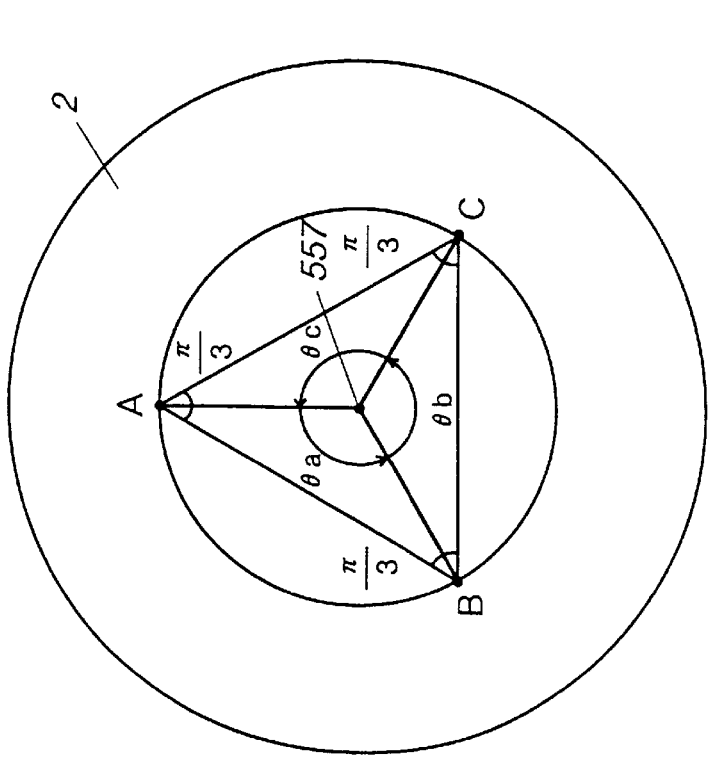
EXAMPLE OF CALCULATION:
$$L'a = f(\theta a, \theta b, \theta c) = \frac{L}{2}\left(\tan\frac{\pi}{6} - \tan\left(\frac{\pi}{2} - \theta a\right)\right)$$

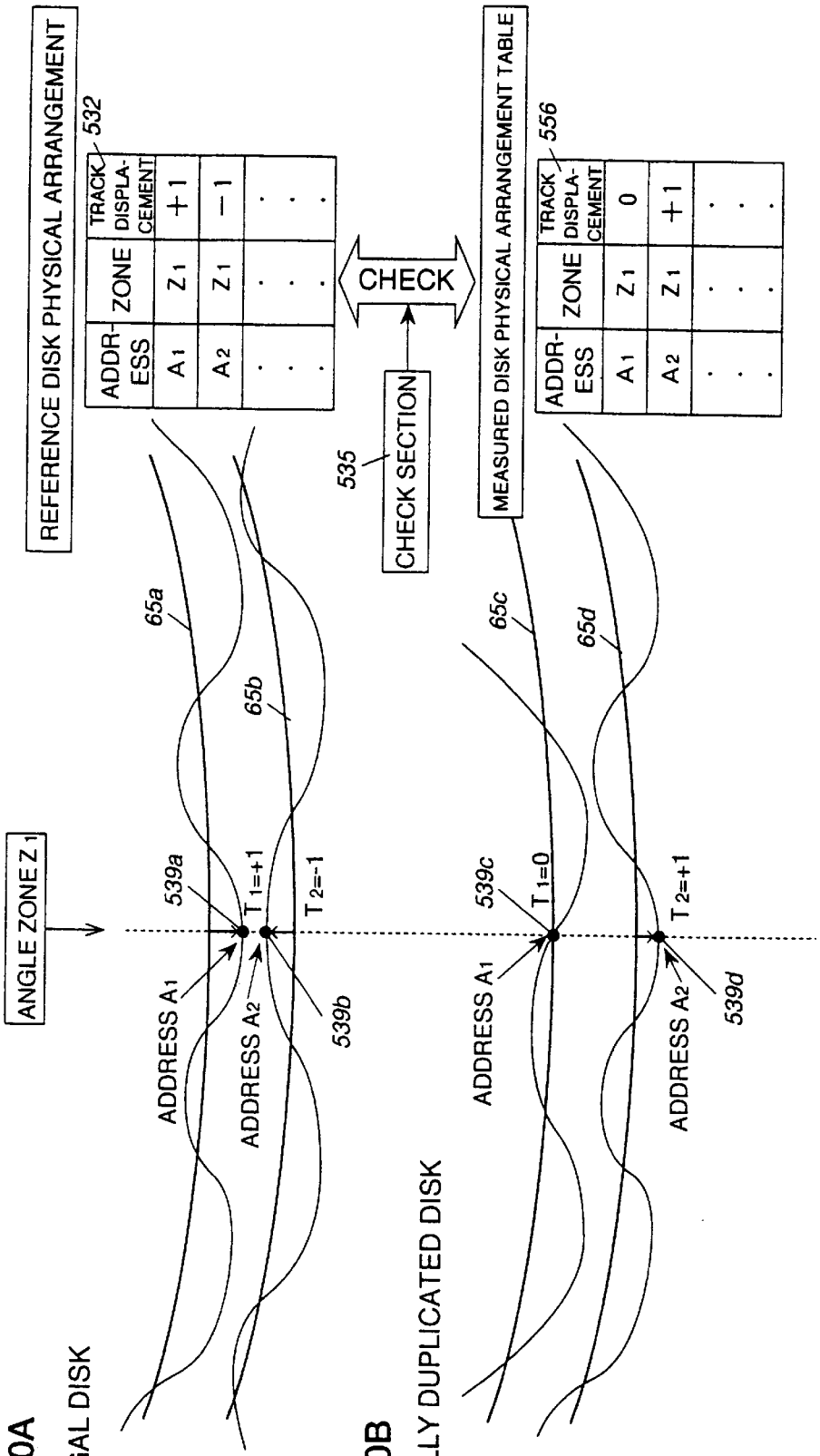
FIG. 20A LEGAL DISK
FIG. 20B ILLEGALLY DUPLICATED DISK

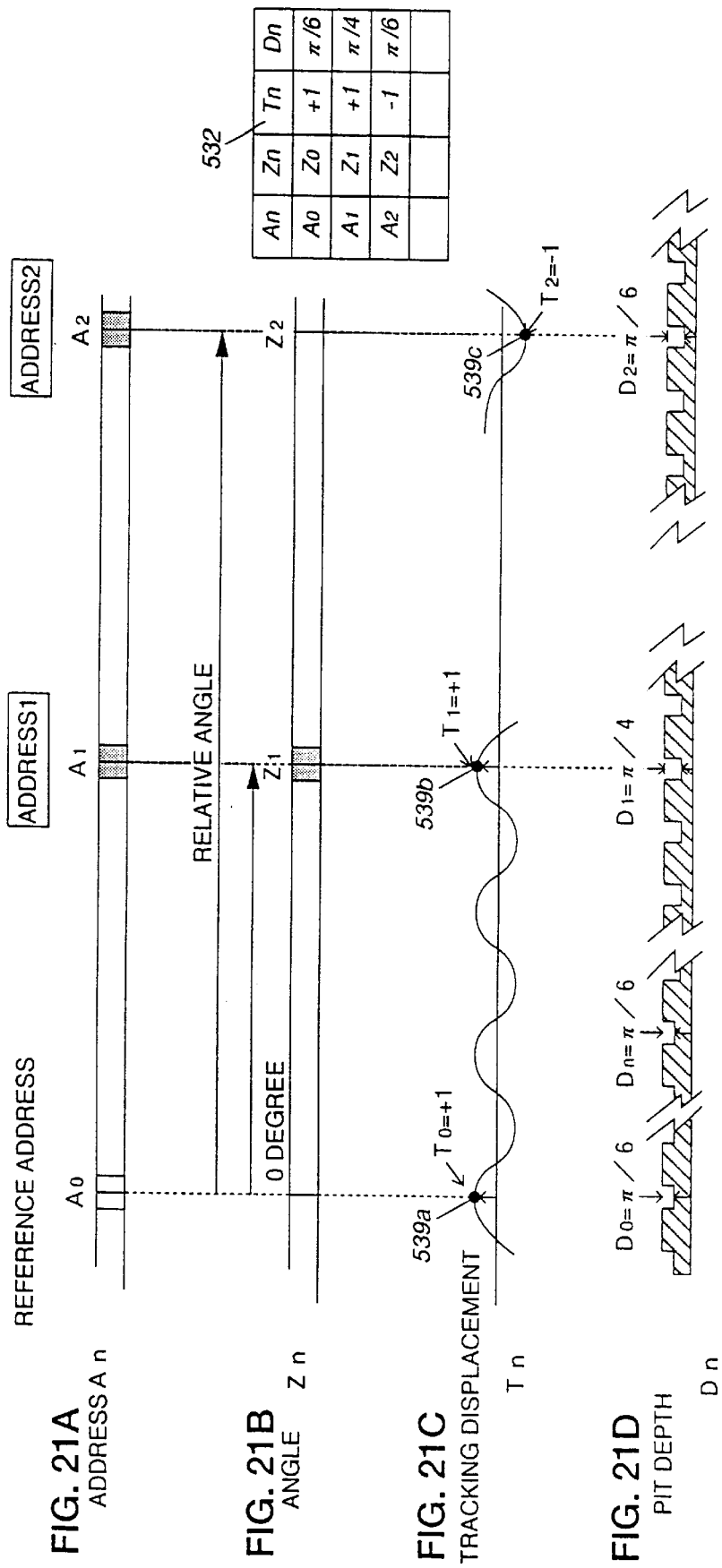

FIG. 23

ORIGINAL RECORD DUPLICATION PREVENTING EFFECTS OF ORIGINAL RECORD FABRICATING APPARATUS

| ORIGINAL RECORD FABRICATING APPARATUS | | COPY PREVENTING SYSTEM | | | | | | |
|---|---|---|---|---|---|---|---|---|
| | | SINGLE A | SINGLE B | SINGLE C | ADDRESS A+B | B+C | A+C | A+B+C |
| | | ANGLE DIRECTION | TRACKING DIRECTION | DEPTH DIRECTION | ANGLE×ADDRESS ANGLE×TRACKING | TRACKING×ADDRESS DEPTH×ADDRESS | ANGLE×ADDRESS ANGLE×DEPTH | |
| EXISTING CD FABRICATING APPARATUS | STANDARD ARTICLE | ○ | ○ | ○ | ○ | ○ | ○ | ○ |
| | SLIGHTLY MODIFIED ARTICLE | △ | ○ | ○ | ○ | ○ | ○ | ○ |
| EXISTING MD/CD FABRICATING APPARATUS | STANDARD ARTICLE | ○ | △ | ○ | ○ | ○ | ○ | ○ |
| | SLIGHTLY MODIFIED ARTICLE | △ | ○ | ○ | △ | ○ | ○ | ○ |
| LD/CD FABRICATING APPARATUS | STANDARD ARTICLE | ○ | ○ | ○ | ○ | ○ | ○ | ○ |
| | SLIGHTLY MODIFIED ARTICLE | △ | △ | ○ | ○ | ○ | ○ | ○ |
| LD/CD/MD FABRICATING APPARATUS | STANDARD ARTICLE | ○ | ○ | ○ | △ | ○ | ○ | ○ |
| | SLIGHTLY MODIFIED ARTICLE | △ | △ | △ | △ | △ LOW YIELD | △ LOW YIELD | △ LOW YIELD |
| RECORDABLE TYPE OPTICAL DISK FABRICATING APPARATUS | STANDARD ARTICLE | △ | △ LOW YIELD | △ LOW YIELD | △ LOW YIELD | △ LOW YIELD | △ LOW YIELD | △ LOW YIELD |
| | SLIGHTLY MODIFIED ARTICLE | × | × | LOW YIELD | × | LOW YIELD | LOW YIELD | LOW YIELD |

←———— STANDARD ARTICLE ————→

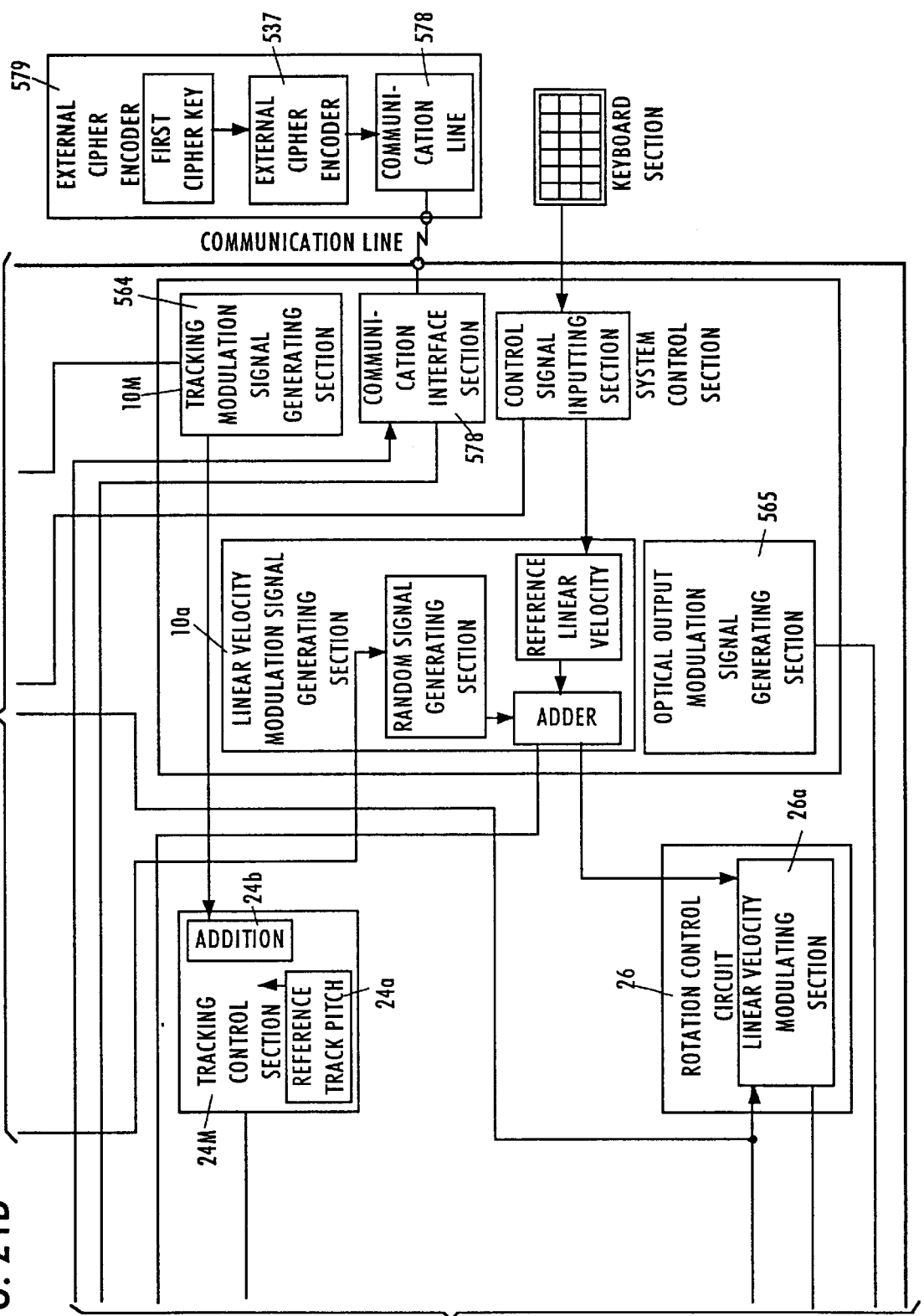

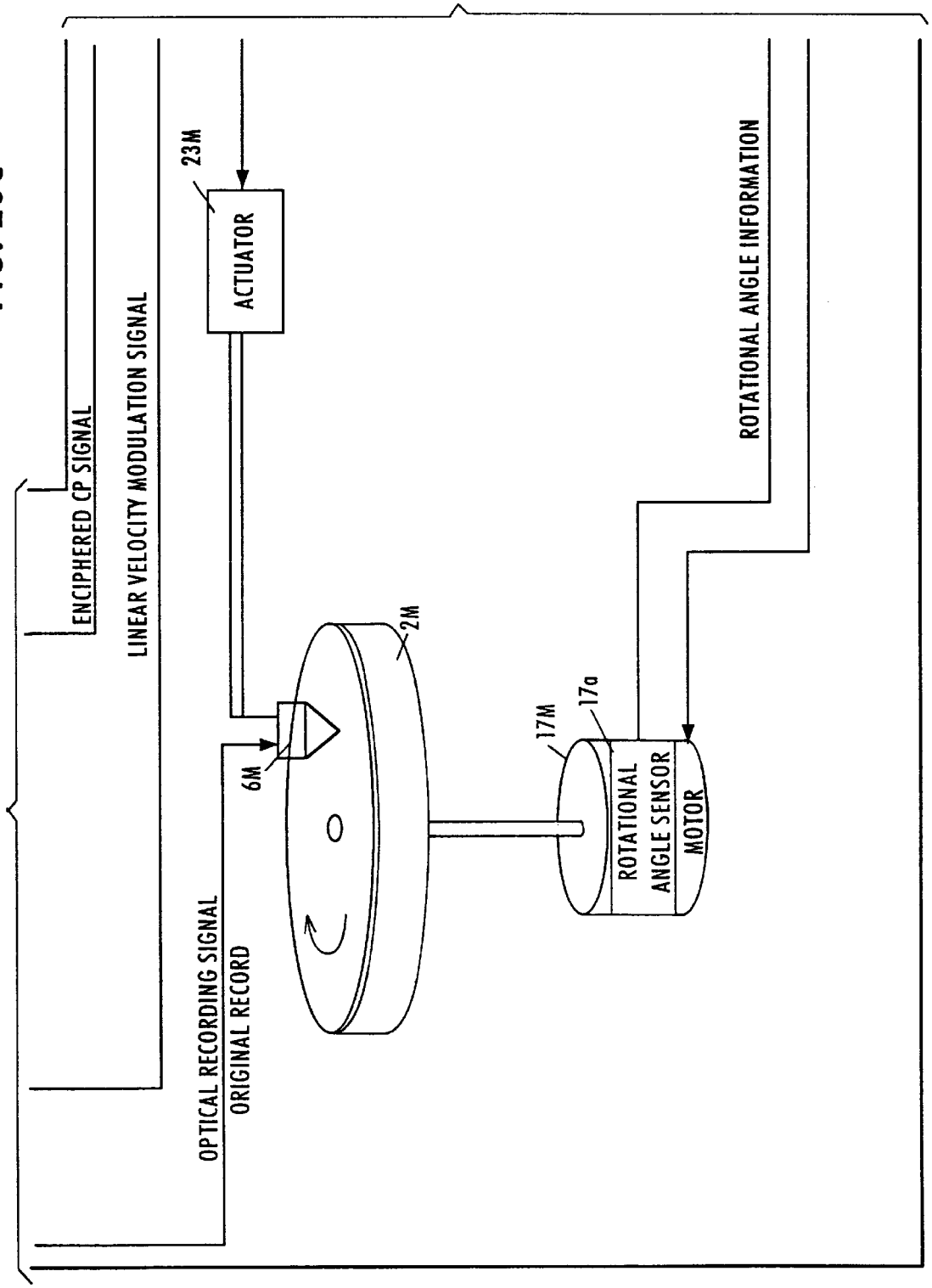

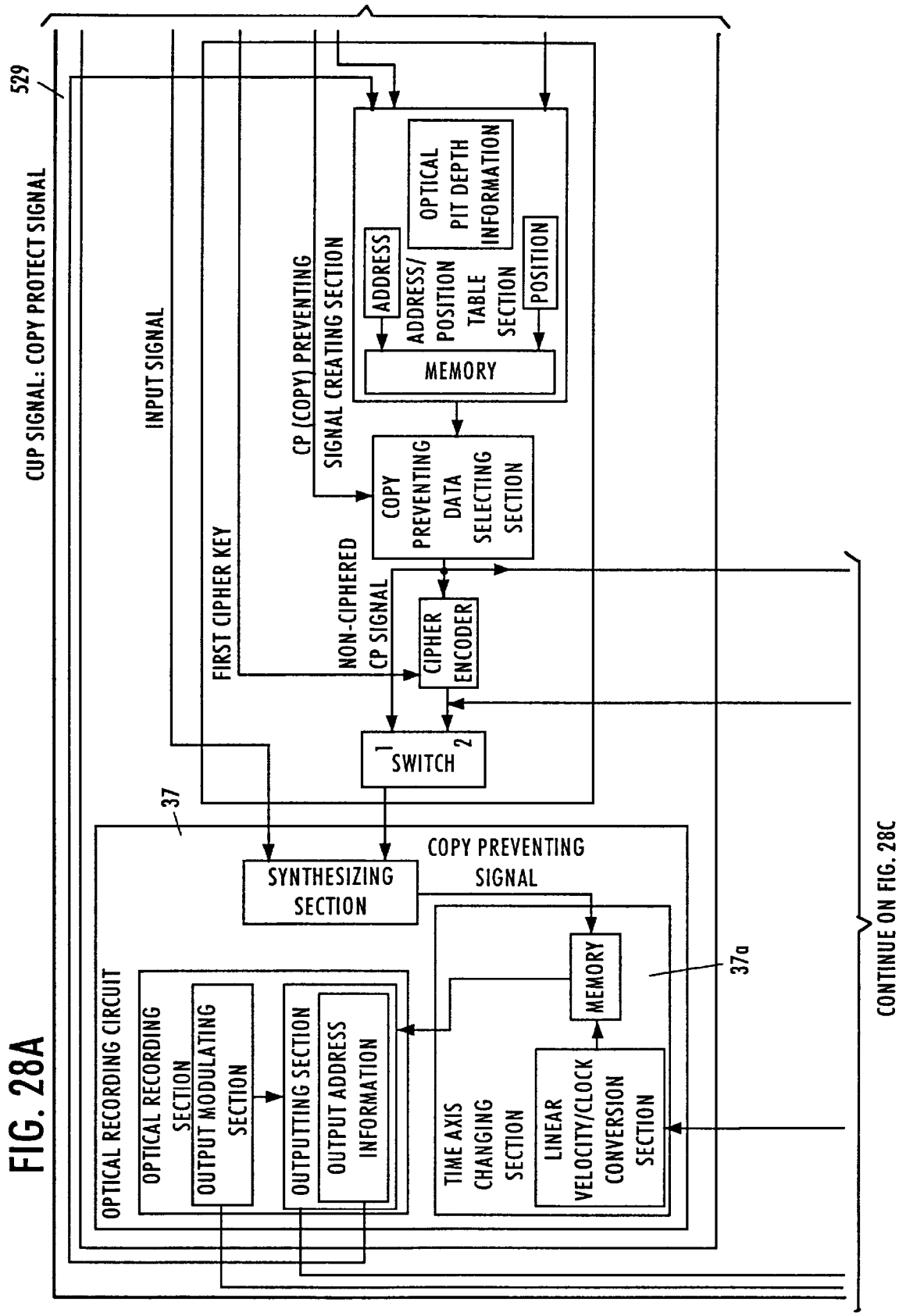

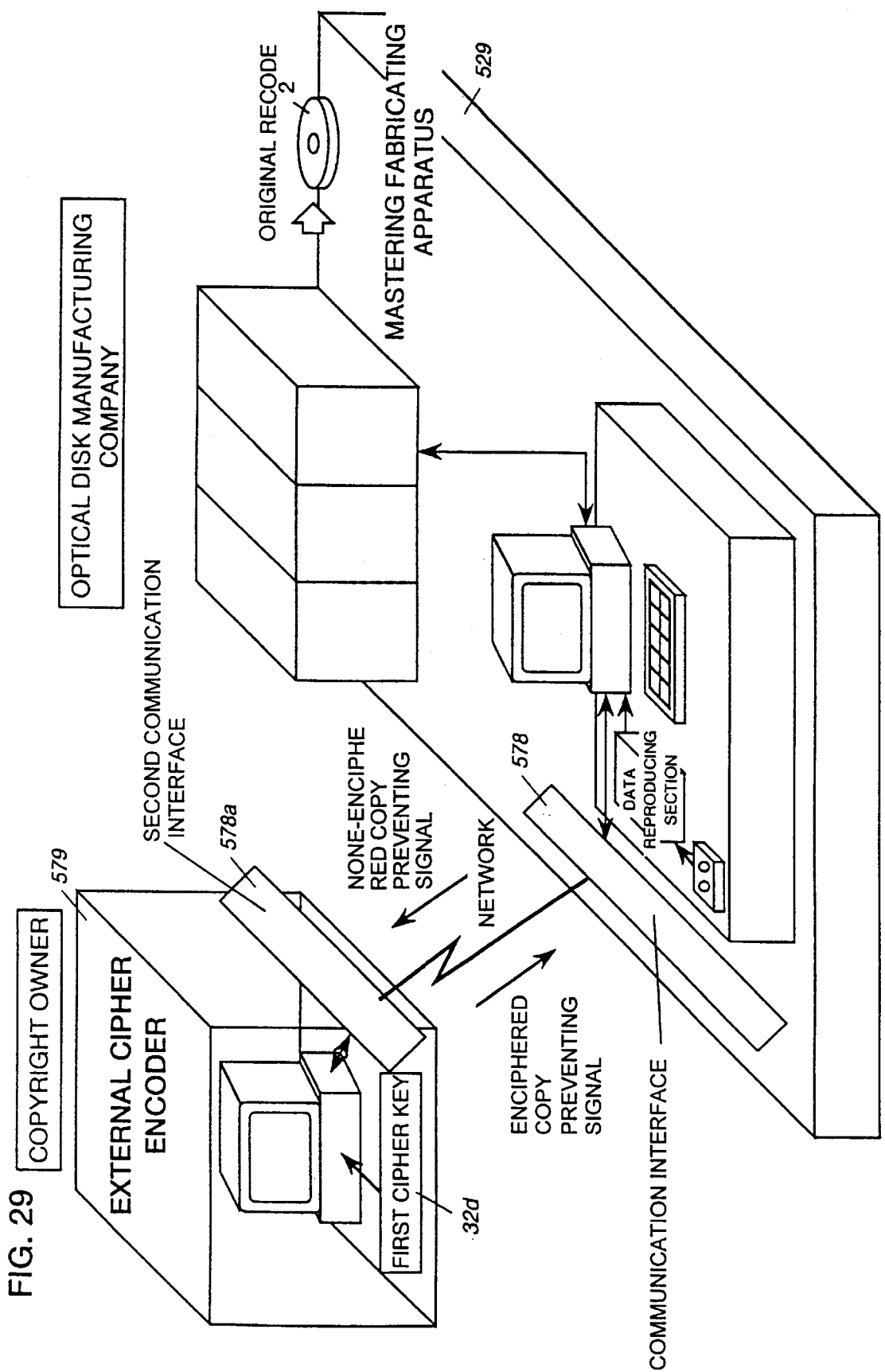

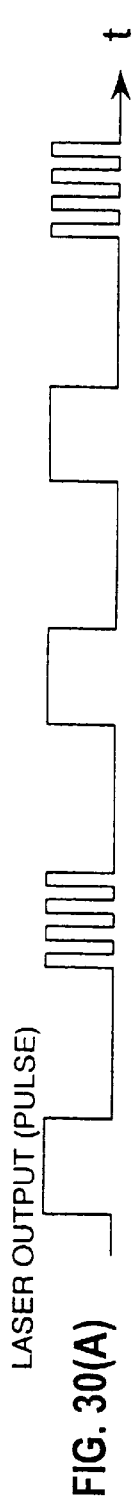
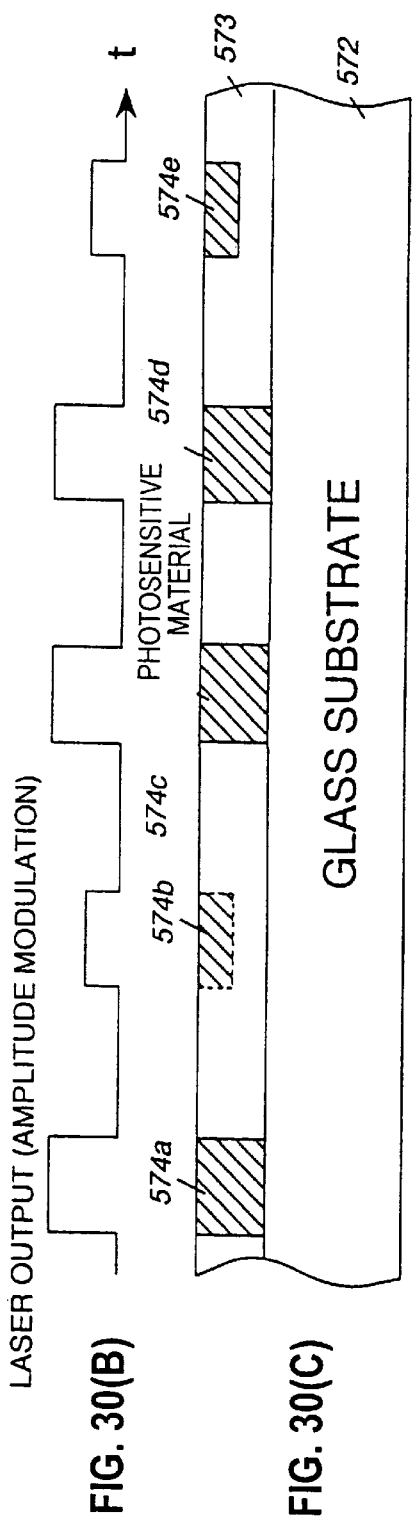
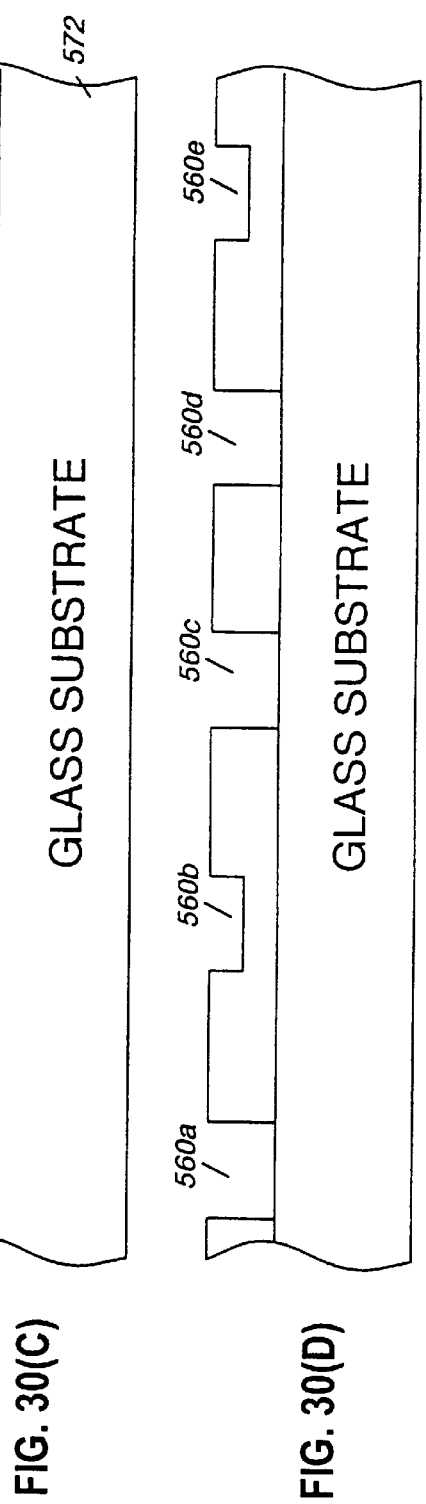
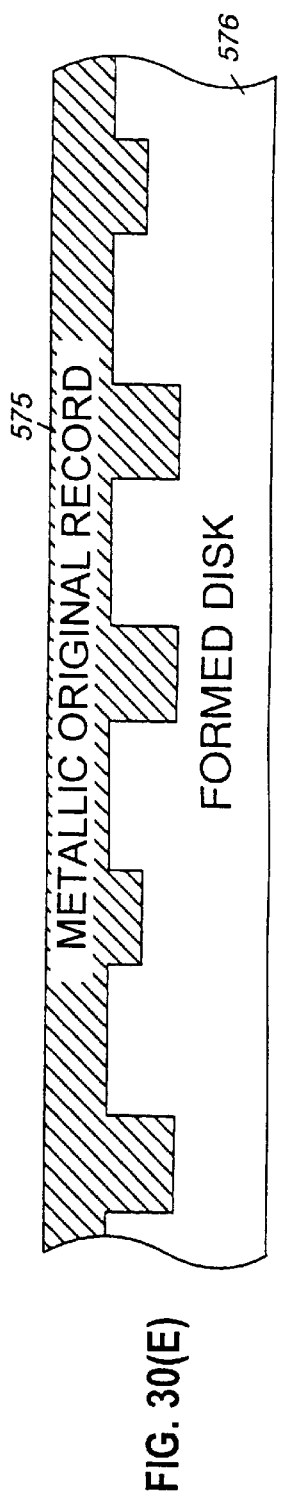
FIG. 30(A) LASER OUTPUT (PULSE)
FIG. 30(B) LASER OUTPUT (AMPLITUDE MODULATION)
FIG. 30(C)
FIG. 30(D)
FIG. 30(E)

ONE-ORIGINAL RECORD SYSTEM

COPY PREVENTING SIGNAL RECORDING SECTION

FORMED OPTICAL DISK

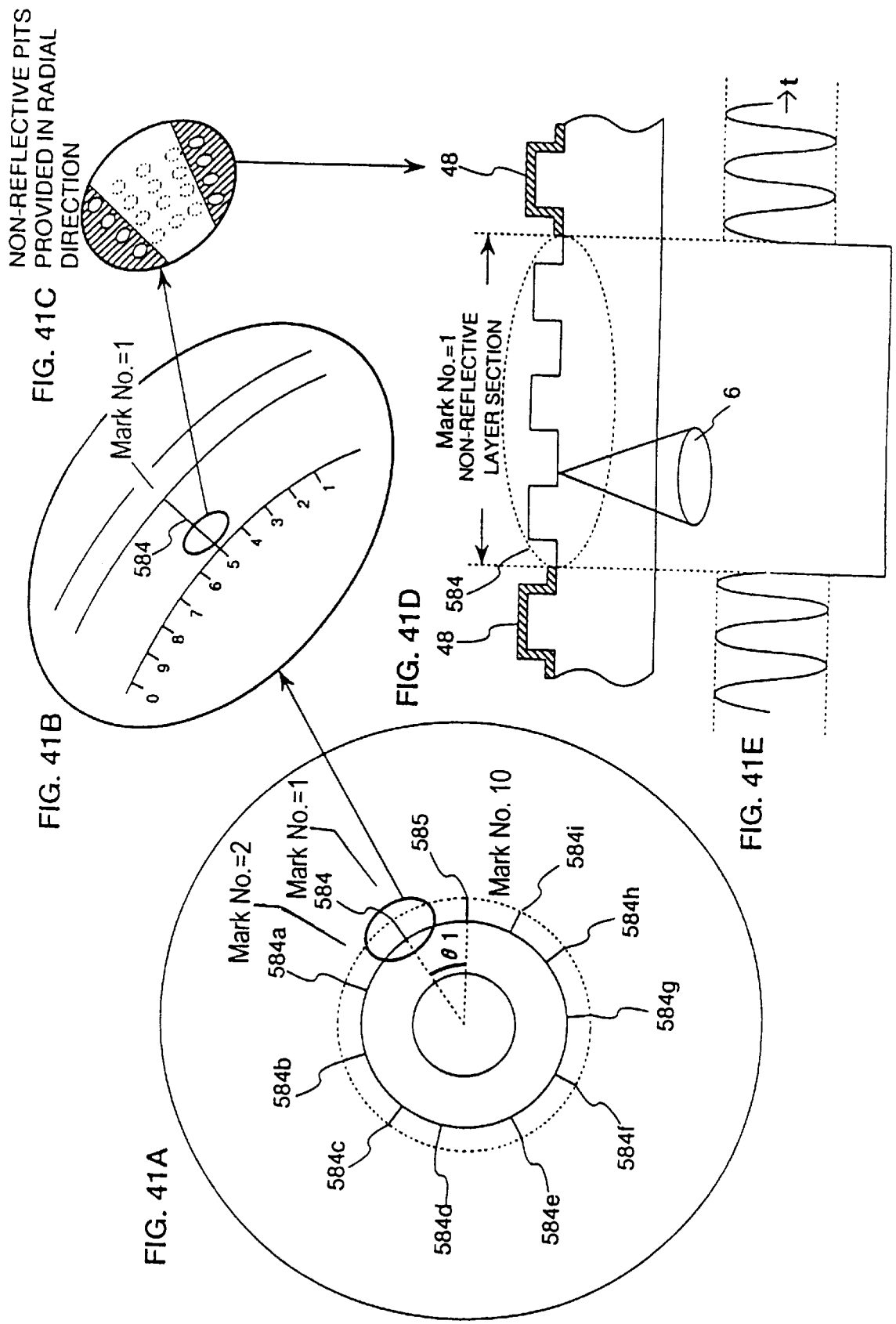

FIG. 43

LEGAL DISK

LOW-REFLECTION SECTION - ADDRESS TABLE 609

| MARK No. | START POSITION | | | END POSITION | | |
|---|---|---|---|---|---|---|
| | ADDRESS | Sync No | CLOCK NUMBER | ADDRESS | Sync No | CLOCK NUMBER |
| 1 | A n | S₁ | m+2 | n | | m+257 |
| 1 | A n+12 | S₂ | m+14 | n+12 | | m+267 |
| 1 | A n+23 | | m+25 | n+23 | | m+300 |
| .. | .. | | .. | .. | | .. |
| 2 | A n+1 | | m+15 | n+1 | | m+160 |
| 2 | A n+13 | | m+85 | n+13 | | m+250 |
| 2 | A n+24 | | m+68 | n+24 | | m+210 |
| 10 | A n+9 | | | | | |
| 10 | | | | | | |

COMPARISON

ILLEGALLY DUPLICATED DISK

LOW-REFLECTION SECTION - ADDRESS TABLE 609x

| MARK No. | START POSITION | | | END POSITION | | |
|---|---|---|---|---|---|---|
| | ADDRESS | Sync No | CLOCK NUMBER | ADDRESS | Sync No | CLOCK NUMBER |
| 1 | n | S₁ | m+2 | n | | m+257 |
| 1 | n+12 | S₂ | m+21 | n+12 | | m+277 |
| 1 | n+22 | | m+4 | n+22 | | m+230 |
| .. | .. | | .. | .. | | .. |
| 2 | n+1 | | m+36 | n+1 | | m+190 |
| 2 | n+13 | | m+120 | n+13 | | m+281 |
| 2 | n+25 | | | n+25 | | |
| 10 | n+9 | | | | | |
| 10 | | | | | | |

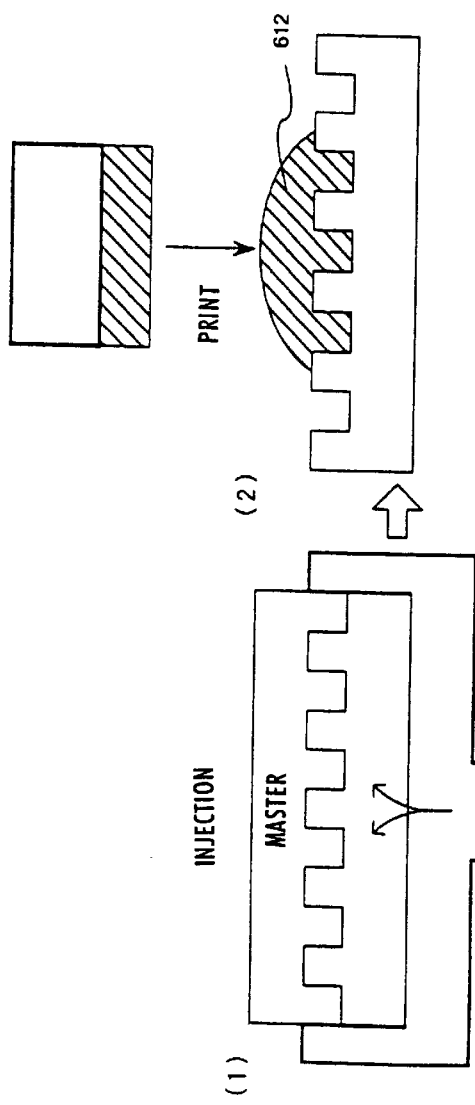
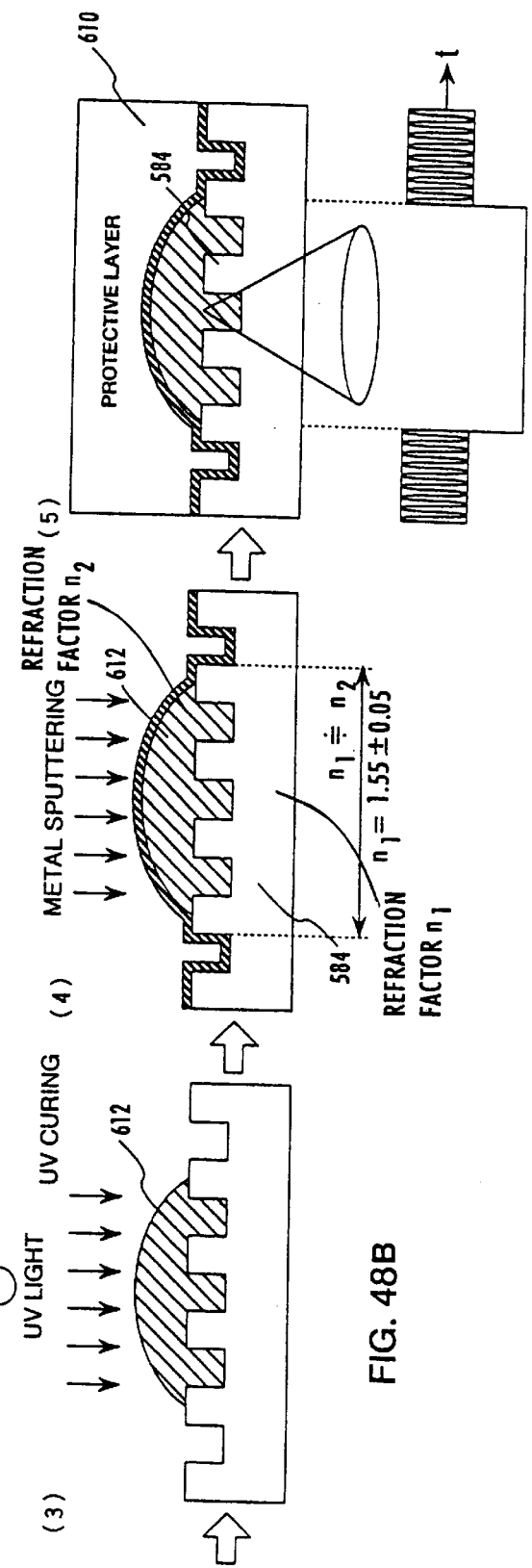
FIG. 48A
FIG. 48B

FIG. 56

EFM CONVERSION TABLE FOR CP

| ORIGINAL DATA TRAIN | EFM Encoder | MODULATED DATA TRAIN | EFM Encoder | DEMODULATED DATA TRAIN |
|---|---|---|---|---|
| 01100100 | | 01000100100010 | | |
| 01100101 | | 00000000100010 | | |
| 01100110 | | 01000000100100 | | |
| 01100111 | | 00100100100010 | | |
| 01101000 | | 01001001000010 | | |
| 01101001 | | 10000001000010 | | |
| 01101010 | | 10010001000010 | | |
| 01101011 | | 10001001000010 | | |
| 01101100 | | 01000001000010 | | |
| 01101101 | | 00000001000010 | ORDINARY SIGN | |
| 01101110 | | 00010001000010 | | |
| 01101111 (ORIGINAL DATA) | → | 00100001000010 | → | 01101111 (DEMODULATED DATA) |
|  | → | 00100001000100 | CP SPECIAL SIGN | ↗ |
| 01110000 | | 10000000100010 | | |
| 01110001 | | 10000010000010 | | |
| 01110010 | | 10010010000010 | | |
| 01110011 | | 00100000100010 | | |
| 01110100 | | 01000010000010 | | |
| 01110101 | | 00000010000010 | | |
| 01110110 | | 00010010000010 | | |
| 01110111 | | 00100010000010 | | |
| 01111000 | | 01001000000010 | | |
| 01111001 | | 00001001001000 | | |
| 01111010 | | 10010000000010 | | |
| 01111011 | | 10001000000010 | | |
| 01111100 | | 01000000000010 | | |
| 01111101 | | 00001000000010 | | |
| 01111110 | | 00010000000010 | | |
| 01111111 | | 00100000000010 | | |

FIG. 57A

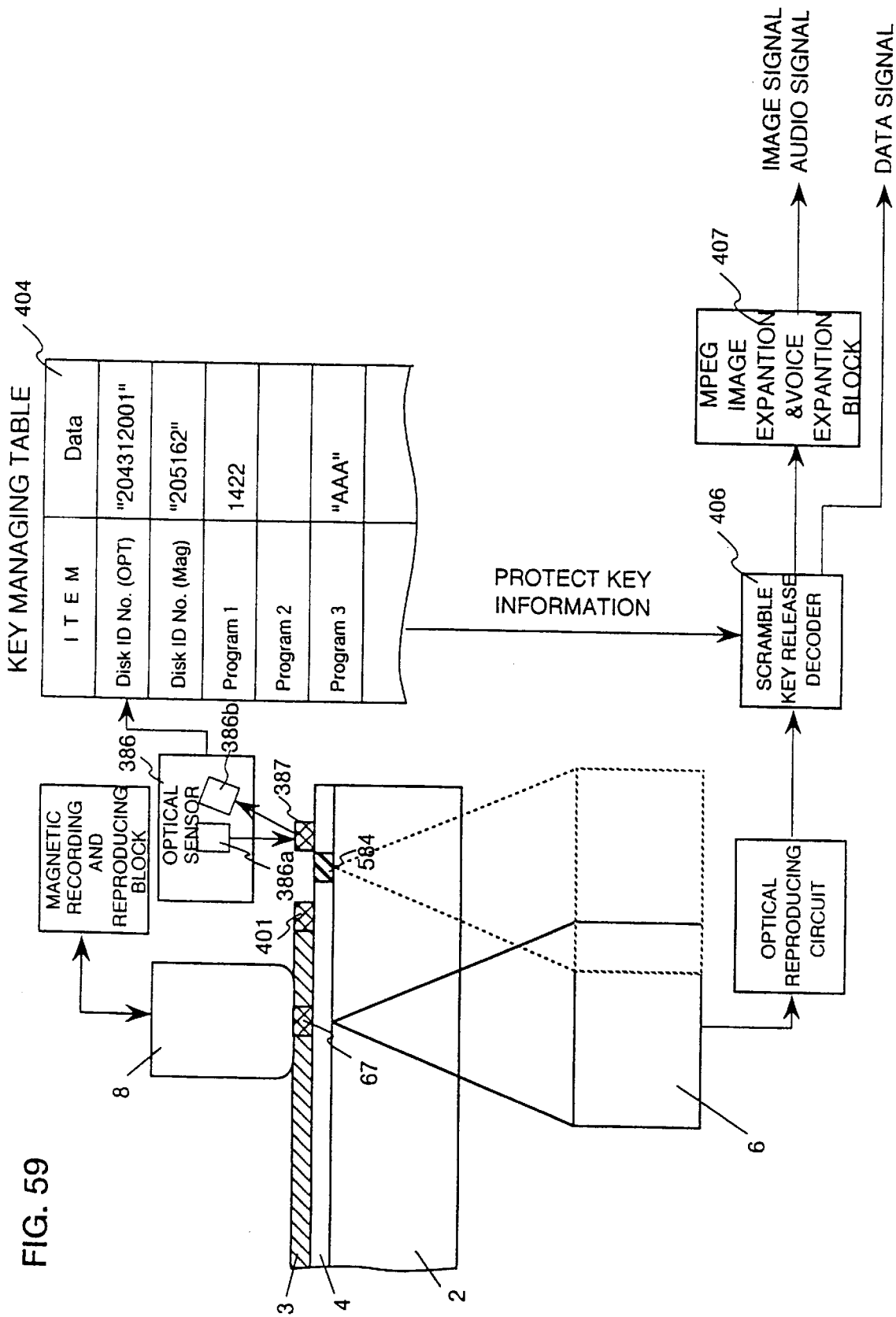

FIG. 62A  FIG. 62B  FIG. 62C INPHASE SIGNAL DETECTION SIGNAL

ILLUSTRATION OF DISPLAY ON PERSONAL SCREEN

TOP VIEW OF CD LABEL SURFACE

FIG. 81

```
A:> Start Program No.11
Please input Password of Program No.N
A:> 123456
OK
```

FIG. 83A
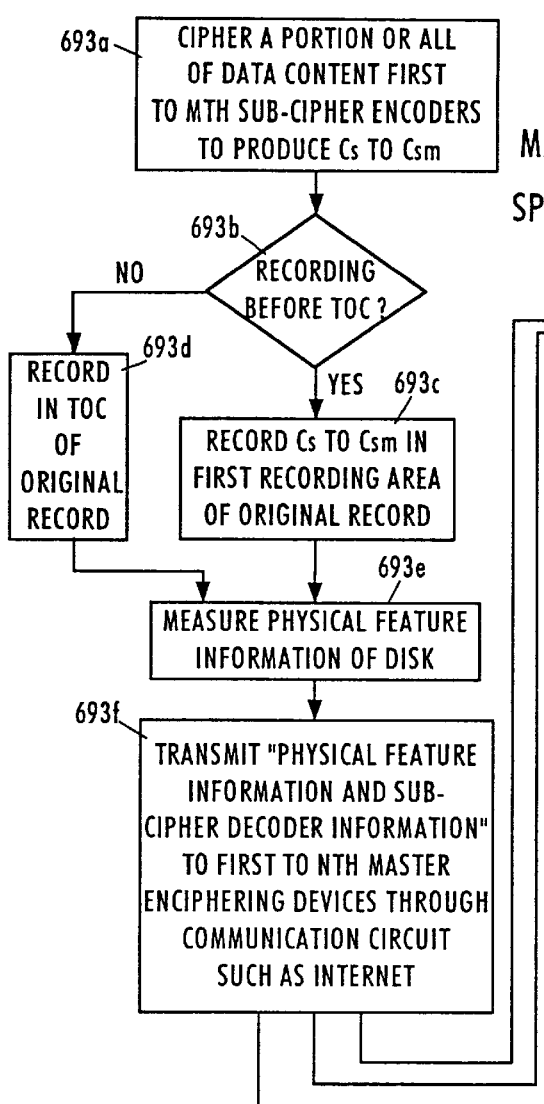
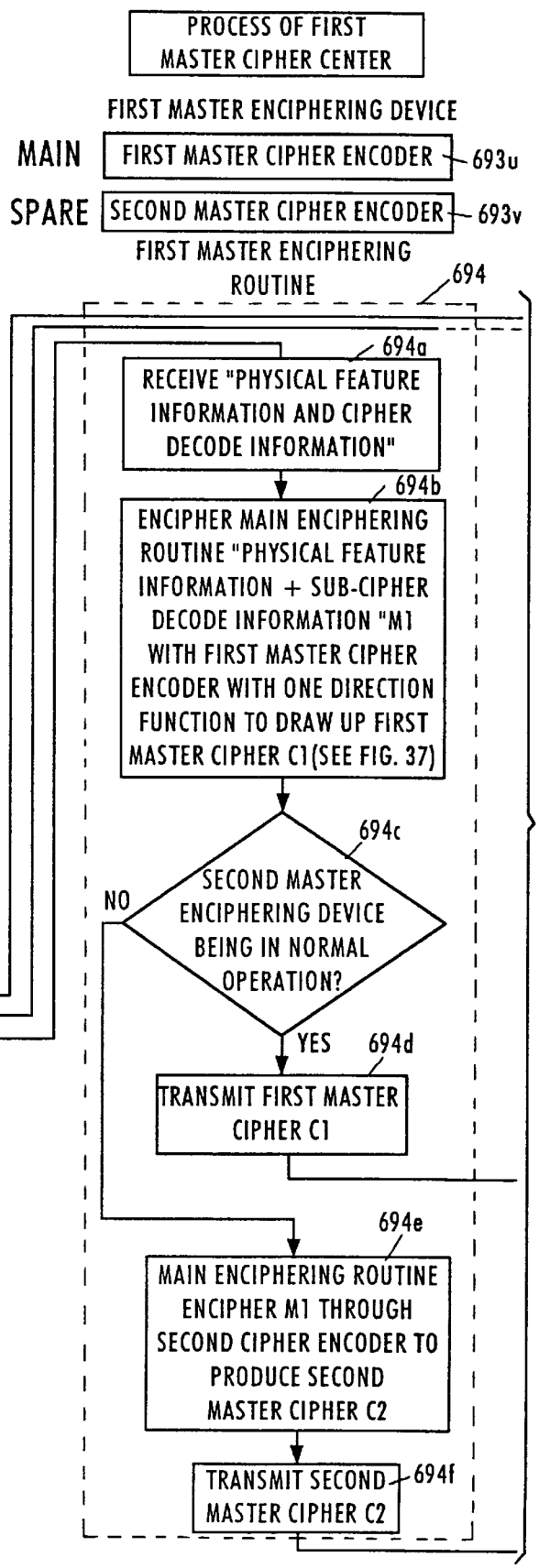
FIG. 83

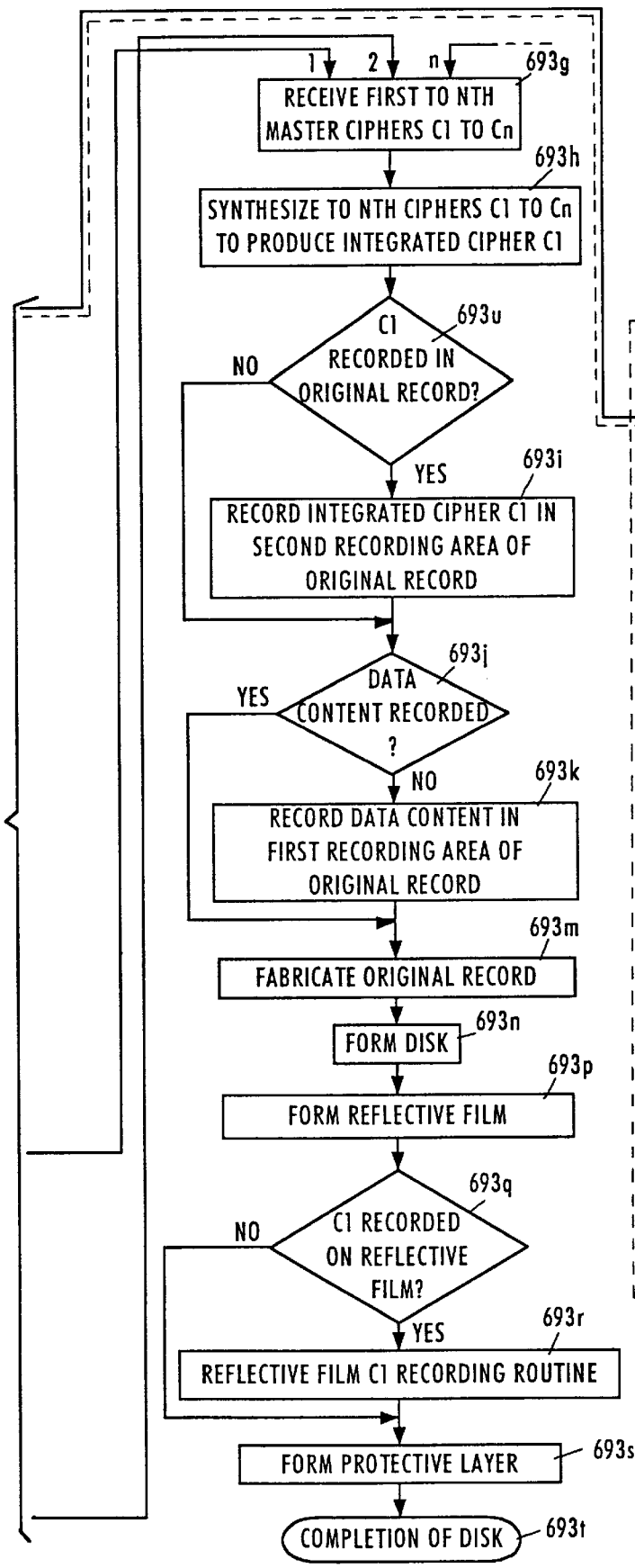

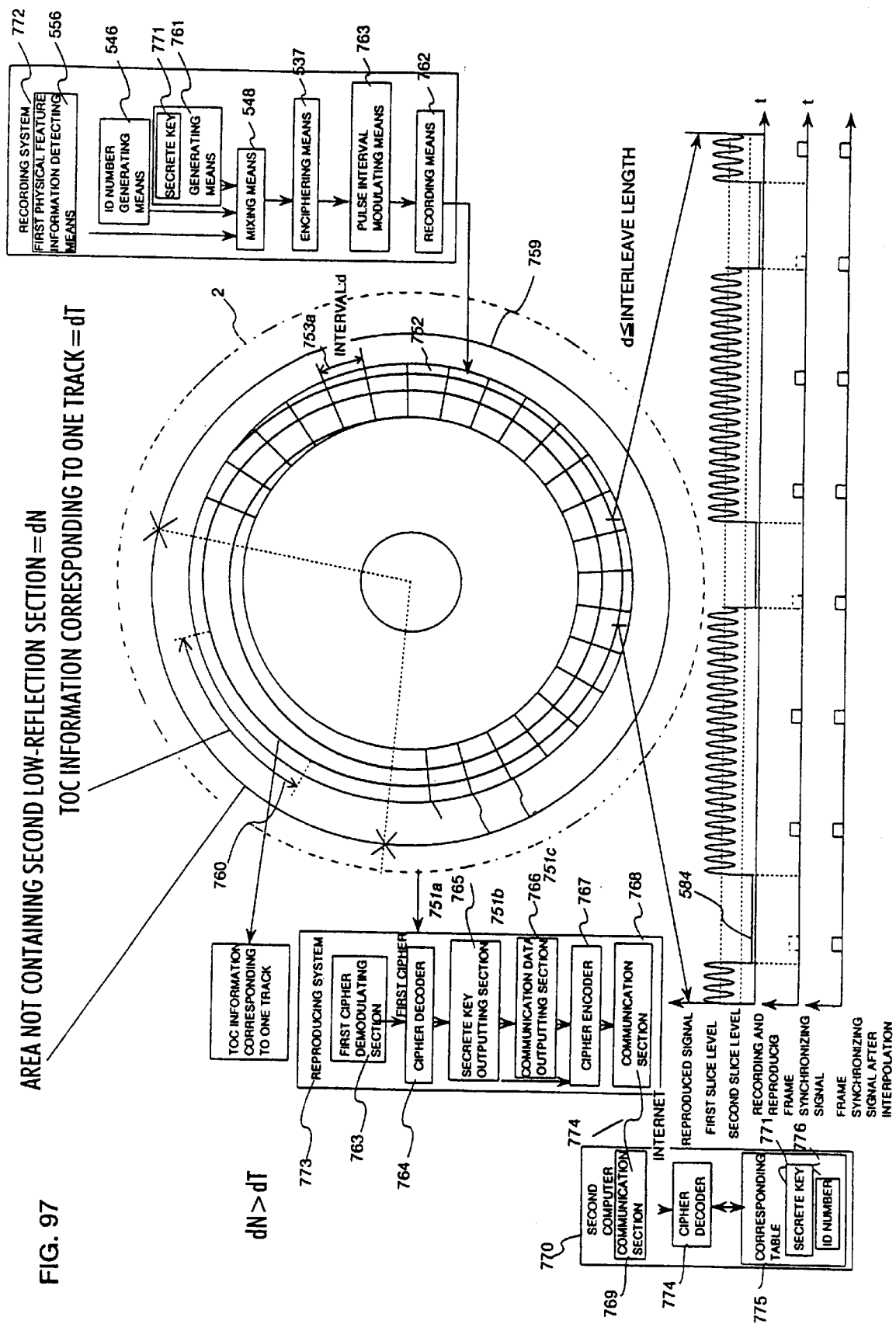

METHOD AND APPARATUS FOR PREVENTING ILLEGAL COPY OR ILLEGAL INSTALLATION OF INFORMATION OF OPTICAL RECORDING MEDIUM

This is a continuation-in-part, of a copending U.S. patent application Ser. No. 08/281,337, filed Jul. 27, 1994 by one of the applicants of the present application.

BACKGROUND OF THE INVENTION

1. Industrial Application Field

The present invention relates to prevention of illegal copies of disc-like optical recording media and prevention of illegal install of information into information processing systems or the like, and more particularly to a method and system for preventing recorded music on optical disks, as well as projected images and various sorts of programs, such as game softwares (softs) and computer softwares, from being illegally copied and utilized without permission of the copyrighters, and further relates to an optical recording medium incapable of copy.

2. Description of the Prior Art

In recent years, optical disks are widely being employed in a variety of fields. The optical disks are generally classified into record-possible RAM disks and record-impossible ROM disks, while the manufacturing cost of the RAM disks is from five times to ten times that of the ROM disks. Accordingly, the ROM disks tend to be chiefly used in applications that supply a large number of people with a large quantity of information, for example, an electronic publication application and a medium cost-limited application that supplies music softwares and projected image softwares. On the other hand, as obvious from CD-ROM game machines and CD-ROM contained personal computers, there is a need for a RAM function being incorporated into the ROM disks, as an extension is more being made to interactive use. Home-use systems seldom require a large RAM capacity, for which reason great interest is focused on the advent of a new medium concept capable of realizing the three conditions: a small capacity RAM function, a large capacity ROM function, and a low cost. In addition, illegal duplicates of ROM disks such as CDs are recently put in the market so that the copyrighters suffer serious damage. Thus, a countermeasure has been needed for the duplicate prevention. Moreover, a soft distribution method has come into wide spread use where a plurality of encrypted (enciphered) programs are incorporated into disks and decrypted (deciphered) through passwords, and for improving the security of the password there is a need for a different ID number being recorded in each ROM.

One possible way to realize this concept is that one magnetic recording layer is equipped on the rear surface of a ROM disk, in which case the formation cost of the recording layer is less than one-tenth that of the ROM disk itself, thus realizing a partial RAM disk without greatly raising the cost of the ROM disk. Actually, as disclosed in Japanese Patent Laid-Open Nos. 56-163536, 57-6446, 57-212642, 2-179951, in terms of ROM disks such as CD-ROM not having a cartridge, there have already been proposed approaches wherein an optical recording section is provided on a front surface of a CD-ROM and a magnetic recording section is added on the rear surface thereof. In addition, Japanese Patent Laid-Open No. 60-70543 discloses an attempt to accomplish magnetic recording by means of a combination of a disk wherein, like optical disks of amorphous material, an optical recording section, made of a nonmagnetic material, is placed on its surface and a magnetic recording layer is located on its rear surface and a magnetic head which is equipped in a mechanical section facing the rear surface.

On the other hand, for the duplicate prevention, only means is known which is made to manufacture a special disk through a special process, such as intentionally making a cut or openwork on the disk, so that difficulty is encountered to manufacture it without a special manufacturing apparatus.

However, the aforesaid methods are merely based on a combination of a magnetic recording section and an optical recording section, while not containing the important requirements for definite realization of the equipment at all, such as the ways of avoiding the mutual interference between the optical recording section and magnetic recording section, permitting access to magnetic tracks with a simple arrangement, sharing a circuit, protecting magnetically recorded information on media from the external environment including magnetism and abrasion without the use of a cartridge, compressing information to be recorded in a RAM area, accelerating the access, and concretely making out a physical track format.

Furthermore, in the prior art examples, disclosure is hardly made in terms of the ways of realizing a home-use partial RAM disk in a concrete form, such as the method of mass-producing media at a low cost, which is important in realization of the media, and the method of making the media conformable with the CD standards. Therefore, there remains a problem which arises with the conventional examples in that difficulty is experienced in concrete realization of media and systems capable of home use.

SUMMARY OF THE INVENTION

The present invention is for eliminating above-described problems, and it is therefore a first object of the present invention to provide a method, system and medium which can realize a ROM type partial RAM disk and system without the use of a cartridge like a CD-ROM.

A second object of this invention is to provide a duplicate-preventing disk and system capable of preventing illegal duplicate through a way such as changing the physical arrangement of addresses, but not through the special method proposed heretofore.

For achieving these purposes, according to this invention, when an optical disk enters in a manufacturing step, first physical feature information indicative of a physical feature including at least a two-dimensional pit arrangement or pit configuration is encrypted and optically or magnetically written in advance in such a manner as being distinguishable from the main information to be recorded in the optical disk, before, i.e., when being in reproduction, read out to be deciphered. At this reproduction, a physical feature of the optical disk is additionally measured to obtain second physical feature information. The second physical feature information is checked (collated) with the first physical feature information so as to make a decision as to whether or not a specific relationship is present therebetween. When the second physical feature information is not in the specific relation to the first physical feature information, the operation of a specific program read out from the optical disk is made to stop, the reading-out of the information is designed to stop afterwards, or a given process of the read information by a signal processing means is adapted to stop.

That is, according to this invention, there is provided an information reproducing system comprising means (17) for rotationally driving a disc-like optical recording medium (2) wherein information is recorded in the form of pits, an optical head (6) for reading out the recorded information from the optical recording medium, head-moving means (23) for making the optical head movable radially of the optical recording medium, and signal processing means for processing the information read out through the optical head, which system is characterised by including:

first physical information detecting means (743, 38, 665) for detecting on the basis of information read out through the optical head or a magnetic head first physical feature information (532) which is representative of a physical feature including at least a two-dimensional pit arrangement or pit configuration on the optical recording medium and which is encrypted and recorded at manufacturing of the optical recording medium;

decryption means (534) for decrypting the first physical feature information;

means (17a, 6, 38, 703a) for measuring a physical feature of the optical recording medium to obtain second physical feature information;

check means (535) for checking the second physical feature information with the first physical feature information to make a decision as to whether or not both are in a specific relation to each other; and control means (717, 665) for, when the check means decides that the second physical feature information is not in the specific relation to the first physical feature information, stopping the operation of a specific program read out from the optical recording medium, for stopping the reading-out of information from the optical recording medium afterwards, or for stopping a given process of information, read out from the optical recording medium, the given process being practiced by the signal processing means.

Moreover, according to this invention, there is provided an information recording system which is characterised by comprising:

encryption means (537) for encrypting, using a one direction function, first physical feature information (532) indicative of a physical feature including at least a two-dimensional pit arrangement or pit configuration on a disc-like optical recording medium; and recording means (37, 6, 23, 24, 17, 26, 10) for recording the encrypted first physical feature information on the optical recording medium or an original record therefor so that the encrypted first physical feature information is distinguishable from main information to be recorded on the optical recording medium.

In addition, according to this invention, there is provided a method of manufacturing a disc-like optical recording medium, which comprises the steps of:

recognizing first physical feature information (532) representative of a physical feature at least including a two-dimensional pit arrangement or a pit configuration on the disc-like optical recording medium;

encrypting the first physical feature information by using a one direction function; and recording the encrypted first physical feature information on the optical recording medium or an original record therefor so that the encrypted first physical feature information is distinguishable from main information to be recorded on the optical recording medium.

Furthermore, according to this invention, there is provided a disc-like optical recording medium which is manufactured through the steps of recognizing first physical feature information (532) representative of a physical feature at least including a two-dimensional pit arrangement or a pit configuration on the disc-like optical recording medium, encrypting the first physical feature information by using a one direction function; and recording the encrypted first physical feature information on the optical recording medium or an original record therefor so that the encrypted first physical feature information is distinguishable from main information to be recorded on the optical recording medium.

Still further, there is provided a method of preventing an illegal copy of a disc-like optical recording medium or of preventing an illegal install of information on the disc-like optical recording medium, which comprises the steps of detecting on the basis of information read out from the optical recording medium first physical feature information (532) which is representative of a physical feature including at least a two-dimensional pit arrangement or pit configuration on the optical recording medium and which is encrypted and recorded by using a one direction function at manufacturing of the optical recording medium;

decrypting the first physical feature information;

measuring a physical feature of the optical recording medium to obtain second physical feature information;

checking the second physical feature information with the first physical feature information to make a decision as to whether or not both are in a specific relation to each other; and when the check step decides that the second physical feature information is not in the specific relation to the first physical feature information, stopping the operation of a specific program read out from the optical recording medium, stopping the reading-out of information from the optical recording medium afterwards, or stopping a given process of information, read out from the optical recording medium, the given process being practiced by signal processing means.

Moreover, there is provided a method of preventing an illegal copy of a disc-like optical recording medium or of preventing an illegal install of information on the disc-like optical recording medium, which comprises the steps of:

detecting first physical feature information (532) from the optical recording medium, the first physical feature information being indicative of a physical feature at least including a two-dimensional pit arrangement or a pit configuration on the optical recording medium, encrypted using a one direction function and recorded on the optical recording medium or an original record therefor so as to be distinguishable from main information to be recorded on the optical recording medium;

decrypting the first physical feature information;

measuring a physical feature of the optical recording medium to obtain a second physical feature information;

checking the second physical feature information with the first physical feature information to make a decision as to whether or not both are in a specific relation to each other; and when the check step decides that the second physical feature information is not in the specific relation to the first physical feature information, stopping the operation of a specific program read out from the optical recording medium, stopping the reading-out of information from the optical recording medium afterwards, or stopping a given process of information, read out from the optical recording medium, the given process being practiced by signal processing means.

Contents of This Specification

This specification contains detailed descriptions of many embodiments, and a table of the brief contents thereof is herein appended as follows.

Summary of the Invention
Brief Description of the Drawings
Description of Reference Marks
Table of Contents of the Embodiments and Corresponding Drawings
First Embodiment
Second Embodiment
Third Embodiment
Fourth Embodiment
Fifth Embodiment
Sixth Embodiment
Seventh Embodiment
Eighth Embodiment
Ninth Embodiment
Tenth Embodiment
Eleventh Embodiment
Twelfth Embodiment
Thirteenth Embodiment
fourteenth Embodiment

BRIEF DESCRIPTION OF THE DRAWINGS

FIG. 2A is an illustration of variation of linear velocity with time at recording in the second embodiment;

FIG. 2B is an illustration of address locations on an optical disk at 1.2 m/s in the second embodiment;

FIG. 2C is an illustration of address locations on an optical disk at 1.2 m/s→1.4 m/s;

FIG. 3A is an illustration of a physical arrangement of addresses of a legal CD in the second embodiment;

FIG. 3B is an illustration of a physical arrangement of addresses of an illegally duplicated CD in the second embodiment;

FIG. 4 consists of FIG. 4(a) is an illustration of the relationship between rotational pulses for a disk and time in the second embodiment;

FIG. 4(b) is an illustration of the relationship between a physical position signal and time in the second embodiment;

FIG. 4(c) is an illustration of the relationship between address information and time;

FIG. 8A is a process illustration of a CD with an ID number recorded in a first embodiment;

FIG. 8B is an illustration of an process for a prior art CD;

FIG. 9A is a top view of a magnetizing device in the first embodiment;

FIG. 9B is a side elevational view showing a magnetizing device in the second embodiment;

FIG. 9C is an enlarged side elevational view showing the magnetizing device in the second embodiment;

FIG. 9D is a block diagram showing the magnetizing device in the second embodiment;

FIG. 11A is an illustration of the relationship between a linear velocity and time at a constant linear velocity in the second embodiment;

FIG. 11B is an illustration of the relationship between a linear velocity and time at variation of the linear velocity in the second embodiment;

FIG. 11C is an illustration of a physical arrangement of addresses at a constant linear velocity in the second embodiment;

FIG. 11D is an illustration of a physical arrangement of addresses at variation of the linear velocity in the second embodiment;

FIG. 12A is a cross-sectional view of a legal original record in the second embodiment;

FIG. 12B is a cross-sectional view showing a legally formed disk in the second embodiment;

FIG. 12C is a cross-sectional view showing an illegally duplicated original record in the second embodiment;

FIG. 12D is a cross-sectional view showing an illegally duplicated formed disk in the second embodiment;

FIG. 15 an illustration of an address arrangement on a disk original record in the second, fourth and seventh embodiments;

FIG. 19A is an illustration of an address arrangement on an optical disk which is not in an eccentric condition, in the third embodiment;

FIG. 19B is an illustration of an address arrangement of an optical disk which is in an eccentric condition, in the third embodiment;

FIG. 20A is an illustration of tracking displacement of a legal disk in the third embodiment;

FIG. 20B is an illustration of tracking displacement of an illegally duplicated disk in the third embodiment;

FIG. 21A shows an address An in the third embodiment;
FIG. 21B illustrates an angle Zn in the third embodiment;
FIG. 21C shows an tracking displacement Tn in the third embodiment;
FIG. 21D illustrates a pit depth Dn in the third embodiment;

FIG. 23 is illustrative of a duplicate preventing effect relating to each original record fabricating apparatus in the second and third embodiments;

FIG. 29 is a block diagram wholly showing an original record fabricating system in the second and third embodiments;

FIG. 30A is an illustration of a waveform of a laser output in the third embodiment;

FIG. 30B is an illustration of a waveform of a laser output in the third embodiment;

FIG. 30C is a cross-sectional view showing a substrate in the third embodiment;

FIG. 30D is a cross-sectional view showing a substrate in the third embodiment;

FIG. 30E is a cross-sectional view showing a formed disk in the third embodiment;

FIG. 41A is a top view of a disk in a fourth embodiment;

FIG. 41B is a top view of a disk in the first embodiment;

FIG. 41C is a top view of a disk in the first embodiment;

FIG. 41D is a transverse cross-sectional view showing a disk in the first embodiment;

FIG. 41E is an illustration of a waveform of a regenerative signal in the first embodiment;

FIG. 43 is an illustration of comparison between low-reflection portion address tables of a legal disk and duplicated disk in the fourth embodiment;

FIG. 48 is a flow illustration of a manufacturing method of a low-reflection portion in the fourth embodiment;

FIG. 56 is an illustration of a duplicate preventing EFM conversion table in the fifth embodiment;

FIG. 59 is a principle illustration of a disk based on a duplicate preventing method using an optical mark in the first embodiment;

FIG. 81 is an illustration of display on a screen in the first embodiment;

FIG. 83 is a flow chart showing encryption in a thirteenth embodiment;

FIG. 84 is a flow chart showing a main cipher in the thirteenth embodiment;

FIG. 85 is a flow chart showing a reflecting film recording routine in the thirteenth embodiment;

FIG. 86 is a flow chart at disk reproduction in the thirteenth embodiment;

FIG. 87 is a flow chart showing a decryption in the thirteenth embodiment;

FIG. 88A is a block diagram showing a mastering apparatus in a fourteenth embodiment;

FIG. 88B is a block diagram showing a mastering apparatus in a fourteenth embodiment;

FIG. 89 is a flow chart showing formation of an original record in the fourteenth embodiment;

FIG. 90 is a block diagram showing an information processing unit in the fourteenth embodiment;

FIG. 91 is a flow chart at information reproduction in the fourteenth embodiment;

FIG. 92 shows a reproduction principle of an in-phase signal in the eighth embodiment;

FIG. 93A is illustrative of the principle of a two-point coincidence system in the eighth embodiment;

FIG. 93B is illustrative of the principle of a three-point coincidence system in the eighth embodiment;

Figure 94:
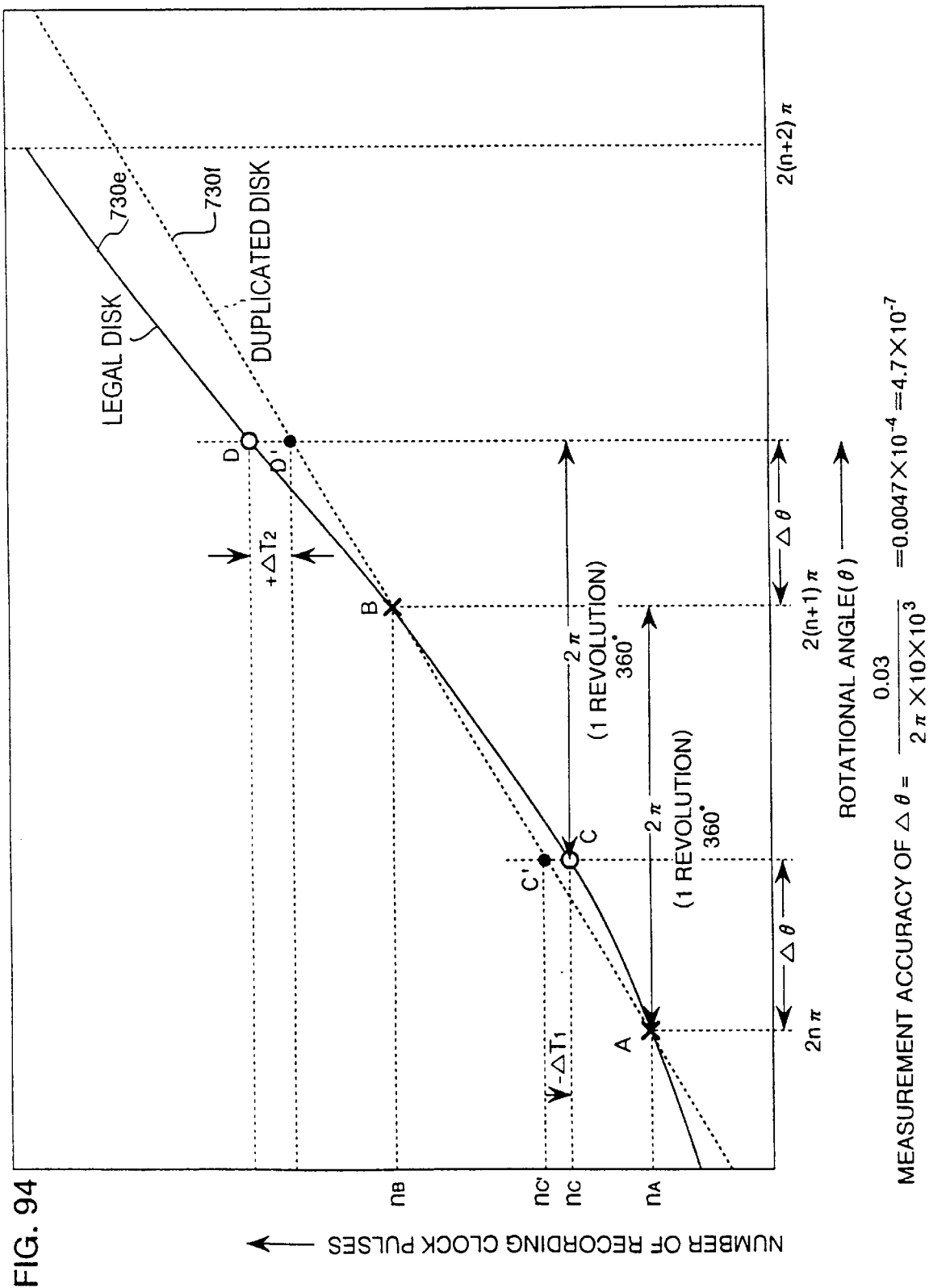
Figure 95:
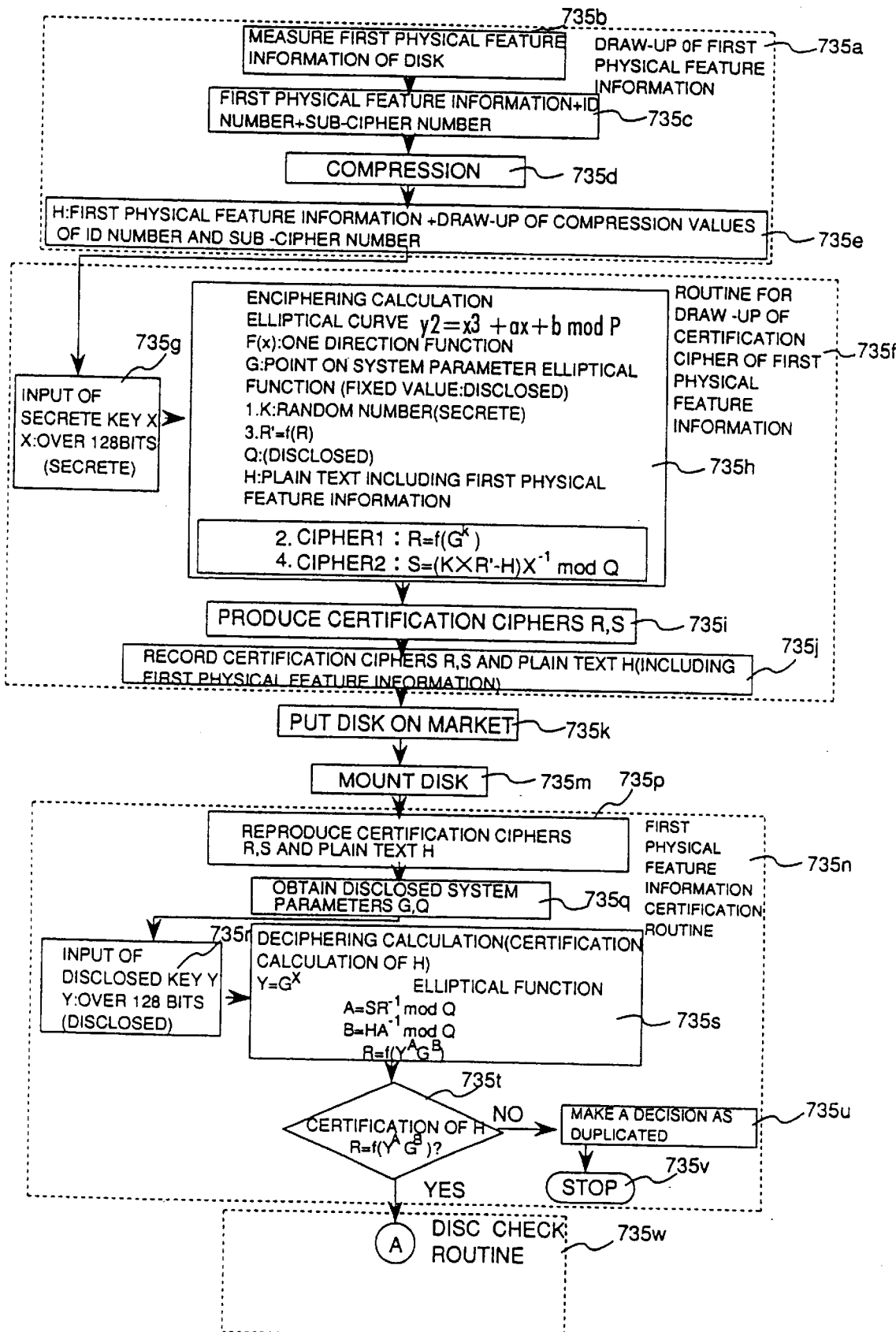
Figure 96:
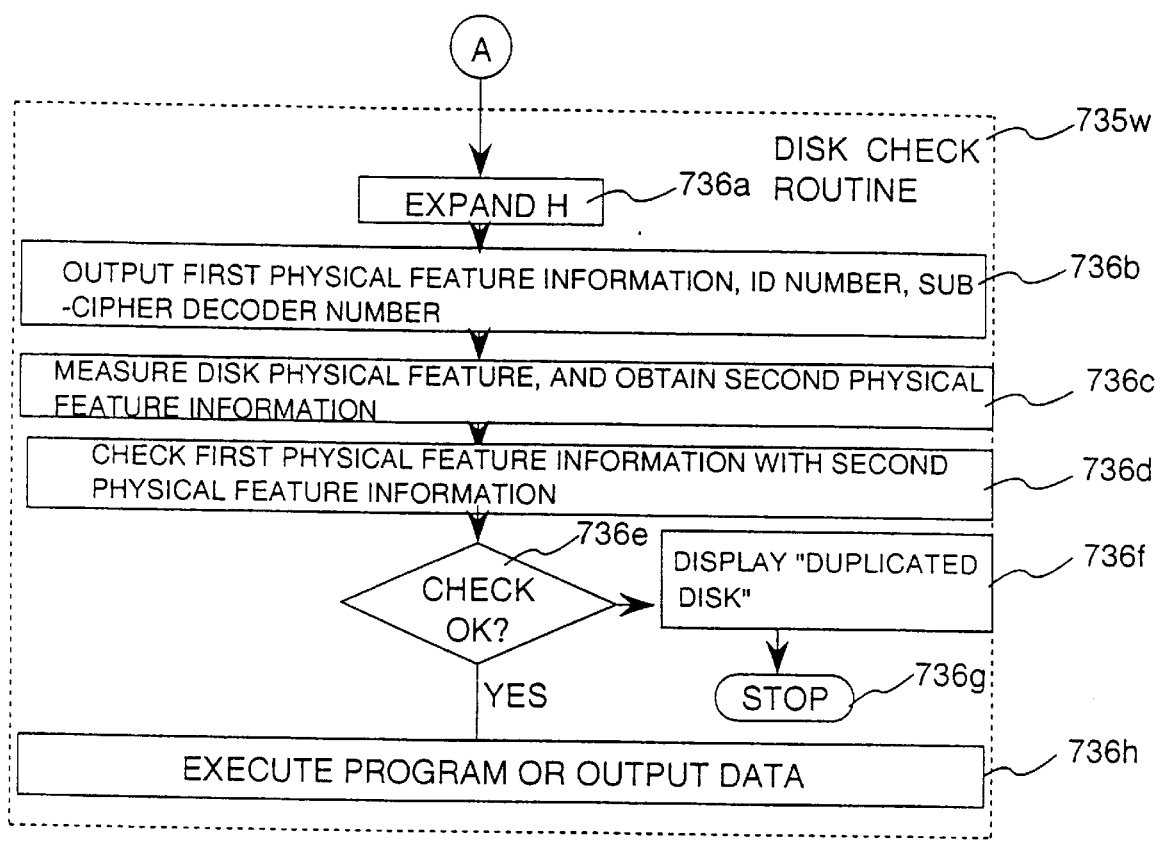

FIG. 94 is illustrative of four-point coincidence system in the eighth embodiment;

FIG. 95 is a first flow chart in the thirteenth embodiment;

FIG. 96 is a second flow chart in the thirteenth embodiment; and

FIG. 97 is a top view showing a second low-reflection portion in the seventh embodiment.

Reference marks used in the drawings will be described hereinbelow for reference.

1 recording and reproducing system
2 recording medium
2M original record
3 magnetic recording layer
4 optical recording layer
5 optical transmission layer
6, 6M optical head
7 optical recording block
8 magnetic head
8a main magnetic pole
8b magnetic sub-pole
8c head cap
8e uniform magnetic field area
8m magnetic field modulation magnetic head
8s cancelling magnetic head
9 magnetic recording block
10M system control section
17, 17M motor
18 optical head
19 head base
23, 23M head moving actuator
23a traverse actuator
24a traverse movement circuit
24M tracking circuit
30 memory
34a memory (for system)
37 optical recording circuit
37a time base circuit
37b optical recording section
37c optical output section
37d combination section
38 frame synchronizing signal
38a clock reproduction circuit
40 coil
40a magnetic field modulation coil
40b magnetic recording coil
40c tap
40d tap
40e tap
41 slider
42 disk cassette
43 printing ground layer
44 printing area
45 printing
46 pit
47 substrate
48 optical reflective layer
49 printing ink
50 protective layer
51 arrow 52 optical recording signal
54 lens
57 light-emitting section
60 adhesive layer
61 magnetic recording signal
65 optical track
66 focal point
67 magnetic track
67a recording magnetic track
67b reproduction magnetic track
67s servo magnetic track
67f guard band
67g guard band
67x cleaning track
69 high $\mu$ magnetic layer
70 head gap
70a recording head gap
70b reproduction head gap
81 interference layer
84 reflective layer
85 modulated magnetic field
85a magnetic flux
85b magnetic flux
150 coupling section
201 decision step
202 reproduction step
203 reproduction copy step
204 reproduction dedicated step
205 recording copy step
206 recording step
207 copy step
210 demagnetizing area
210a demagnetizing area
210b demagnetizing area
301 shutter
302 head hole
303 liner hole
304 liner
305 liner supporting section
305a movable section
305b sub-liner supporting section
305c liner elevating section
307 channel
307a liner driving channel
310 liner pin
311 liner pin guide
312 pin driving lever
313 recognition hole
314 protective pin
315 liner driving section
316 pin shaft
317 spring
318 coupling portion
319 pin shutter
320 optical address
321a center
321b center
321c center
322 optical data train
323 address
324 data
325 guard band
326 track group
327 block
328 track data
328 synchronizing signal
329 address
330 parity
331 data
333 separation circuit
334 modulation circuit
335 disk circuit angle detecting section
336 eccentricity correction memory
337 signal-free area
338 traverse control section
339 table showing correspondence between optical address and magnetic address
340 head amplifier
341 demodulator
342 error check section
343 data separation section
344 AND circuit
345 recording data
346 light-free address area
347 optical address area
348 magnetic TOC area
349 track locus
350 head reproduction section
351 memory data
352 coating material barrel
353 coating material transfer roll
354 intaglio drum
355 etching section
356 scriber
357 soft transfer roll
358 coating section
360 magnetic shield
361 resin section
362 random magnetic field generator
363 traverse shaft
363b magnetic head traverse shaft
364 positional reference section
365 disk lock section
366 traverse coupling section
367 traverse gear
367c magnetic head traverse gear
368 reference table
369 synchronizing section
370 recording format
371 track number section
372 data section
373 CRC section
374 gap portion 375 guide section for coupling section
376 disk cleaning section
377 magnetic head cleaning section
378 noise canceller
380 coupling section for disk cleaning section
381 magnetic sensor
382 optical reduction clock signal
383 magnetic lock signal
384 magnetic recording signal
385 decision window time
386 optical sensor
387 optical mark
387a bar code
388 light-transmitting section
389 upper cover
390 cassette cover
391 magnetic plane shutter
392 shutter coupling section
393 cassette cover rotary shaft
394 insertion opening
395 tape
396 label section
397 buzzer
398 magnetic recording area
399 screen printer
400 bar code printer
401 high Hc section
402 magnetic section
402a space section
403 magnetic section
404 key managing table
405 step of flow chart
406 key releasing decoder
407 voice extension block
408 personal computer
409 hard disk
410 install step
411 application
412 OS
413 BIOS
414 drive
415 interface
416 step of flow chart
321 optical file
422 magnetic file
436 network BIOS
437 LAN network
447 step of flow chart
447a step of flow chart
448 corrected data
449 display
450 key pad
451 error correction step
452 parity
453 C1 parity
454 C2 parity
455 Index
456 sub-code synchronism detecting section
457 index detecting section
458 divider
459 magnetic synchronizing signal detecting section
460 shortest/longest pulse detecting section
461 pseudo optical synchronizing signal generating section
462 pseudo magnetic synchronizing signal generating section
463 optical synchronizing signal detector
464 divider/multiplier
465 change-over switch
466 waveform shaping section
467 clock reproducing section
468 medium identifier
469 optical address information
470 data
514 spring
514a head elevation coupling means
514a head elevation inhibiting means
514c optical head travelling area
516 loading motor
517 loading gear
518 tray moving gear
519 head elevator
520 tray
521 opening and closing shaft for upper cover
522 menu image planeΩselection number table
523 playback control information
524 step of flow chart
525 list ID offset table
526 optical search information
527 magnetic track search information
528 master data
529 mastering device
530 data arrangement
531 Zone
532 physical arrangement (configuration) table (first physical feature information)
533 illegal disk check circuit
534 cipher decoder
535 check circuit
536 output/operation stopping means
537 cipher encoder
538 cipher signal
539 physical position
540 magnetizing device
541 magnetizing device
542 magnetizing device
543 magnetizing current generator
544 current direction switching device
545a coil
546 ID number generator
547 mixer
548 separation key
549 separator 550 ID number
551 step of flow chart
552 physical arrangement signal
553 angular position detecting section
554 tracking amount detecting section
555 pit depth detecting section
556 measured disk physical arrangement table
557 disk center
558 rotational center of disk
559 eccentric portion
560 pit
561 duplicate pit
562 pulse signal
563 duplicate preventing signal
564 tracking modulation signal generating section
565 copy preventing (protection) signal generating section
566 optical output modulation signal generating section
567 optical output modulating section
568 pulse duration modulating section
569 pulse duration adjusting section
570 output address information section
571 time base (axis) changing section
572 original record
573 photosensitive layer
574 photosensitive section
575 metallic original record
576 formed disk
577 second photosensitive section
578 communication interface section
579 external cipher decoder
580 pit group
581 reproduced waveform
582 random extractor
583 random number generating section
565 image plane
566 step (flow chart of step virtual file)
567 window
568 holder
569 file
570 CD-ROM icon
571 CD-ROM-RAM icon
572 HDD
573 invisible file
574 invisible folder
575 display
576 stereo-capacity display
577 virtual capacity display
578 password input section
579 file name input section
584 low-reflection section
585 reference low-reflection section
586 low-reflection light quantity detecting section
587 light quantity level comparator
588 light quantity reference value
589 HPF
590 waveform shaping circuit
590a AGC
591 demodulating section
592 EFM
593 physical address output section
594 address output section
595 synchronizing signal output section
596 low-reflection section address$\Omega$clock number position signal output section
597 n−1 address output section
598 clock counter
599 low-reflection section start/end position detecting section
600 low-reflection section position detecting section
601 low-reflection section angular position signal output section
602 low-reflection section angular position detecting section
603 n−1 address signal
604 synchronizing signal
605 low-reflection section start point
606 low-reflection section end point
607 time-delay correcting section
608 reference delay time TD measuring section
609 low-reflection section$\Omega$address table
610 vapor deposition preventing section
611 protective layer
612 ink
613 light shielding section
614 adhesive section
615 first mask
616 second mask
617 printing section
618 CP optical mark section
620 bar code
621 bar code demodulating section
622 character pattern
623 heating section
624 heating head
625 film
626 disk physical ID
627 stamper physical ID
628 disk managing ID
629 master cipher
630 written layer
631 error sign-address table
632 CP error sign
633 physical ID output section
634 error sign list
635 standard sign
635 CPEFM conversion table
637 original data
638 decode data
639 CP special sign
640 CP special sign detecting section
641 CP special sign address output section
642 CP special sign-address table
643 laser trimming device 644 laser beam deflecting device
645 off-track switching circuit
646 track servo polarity inverting section
647 off-track signal reproducing section
648 optical sensor
649 optical beam spot
650 inphase reproduction signal
651 negative-phase reproduction signal
652 inphase reproduction signal
653 inphase signal block
654 frame sync signal
655 foreign substance
656 pulse duration modulation signal demodulating section
657 reproduction output detecting section
658 reproduction output reference value
659 reproduction output lowering section
660 offset voltage detecting section
661 switching section
662 2 demodulators
663 2 personal computers
664 network
665 CPU
666 step (install program)
667 step (legal disk check routine)
668 step (machine ID check making-out recording routine)
669 step (legal cipher decoder check routine)
670 step (routine for stepping use of illegal copy soft)
671 step (program executing routine)
672 step (routine for stopping same ID number soft)
673 step (program movement detecting step)
674 step (machine ID check step)
675 step (cipher decoder check routine)
676 personal computer
677 CD-ROM layer
678 virtual ROM layer
679 write-once layer
680 recording layer
700 original record
701 recording layer
703 physical feature information measuring section
704 physical feature information transmitting section
705 physical feature information receiving section
706 plain text information output section
707 first recording area
708 second recording area
709 first recording line
710 second recording line
711 step (original record flow chart)
712 step (reproduction flow chart)
713 step (stopping routine)
714 plain text information output section
715 plain text data checking section
716 plain text data coincidence detecting section
717 program executing stopping section
718 sub-cipher decoder
719 RAM section
720 sub-cipher decode data
721 data output section for conversion into plain text
722 program/reproduction operation stopping section
723 recording signal output section
724 CPU
739 pit number
740 first low-reflection section
741 high-reflection section
742 optical recording signal area
743 first physical feature information detecting means
744 second recording means
745 reproduction means
746 first offset voltage
747 inphase/negative-phase signal detecting section
748 inphase/negative-phase signal position detecting section
749 frame synchronizing signal detecting section
750 ID number output section
751 second low-reflection section
752 TOC area
753 second low-reflection section interval

DETAILED DESCRIPTION OF PREFERRED EMBODIMENTS

A description will be made hereinbelow in terms of the embodiments of this invention. This invention involves various embodiments relating to an information recording system, information reproducing system, manufacturing method of an optical recording medium and optical recording medium which can realize a method and system for the prevention of illegal copy of an optical recording medium and illegal install of information on an optical recording medium. An original record fabricating apparatus, so-called mastering apparatus, for fabricating optical disks is included in the information recording system, and a reproducing apparatus such as a CD drive general users employ is included in the information reproducing system. In addition, a system such as a photo-magnetic recording type mini-disk (MD) reproducible and recordable at the user side is described as a recording and reproducing system, while the "recording" is different from the "recording" at fabrication of the original record.

The following table shows the contents of the embodiments and the corresponding figures.

First Embodiment

Contents: A method of preventing a software from being illegally installed with a pirate edition preventing system according to this invention incorporated.

Figure: FIG. 59

Second Embodiment

Contents: A basic concept of a pirate edition preventing system according to this invention which uses, as first physical feature information, arrangement angle information of coordinate arrangements of pits for a specific signal on a recording medium.

Figure 1:
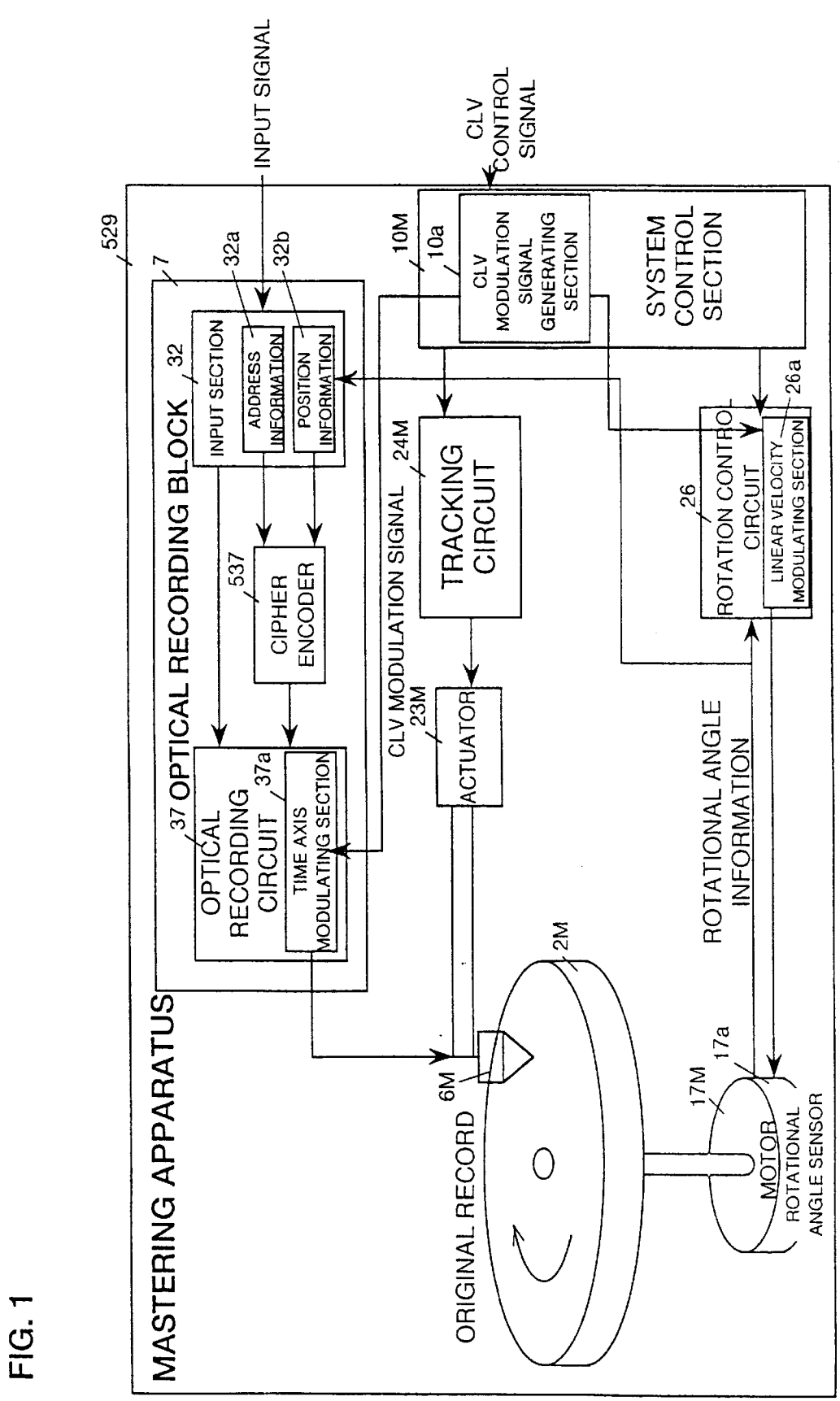
FIG. 1 is a block diagram showing a mastering apparatus for a recording system according to a preferred second embodiment of this invention.
Figure 5:
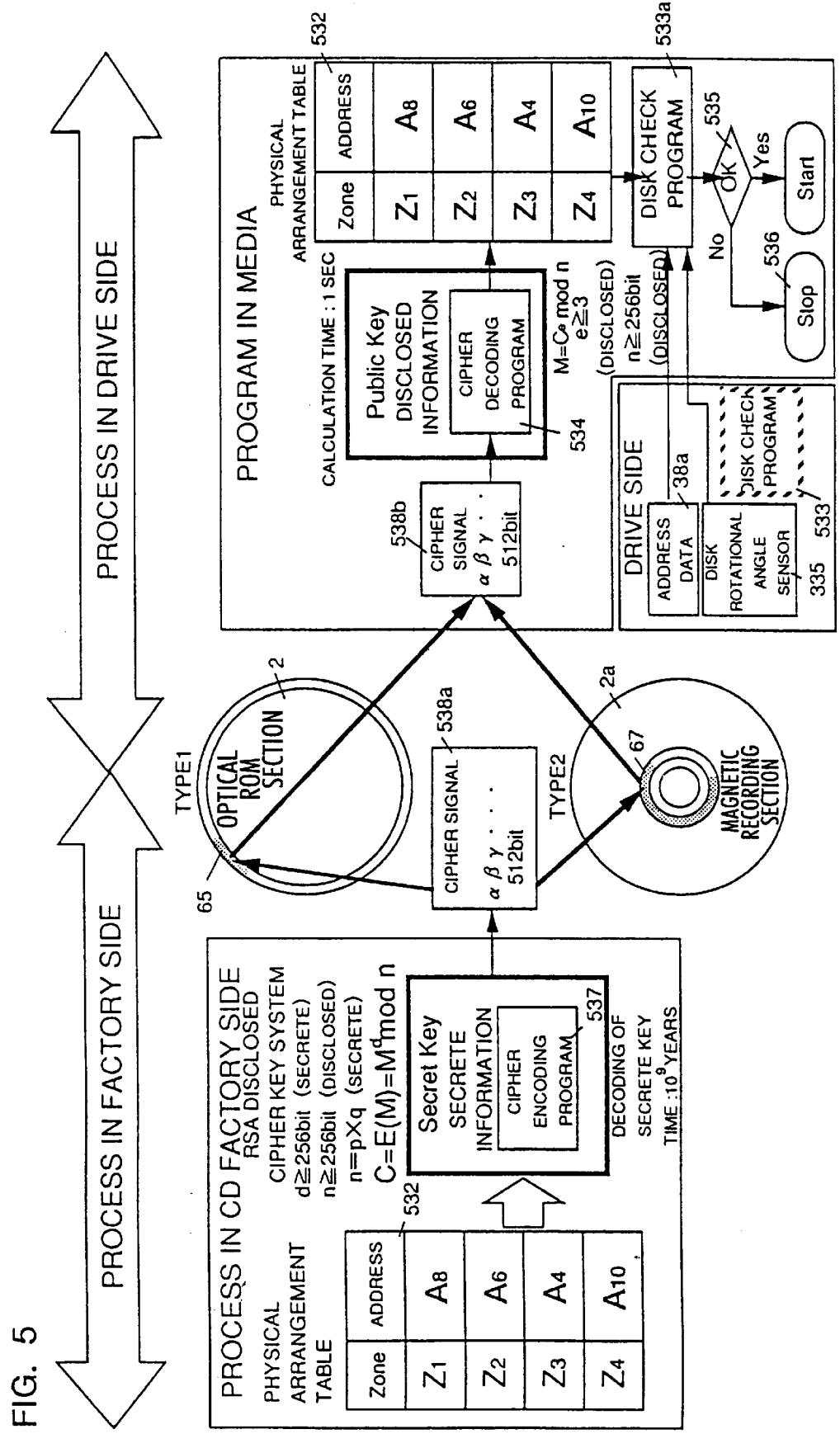
FIG. 5 is an illustration for describing a duplicate preventing principle for a CD in the second embodiment.

Figure: FIGS. 1, 5

Third Embodiment

Contents: A method for employing, as first physical feature information, the information on a tracking quantity and pit depth on a recording medium.

Figure 13A:
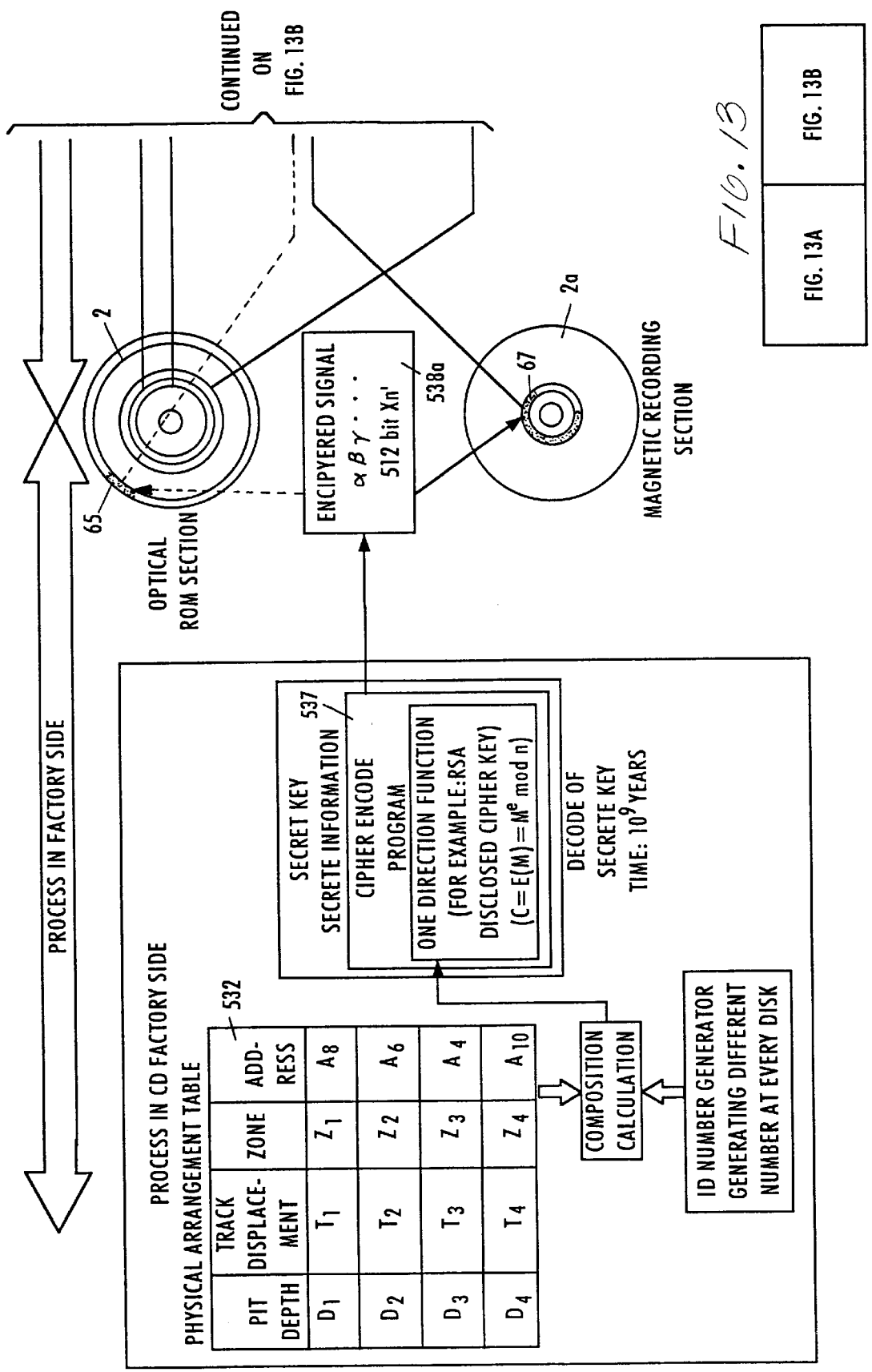
FIG. 13 is a block diagram showing a CD fabricating device and recording and reproducing system in the second embodiment.
Figure 13B:
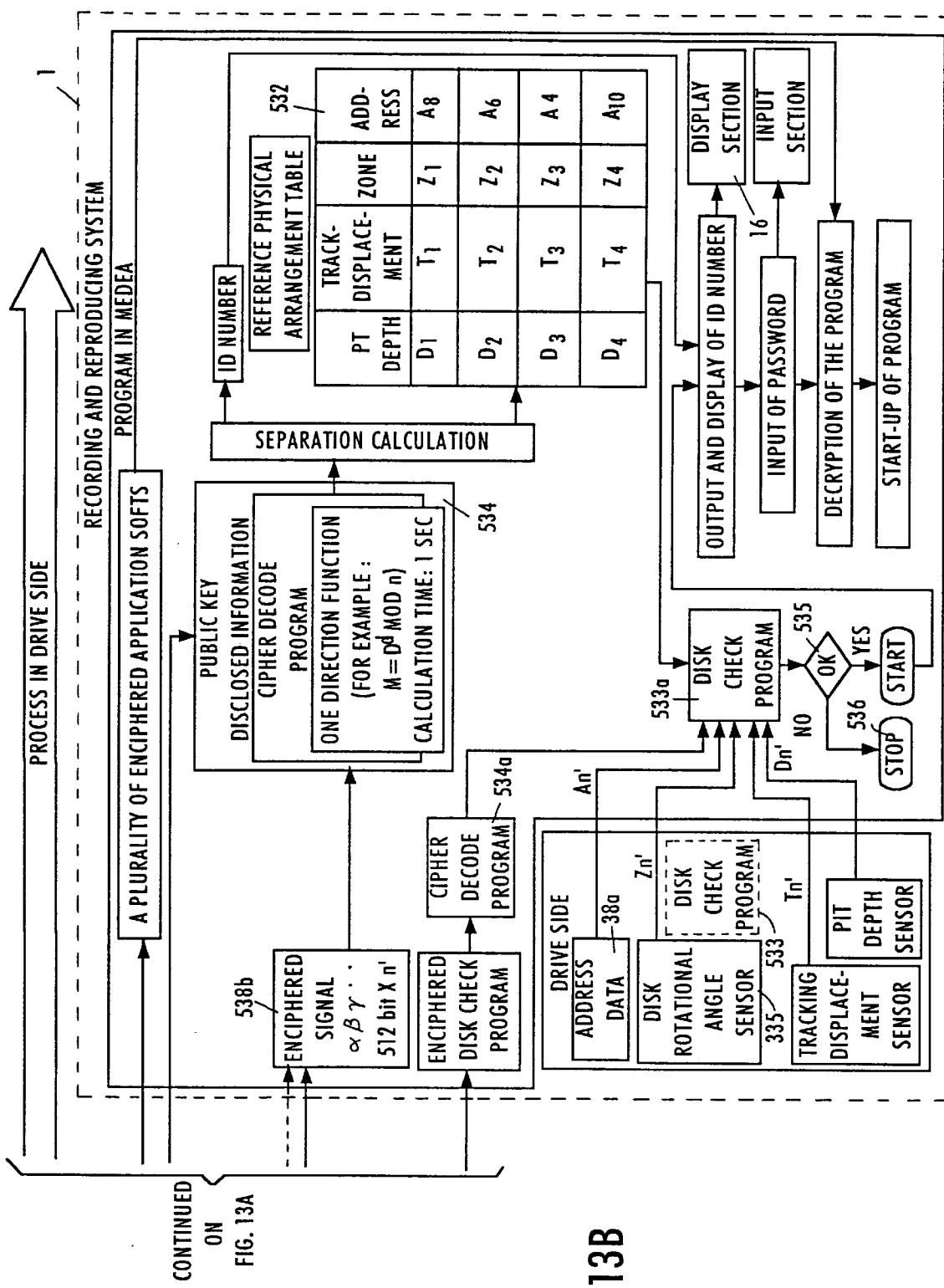
Figure 16:
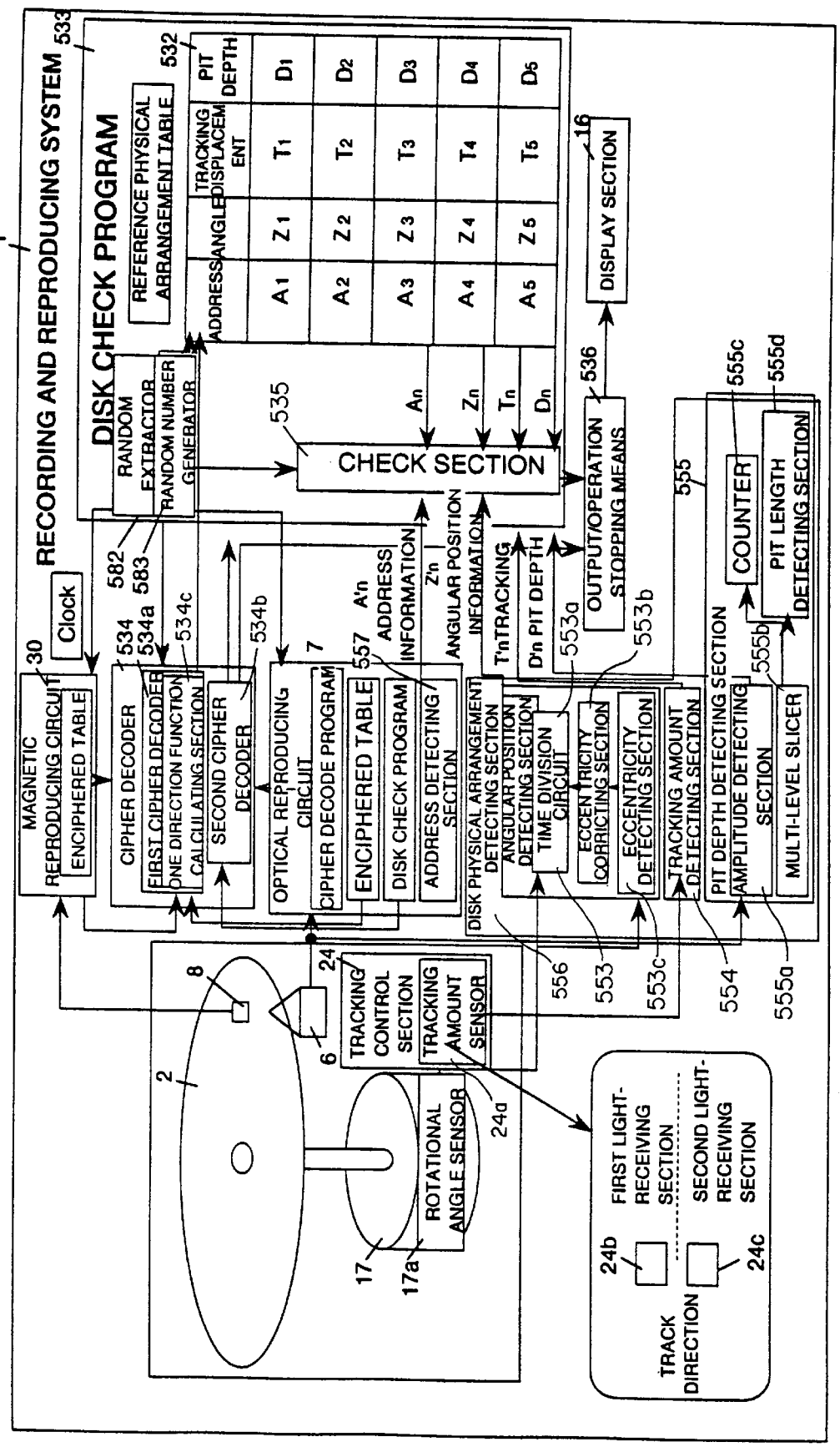
FIG. 16 is a block diagram showing a recording and reproducing system in the second embodiment.

Figure: FIGS. 13, 16, 20

Fourth Embodiment

Contents: A recording method by a second low-reflection section.

1. A method wherein a second low-reflection section is used as first physical feature information in the second embodiment.

2. A method of recording a first cipher with a plurality of second low-reflection sections being set on the basis of a modulated signal on an optical recording medium.

Figure 38:
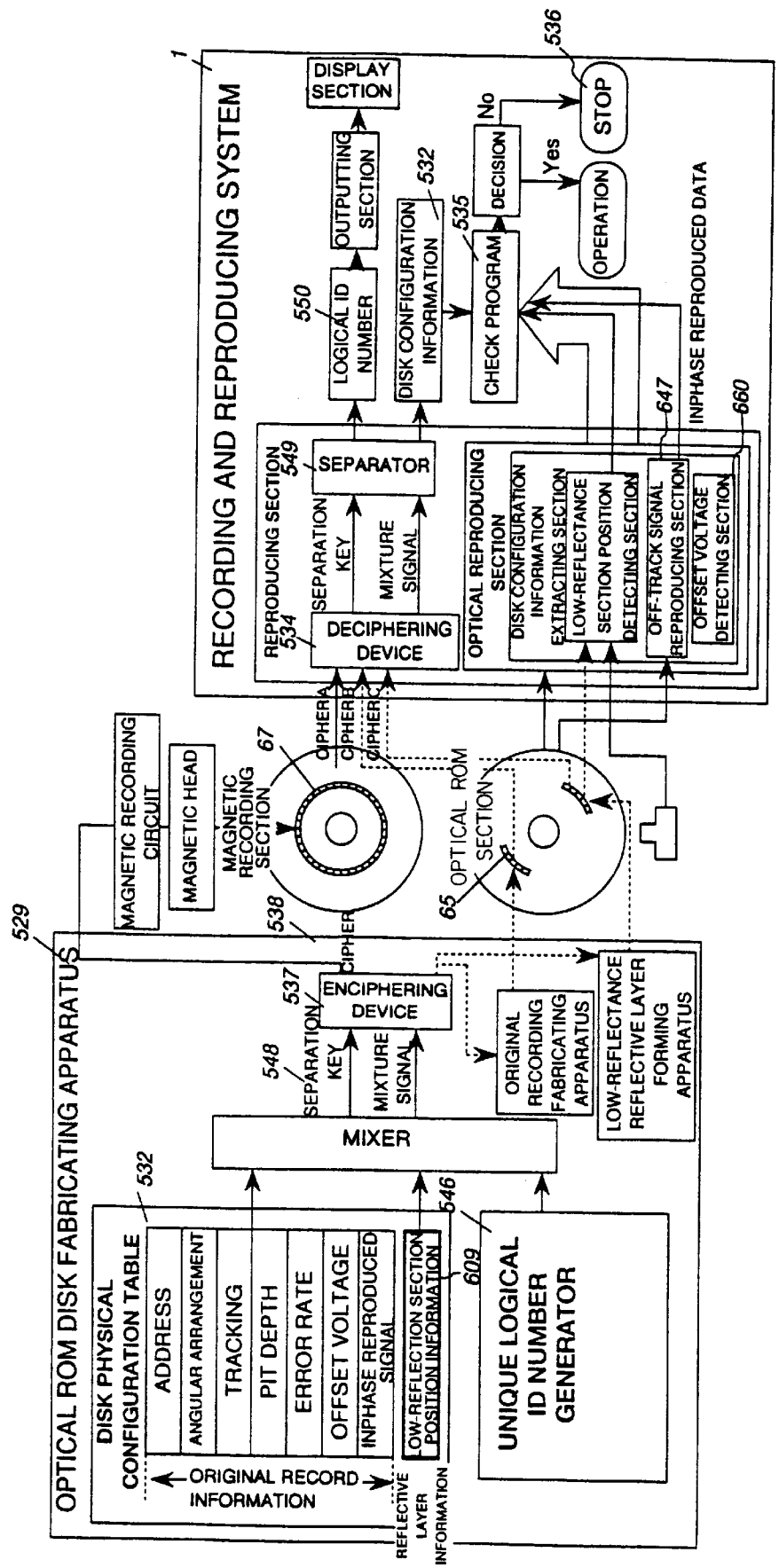
FIG. 38 is a block diagram showing disk formation in the third embodiment.
Figure 39:
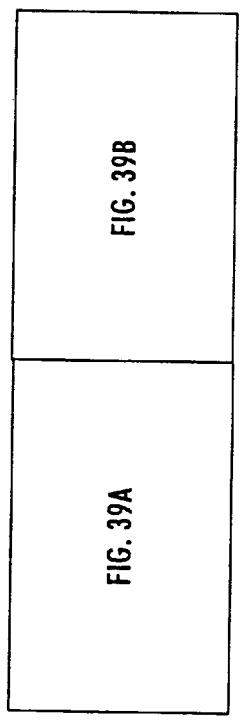
FIG. 39 is a block diagram showing a low-reflection portion position detecting section in the third embodiment.
Figure 39A:
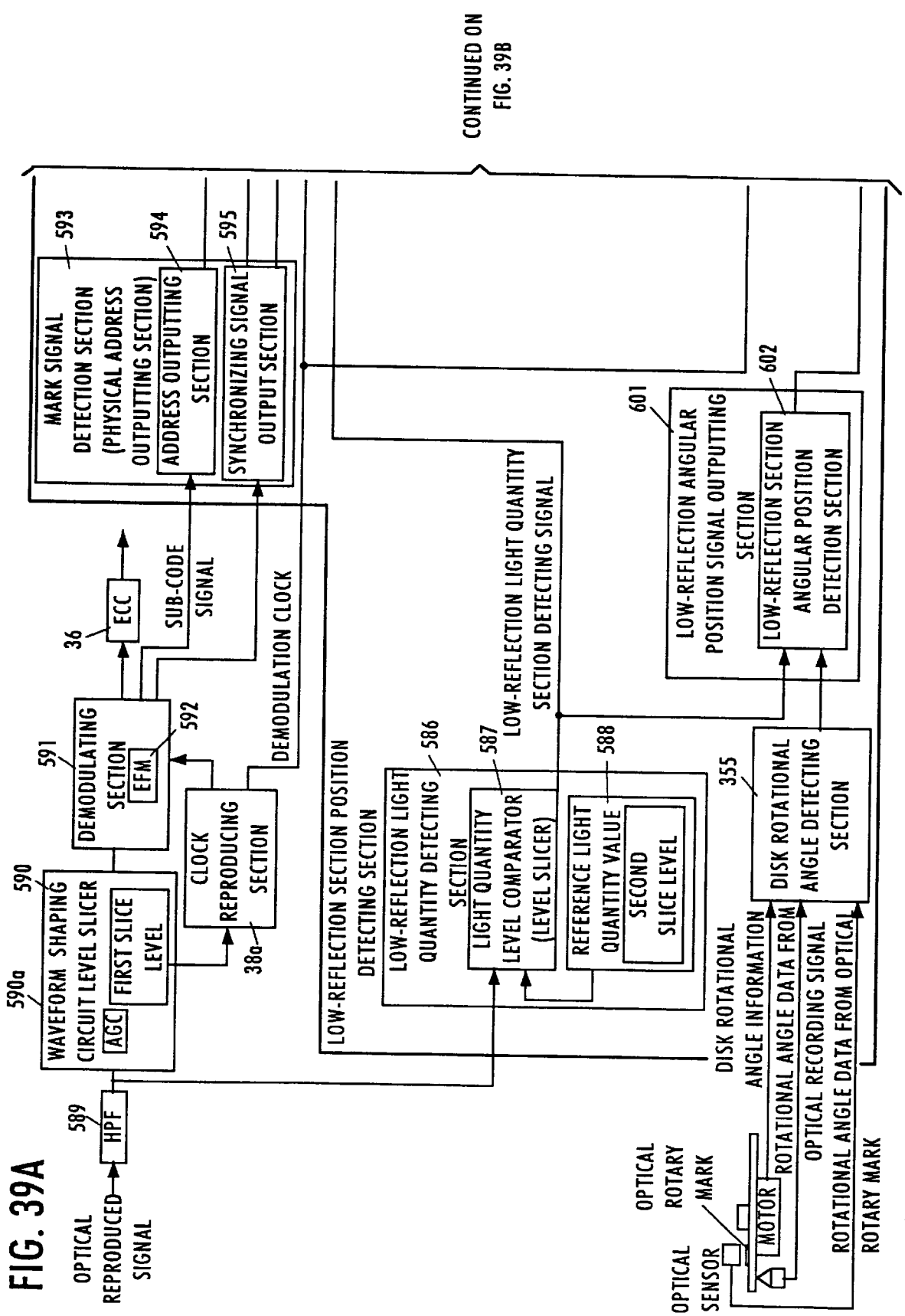
Figure 39B:
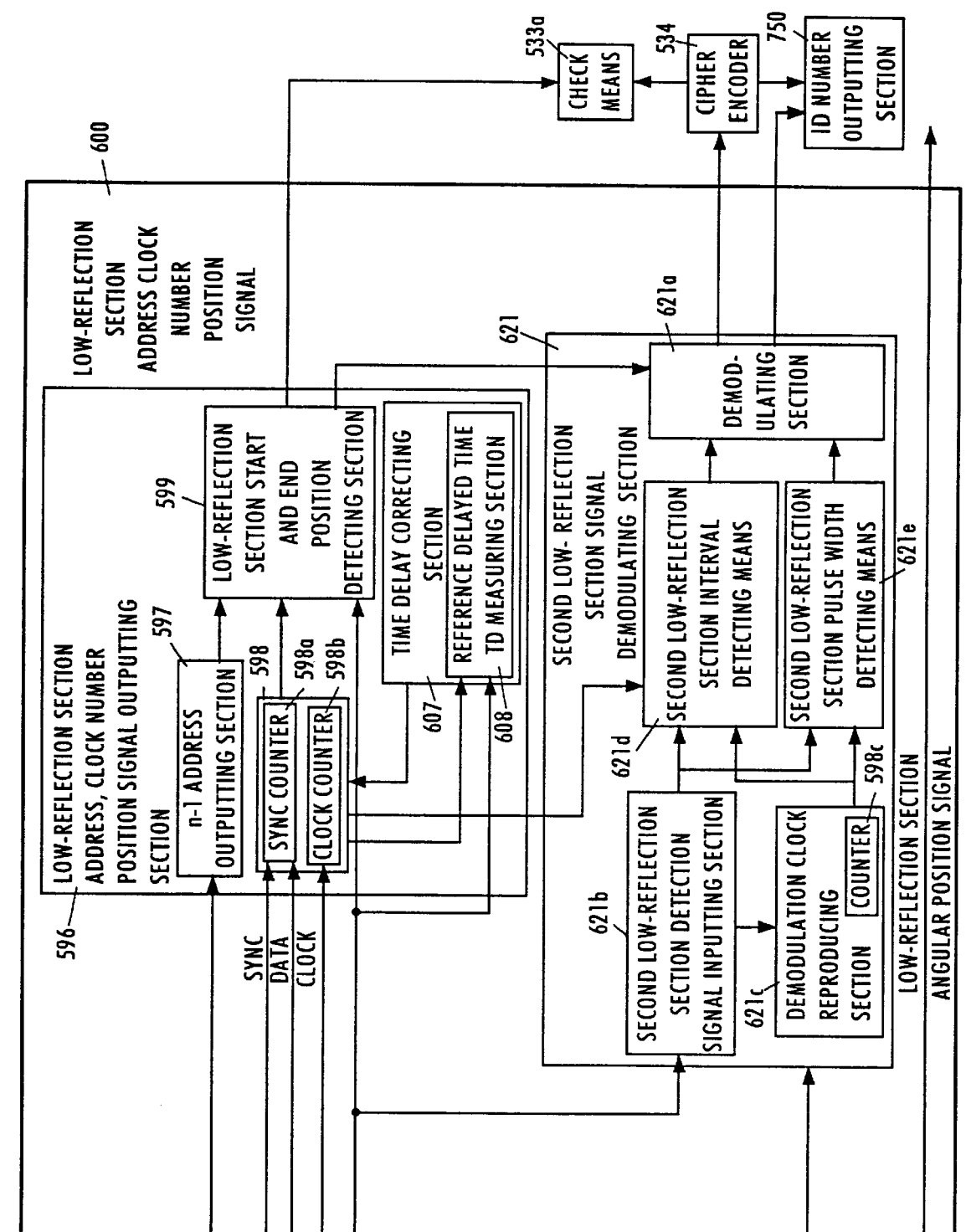
Figure 40:
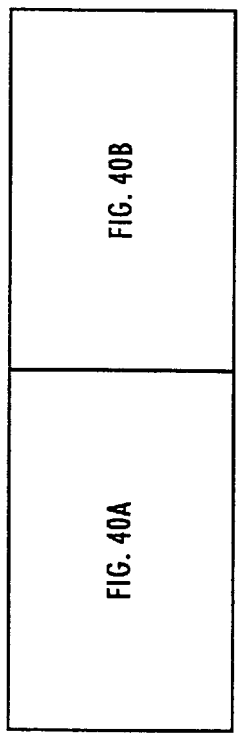
FIG. 40 is a block diagram showing a recording and reproducing system in the third embodiment.
Figure 40A:
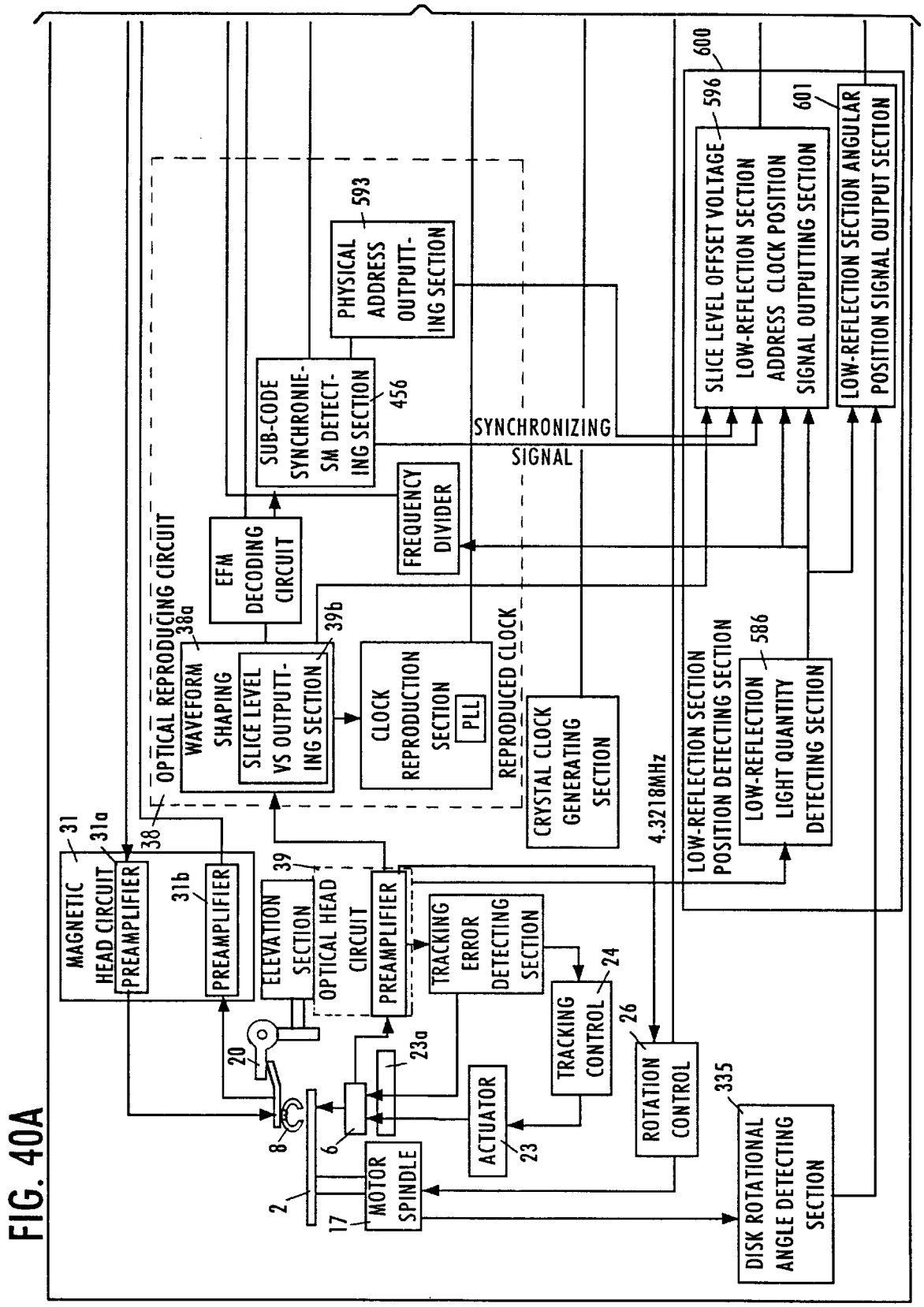
Figure 40B:
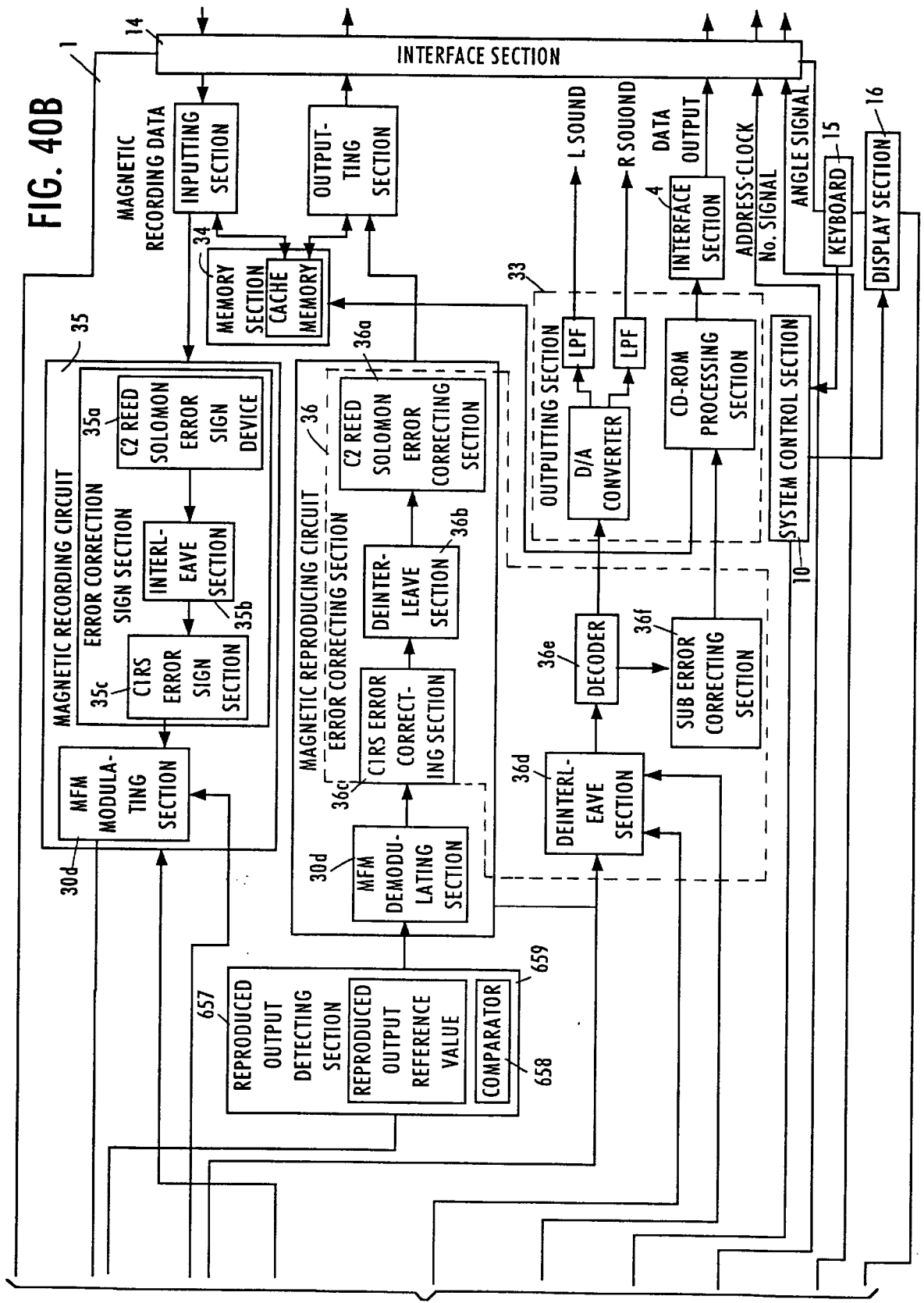

Figure: FIGS. 38 to 40

Fifth Embodiment

Contents: 1. A method wherein an error signal is used as the first physical feature information in the second embodiment.

2. A method wherein a special (EFM) code is used as the first physical feature information in the second embodiment.

Figure 54:
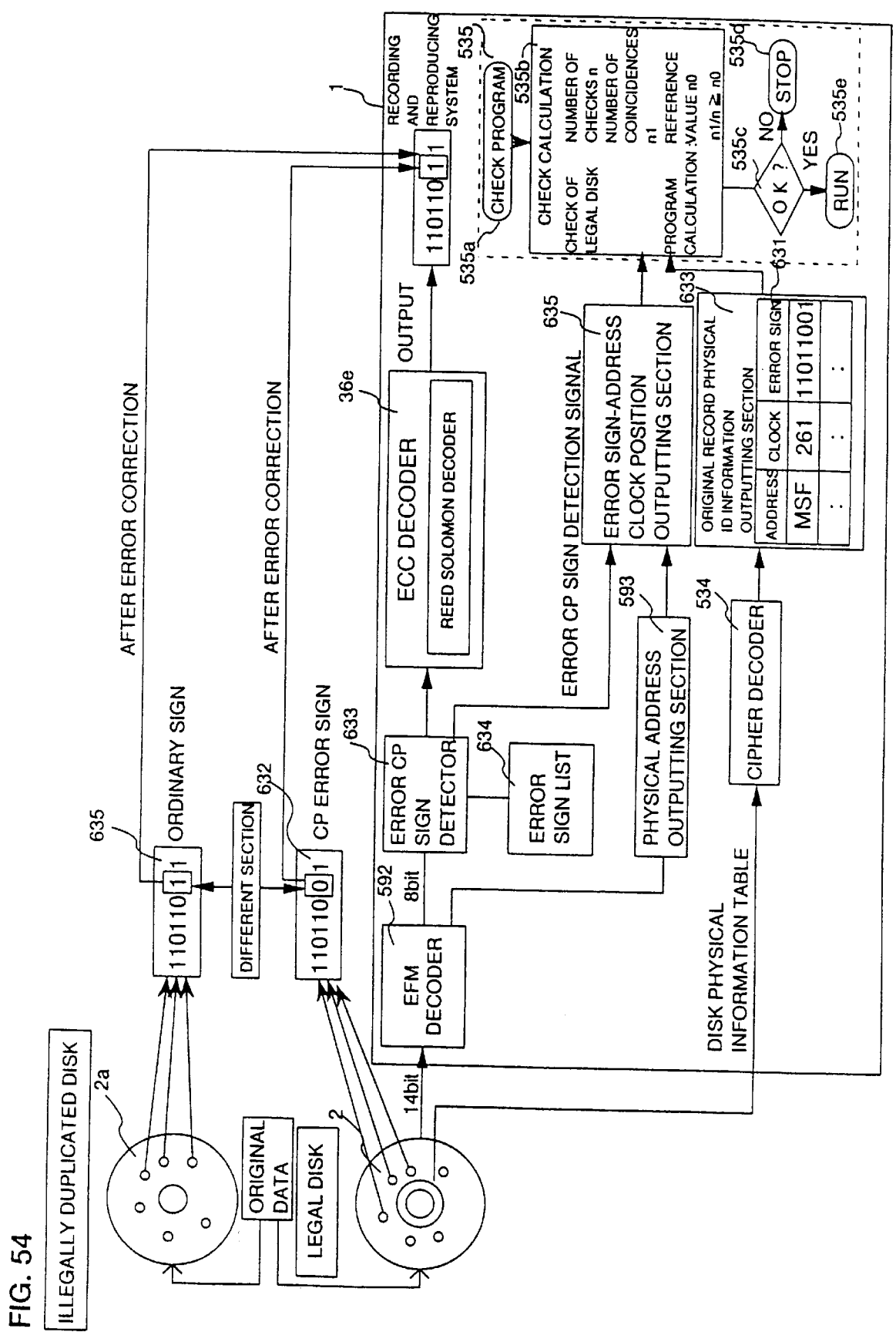
FIG. 54 is an illustration of a principle for duplicate detection by an error CP code in a fifth embodiment.
Figure 55:
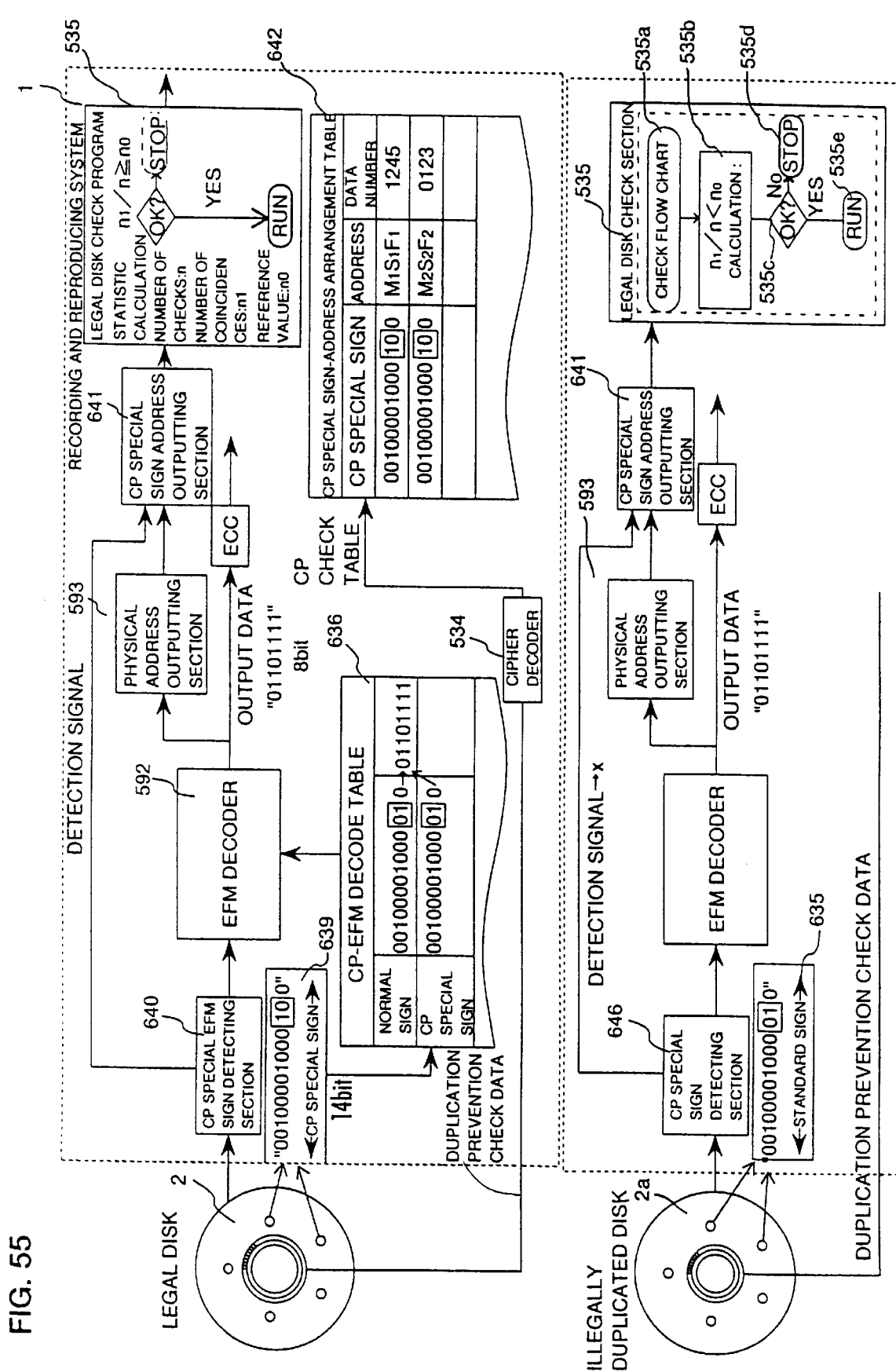
FIG. 55 is an illustration of a principle for duplicate detection by an EFM patent code in a fifth embodiment.

Figure: FIGS. 54 to 56

Sixth Embodiment

Contents: A method of limiting the install with encryption is made by a combination of the first physical feature information and a sub-cipher number.

Figure 58:
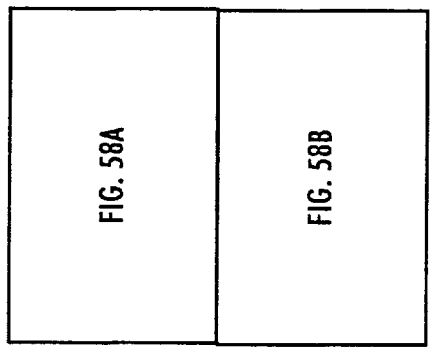
FIG. 58 is a flow chart showing an install allowing method in the sixth embodiment.
Figure 58A:
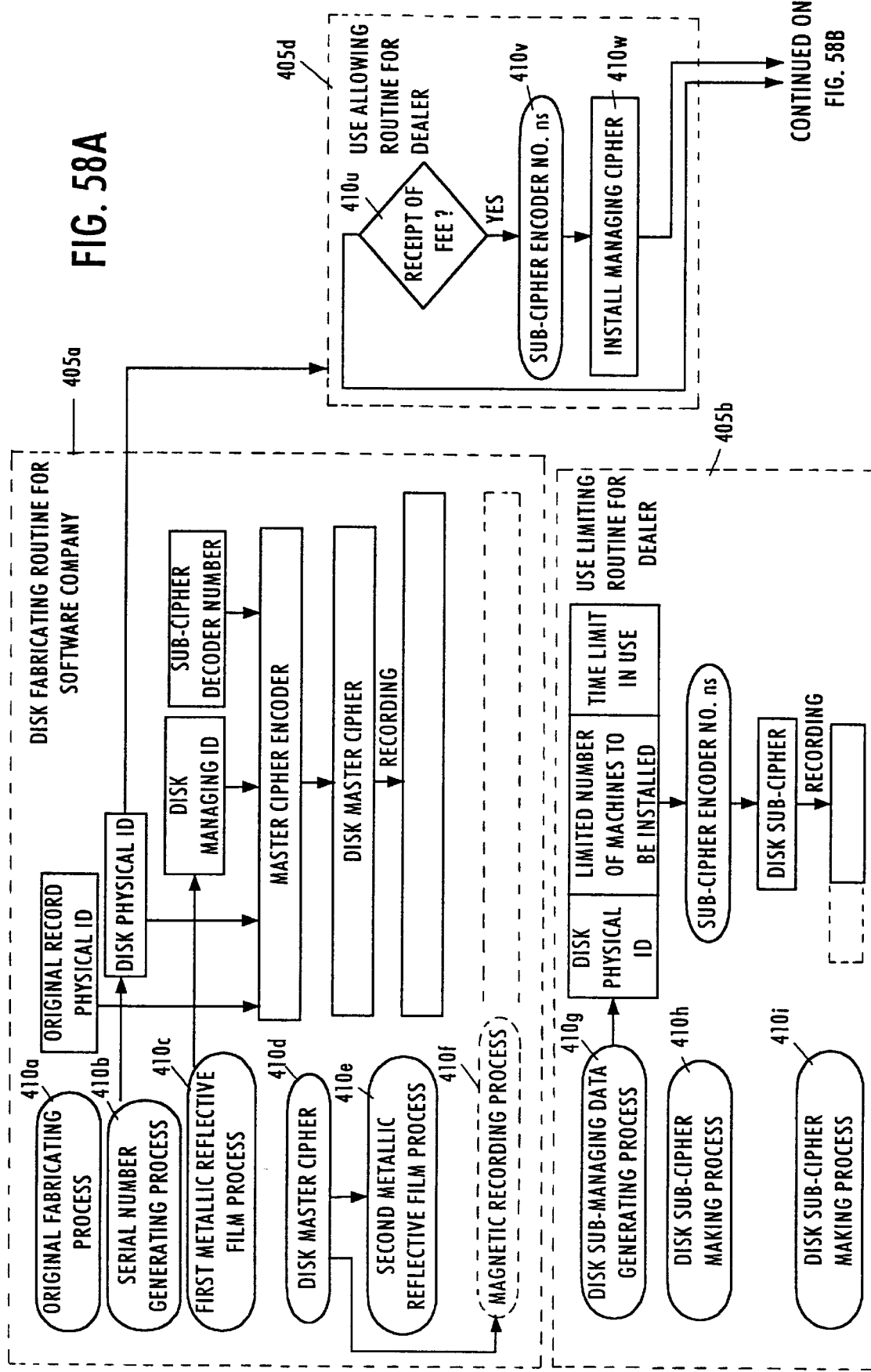
Figure 58B:
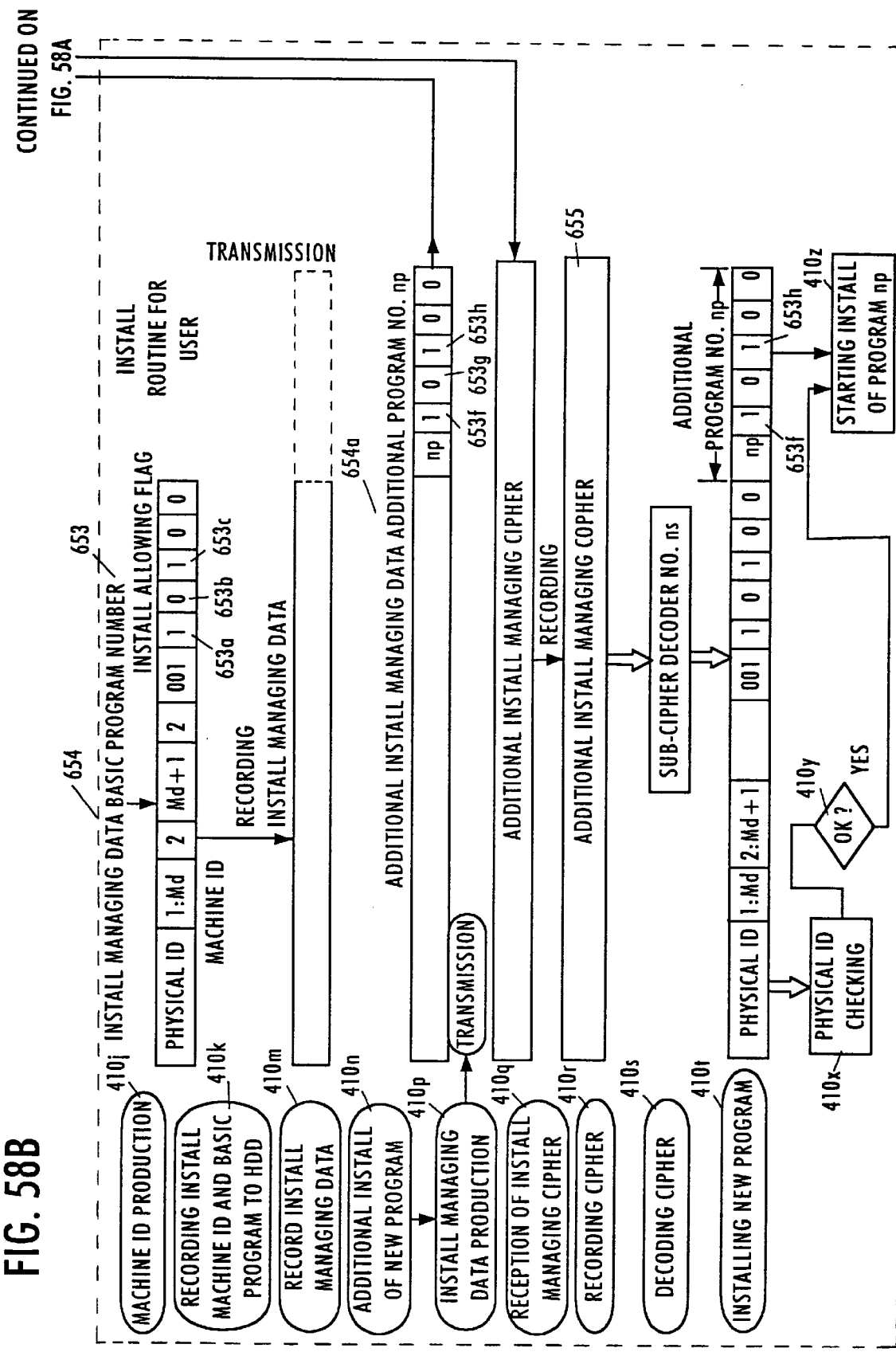

Figure: FIG. 58

Seventh Embodiment

Contents: Another data recording system and producing method for a second low-reflection section, which is different from the fourth embodiment.

Figure 60:
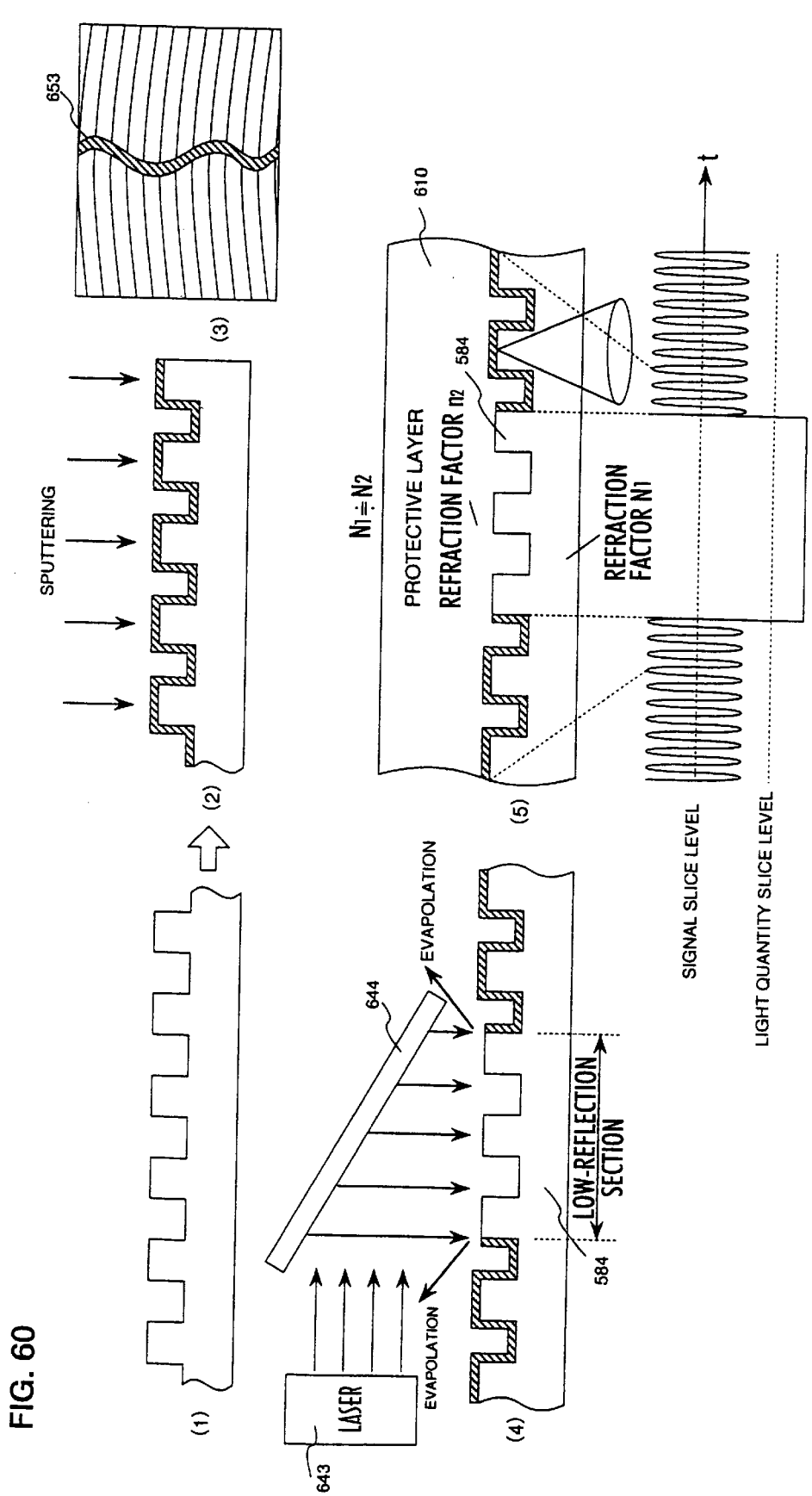
FIG. 60 shows a manufacturing process of a low-reflection portion of an optical disk in a seventh embodiment.

Figure: FIG. 60

Eighth Embodiment

Contents: A method wherein an arrangement state of inphase pits is employed as the first physical feature in the second embodiment (three-point coincidence system).

Figure: FIGS. 60 to 63, 92, 94

Ninth Embodiment

Contents: A method of detecting dust which exists in a first cipher recording area, and a method of displaying the position of the dust.

Figure 64:
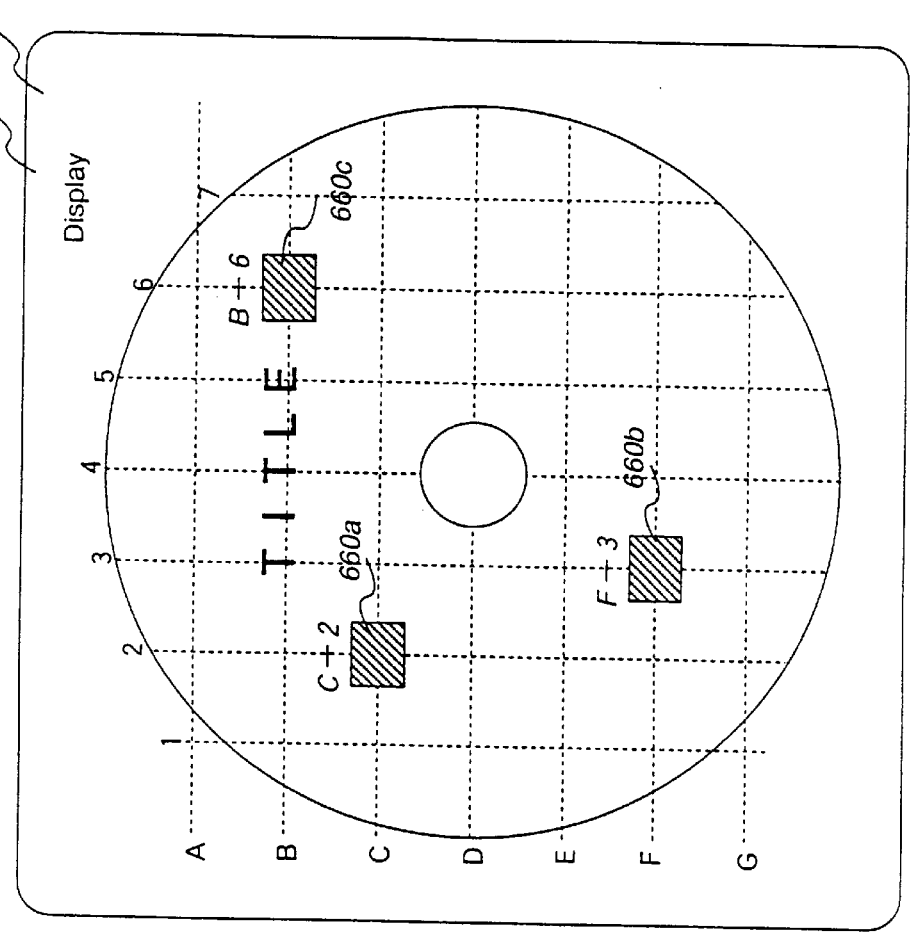
FIG. 64A is a top view showing a foreign material arrangement on a label surface of a CD in a ninth embodiment.
FIG. 64B shows a displaying state of a CD in a display section in the ninth embodiment.
Figure 64:
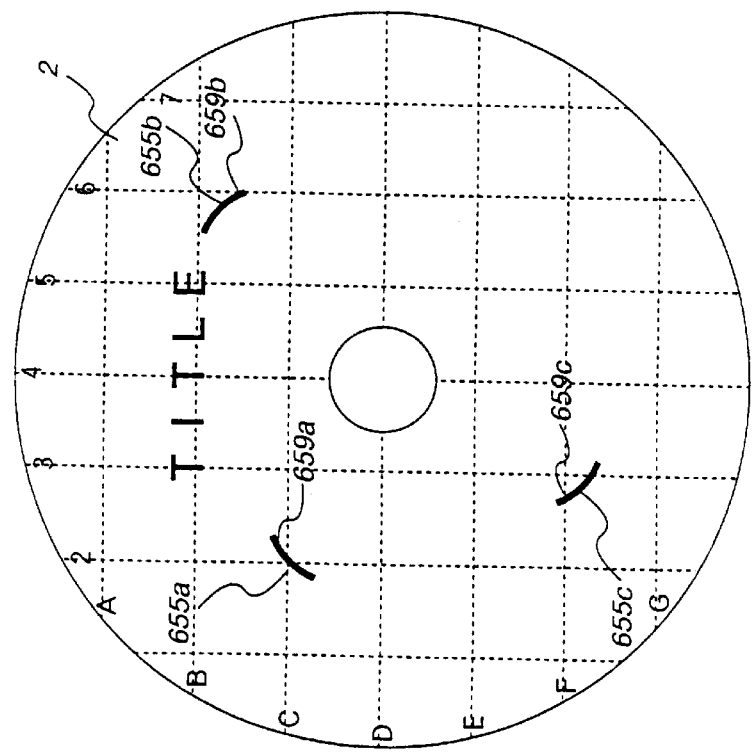

Figure: FIG. 64

Tenth Embodiment

Contents: A method wherein an offset voltage signal is employed as the first physical feature information in the second embodiment.

Figure 31:
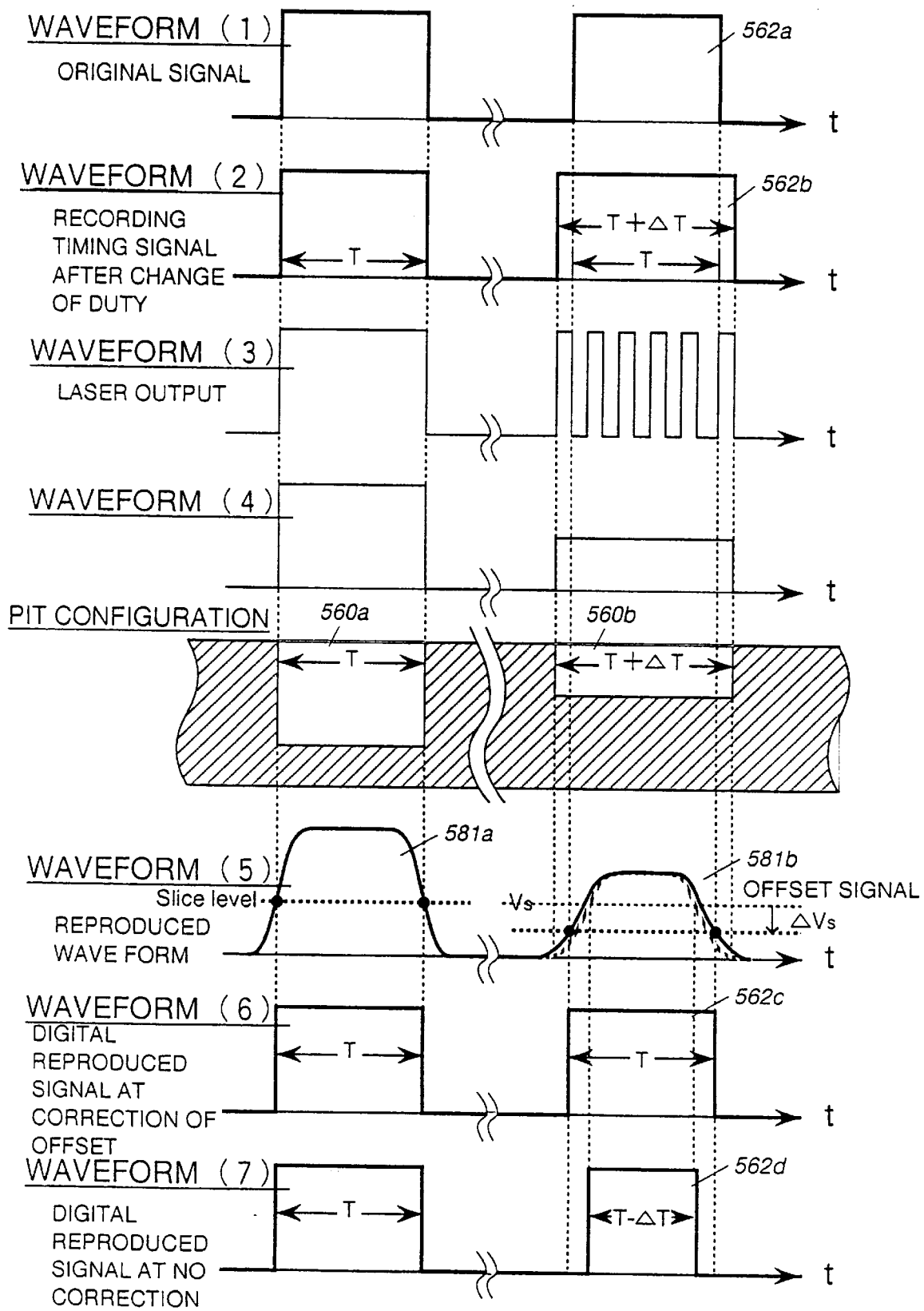
FIG. 31 is an illustration of the relationship between an laser recording output and regenerative signal in the third embodiment.

Figure: FIG. 31

Eleventh Embodiment

Contents: A method of stopping the operation of an illegal copy program.

Figure 69:
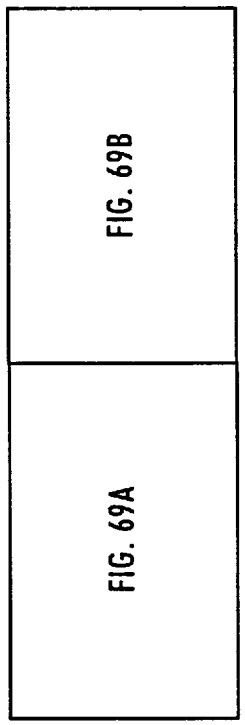
FIG. 69 is a block diagram showing a magnetic recording system in an eleventh embodiment.
Figure 69A:
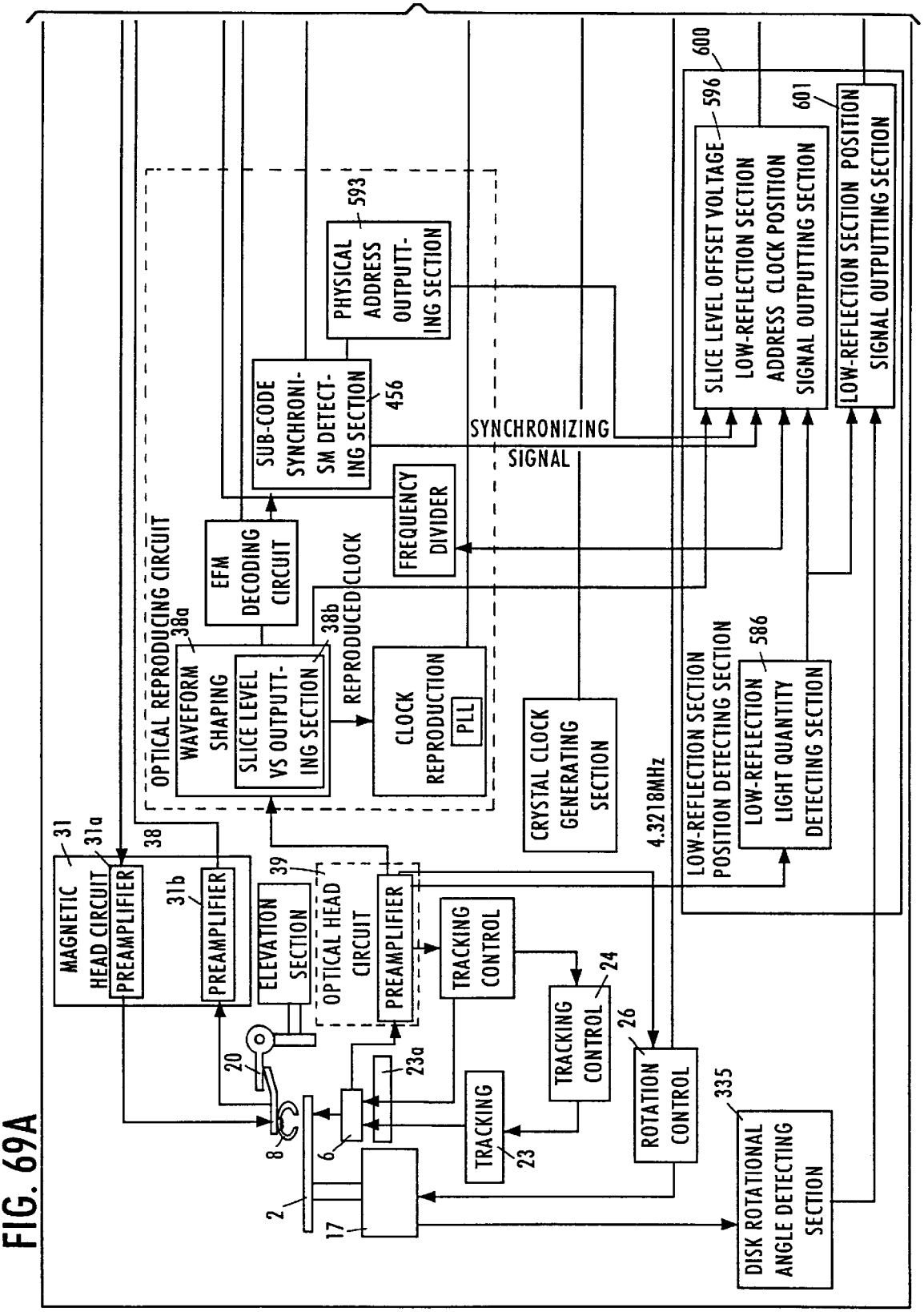
Figure 69B:
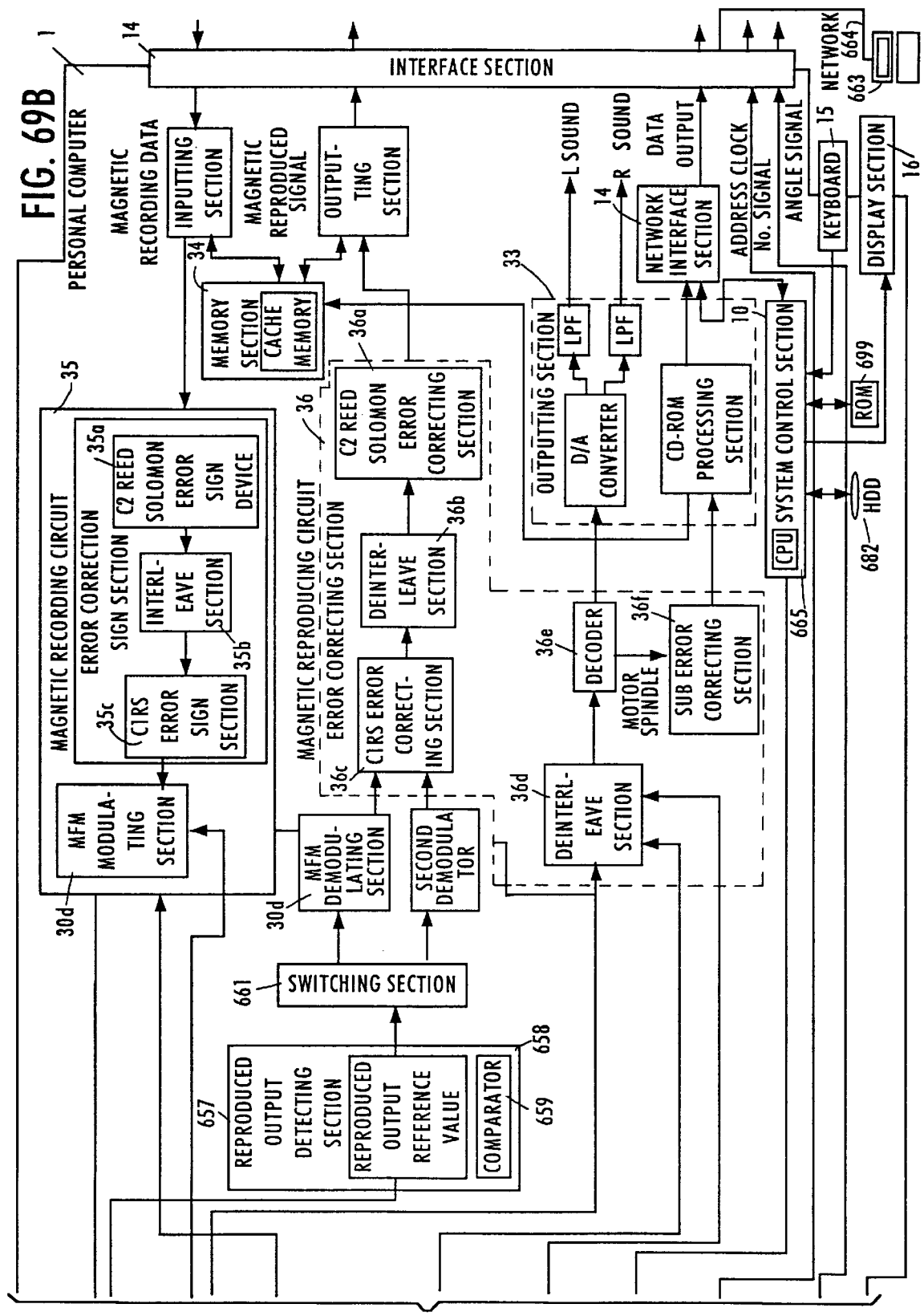
Figure 74:
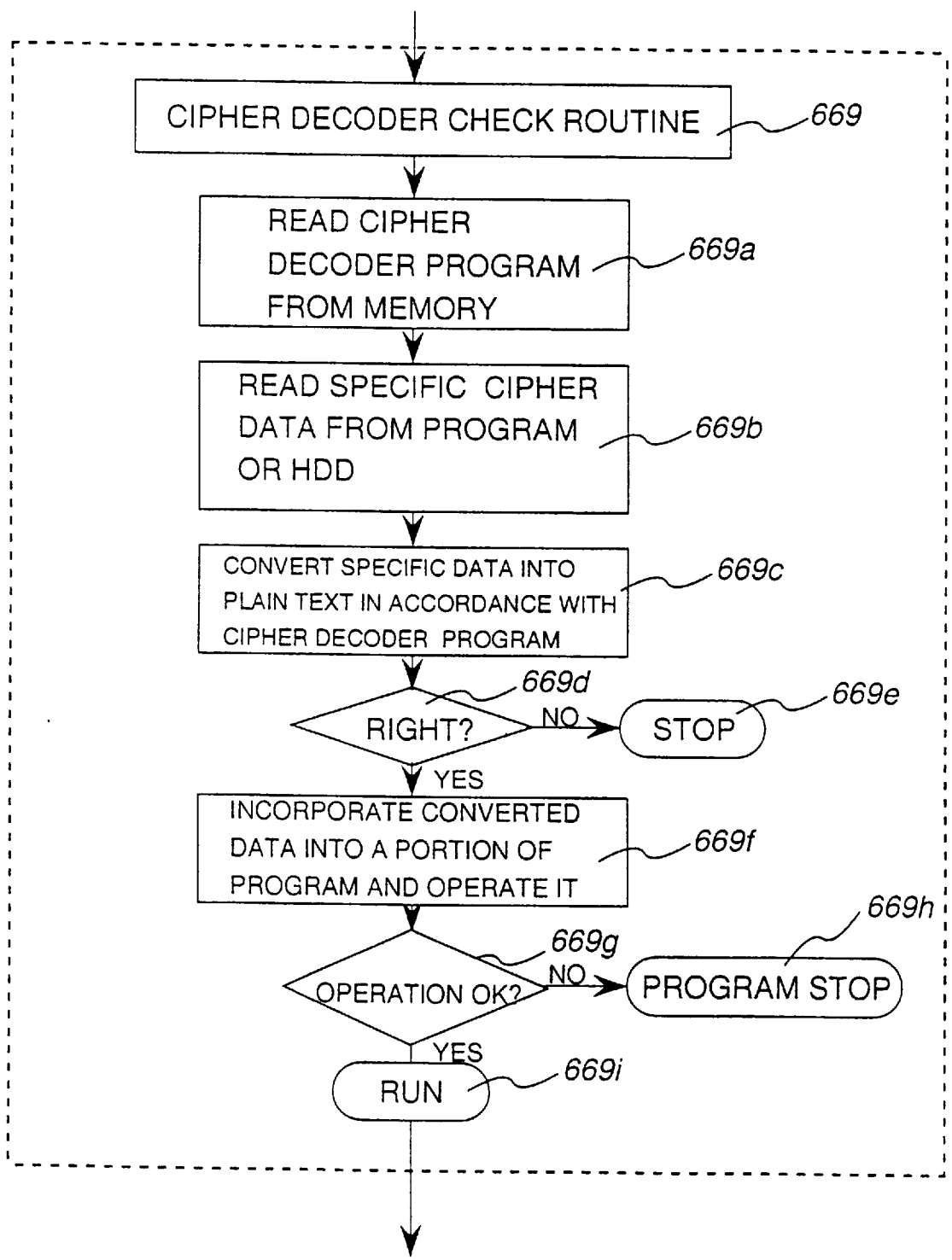
FIG. 74 is a flow chart showing an operation of the eleventh embodiment.

Figure: FIGS. 69, 770 to 74

Twelfth Embodiment

Contents: A method of preventing a scramble from being released at illegal use with the first physical feature information and a scramble key being encrypted by a one direction function.

Figure 77:
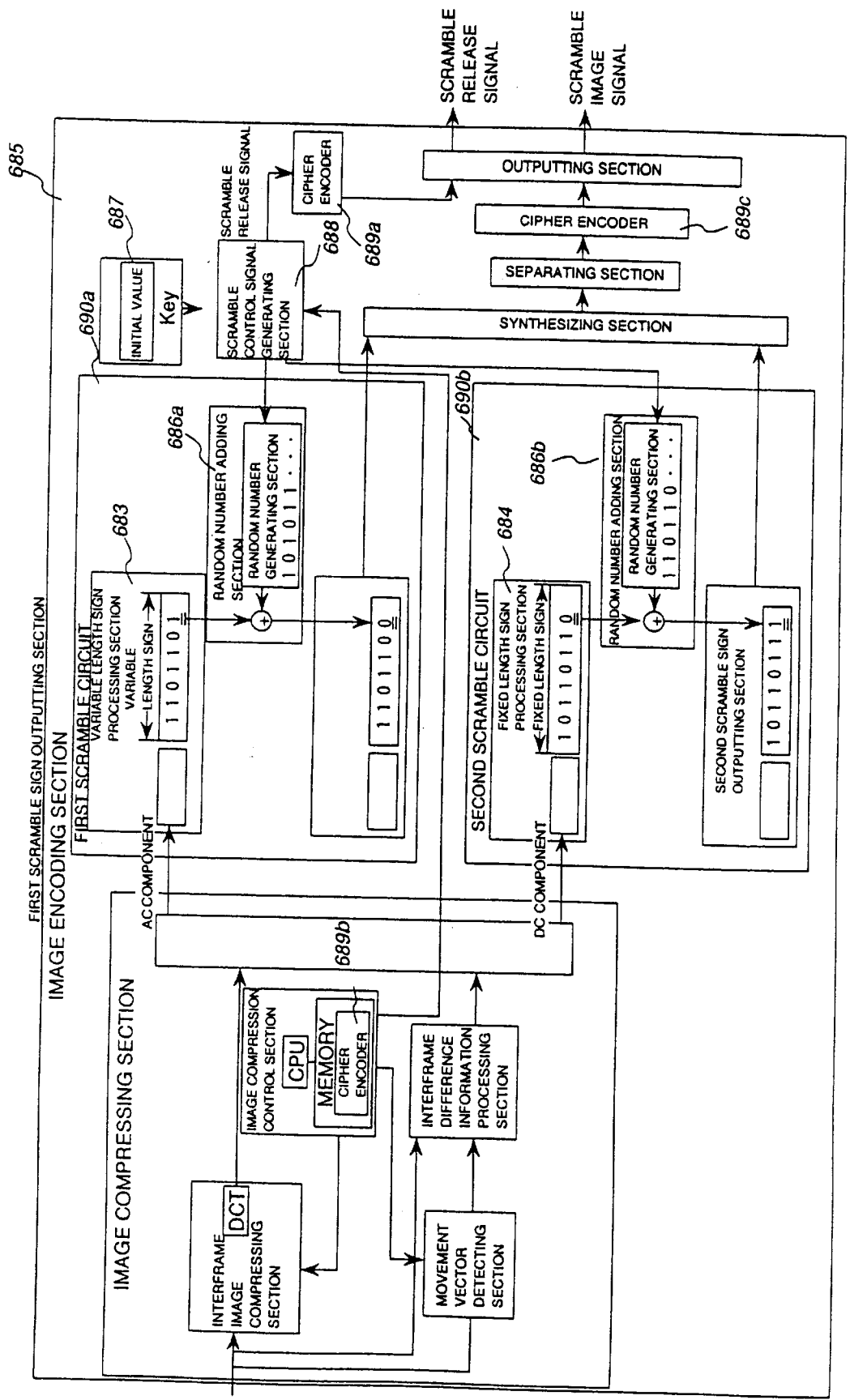
FIG. 77 is a block diagram showing an image encoding section in an twelfth embodiment.
Figure 78:
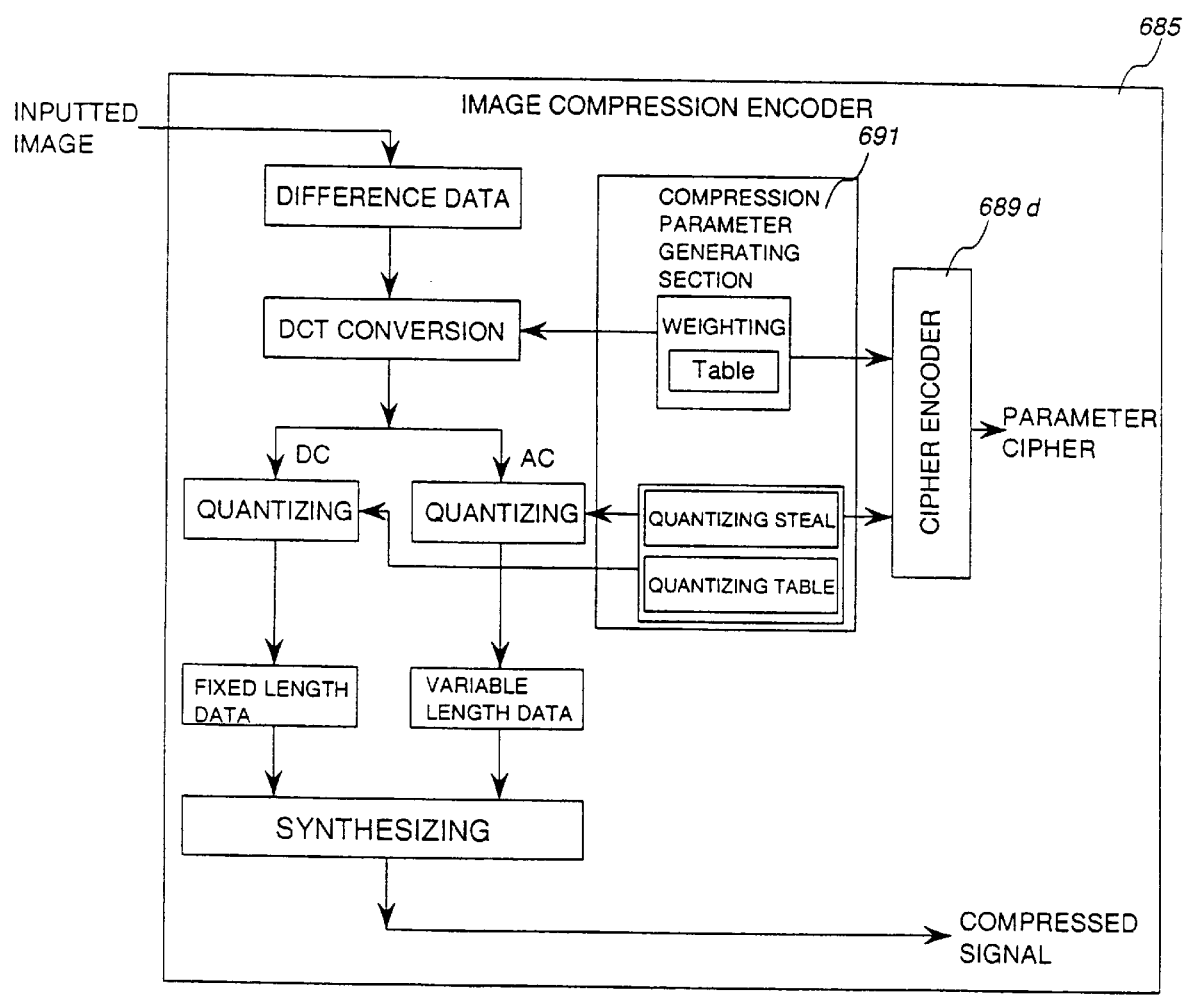
FIG. 78 is a block diagram showing an image compressing encoder in the twelfth embodiment.
Figure 79:
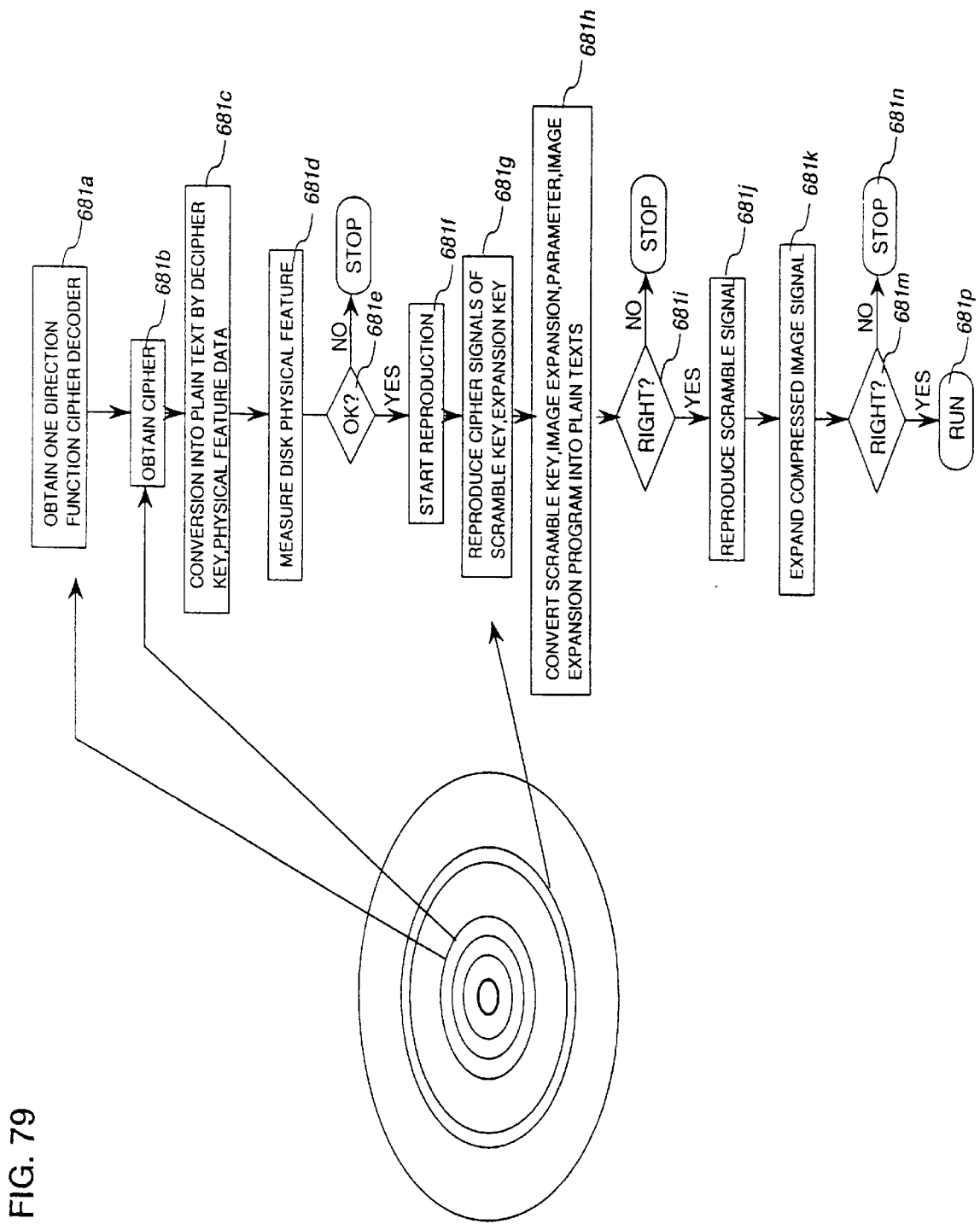
FIG. 79 is a flow chart showing an operation of the twelfth embodiment.

Figure: FIGS. 77 to 79

Thirteenth Embodiment

Contents: 1. A method of providing a plurality of cipher decoders on a ROM.

2. A method of using an elliptic function as the one direction function in the second embodiment.

Figure 86:
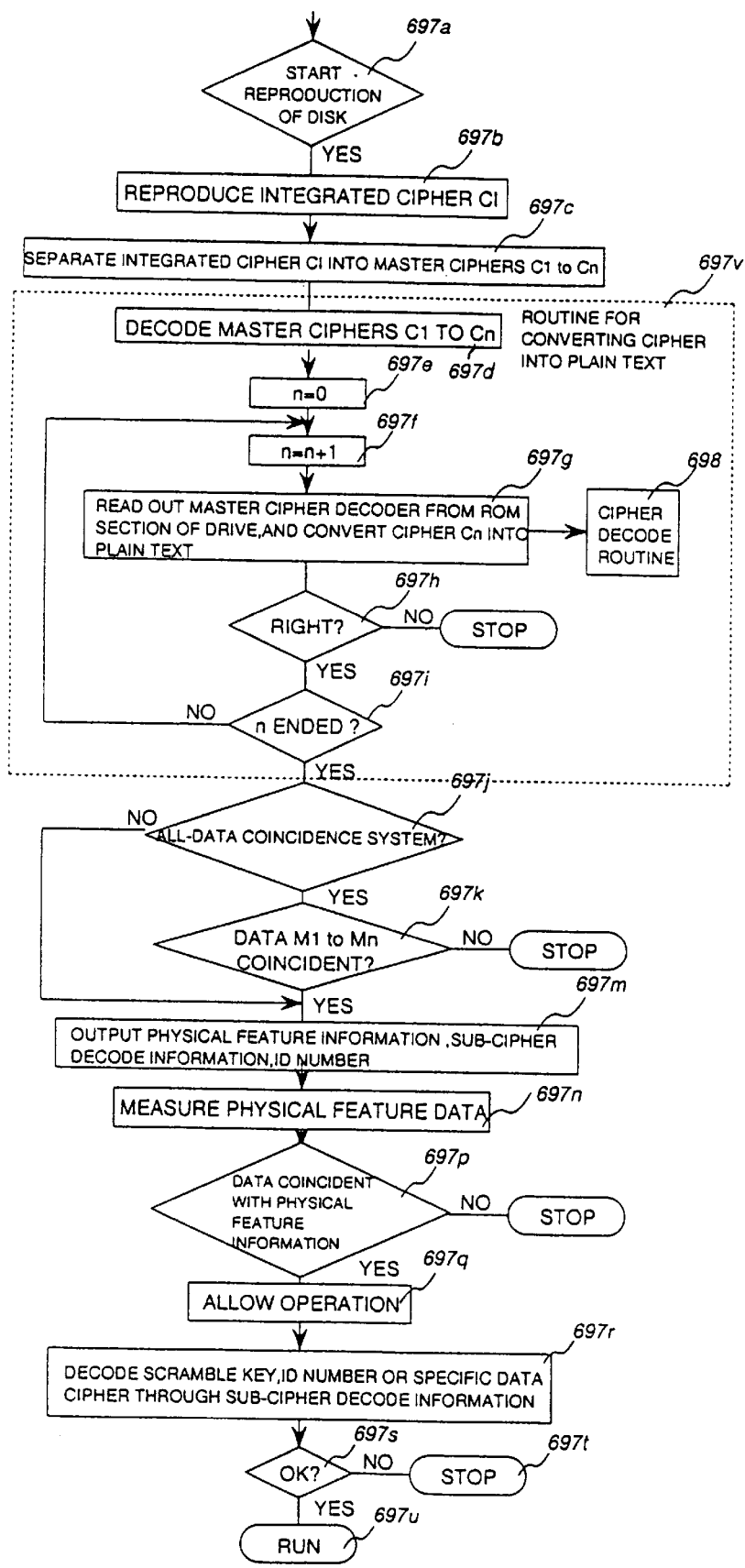

Figure: FIGS. 83, 86

Fourteenth Embodiment

Contents: A method of fabricating an original record wherein recording is made from the outer circumferential portion to the inner circumferential portion, the first physical feature information is measured and the first cipher is recorded at the inner circumferential portion.

Figure 88A:
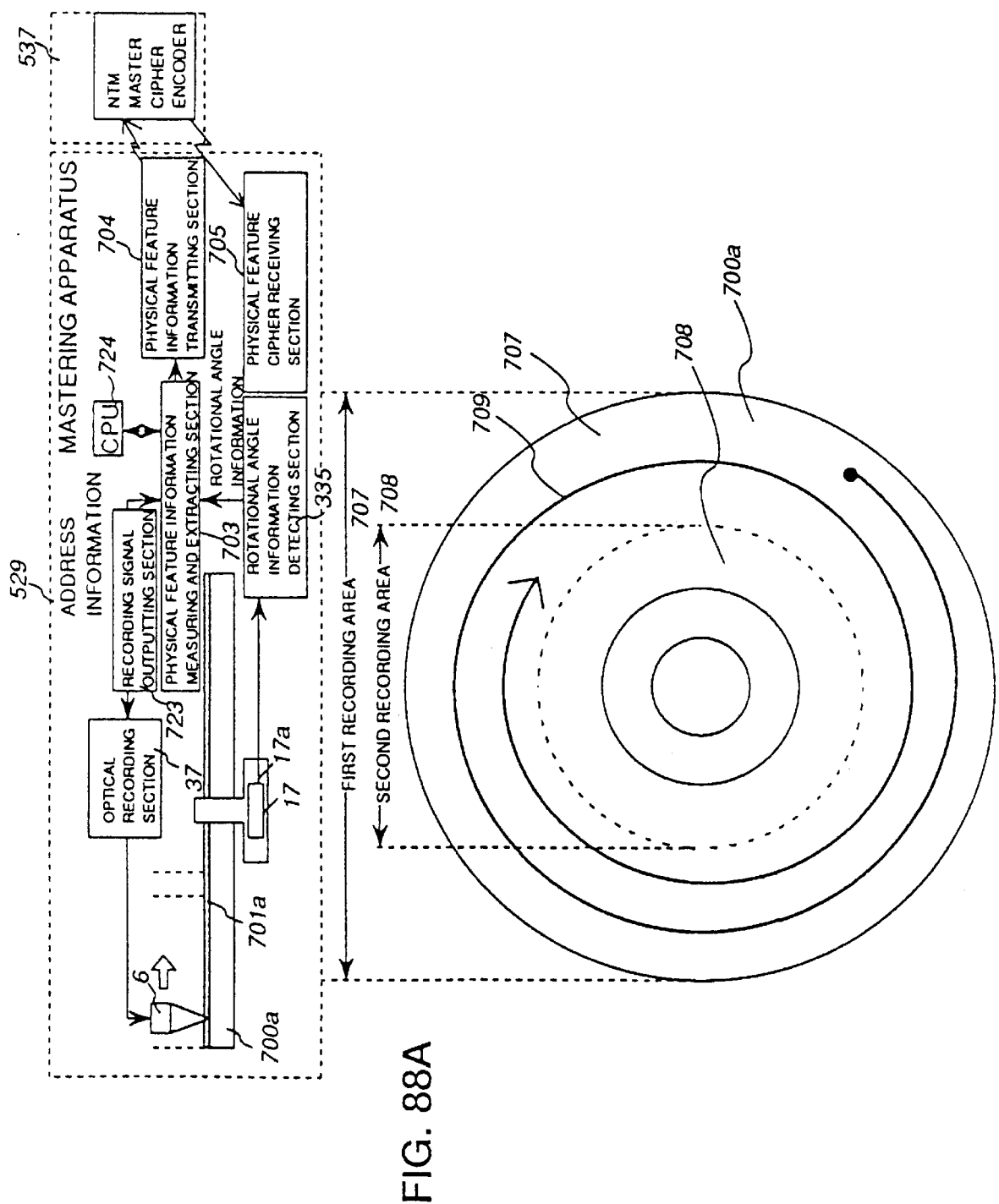

Figure: FIGS. 88, 89

[First Embodiment]

The first embodiment relates to a system and method for the prevention of illegal duplication from a CD or CD-ROM or illegal copy of a program on a CD-ROM to more than the legal number of personal computers. First, a detailed description will be made in terms of a method of releasing a key (unlocking) to execute a specific program recorded on an optical disk such as a CD-ROM which contains a number of programs keys such as passwords. Since a CD as shown in FIG. 59 employs a disk copy preventing (protection) method according to this invention which will be described hereinafter with reference to FIGS. 70 to 72, difficulty is encountered to duplicate the CD. In addition, on an optical mark section 387 there is recorded an ID Number which is different at every disk. This ID number is read through an optical sensor 386 comprising a light-emitting section 389$a$ and a light-receiving section 389$b$ to obtain, for example, data "204312001" which in turn, is inputted into a disk ID number (OPT) item of a key managing table 404 in a memory of a reading CPU. Although this method is usually effective, there is a possibility that an illegally duplicating traders concerned make the duplication by means of a printing machine. Moreover, in order to improve the duplication preventing effect, an extremely high Hc section 401 such as a 40000e material made of barium ferrite is provided so as to magnetically record the magnetic ID Number (Mag) data "205162" in the factory. This data is reproducible with a common magnetic head, and the reproduced data is put in the disk ID number (Mag) item of the key managing table 404.

As shown in FIG. 8A which is an illustration of a process to record an ID number, the employment of a magnetizing device 540 as shown in FIGS. 9A to 9D permits the time required for the process to record the ID number on a recording medium 2 to become below 1 second. This magnetizing device 540 has a ring-like configuration as shown in FIG. 9A and has a plurality of magnetizing poles 542$a$ to 542$f$ as illustrated in FIGS. 9C and 9D which are enlarged views, coils 545$a$ to 545$f$ being wound around the magnetizing poles 542$a$ to 542$f$, respectively. This plurality of magnetizing poles 542$a$ to 542$f$ are some of the whole magnetizing poles, and all the magnetizing poles are approximately 100 in number, for example. The current from a magnetizing current generator 543 flows through a current direction switching device 544 so that currents flowing in preset directions advance into the coils 545$a$ to 545$f$, thus allowing the magnetization to be accomplished in a desired direction at every pole. FIG. 9D shows an example that the magnetizing directions are set to establish S, N, S, S, N, S poles from the left side. In this case, on a magnetic recording layer 3 there are in an instant formed magnetically recorded signals in the directions indicated by arrows 51$a$, 51$b$, 51$c$ and 51$d$. It is possible to record the signals even on a high Hc magnetic material such as a 40000e material. Accordingly, the time needed fro the process shown in FIG. 8A is substantially equal to that for a conventional process shown in FIG. 8B, with no lengthened time for the production of a CD.

In a method wherein an ID number is magnetically recorded through a magnetic head while the recording medium 2 rotates, the time required for the start-up of rotation of the medium 2, several turns of the medium and the stopping of the rotation is several seconds. For this reason, there is a problem in that difficulty is experienced to introduce it to a CD mass production process, in which the processing time for giving the ID number is approximately 1 second, without changing the flow of the process.

In FIG. 8A which is the illustration of the process for giving an ID number, the employment of the magnetizing device 540 illustrated in FIGS. 9A to 9D allows the process time for recording the ID number on the medium 2 to be less than 1 second, with the result that this is more suitable for a process which has a fast through put. The recording operation of the magnetizing device 540 is as follows. That is, as described above the current direction switching device 544 permits currents to flow into the coils 545a to 545f in desired directions, which achieves arbitrary magnetizing directions. Since the FIGS. 9A to 9D magnetizing device 540 allows the flows of the currents to the respective coils 545a to 545f in set directions, it is possible to obtain a set magnetizing direction to make a different pattern at every disk. In FIG. 9D, the magnetizing directions are set to make a pattern of S, N, S, S, N, S poles from the left side, in which case the magnetic recording layer 3 instantaneously has the magnetically recorded signals on its specific track in the arrow 51a, 51b, 51c, 51d directions for several milliseconds. Accepting a large current, magnetizing devices make it possible to accomplish the recording even on a high Hc magnetic material such as 4000oe. Accordingly, as illustrated in FIG. 8A, the operating time for the recording the ID number is approximately the same as that in the prior FIG. 8B process and, hence, the CD production is possible without changing the flow of the process at all. In addition, in the case of the use of the magnetizing device 540, since the ID number can magnetically be recorded with no relation of the medium 2, it is possible to reduce the through put in the process, as well as to accomplish the accurate printing in the printing process after the recording of the ID number of the FIG. 8A because of no rotation of the medium 2. At present, a magnetic head is commercially available which permits the recording on a magnetic recording layer whose Hc is about 2700oe. Thus, when Hc is low, there arises a problem in that the revision of the ID number is possible. On the other hand, the magnetizing device 540 generally generates a strong magnetic field, which allows the magnetic recording layer 3 having as high Hc as 4000oe to permit the recording of the ID number, thereby eliminating such a problem. In the case where the ID number is recorded in a specific track of the high Hc magnetic recording layer 3, since the ID number of this medium is not rewritable, i.e., can not be revised, through a usually available magnetic head 8, it is possible to ensure a higher degree of security for the password related to the ID number of the medium.

Figure 10:
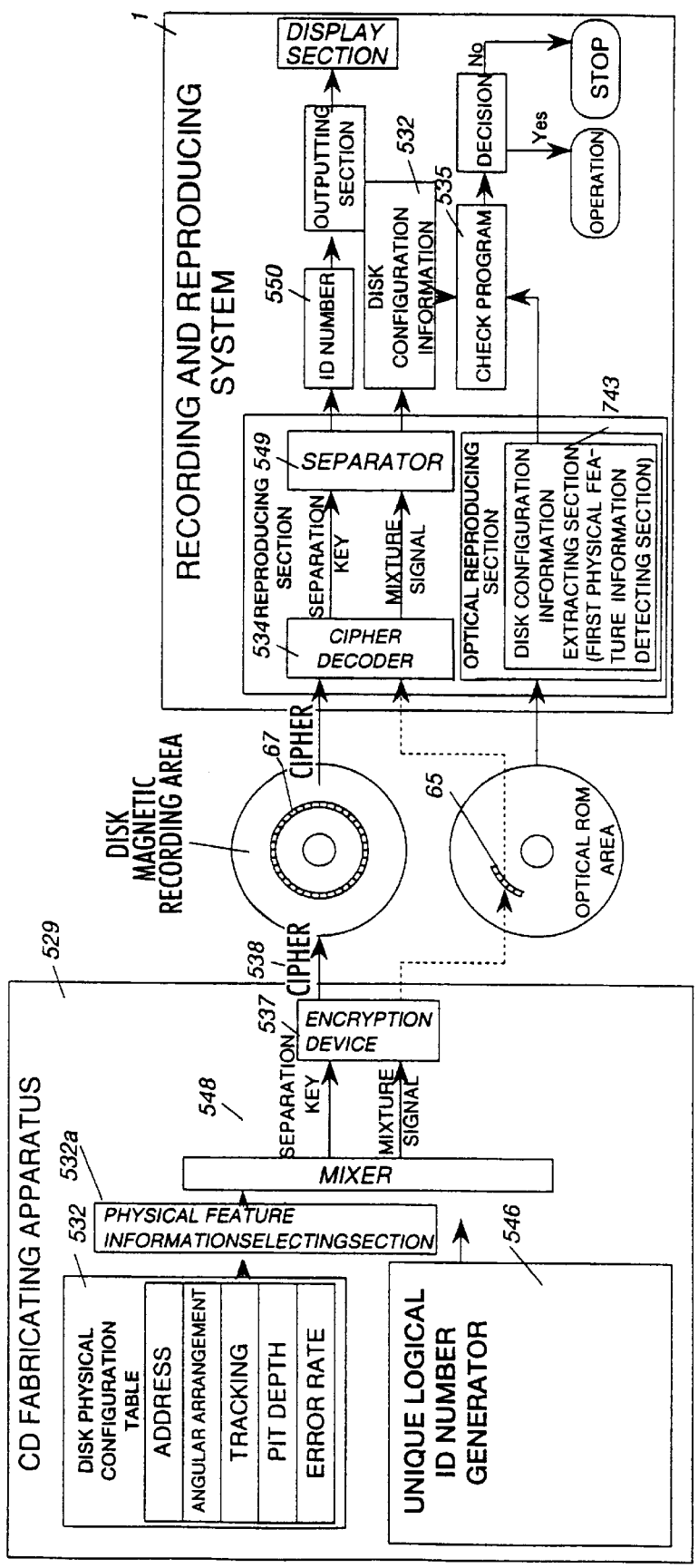
FIG. 10 is an illustration of the principle of ID number input in the first embodiment.

Furthermore, according to this invention, as illustrated in FIG. 10, a mixer 547 mixes a signal from a unique ID number generator 546 with the data on a physical configuration table (the first physical feature information) 532 of a disk so as to make difficult the separation therebetween if there is no key, the mixture signal, together with a separation key, being fed to an encrypting device 537 and the resulting cipher 538 being recorded on a magnetic recording track 67 in a magnetic recording area of a disk after the formation process for the disk or recorded on an optical recording track 65 in the original record formation process. The magnetic recording track 67 and optical recording track 65 are provided in an area different from the main information recording area. For instance, they are placed at an inner circumferential section or outer circumferential section of the disk, and for the magnetic track 67, they may be located on the surface opposite to the optical recording layer surface. The aforesaid physical configuration table 532 will sometimes be described as a physical arrangement table. In the recording and reproducing system 1 side, a cipher decoder 543 decrypts the cipher and a separation device 549 separates the ID number 550 from the disk physical arrangement table 532 by means of the separation key to check the illegal disk according to the illegal disk check method according to this invention, which will be described later with reference to FIGS. 70 to 71, thereby stopping the operation of the illegal disk.

In the case of the FIG. 10 method, the cipher (first cipher) 538 to be recorded on the magnetic recording track 67 is based on the mixture signal of the ID number created by the unique ID number generator 546 and the disk physical arrangement table, thus being different at every disk. As a matter of course, this disk employs the illegal duplication preventing method according to this invention which will be described later with reference to FIGS. 5 and 7, whereby the illegal duplication traders concerned can not illegally duplicate the optical recording section of a CD. Accordingly, even if taking one sheet of normal disk to try to illegally use the legal disk a person can not illegally use it except for the revision of its ID number. If there is a disk fabricated on the basis of an original record corresponding to a disk whose password is known, the fabrication of the same disk is possible with the same first cipher being recorded in the magnetic recording section. This means that the employment of the password causes the illegal use. If the first cipher of the disk physical arrangement table and the ID cipher of the ID number are recorded separately, the same first cipher of the physical arrangement table is recorded on the magnetic recording layers of all the disks due to the same original record, whereby people can readily find that it is a disk due to the same original record. For this reason, when the ID cipher of the ID number is rewritten with the ID cipher of the ID number whose password is known, there is a possibility that the illegal use easily take place. However, According to the FIG. 10 method, a plurality of different original records are present with respect to one title, and further, even if the disks are fabricated through the same original record, the first cipher is entirely different at every disk, which makes it difficult to recognize from the first cipher that two disks are due to the same original record.

First, a description will be made in terms of the principle of making it difficult to find, on the basis of the first cipher, a disk fabricated by the same original record. Although many pieces of first physical feature information of the original record are detectable, the recording capacity of the disk 2 shows limitation. Moreover, even if first physical feature information requiring a large capacity are recorded, the decryption may take much time. The time allowed for the decryption is approximately 1 second, thus limiting the data quantity of the first cipher. For this reason, actually the first physical feature information of the disk results in being obtained by the selection of a portion from the first physical feature information obtained. That is, the first physical feature information is obtainable by the selection of one from a number of selective values. In this illustration, the selective value is changed at every disk by a physical information selecting means 532a shown in FIG. 10. Therefore, even if the disks are due to the same original record, each of the disks has a different first physical feature information so that the first ciphers are different from each other.

As described above, some original records are usually fabricated in terms of one software, and each of the disks has a different first psychical feature information. From the above, the probability that the disks has the same first cipher becomes extremely low, thereby making it impossible to find a disk due to the same original record even if the first cipher data is available. Finding it requires the measurement of the physical feature information of the disk. Thus, it is difficult for a general user to find a disk due to the same original record.

Furthermore, according to this invention, as described with reference to FIG. 10, the first physical feature information and different ID number given at every disk are enciphered together. Accordingly, even if a disk whose decryption password is known is obtained to replace the first cipher of this disk with the first cipher of another disk, its operation stops by means of the pirate edition preventing program except that the first physical feature information, i.e., the original record, is not the same. Therefore, it does not operate at all. In the FIG. 10 method, since difficulty is encountered to find a disk fabricated by the same original record, the general users can not almost do the revision of the ID, thus preventing the general users from doing the illegal use. There is no way except that the information on the disk physical arrangement table 532 are read out from the whole area of the disk so as to check as to whether or not the same original record is used. For checking all the data on the address, angular arrangement, tracking, pit depth and error rate, the time is also required for confirmation. Accordingly, it is difficult for the illegal duplication traders concerned to find a disk fabricated by an original record which produced a disk such as a CD whose password is known, which makes it difficult that the illegal duplication traders concerned revises the ID number.

Figure 49:
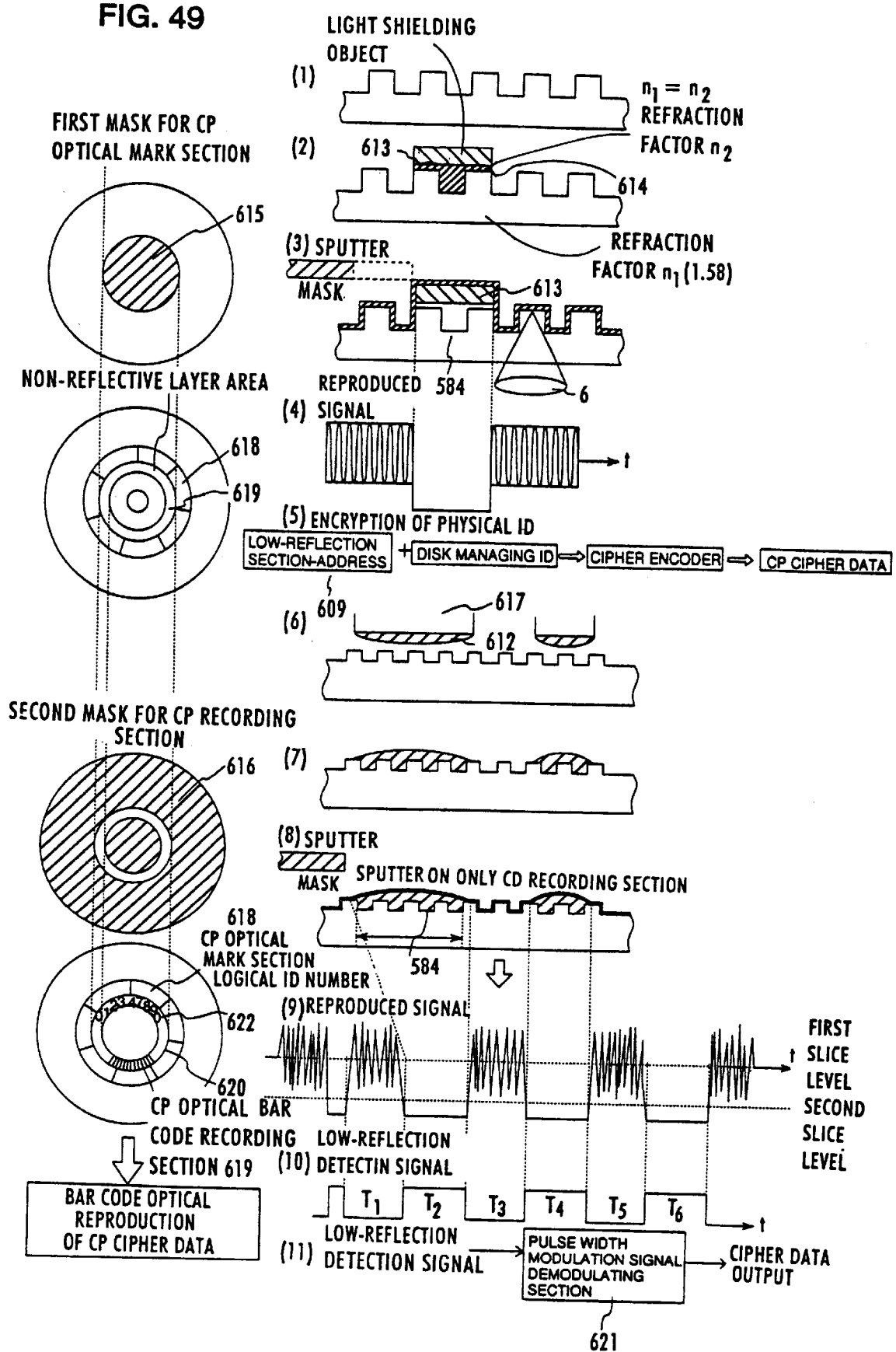
FIG. 49 is a flow illustration of a manufacturing method of a low-reflection portion in the fourth embodiment.
Figure 80:
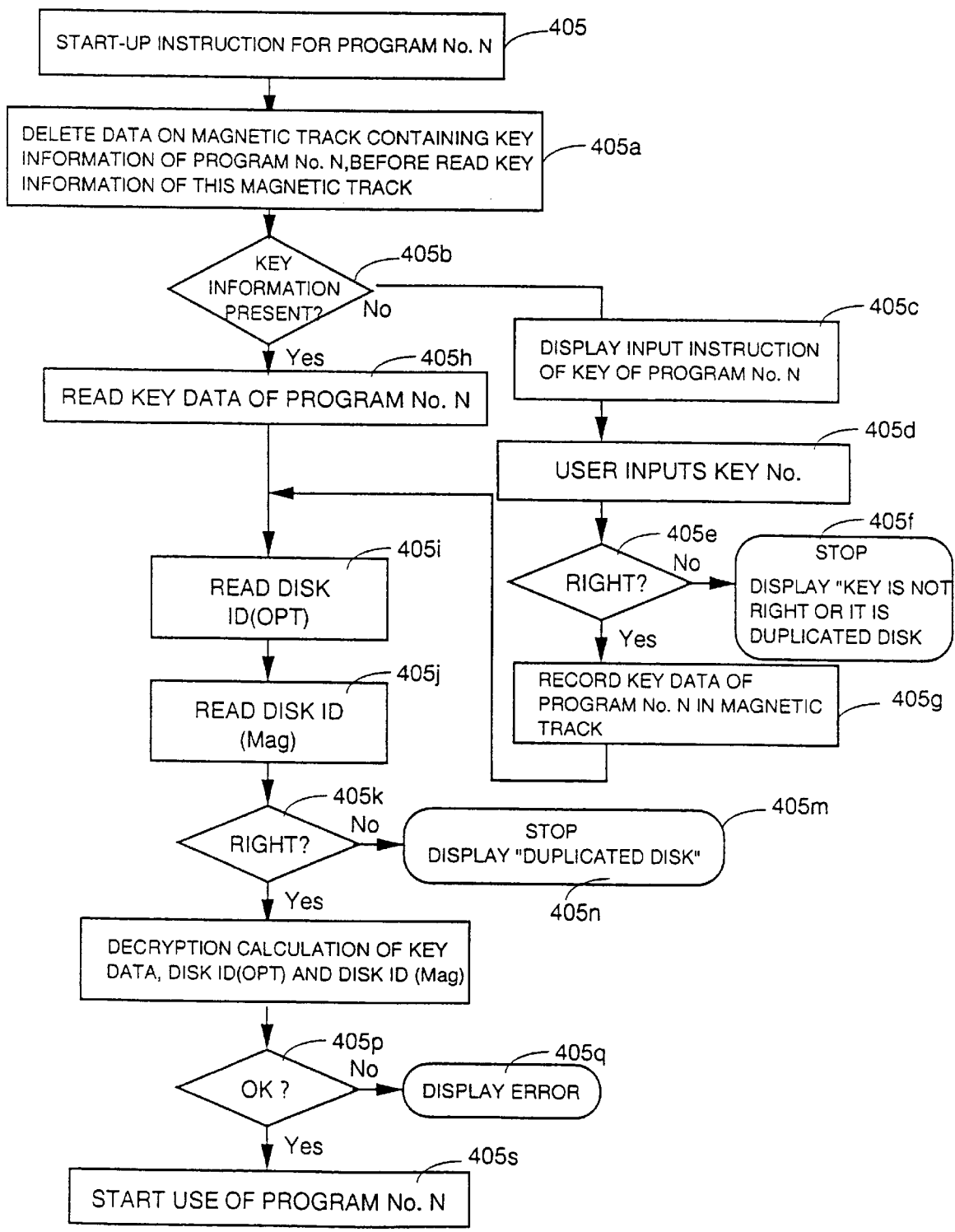
FIG. 80 is a flow chart showing an install program in the first embodiment.
Figure 82A:
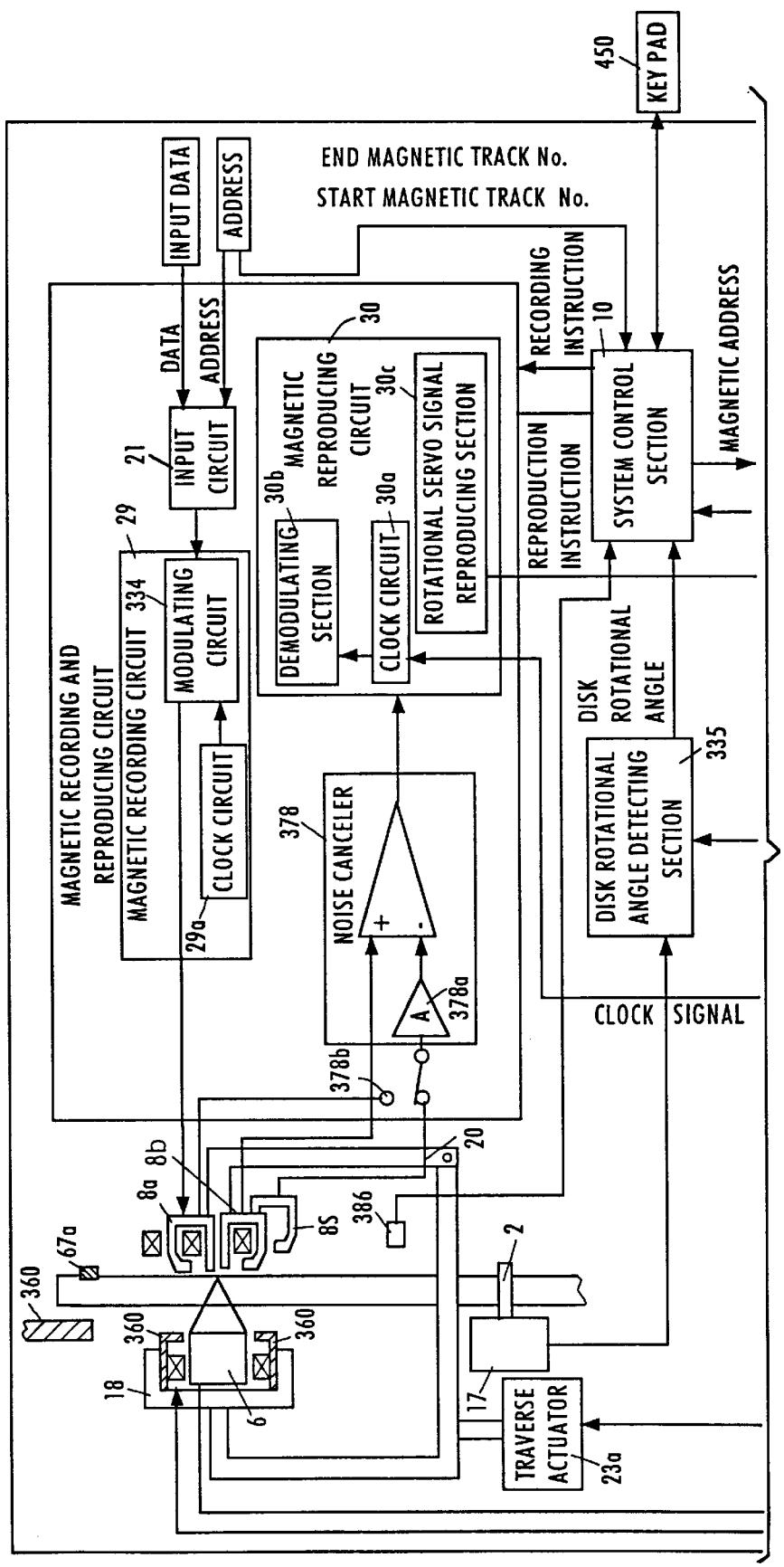
FIG. 82 is a block diagram showing a recording and reproducing system according to the first embodiment.
Figure 82B:
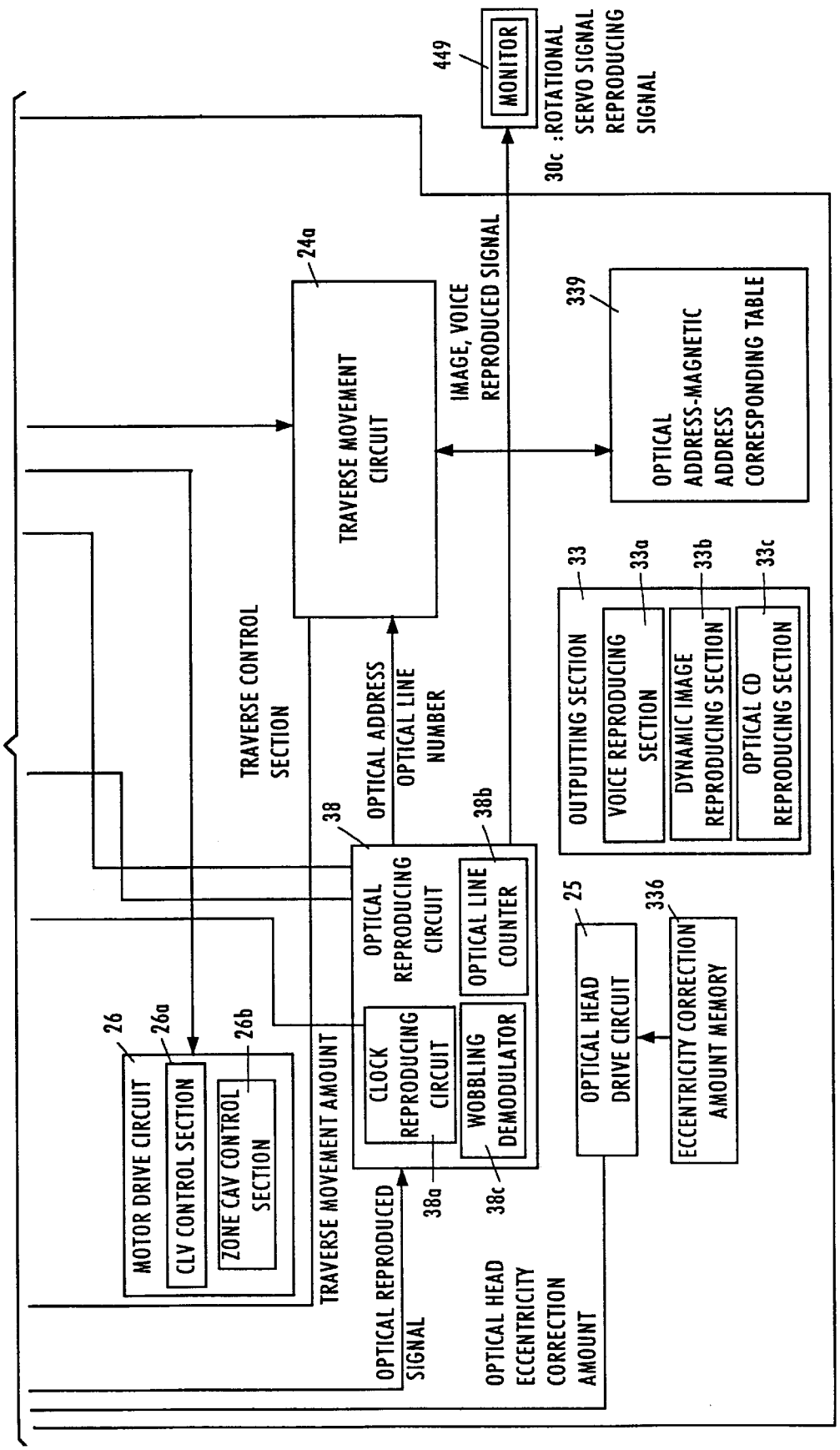

A concrete procedure will then be described with reference to a flow chart of FIG. 80. FIG. 69 is a block diagram of the whole including a CPU 665 and a magnetic recording and reproducing means, the operations of the parts of which will be described hereinafter. In FIG. 80, in a step 405, in response to the input of a start-up command for the program No. N to the CPU 665, the CPU 665 executes a step 405a to read as to whether or not the key information for the program is recorded on a magnetic track. At this time, a recording current is made to flow through the magnetic head 8 so as to erase that data. In the case of the legal disk 2, the key information is not erasable for that Hc is high. On the other hand, if it is an illegal disk, the key information disappears. Then, a step 405b is executed in order to check whether or not the key data, i.e., a password, exists. If the answer is "NO", the user receives a key input command on a screen as shown in FIG. 81, then followed by a step 405d where the user inputs, for example, "123456" which in turn, is checked as to whether it is in the right or not in a step 405e. If the answer is "NO", in a step 405f the operation stops and a display is made on a display section 16 to indicate that the key is not in the right or it is a duplicated disk. On the other hand, if the answer is "YES", the operational flow goes to a step 405g in which the key data for allowing the execution of the program No. N is recorded on a magnetic track on the recording medium 2, subsequently followed by a step 405i. In this invention, an ID mark such as a bar code is provided on a surface opposite to the optical reading surface of an optical disk as shown in FIG. 59, or a bar code 619 is provided on the optical reading surface as shown in FIG. 49.

Returning back to the step 405b, if the answer is "YES", the operational flow advances to a step 405h to read the key data for the program No. N, and then proceeds to the step 405i to read the disk ID (OPT) on the optical recording layer, and further goes to a step 504j to read the disk ID (mag) on the magnetic recording layer, and still further enters into a step 405 to check whether they are in the right or not. If the decision shows "NO", a step 405m is executed to display "duplicated disk", then terminating the operation. On the other hand, if the decision indicates "YES", a step 405n is executed in order to make the decryption calculation for the key data, disk ID (OPT) and disk ID (Mag), then followed by a step 405p to check whether the data are in the right or not. If the answer is "NO", an error display is made in a step 405q. If the answer is "YES", the use of the program No. N starts in a step 405s.

In the case of using this method according to this invention, if for CDs 120 tunes each being voice-compressed to 1/5 are recorded and for game softs several hundreds of titles are recorded so that 12 tunes or one game can initially be listened, they can be released at the cost corresponding to the copyright fee for 12 tunes or one game. Further, when the user paid the fee afterwards, the soft trader informs him of the key for the ID No. of the disk, which allows the use of additional softs such as tunes and games as shown in FIG. 59. In this case, the employment of a sound expansion block 407 permits music soft containing a maximum of 120 tunes to be recorded on one CD, for that the sound expansion expands the recording quantity to five times, i.e., 370 minutes. Thus, the user can listen to a favorite tune from the recorded tunes when unlocked. Once the key is unlocked, the key data is recorded so that there is no need to always use the key. This method is applicable to electronic dictionaries general programs other than the music CDs and game CDs, providing the same effects. For reducing the cost, it is also possible to omit the ID No. for the high Hc section 401.

[Second Embodiment]

Secondly, a description will be made in terms of a second embodiment which relates to a method of preventing the duplication of a CD itself, i.e., preventing the production of the so-called pirate CD by the illegal copy of the legal CD. In this embodiment, the two-dimensional arrangement of pits of a disk is treated as the first physical feature information. Nowadays, CDs are illegally duplicated in various manners to produce pirate CDs which in turn, are put in the market, and a way of preventing the duplication is needed. Difficulty is experienced to prevent the duplication only with softwares such as encryption. The second embodiment prevents the duplication utilizing a cipher and a pit arrangement of a CD.

FIG. 1 is a block diagram showing a mastering apparatus for fabricating an original record for CLV type optical disks. The mastering apparatus 529 comprises a linear velocity control section 26a whereby an optical head 6 generates an optical beam to exposure-record latent images of pits on a photosensitive surface of a disk 2 while the linear velocity is kept within the range of 1.2 m/s to 1.4 m/s for CDs. For CDs, a tracking circuit 24 increases the radius r in pitch of about 1.6 $\mu$m per revolution so that the pits are recorded spirally. Thus, the data are recorded spirally on an original record as shown in FIG. 3A. In the case of a CAV optical disk such as a video disk, an original disk is reproduced and an original record is fabricated through rotational control completely connected with the rotation of the original disk. Accordingly, if the third party gets master data 528, the mastering apparatus 529 can easily fabricate an original record for an optical disk having the completely same pattern as a legally manufactured CAV optical disk. For CAV, the difference in pit pattern between the legally manufactured original record and the illegally fabricated original record becomes below several μm. For this reason, the conventional method can not distinguish between the legally fabricated optical disk and the illegally produced optical disk on the basis of the physical arrangement of a pit pattern.

On the other hand, for CLV optical disks such as CD-ROMs, the pits are spirally recorded on an original record at an initially set constant linear velocity ranging from 1.2 to 1.4 m/s. In the case of CAV, the amount of data to be recorded per revolution is always constant, while in the case of CLV the data amount per revolution varies as the linear velocity varies. When the linear velocity is low, the data arrangement 530a as shown in FIG. 3A takes place, and when the linear velocity is high, the data arrangement 530b as shown in FIG. 3B occurs. Thus, according to the normal mastering apparatus, there comes out the difference in data arrangement between the legal CD and illegal copied CD. In the mastering apparatus for the common CDs commercially available, the linear velocity can be set with accuracy as high as 0.001 m/s, and the original record is made with a constant linear velocity. However, even if the original record for 74-minute CDs is fabricated with such a high accuracy at the linear velocity of 1.2 m/s, when the error is shifted to the plus side at the outermost circumferential track, an error corresponding to 11.783 revolutions takes place. That is, as compared with the ideal original record, the original record to be fabricated has the data arrangement 530b whose angular error is 11.783 revolutions×360 degrees at the outermost circumferential track. Accordingly, as shown in FIGS. 3A and 3B, the legal CD and illegal CD have different data arrangements 530, i.e., different A1 to A26 addresses 323a to 323x. For instance, when the CD is divided into four sections to define Z1 to Z4 arrangement zones 531, the arrangement zones 531 of the A1 to A26 addresses 323 are different from each other. Accordingly, when a corresponding table between the arrangement zones 531 and the addresses 323 for two CDs are drawn out, as shown in FIGS. 3A and 3B it is found that the physical position tables 532a and 532b of the legal CD and illegally duplicated CD are different from each other. This difference allows distinguishing between the illegally duplicated CD and the legal CD. However, even if a CD is fabricated which is hard to duplicate, the effect comes down if the method of checking the legal CD is in easy revision. According to this invention, as shown in FIG. 5, the physical position table 532 is made during the fabrication of the CD original record or after the completion of production of the original record. This physical arrangement table 532 is encrypted by an encryption means 537 on the basis of a one direction function such as an RSA type disclosure cipher key and then recorded in an optical ROM section 65 of the CD medium 2 or in the magnetic recording track 67 of the CD medium 2a.

Subsequently, in the drive side, a cipher signal 538b is reproduced from the CD medium 2 or 2a and the physical arrangement table 532 is restored using a decryption program 534 reproduced from the optical recording section of the CD. Further, disk rotational (turning) angle information 335 corresponding to the actual CD address 38a is obtained on the basis of an index or a rotational pulse signal from the aforesaid FG by using a disk check program 533a similarly reproduced from the CD and checked with the data of the physical arrangement table 532. If OK, the operation starts. If NO, a decision is made such that it is an illegally duplicated CD, thus stopping the operation of soft programs or the reproduction of the music softs. In the illegally copied CD shown in FIG. 33B, the physical position table 532b is different from that of the legal CD, whereby the CD is rejected. The illegally duplicated CD does not come into operation except for the decryption of a cipher decrypting program 537. Accordingly, even though the cipher signal is copied, the rejection takes place. Thus, it is possible to almost completely prevent the reproduction of the illegally copied CD.

There may be three ways the illegal duplication traders concerned can take as countermeasures: 1) fabricating a CLV disk original record having the totally same pit pattern; 2) decrypting the cipher encode program of the secrete key shown in FIG. 5 by means of the cipher decode program 534; 3) analyzing all the programs in the CD-ROM to replace the cipher decode program 534 and disk check program 533a by the program revision. Of these three ways, the third way is meaningless because the program decryption and program revision need much time, i.e., large cost. In addition, according to this invention, the cipher decode program 534 and disk check program 533a are placed in the media side but not in the drive side, and hence they can changed at every title or press of the CD-ROM. Accordingly, since the investment for the program decryption and cipher decryption is needed at every title, the illegal traders are unprofitable so that the duplication can be prevented from the economical aspect. Further, a description is made in terms of the second way. This invention employs a one direction function such as the RSA type disclosure cipher key shown in FIG. 5. For example, the employment of the equation $C=E(M)=M emodn$ is possible. Thus, even if the cipher decode program, i.e., one key, is in disclosure on the CD-ROM, the decryption of the cipher encode program 537 which is the other key takes incredible time and hence is substantially impossible. Although there is a possibility that the information on the cipher encode program 537 leaks, in the FIG. 5 method the cipher decode program 534 is present at the media side but not at the drive side. Accordingly, even in case that it leaks, by changing both the pair of cipher programs, the duplication preventing effect is easily restorable. Finally, the first way of fabricating the CLV original record having the completely same pattern is difficult because, although one-pulse rotational signal emerges per revolution, the current CLV mastering apparatus 529 does not include a means to detect the rotational angle with high accuracy for control. In this case, with the rotational angle information and recorded signal being read out from the duplication source, i.e., CD, to take the synchronization with the rotational pulses during the duplication, a similar pit patter can be drawn with some degree of positional accuracy, but not exactly. However, this is possible only in the case where the recording on the duplication source CD is effected at the same linear velocity.

In the mastering apparatus 529 according to this invention, as shown in FIG. 1 a CLV modulation signal generating section 10a generates a CLV modulation signal which in turn, is supplied to a linear velocity modulating section 26a in some case and a time-axis modulating section 37a of an optical recording circuit 37 in some case for CLV modulation. The linear velocity modulating section 26a modulates, at random, the linear velocity at 1.2 m/s to 1.4 m/s which are within the CD standard range as shown in FIG. 2A. This can similarly be realized even if the time-axis modulating section 37a modulates the signal while the linear velocity is constant, in which case there is no need for the modification of the apparatus. Difficulty is encountered to detect with high accuracy the linear velocity modulation from the duplication source CD. Even the mastering apparatus which made the original record can not duplicate it, for that the recording is performed at random without controlled. The original record always varies. For this reason, it is almost impossible to completely duplicate the CD involving the linear velocity modulation according to this invention. However, since the linear velocity from 1.2 to 1.4 m/s for CDs is in the standard range, the data is reproducible by means of the common CD-ROM player currently put on the market.

Let it be assumed that ass shown in FIG. 2B, the same data is recorded on a specific optical track 65a at a constant linear velocity of 1.2 m/s and, when the start point is taken as S, the end point A1 of the recorded data takes a position of 360 degrees. In this case, if as shown in FIG. 2C the linear velocity evenly increases from 1.2 m/s to 1.4 m/s during one revolution, the physical position 539a of the address A3 comes to the physical position 539a shifted by 30 degrees. Further, the linear velocity increases during ½ revolution, it comes to the physical position 539c shifted by 45 degrees. This means that the position is changeable by a maximum of 45 degrees during one revolution. Since the common CLV mastering apparatus can generate only one rotational pulse per revolution, the positional error is accumulated up to 90 degrees during two revolutions. Even if in the future the illegal duplication traders carries out the rotation control, the positional deviation of 90 degrees occurs between the legal original record and illegally copied original record by means of the linear velocity modulation according to this invention. Detecting this positional deviation allows the illegally copied CD. The position deviation detecting resolution is set to be below 90 degrees. Accordingly, in the case where the linear velocity is changed in the range from 1.2 to 1.4 m/s, when as illustrated in FIGS. 3A and 3B four 90-degree division zones Z1, Z2, Z3 and Z4 are set, the detection of the illegal CD is possible. If dividing more than four, its effect improves. Naturally, if a CLV mastering apparatus having an extremely high accuracy would newly be developed, the illegal traders can make the wholly same pit pattern. However, only several companies in the world can develop such an apparatus and, therefore, it is not required for the ordinary use purposes. If the shipment of such a mastering apparatus is limited for the purposes of protecting the copyright owner, the complete prevention of the illegal copy is possible.

Figure 6:
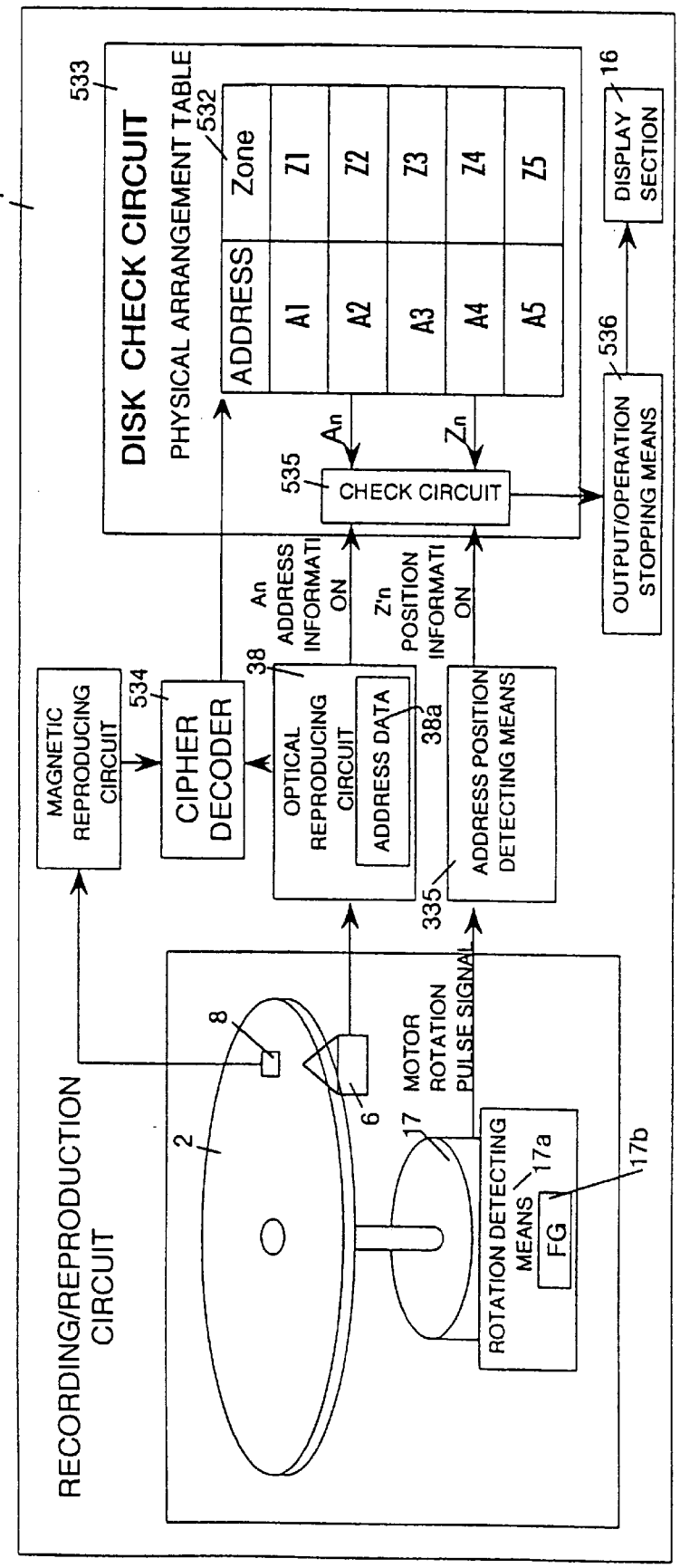
FIG. 6 is a block diagram showing a recording and reproducing system according to the second embodiment.

Furthermore, In the mastering apparatus equipped with a rotational angle sensor 17a as shown in FIG. 1, the physical position table 532 is made out on the basis of the address information 32a of the input data and positional information 32b on the rotational angle from a motor 17, and then encrypted through the cipher encoder 537 and further recorded at the outermost circumferential portion of the original record 2M by means of the optical recording circuit 37. Thus, the physical arrangement table 532 encrypted is recorded on an optical track 65 of the FIG. 5 disk 2 during the formation of the original record. Accordingly, this disk is reproducible even by an ordinary CD-ROM drive not having a magnetic head. In this case, as illustrated in FIGS. 5 and 6, the drive is required to include a disk rotational angle sensor 335. This detecting means is useful if only detecting the relative position of the address 323 and 90-degree zone, and hence a complicated sensor such as a angular sensor is not always needed. The relative position detecting method will be described with reference to FIG. 4. For example, as shown in (a) of FIG. 4 the rotational pulse from the motor or the index signal from the optical sensor once generates per revolution of the disk. This interval is time-divided as shown in (b) of FIG. 4 so that, in the case of six-divided zones, the signal position time slots Z1 to Z6 are given. On the other hand, as described before the address signals 323a, 323b are obtainable from the sub-code of the reproduced signal. A signal position indicating signal is effective to detect that the address A1 exists in the zone Z1 and the address A2 is present in the zone Z3. In this case, the structure becomes simple when the rotation signal or zone signal is recorded in the sub-code, while the data can entirely be duplicated, which destroys the duplication preventing effect. Accordingly, the provision of a means to detect the rotational angle at a place other than the optical recording section like this invention can offer a high duplication preventing effect.

Figure 7:
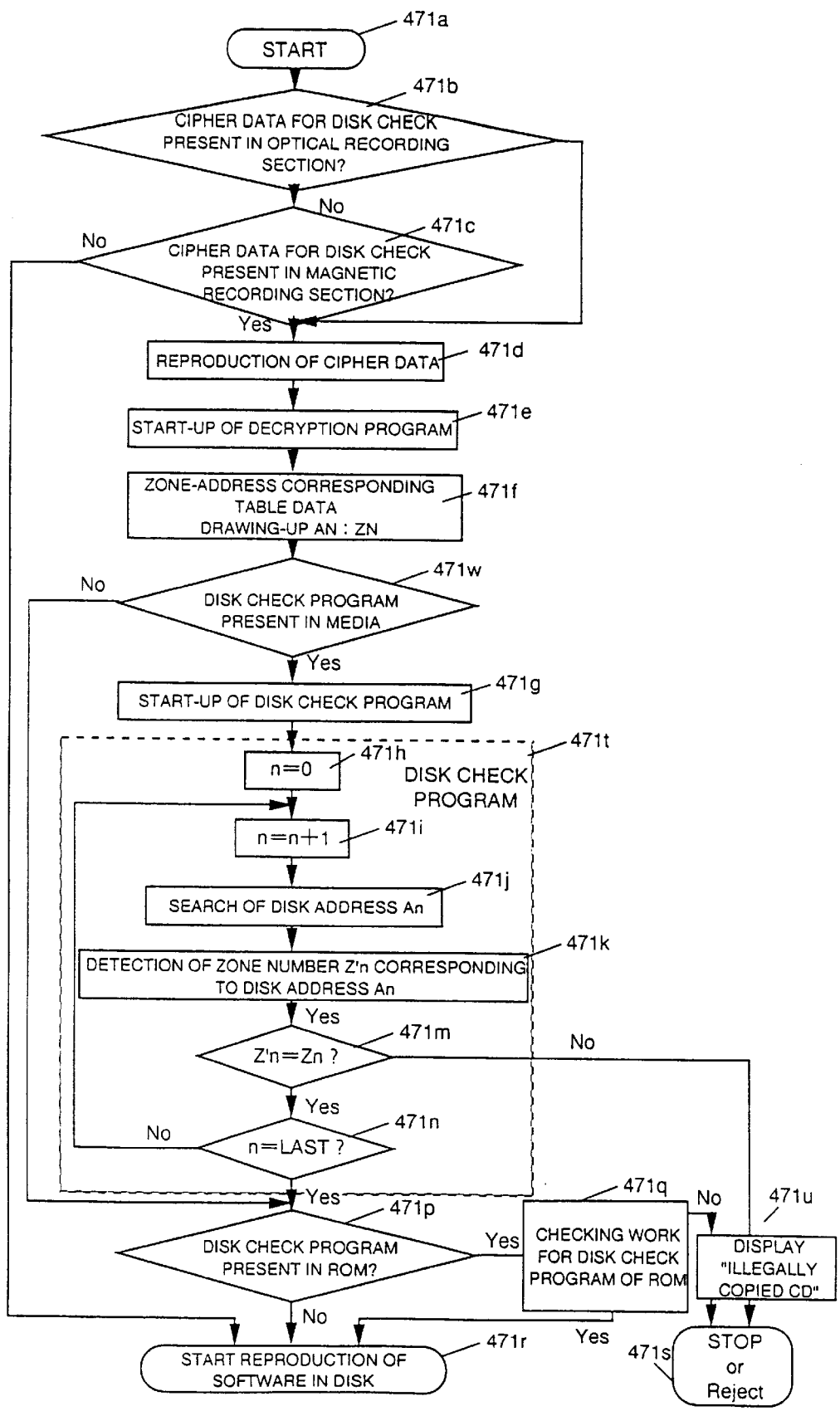
FIG. 7 is a flow chart for check of an illegally duplicated disk in the second embodiment.

Returning back to FIG. 6, in the recording and reproducing system, the signal is reproduced by an optical reproducing circuit 38, and if the physical arrangement table 532 is present in the optical track, in the FIG. 7 flow chart the operational flow advances from a steps 471b to 471e. If the answer of the step 471b is "NO", the step 471c is executed in order to check whether the cipher data exists in the magnetic recording section 67. If "NO", the operational flow goes to a step 471r to give a permission for the start-up. On the other hand, if "YES", the operational flow proceeds to the steps 471d, 471e to reproduce the cipher and to start the decryption program of the cipher decoder 534 recorded on the ROM of the drive or on the disk for the decryption, then followed by a step 471f to make out the physical arrangement table 532, i.e., the zone-address table (An:Zn). A step 471w is for checking whether or not the disk check program is in the media. If the decision is "NO", the operational flow advances to a step 471p. If the decision is "YES", the operational flow proceeds to a step 471g to start the disk check program recorded within the disk. In the disk check program (the step 471f), a step 471h is first executed to set n=0, and then a step 471i is implemented to set n=n+1, and further a step 471j is performed to search the address An of the disk 2 in the drive side for reproduction. In a step 471k, the positional information Z'n is detected and outputted by the foregoing position detecting means 335, and in a step 471m a check is made as to whether Z'n=Zn. If "NO", the operational flow goes to a step 471u to decide that it is an illegally copied CD and further to issue an indication of "illegally copied CD" to the display section 16, then followed by a step 471s for stopping. On the other hand, if the decision of the step 471m is "YES", the operational flow goes to a step 471n to check whether n=the last. If "NO", the operational flow returns to the step 471i. If "YES", the operational flow advances to the step 471p. The step 471p checks whether or not the disk check program is placed in the drive side ROM or RAM. If the decision is "NO", the step 471r is executed to start the soft. On the other hand, if "YES", a step 471q is implemented to run the disk check program. The operational content is the same as a step 471t. Thus, if the answer is "NO", the operational flow advances to the steps 471u and 471s. If the answer is "YES", the step 471r is implemented to start to reproduce the soft within the disk.

In the case where the CD player which is currently in production reproduces a disk whose linear velocity varies between 1.2 to 1.4 m/s, there is not problem in reproducing the original signal. On the other hand, the mastering apparatus can do the cutting with a considerable linear velocity accuracy above 0.001 m/s. Thus, as the standard for the mastering apparatus there has been provided the CD standard in which the linear velocity=±0.01 m/s. If conforming with the this CD standard, as shown in FIGS. 11A and 11B the linear velocity can increase, for example, from 1.20 m/s to 1.22 m/s within the standard. In this case, as shown in FIGS. 11C and 11D the angular physical arrangement of the same address is shifted by an angle of 5.9 degrees per revolution of the disk from 539*a* to 539*b*. When as shown in FIG. 13 a rotational angle sensor 335 which detects the angle shift of 5.9 degrees is provided in the recording and reproducing system side, the physical arrangement difference is distinguishable. For CDs, the rotational angle sensor 335 is useful which has a resolution of 6 degrees, i.e., which angle-divides one revolution into more than 60.

The arrangement of this rotational angle sensor 335 is illustrated in the FIG. 16 block diagram of the recording and reproducing system. Since a pulse emerging from a rotational angle sensor 17*a* such as a FG of the motor 17 is time-divided by a time-division circuit 553*a* of an angular position detecting section 553 of a disk physical arrangement detecting section 556, even if only one rotational pulse signal is obtainable per revolution, when for example the time accuracy is ±5%, it can be divided into 20, which ensures the angular resolution about 18 degrees. This operation was described above with reference to FIGS. 4A, 4B and 4C. Since for CDs an eccentricity of ±200 μm takes place, an angle measurement error appears due to the eccentricity. In the case of a CD according to the CD standard, the angle measurement error of a maximum of 0.8 degrees occurs at P—P due to the eccentricity. Accordingly, if the angle measurement resolution of 1 degree is needed, the measurement becomes impossible. When a high angular resolution is needed in order to avoid this problem, an eccentric quantity detecting section 553*c* is provided in the angular position detecting section 553 in FIG. 16 to measure the eccentric amount so that the correction calculation is made in an eccentric quantity correction section 553*b* to eliminate the influence from the eccentricity. A description will be made in terms of the detection of the eccentric quantity and the calculation of the correction amount. When no eccentricity occurs as shown in FIG. 19A, the center of a triangle made by three points A, B, C on one circle is coincident with the real center 557 of the disk under the condition that $\theta a = \theta b = \theta c$. Actually, as shown in FIG. 19B an eccentricity 559 takes place due to the eccentricity of the disk and the variation in the mounting of the disk. As shown in FIG. 19B, the relative angles of the three point addresses A, B, C are detected by the angle sensor 353, whereby the difference L'a between the rotational center 558 of the disk and the real disk center 557 can be calculated as $L'a = f(\theta a, \theta b, \theta c)$. The eccentricity correction section 553*b* corrects, using the calculated eccentric amount, the rotational angle signal from the rotational angle sensor 17*a*. This can eliminate the adverse influence from the eccentricity so as to improve the accuracy so that the angular resolution is below 1 degree, thereby improving the detection accuracy of the illegal disk.

In the case where the detection of the angular position is made with the resolution as low as 6 degrees as mentioned before, the decision between the legal and illegal disks is required to be strict. In particular, if the decision is made such that the legal disk is the illegal disk, the legal users suffer large damage. It is absolutely needed to avoid it. For this reason, as illustrated in steps 551*t*, 551*u*, 551*v* of the FIG. 14 flow chart, the access to the address of the disk which has been decided as an illegal disk is made two or more times for reproduction and check, whereby it is possible to avoid the wrong decision. The basic portion of the FIG. 14 flow chart is the same as the FIG. 7 flow chart, and only additional portions are described and the description of the portions other than the additional portions is omitted for simplicity.

When in a step 551 a decision is made such that the value is out of the allowable range, in the step 551*t* the access to the address An is again made plural times, then followed by the step 551*u* to detect the zone number Z'n indicative of the relative angle with respect to the address An, and further followed by the step 551*v* to check plural times whether or not the value is within the allowable range. If the decision is "YES", the disk is considered as a legal disk, and the operational flow goes to a step 551*s*. On the other hand, if the decision is "NO", it is considered as an illegal disk, and the operational flow advances to the steps 471*u* and 471*s* to inhibit the operation of the program.

In addition, if a statistic process is added for the prevention of the wrong decision, the decision accuracy improves. In FIG. 12A, in the legal original record the frequency distributions of angle-address, angle-tracking direction, address-tracking direction, angle-pit depth and address-pit depth read out become as illustrated in a graph (1). Accordingly, in the case where specific data are selected and reproduced by a player as shown in a graph (2), easily discriminable sample address data are selected. As shown in FIG. 12B the formed disk is reproduced to find signal sections, indicated with black color, which are out of the allowable range, and further to strike the abnormal values, which are out of the allowable range, off a list as shown by a graph (4). Although in the illustration the frequency distribution of angle-address arrangement is indicated, the same effect is also obtainable in terms of the frequency distribution of pit depth or address-tracking quantity. This permits the copy prevention signal section hard to discriminate, i.e., easy to made a mistake to be eliminated from the list, which reduces the mistake during the reproduction by the reproducing player. That is, the mistake probability decreases with the access to the address of the disk decided as illegality being made two or more times.

On the other hand, in FIG. 12C, in the original record illegally duplicated, since the address of the formed disk is read out to fabricate the original record, a copy protect signal (CP) signal generates which distributes in a given range at a constant probability as shown in a graph (5). In this case, since the disk physical arrangement table can not be revised as described before, the data selection as seen in the graph (2) is impossible. Accordingly, in the physical arrangement of the illegal original record the data are considerably close to the limits of the allowable range or the CP signal exists out of the allowable range. As shown in FIG. 12D, in the optical disk formed from the illegal original record there occur errors due to the formation variation which cause a distribution as shown in a graph (6). In the graph (6), the physical arrangement signal 552*b* exceeding the allowable value develops as indicated by black color. Since the physical arrangement signal 552*b* inherent in the illegal disk is detectable through the disk check program, the operation of the program stops, thereby preventing the use of the copied disk. The distribution of the angle-address CP signal disperses within a narrow range. On the other hand, in the case of the pit depth shown in FIG. 17B, the depth greatly varies in accordance with the cutting and formation condition, and it is considerably difficult to control this with precision. Therefore, the yield of the illegally duplicated disk at manufacturing sharply drops. For this reason, in the case of the pit depth, strong copy protection is possible.

A description will be made hereinbelow in terms of a reproducing system which detects the frequency distribution of the disk physical arrangement as shown in FIGS. 12A to 12D for the prevention of copy. As illustrated in FIGS. 13 and 16, the recording and reproducing system 1 is equipped with a disk physical arrangement detecting section 556 including three detection sections: an angular position detecting section 553, a track displacement detecting section 554 and a pit depth detecting section 555 which output a detection signal indicative of the angular position information Z'n, a detection signal representative of the tracking displacement T'n, and a detection signal indicative of pit depth D'n, respectively. When they are coincident in time with the signal A'n from an address detecting section 557, it is possible to obtain the corresponding data representative of A'n-Z'n, A'n-T'n, A'n-D'n, Z'n-T'n, Z'n-D'n, T'n-D'n. These data are checked in a checking section 535 with An, Zn, Tn, Dn of the reference disk physical arrangement table 532 decoded by the cipher decoder 534. If the decision is made such that it is not a legal disk, an output/operation stopping means 536 stops the operation of the program.

Further, a description will be made with a flow chart in terms of a statistic way to reduce the misjudgment for disks. In the flow chart of FIG. 14 the description of portions which are the same as that of FIG. 7 will be omitted for brevity. Further, the description will be limited to the decision of the illegal disk based on the frequency distributions of the disk physical arrangement data of the graphs (1) to (6) in FIGS. 12A to 12D. First, in the disk check program 471t, a step 551W is executed so as to check every time whether the CP (Copy Protect) decryption program, i.e., a first cipher decoder 534a having a one direction function (for example, RSA) calculating section 534c to decrypt the reference physical arrangement table 532 of the cipher decoder 534 in FIG. 16, is illegally changed or not, in order words, to check illegal revision and illegal decryption by an illegal cipher decoder, with check points being provided at given portions of the disk check program or application program. If "YES", the operation stops, thereby making it possible to prevent the illegal traders from replacing the first cipher decoder 534a with an illegal cipher decoder. This provides a higher degree of cipher security to further ensure the duplication prevention. Subsequently, a step 551f follows, for the angular position, to measure the position of a specific address and to measure the distribution state of the deviation amount with respect to the reference angle of the reference physical arrangement table 532 of the zone number. Assuming that m=0 indicates that the deviation does not occur and m=+n indicates that the zone is shifted by n, a step 551g is executed to set m=−1, a step 551h is executed to set m=m+1, and a step 551i is performed to check whether or not the angular zone Z'n is shifted by m. If the answer is "NO", the operational flow returns to a step 551h. If "YES", the operational flow advances to a step 551j to add it to the Z'n deviation distribution list so that the deviation distribution table is drawn up in succession. If m=the last in a step 551k, the next step 471n is performed. If "NO", the operational flow returns to the step 551h. In such a manner, the measurement is made in terms of the angular position of the specific address in FIG. 16, the state tracking displacement, or the distribution states of the deviations of the pit depth and angle/address positions with respect to the reference.

Figure 18:
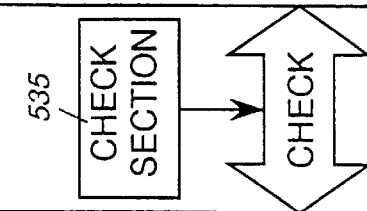
FIG. 18 illustrates a disk physical arrangement table in the third embodiment.

A step 551m of the disk check program 471t is a legality decision program wherein in a step 551n the maximum allowable value Pn (m) for the deviation m of the angular arrangement Z'n of the address n with respect to the reference, which is encrypted and recorded on a magnetic recording layer or an optical recording layer, is decrypted and read out so as to check the a deviation distribution table 556a shown in FIG. 18 and drawn up by the physical position deviation distribution measurement program in the foregoing step 551f and the reference physical arrangement table 532a to check whether the disk is legal or illegal. After setting m=0 in a step 551p and setting m=m+1 in a step 551q, in a step 551r a check is made regarding whether it is within the allowable range. Checking whether being within the allowable range is achieved by checking whether or not the number of Z'n is smaller than Pn (m) in FIG. 18. If "NO", operational flow advances to the aforesaid step 551f to again make access to the corresponding address. If "NO", a decision is made such that the disk is illegal. On the other hand, if OK, the operational flow goes to a step 551s. If m=the last, the operational flow goes to a step 471p, while if "NO", the operational flow returns to the step 551q. Such a measurement of the deviation distribution of Z'n with respect to Zn permits the statistic process which decides that it is an illegal disk when the value is out of the allowable range, thereby further reducing the probability that the legal disk is taken as an illegal disk, or vice versa.

Figure 14:
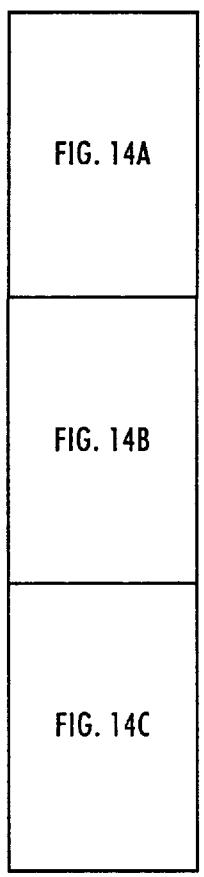
FIG. 14 is a flow chart of the second embodiment.
Figure 14A:
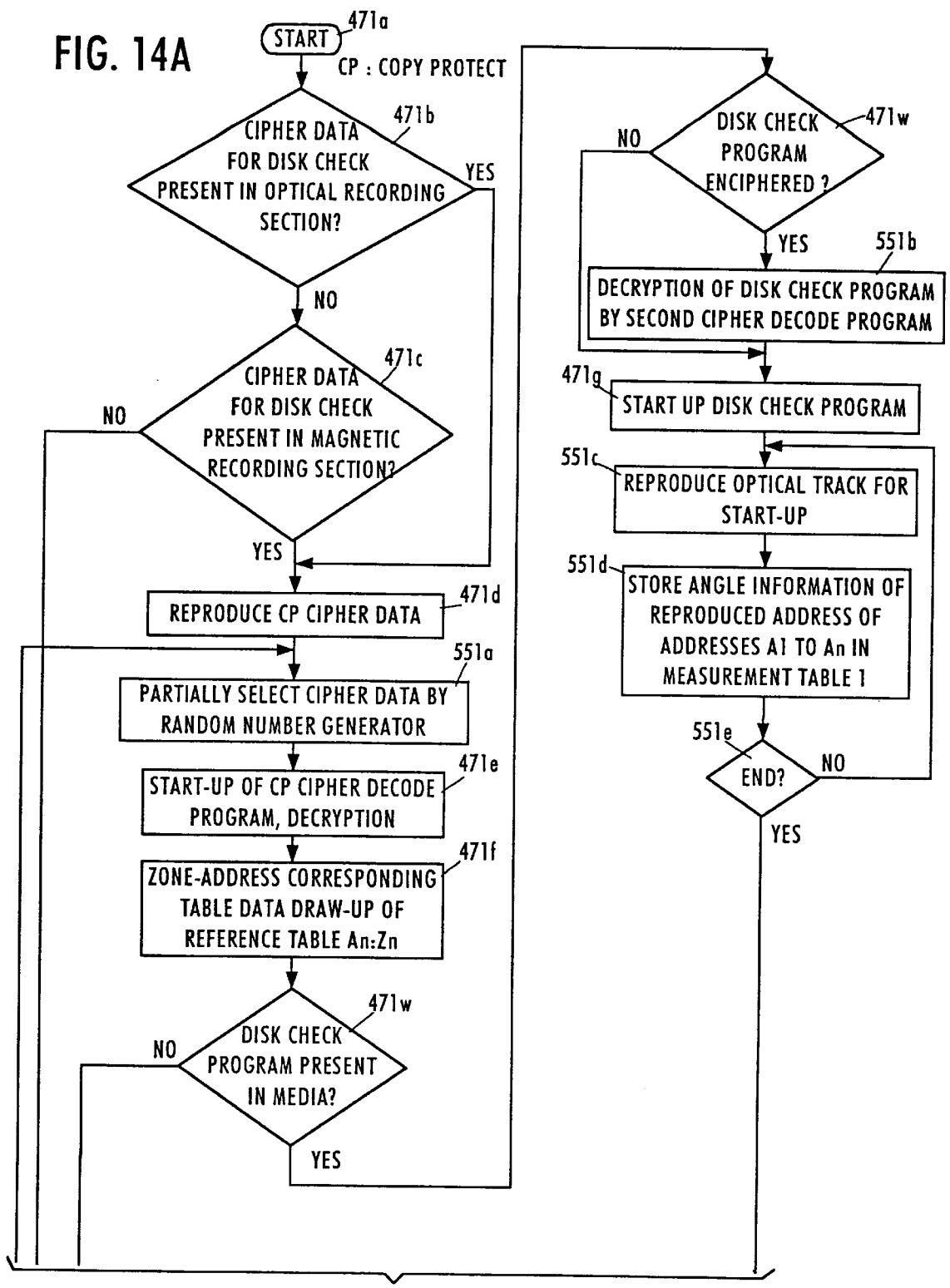
Figure 14B:
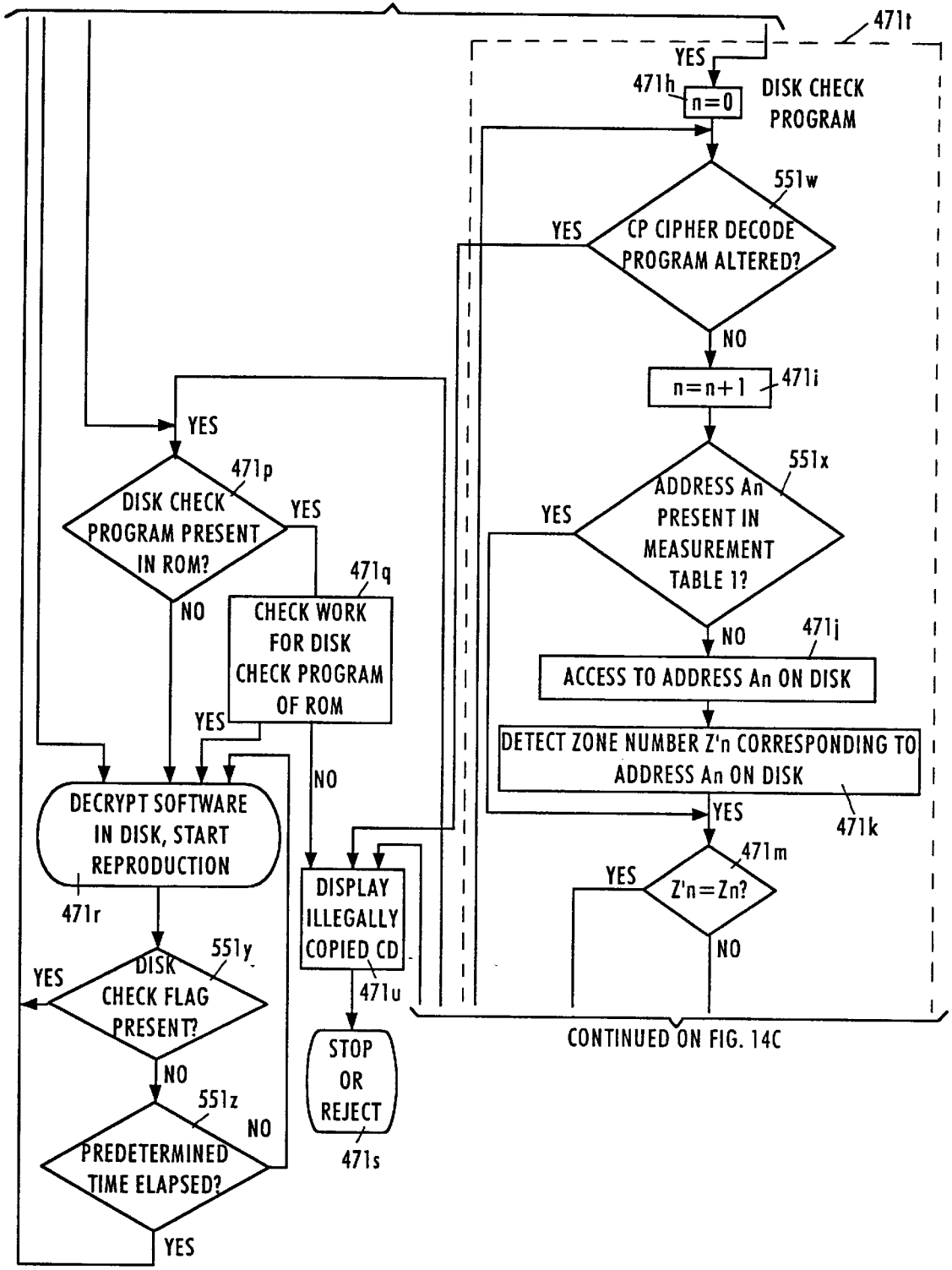
Figure 14C:
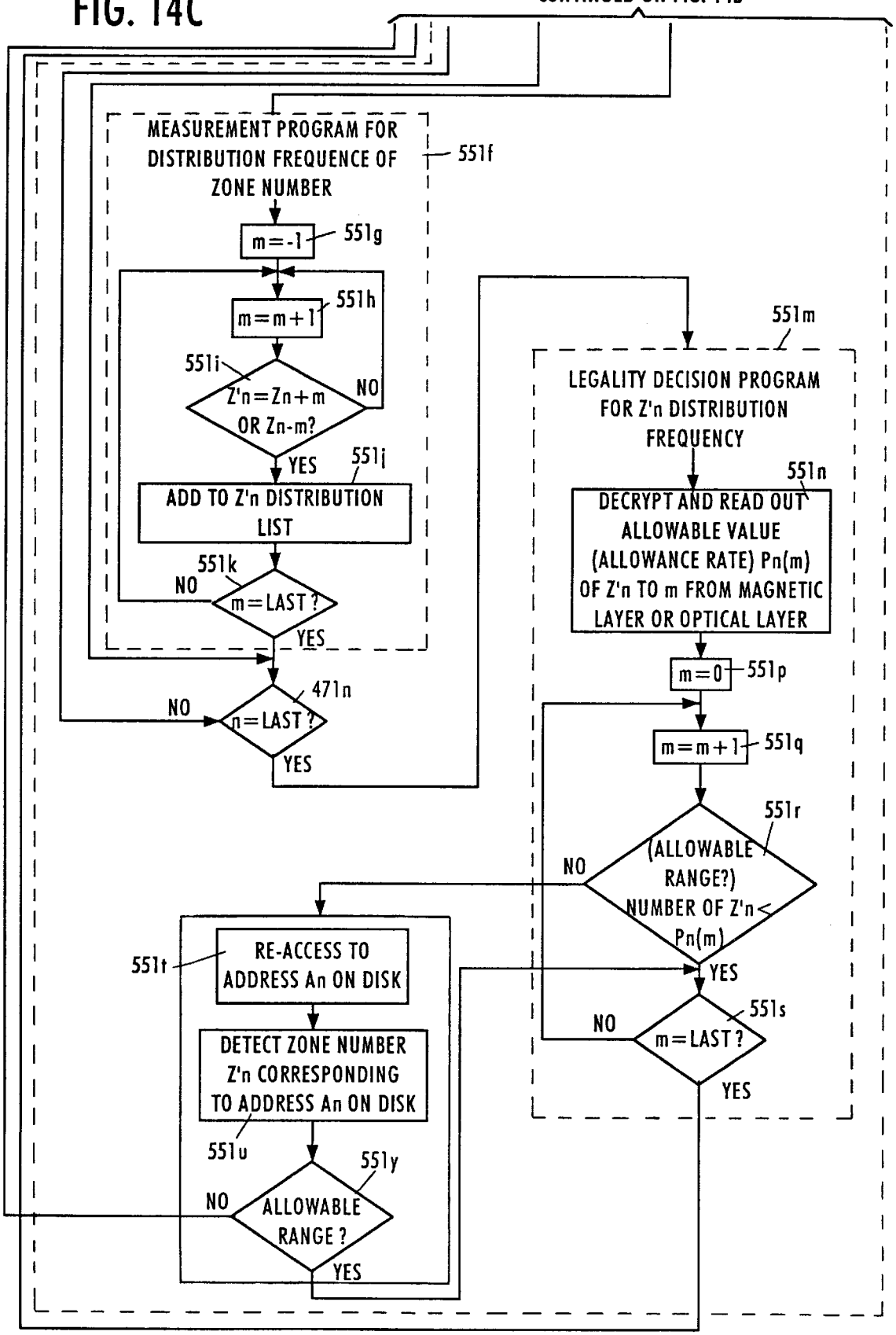

In addition, in the FIG. 14 flow chart, in a step 551a a random extractor 582 including a random number generator 583 as shown in FIG. 16 supplies a partially selective signal to the cipher decoder 534 or the magnetic reproducing circuit 30 to select a portion of all the magnetic tracks or optical tracks, which contain a cipher, for the access and reproduction. Accordingly, since the access is made only to a portion of all the data, for example, about 100 of 10000, the mechanical access time becomes shorter to cause the time necessary for checking the duplication to become shorter. Furthermore, the random extractor 582 issues a selective signal the cipher decoder 534 to carry out the decryption of a portion of the cipher data reproduced. For instance, in the case of a cipher based on a one direction function of 512 bits, the decryption takes a 32-bit microcomputer approximately ⅕ second. However, the employment of this partial selective method can reduce the time for the decryption. Since the random number generator 584 checks a minimum of necessary sampled data which is different every time, even if using a system which checks only 100 of 10000 sampling points every time, the 10000 sampling points are finally checked. Accordingly, the duplication traders are required to duplicate the disk such that the physical arrangement of all the 10000 sampling points are the same as the reference disk. It is difficult to duplicate the angles, tracking amounts and pit depths at all the sampling points, which improves the duplication prevention effect. The addition of this random extractor 582 is able to considerably reduce the disk check time without deteriorating the high duplication prevention effect.

[Third Embodiment]

A description will be made hereinbelow with reference to FIGS. 13 and 16 in terms of a third embodiment which uses the tracking displacement and the pit depth as the first physical feature information. In FIG. 16, in the disk physical arrangement detecting section of the recording and reproducing system 1, in addition to the aforementioned angular position detecting section 553, there is provided two detecting sections: a tracking amount detecting section 554 and a pit depth detecting section 555. The tracking amount detecting section 554 receives a tracking amount Tn at the address n from a tracking amount sensor 24a such as a tracking error detecting circuit which can measure the wobbling of the tracking control section 24 of the optical head 6, and measures the coincidence in time between the tracking amount and the other detection signals such as A'n, Z'n, D'n to output the result as T'n to the checking section 535. This principle will be described with reference to FIGS. 20A and 20B. In the legal disk shown in FIG. 20A, the physical position 539a of the address A1 is modulated in the tracking direction during the formation of the original record (for example, wobbling). Thus, the tracking is shifted toward an outer circumferential portion. When this is defined as T1=+1, the physical position 539b of the address A2 is taken as T2=−1. This information is discriminable during the formation of the original record or after the fabrication thereof, and therefore, after the reference physical arrangement table 532 is drawn up and encrypted, it is recorded on the medium 2.

Secondly, in the medium 2 illegally duplicated as shown in FIG. 20B, generally the tracking displacement is not given. Even if the tracking displacement is given, as shown in the illustration, the tracking displacements T'1 and T'2 of the addresses A1 and A2 in the same angular zone Z1 give 01+1, and the disk physical arrangement table 556 measured is different from the reference physical arrangement table 532 of the legal disk. Accordingly, the checking section 535 of the disk check section 533 in FIG. 16 detects this and the output/operation stopping means 536 stops the output of the program, the operation of the program, or the decryption of the application program by the second cipher decoder 534b and outputs a display signal indicative of "illegally copied disk" to the display section 16. In the case of FIG. 16, since the disk check program itself is encrypted by the second cipher decoder 534b, difficulty is encountered to revise the disk check program 533, thus increasing illegal duplication preventing effect.

Figure 36:
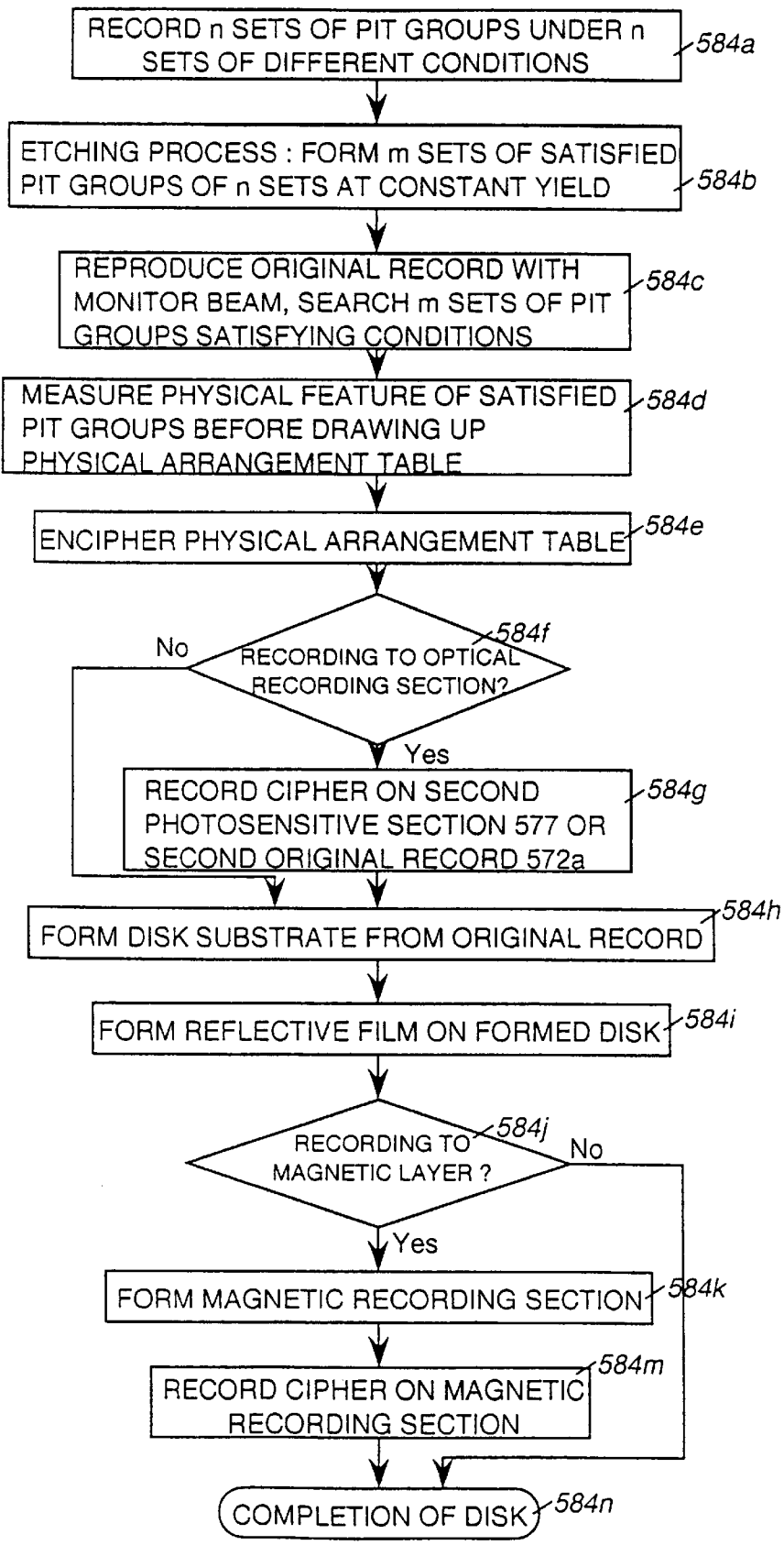
FIG. 36 is a flow chart showing a process for fabricating an original record and for manufacturing a recording medium in the third embodiment.

Furthermore, a description will be made about the pit depth detecting section. As shown in FIG. 16, the optically reproduced signal from the optical head 6 is fed to an amplitude detecting section 555a of a pit depth detecting section 555, which is designed to detect the amplitude of the envelop or the variation of the modulation factor, so as to detect the pit depth on the basis of the amplitude variation, the detection output D'n being delivered to the checking section 535 to be checked with the data of the reference physical arrangement table 532. If different therefrom, the copy preventing operation starts. Thus, as shown in FIGS. 21A to 21D, the four parameters of the address An, angle Zn, tracking displacement Tn and pit depth Dn can be checked with respect to the physical arrangements 539a, 539b, 539c of one sampling point. Thus, it is needed to duplicate the original record which conforms with the four parameters at all the sampling points. It is difficult to duplicate the original record satisfying such conditions at a high yield, which results in realizing a great copy preventing function. In particular, duplicating a pit group whose widths are different and whose depths are the same is extremely difficult and deteriorates the yield. Accordingly, the duplication is economically impossible. In this invention, as shown in FIG. 36, when in a step 584a 1000 sets of pit groups are recorded under 1000 recording conditions different in recording output, pulse width and so on, in a step 584b the pit groups satisfying 5 sets of conditions are made at a given yield, for example, at 1/200 yield. In a step 564a the physical arrangements of the pit groups satisfying the conditions are found by the monitor of the original record by a leaser beam. In a step 584d the physical arrangement table for the satisfying pit groups is drawn up, and in a step 584e the physical arrangement table is encrypted, and further, if a step 584f shows the optical recording section, in a step 584g the obtained cipher is recorded on a second photosensitive section 572a of the original record. In a step 584h a plastic is injected to the original record to produce an optical disk. In a step 584i a reflection layer is formed, in a step 584j a magnetic layer is completed, if already completed, in a step 584k a magnetic recording section is made, and in a step 584m the cipher is recorded in the magnetic recording section to complete an optical disk. The pit depth is measured after the fabrication of the original record, the encryption is made and the arrangement table is recorded, thereby increasing the yield up to approximately 100% at the time of the production of the original record.

Figure 17:
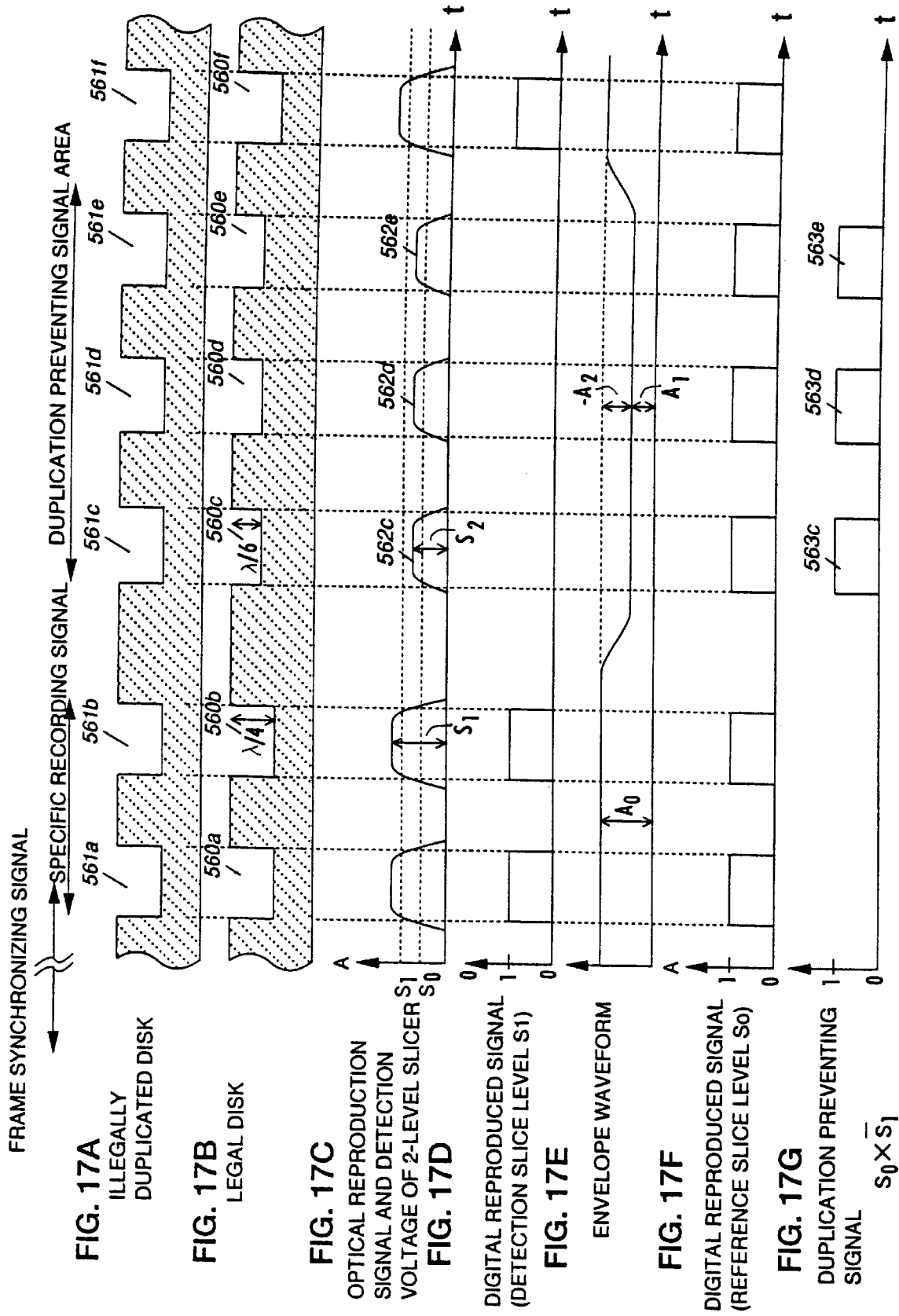
FIG. 17A is a cross-sectional view showing an illegal disk in a third embodiment.
FIG. 17B is a cross-sectional view showing a legal disk in the third embodiment.
FIG. 17C is an illustration of a waveform of an optical regenerative signal in the third embodiment.
FIG. 17D is an illustration of a digital signal in the third embodiment.
FIG. 17E is an illustration of an envelope waveform in the third embodiment.
FIG. 17F is an illustration of a digital waveform in the third embodiment.
FIG. 17G is an illustration of a waveform of a detection signal in the third embodiment.

A description will be made in terms of a detecting method of the pit depth in the pit depth detecting section 555. In FIG. 17A, pits 561a to 561f of an illegally duplicated disk have the same pit depth. Of pits of the legal disk shown in FIG. 17B, the pits 560c, 560d, 560e are shallower. Accordingly, as shown in FIG. 17C reproduced pulses 562c, 562d, 562e have a lower peak value, and the reproduced output becomes as shown in FIG. 17F when a multi-level slicer 555b assumes the reference slice level S0, while the output disappears as shown in FIG. 17D at the detection slice level S1. Accordingly, taking the logical product (AND) of the inverse value of S1 and S0, the duplication preventing signals 563c, 563d, 563e are obtainable as shown in FIG. 17G only when the disk is a legal disk. In the illegal disk, since the output at the detection slice level S1 successively becomes 1, the outputs of the duplication preventing signals do not appear. For this reason, the detection of the duplicated disk is possible. In addition, in this case, even if the amplitude detecting section 555a detects the amplitude lowering of the envelope of the optical output waveform or the lowing of the modulation factor and the inverse sign of S1 is obtained, a similar effect is available.

As obvious from a FIG. 23 comparison table on the duplication preventing effects, since an original record fabricating apparatus for common CDs or MDs does not have an angle control function, the angular direction disk check, i.e., A, is effective. On the other hand, since an original record fabricating apparatus for laser disks (LDs), MDs and CD-ROMs is not equipped with a wobbling, i.e., tracking direction, control means, the tracking direction displacement, i.e., B, is effective. In the case of the depth direction, i.e., C, in addition to the conventional circuit, a detection circuit is required which can detects the amplitude or modulation factor, and hence the detection is impossible with the existing IC for CDs. Accordingly, since at present A+B provides a great copy preventing effect and has compatibility with the existing IC, the greatest effect is obtainable for CDs and MDs. Consequently, the current original record fabricating apparatus can offer the greatest effect when employing the checking method based on A+B, i.e., the combination of two parameters: angular direction and tracking direction.

Figure 24:
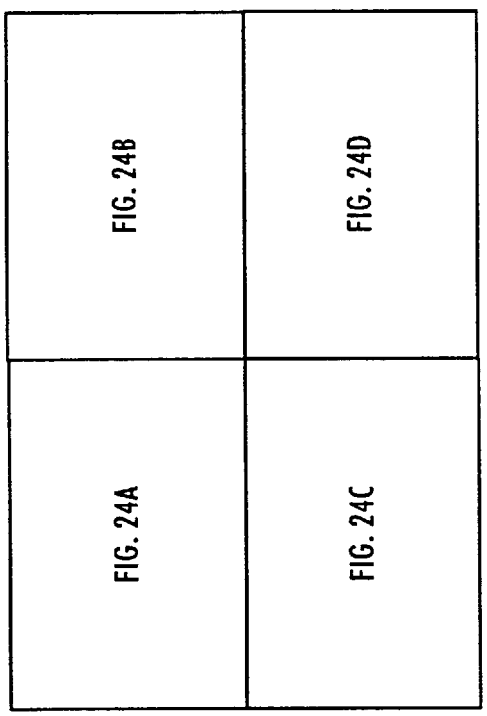
FIG. 24 is a block diagram showing an original record fabricating apparatus in the second and third embodiments.
Figure 24A:
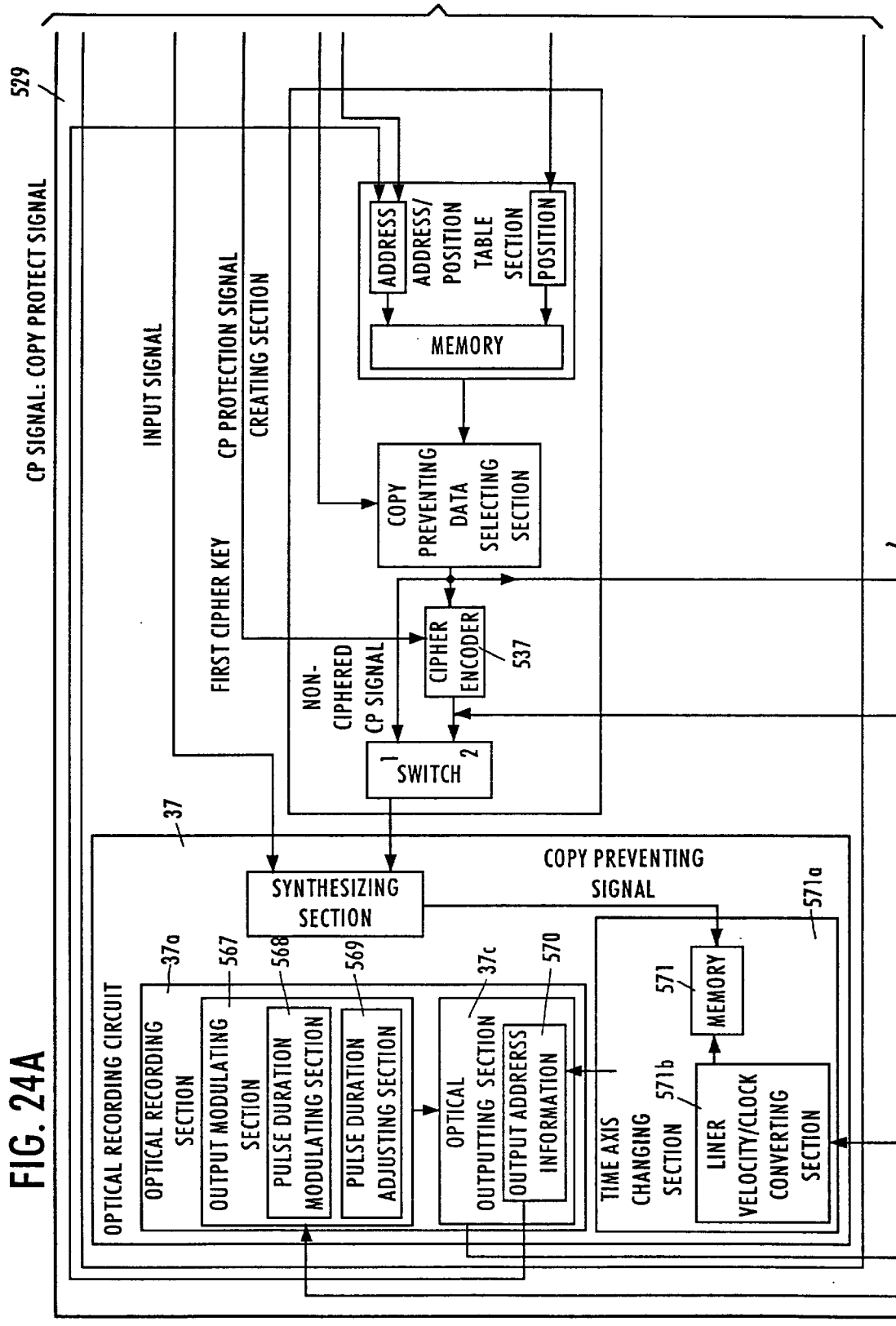
Figure 24B:
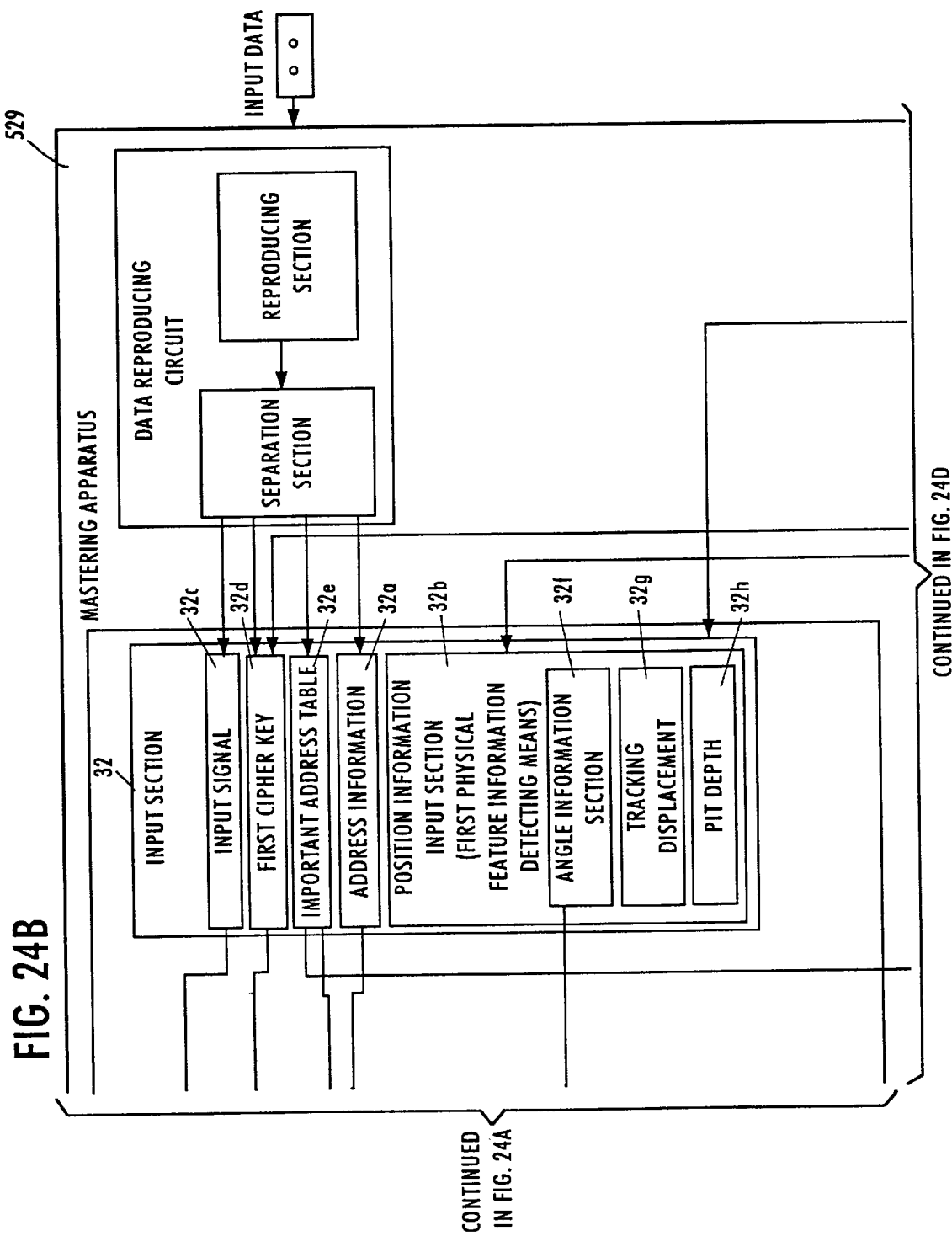
Figure 24C:
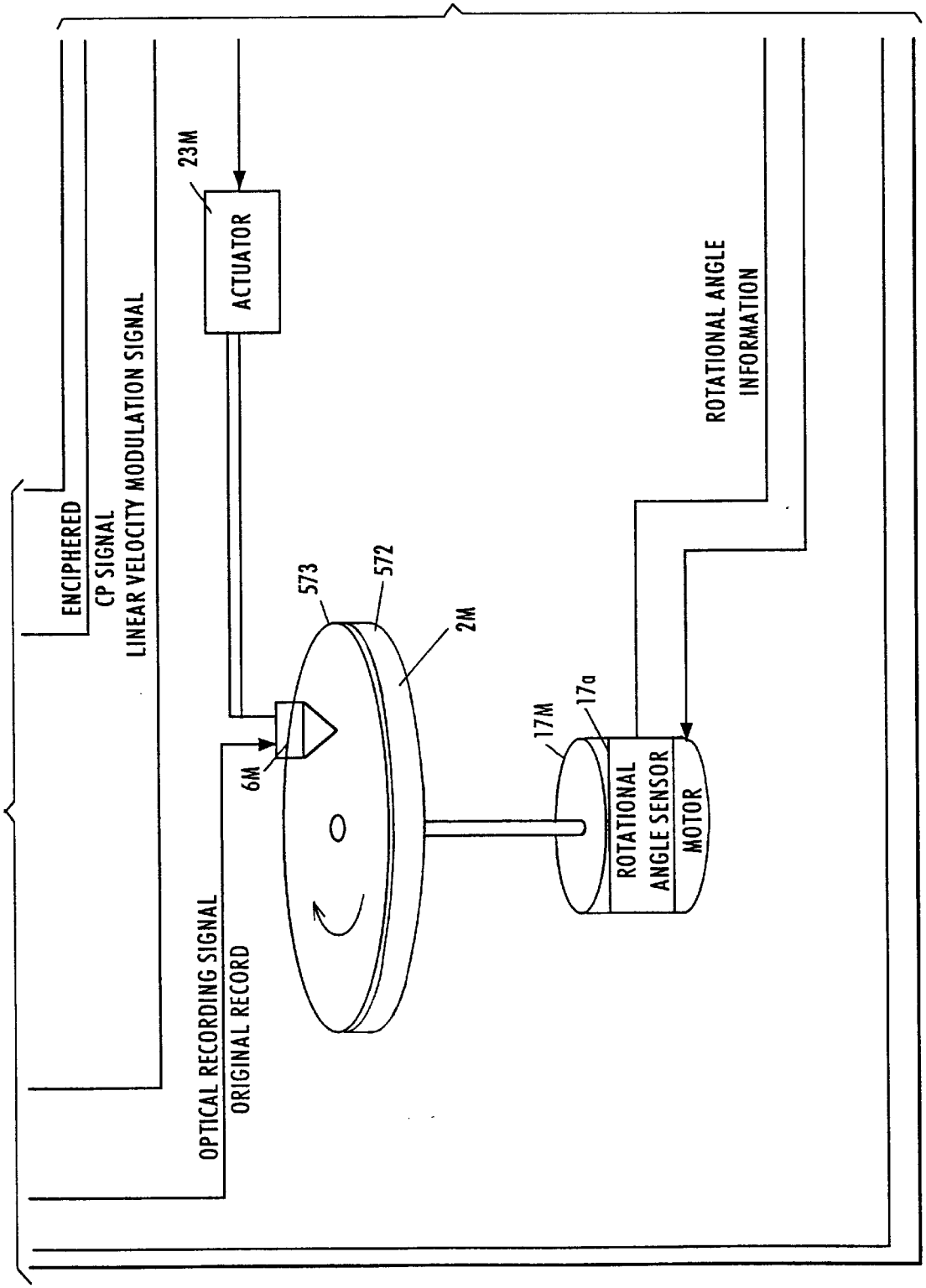
Figure 25:
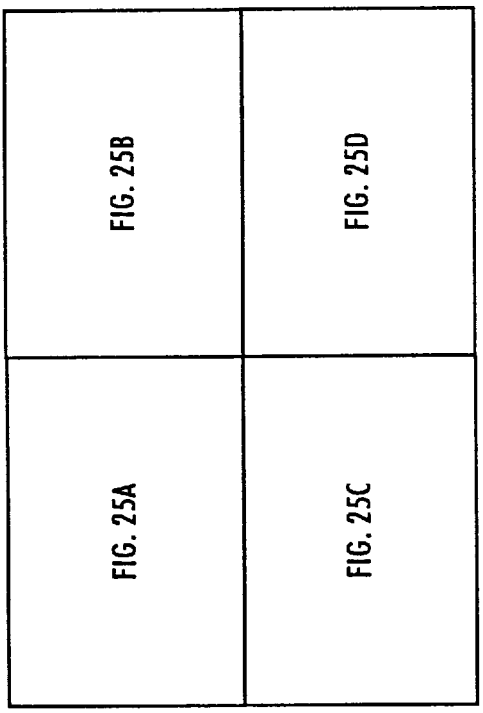
FIG. 25 is a block diagram showing an original record fabricating apparatus in the second and third embodiments.
Figure 25A:
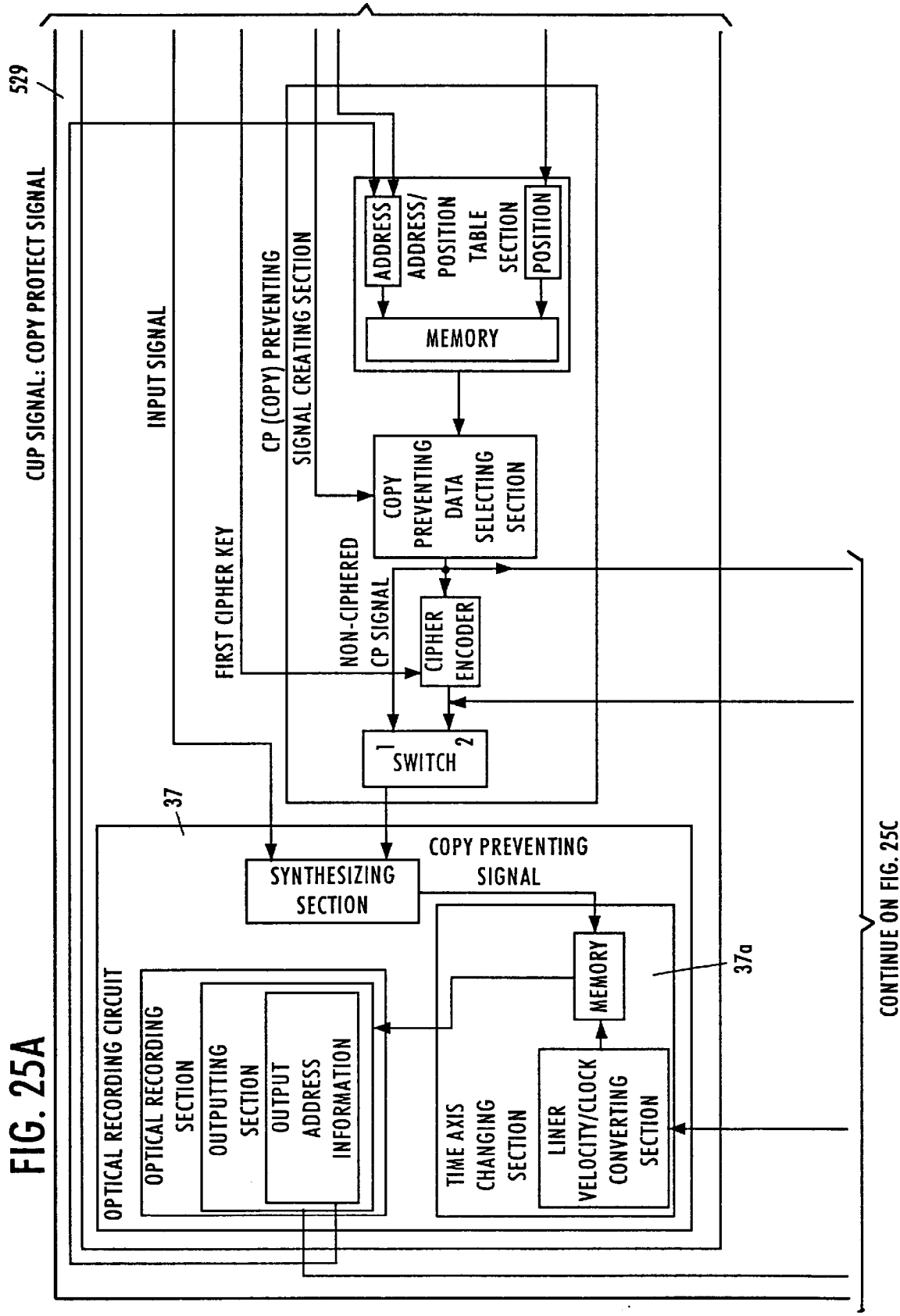
Figure 25B:
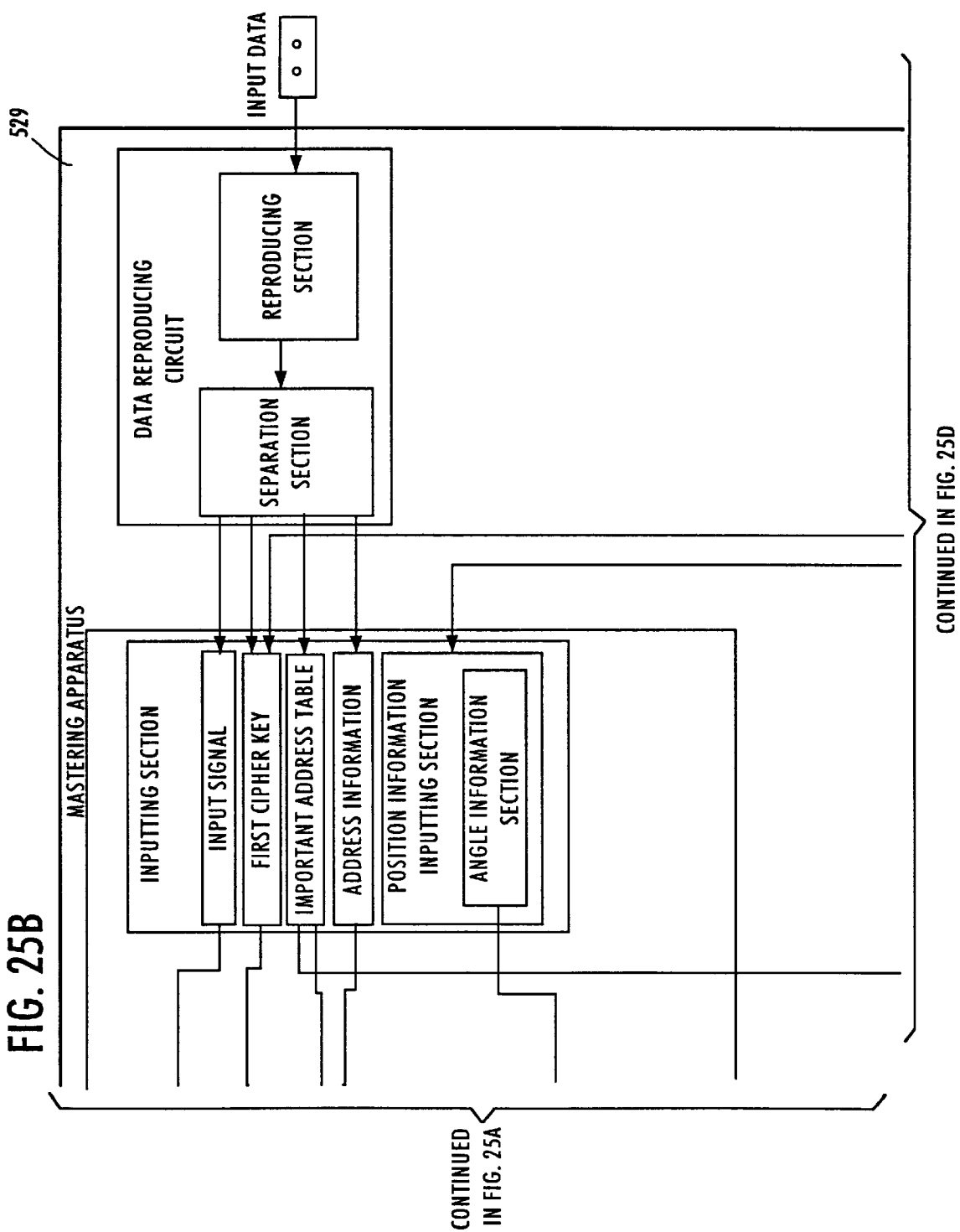
Figure 25C:
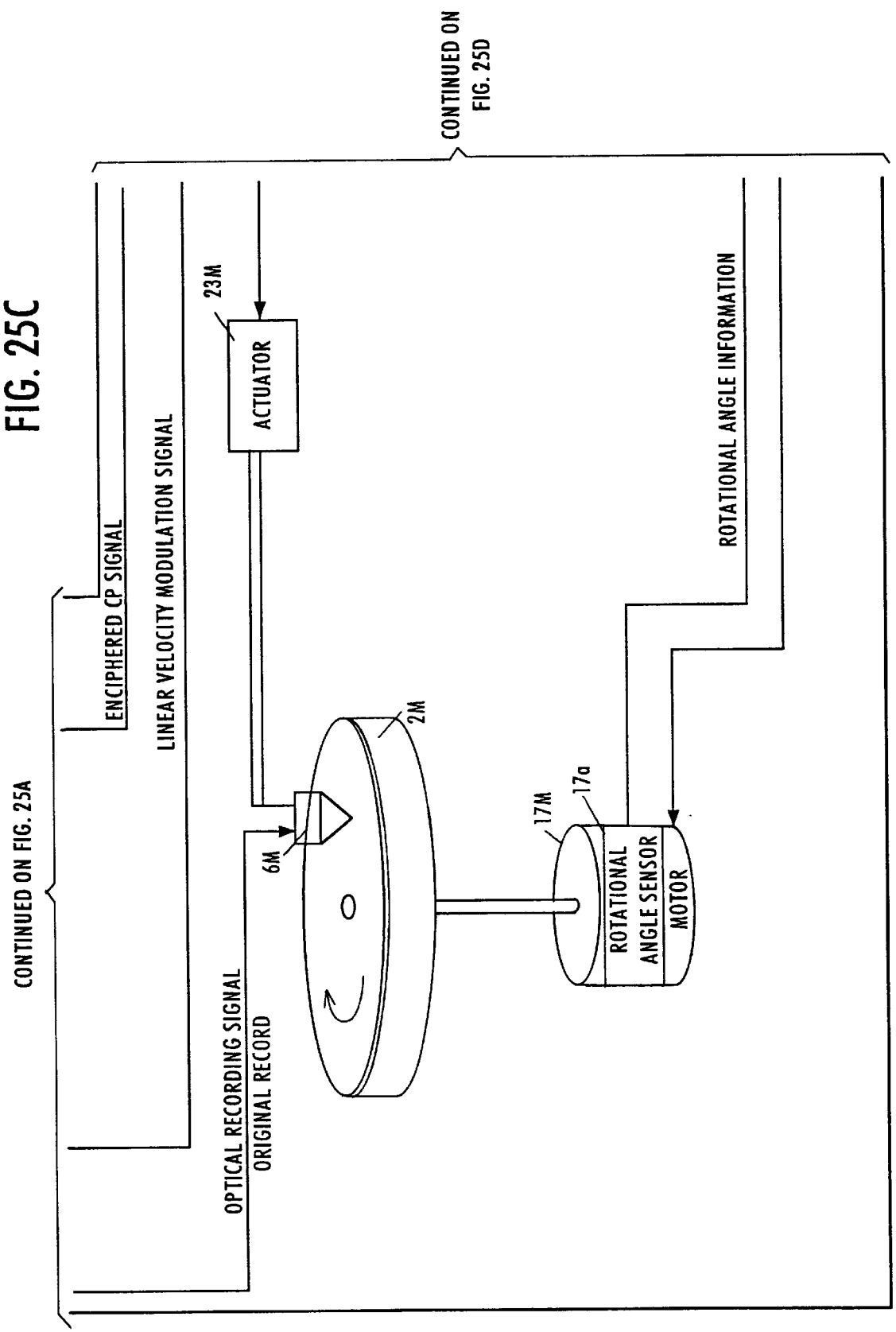
Figure 25D:
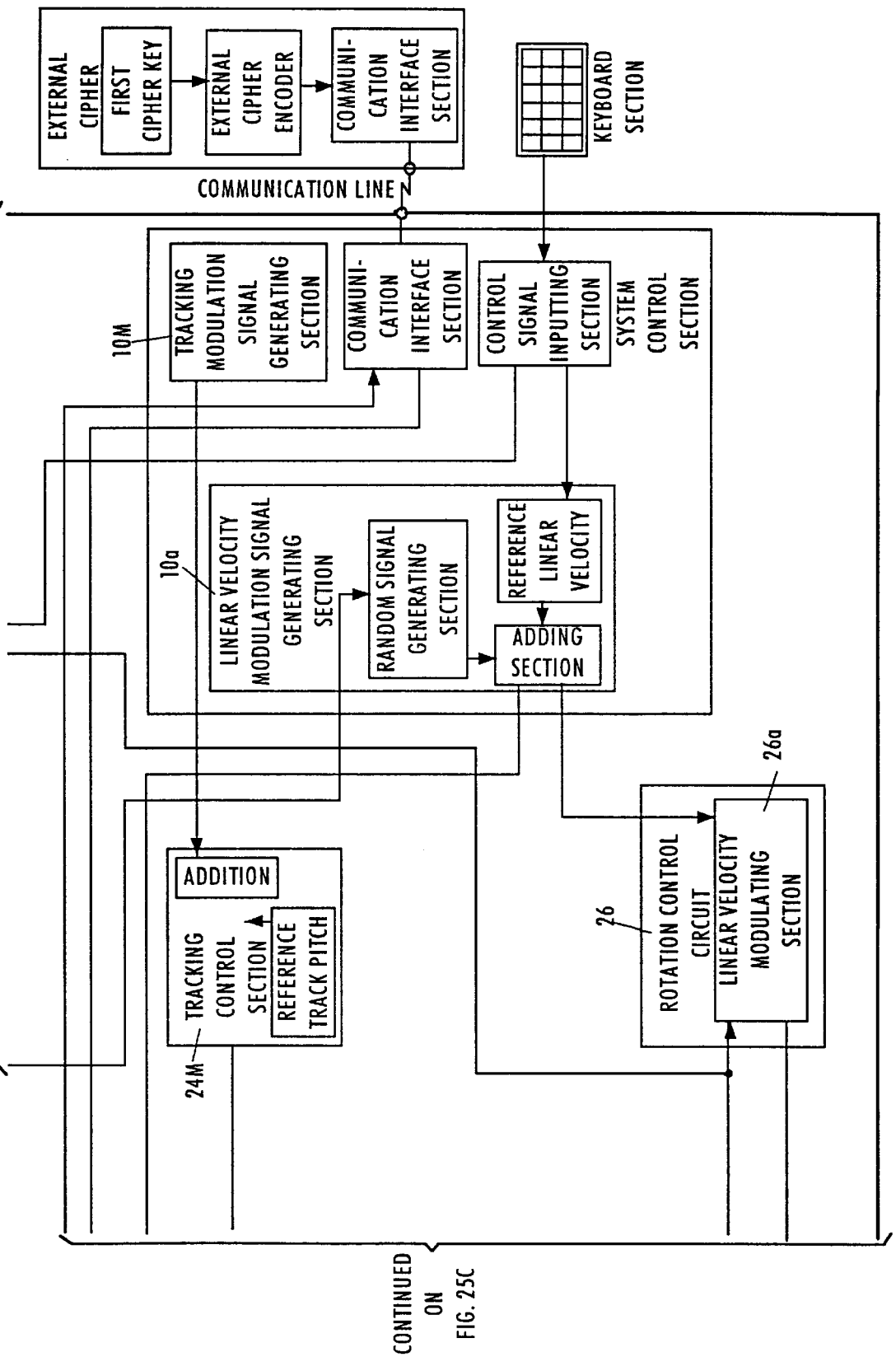
Figure 26:
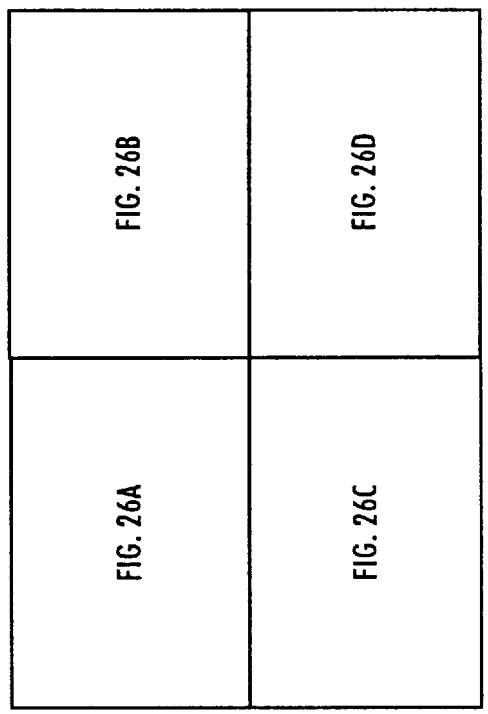
FIG. 26 is a block diagram showing an original record fabricating apparatus in the second and third embodiments.
Figure 26A:
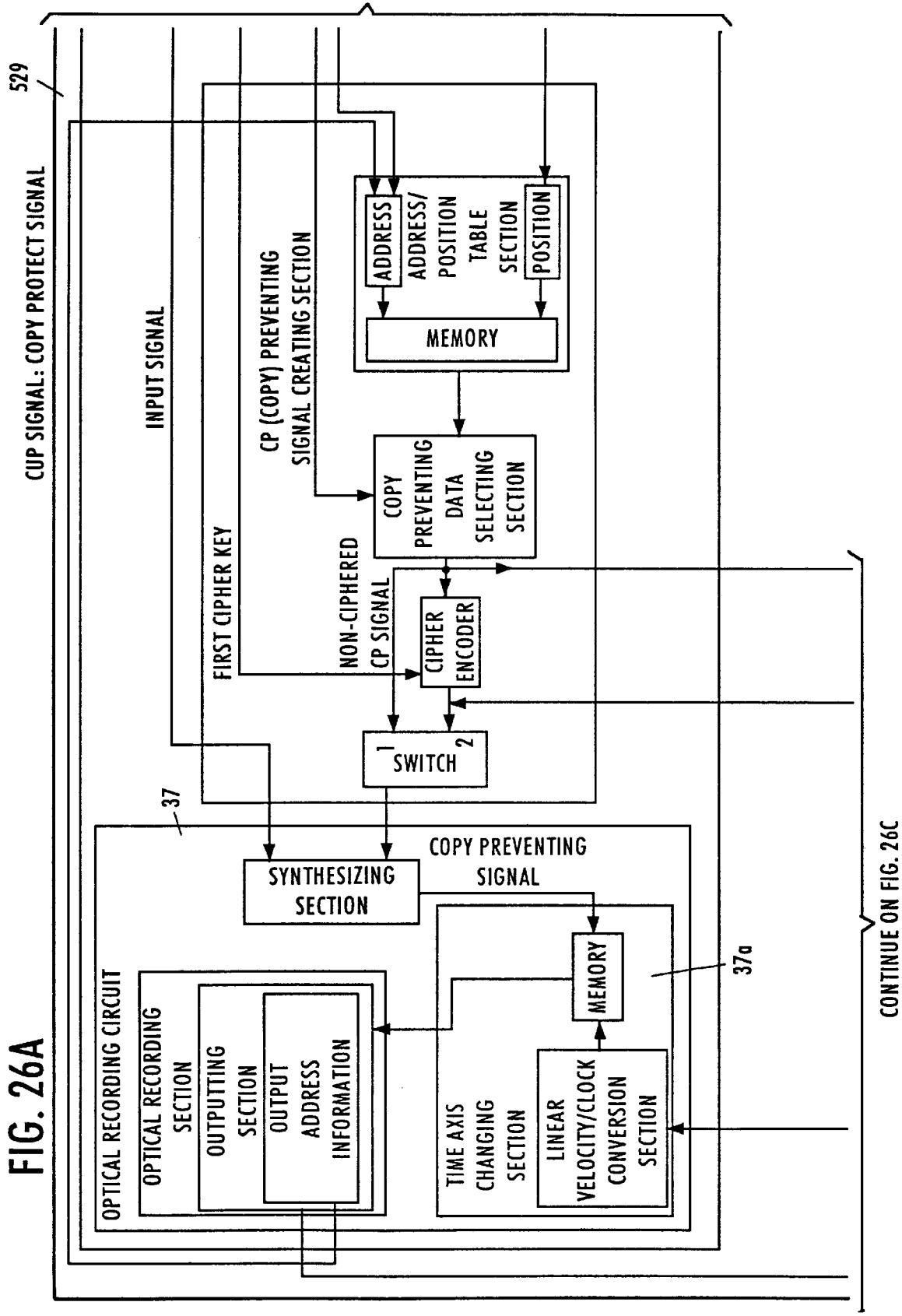
Figure 26B:
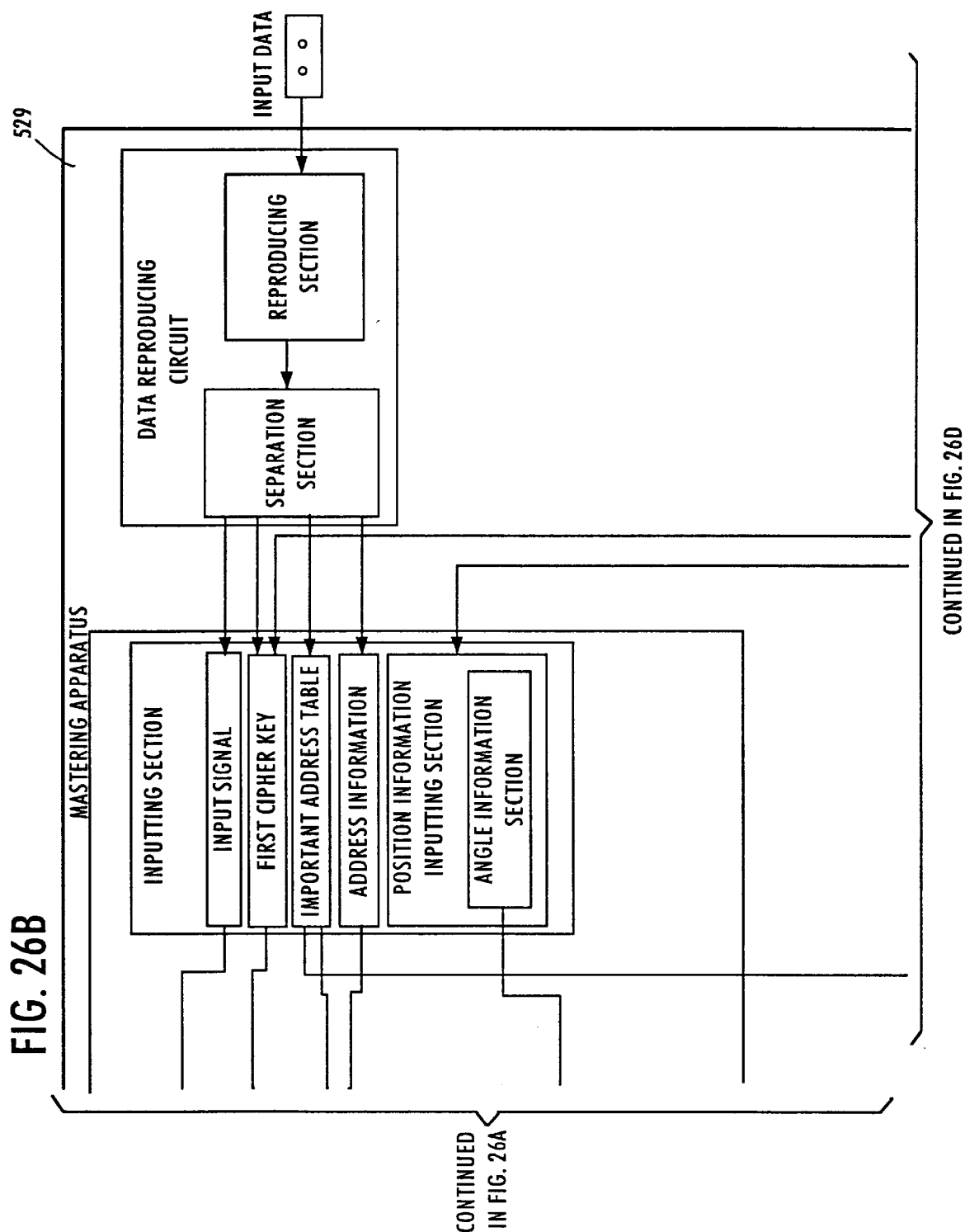
Figure 26D:
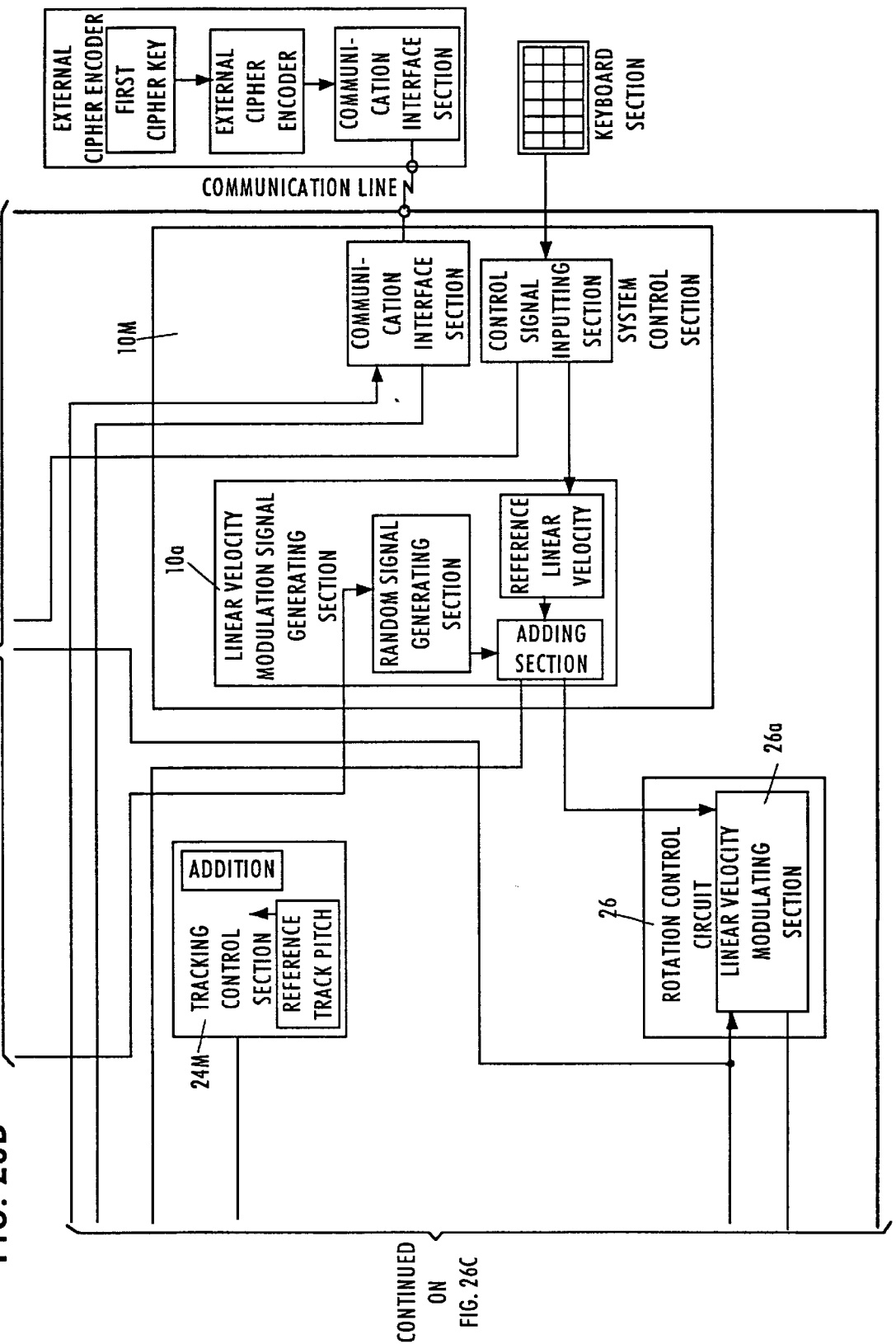
Figure 27:
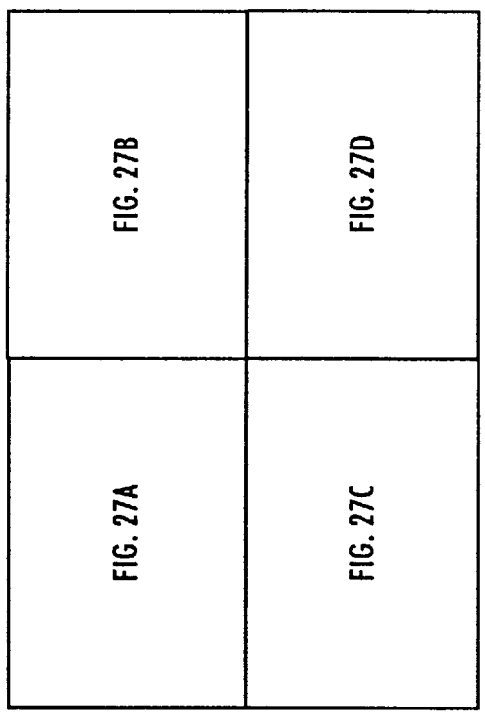
FIG. 27 is a block diagram showing an original record fabricating apparatus in the second and third embodiments.
Figure 27A:
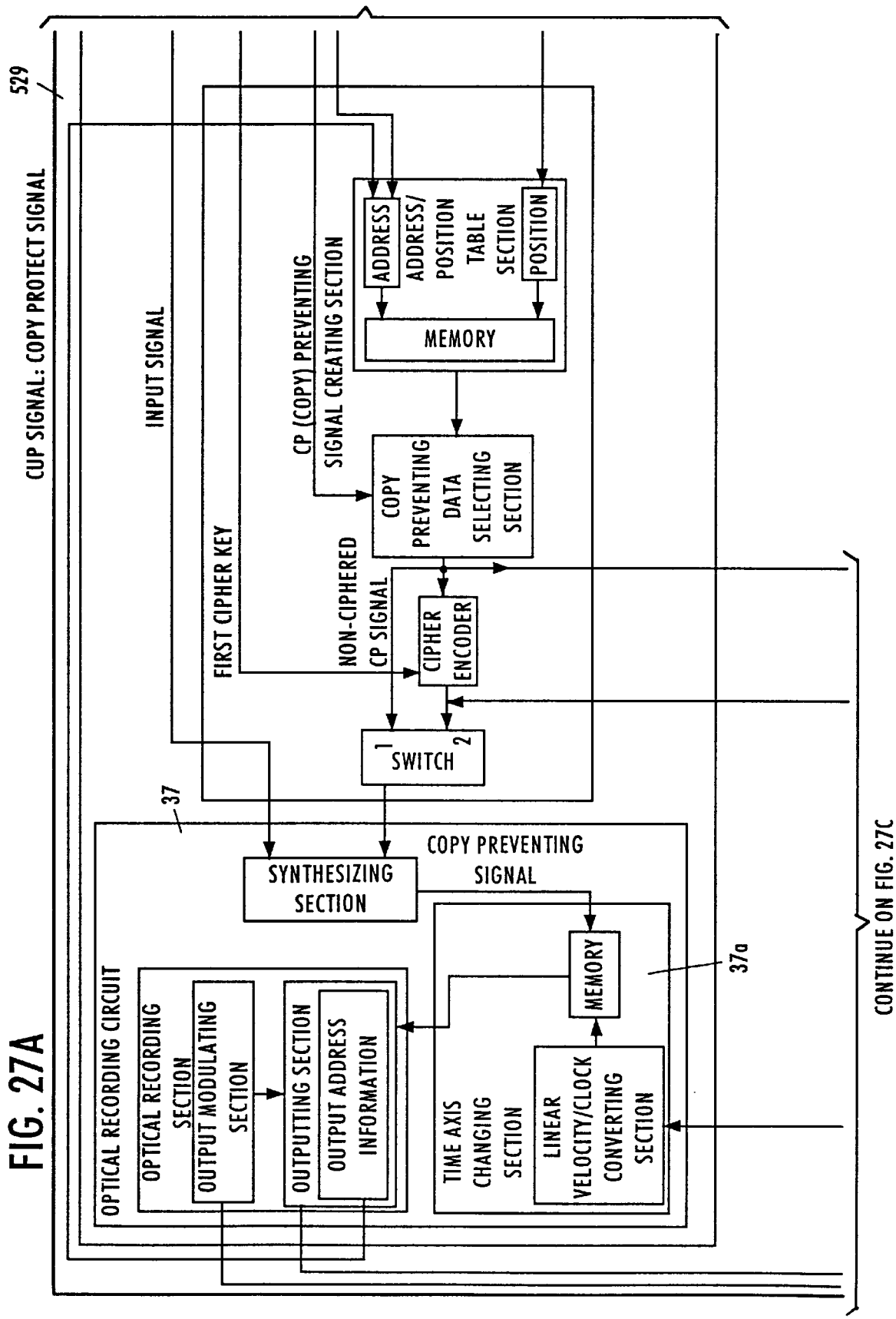
Figure 27B:
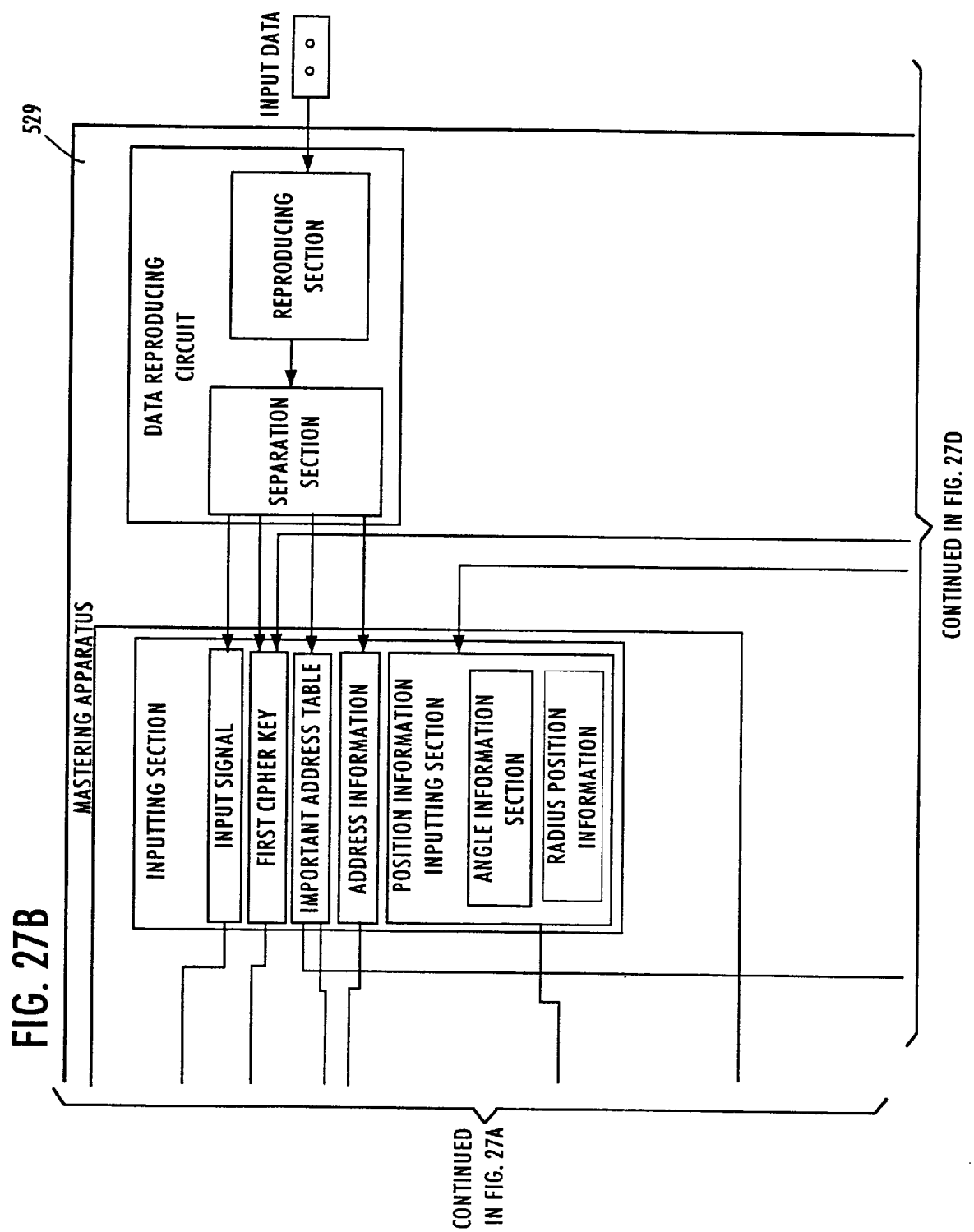
Figure 27C:
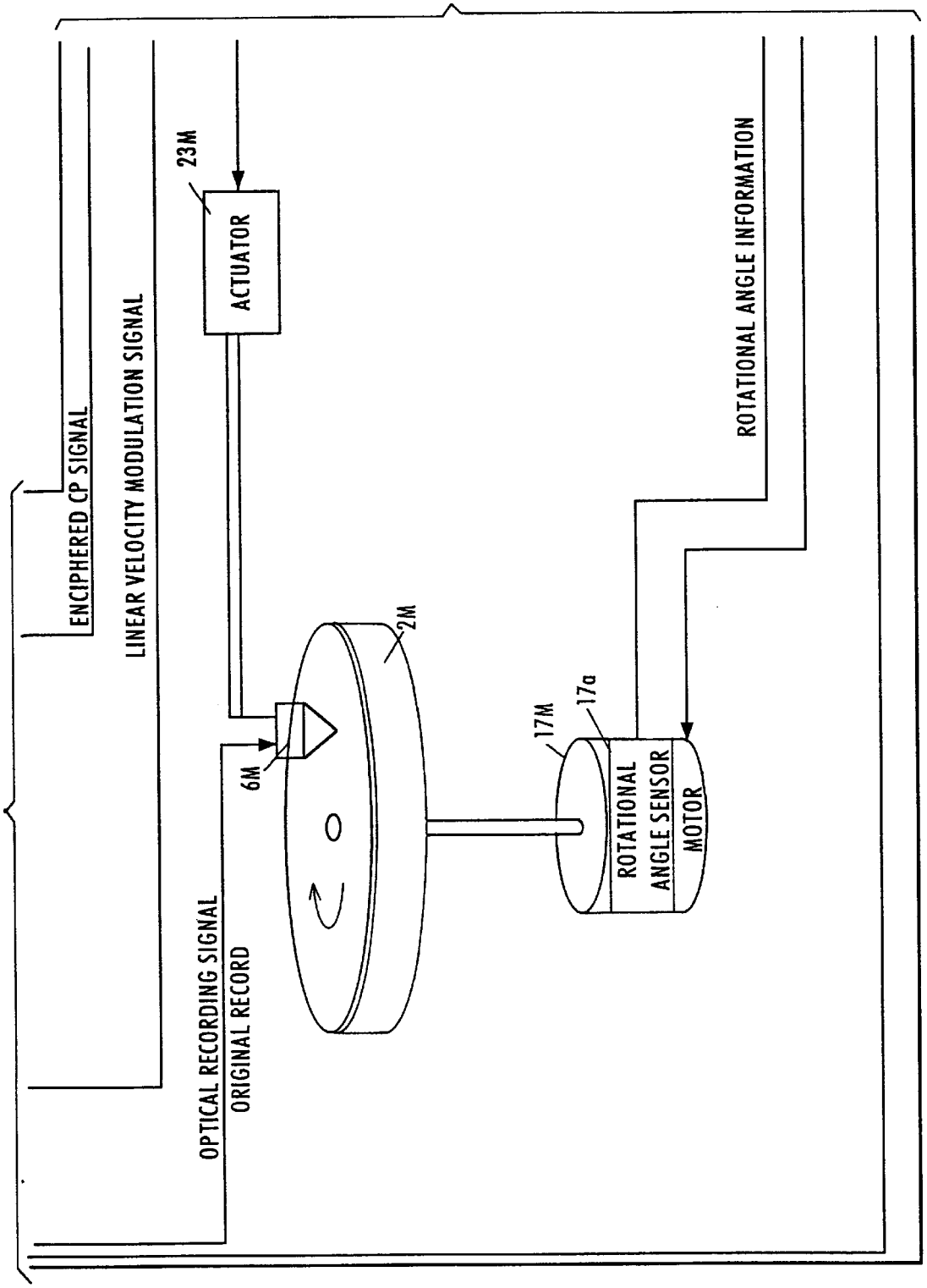
Figure 27D:
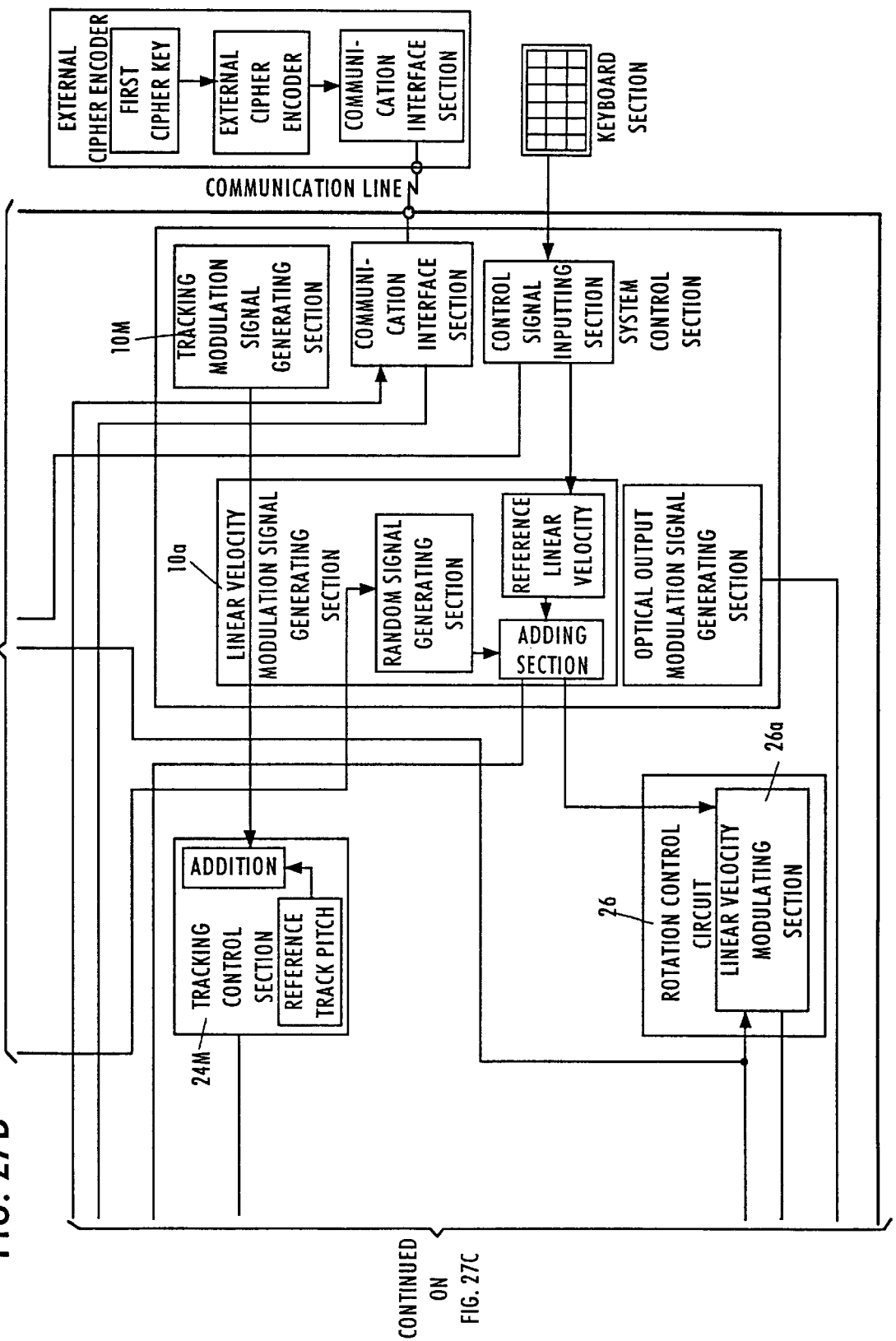
Figure 28:
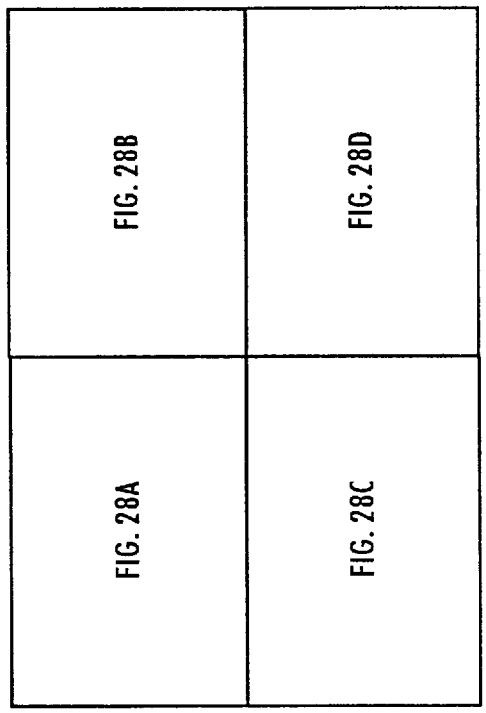
FIG. 28 is a block diagram showing an original record fabricating apparatus in the second and third embodiments.
Figure 28B:
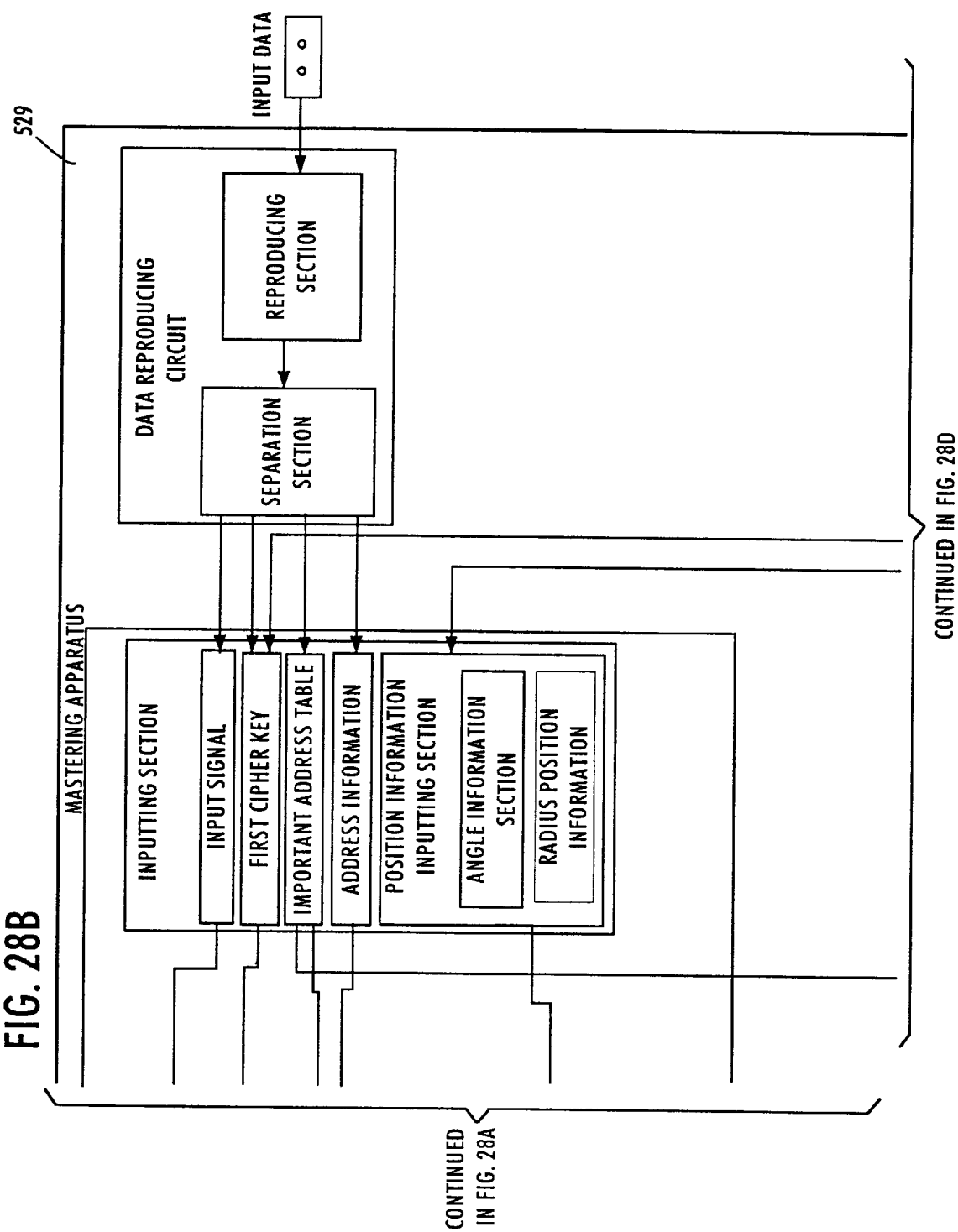
Figure 32:
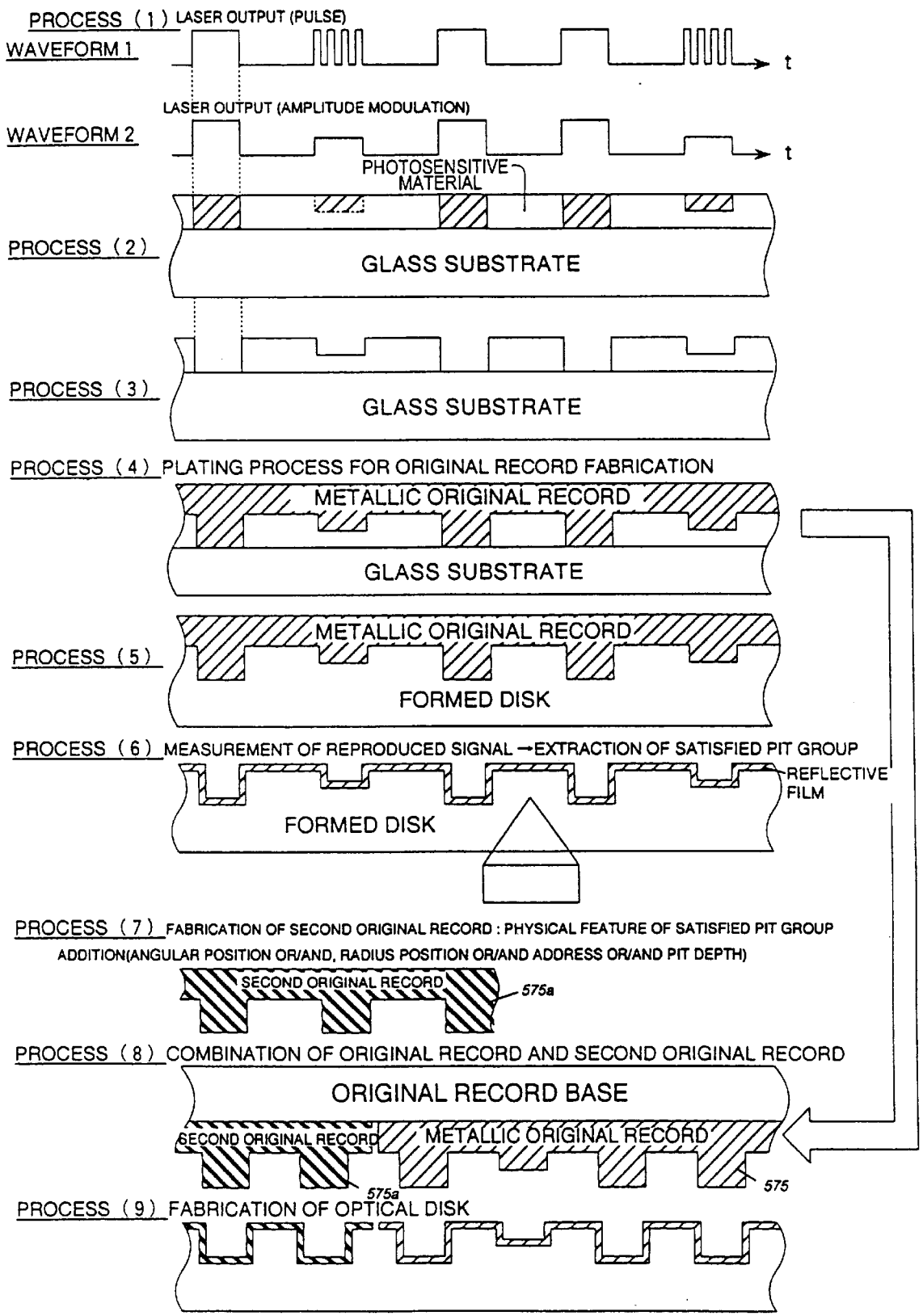
FIG. 32 is illustrative of a process for an original recording fabrication in the third embodiment.

FIG. 24 shows a disk original record fabricating apparatus which implements the modulation on the angular direction, tracking direction and pit depth direction. The FIG. 24 mastering apparatus 529 basically and substantially has the same arrangement and operation as the aforementioned FIG. 1 mastering apparatus, and the description thereof is limited to the portions differing therefrom. A description is first made in terms of the tracking modulation method. In the system control section, there is provided a tracking modulation signal generator 564 which supplies a modulation signal to a tracking control section 24 to perform the tracking at almost constant radius r0 on the basis of a reference track pitch 24a. The modulation such as wobbling is carried out within the range of the track radius r0±dr. Thus, a meanderring track is formed on the original record 572 as shown in FIGS. 20A and 20B. This tracking displacement is fed to a tracking displacement information section 32g of a positional information input section 32b. In the copy preventing signal generator 565, the reference physical arrangement table 532 on the address An, angle Zn, tracking displacement Tn and pit depth Dn as described with reference to FIG. 13 is drawn up and encrypted in the cipher encoder 537. This cipher is recorded in a second original record area 572a provided at an outer circumferential portion of the original record as shown in FIGS. 32 and 33 or recorded in a second original record area provided at an outer circumferential portion as shown in FIGS. 34 and 35. In addition, the modulation Dn in the pit depth direction can individually be added. In FIG. 24, the system control section 10 is equipped with an optical output modulation signal generating section 566 whereby the amplitude of the laser output of an output modulation section 567 in the optical recording section 37b varies as shown by the waveform (2) of FIG. 32, or a pulse width modulating section 568 modulates the pulse duration or pulse separation with a constant amplitude as shown in by the waveform (1) of FIG. 32, thereby changing the effective value of the laser output. With this, a photosensitive section 574 having depths can be formed in a photosensitive section 573 of the original record 572 as shown by the process (2) of FIG. 32. Through the etching process, pits 560a to 560e having different depths are formed as shown by the process (3) of FIG. 32, the deep pits 560a, 560c, 560d having depths close to $\lambda/4$ and the shallow pits 560b, 560e having depths close to $\lambda/6$. This original record 572 is metal-plated with nickel or the like so as to produce a metallic original record as shown by the process (4) of FIG. 32, and then plastic-formed to fabricate a formed disk 576 as shown by the processes (5) and (6) of FIG. 32. In the case where the pits are formed on the original record by changing the amplitude of the laser output, since the peak value of the reproduced output decreases as shown by the waveform (5) of FIG. 31, if it is sliced with a specific slice level by a level slicer, the pulse duration tends to be detected as a smaller duration as compared with the case that pit depth is large, thus making it difficult to provide a normal digital output. For this reason, a pulse width adjusting section 569 generates a wider pulse T+$\Delta$T as shown by the waveform (2) of FIG. 31 relative to the original signal of the synchronism T as shown by the waveform (1) of FIG. 31 so that the digital signal is corrected as shown by the waveform (6). In the case of no correction, a sliced digital output is obtained which has a duration smaller than that of the original signal as shown by the waveform (7) of FIG. 31, resulting in the output of an incorrect digital signal.

Figure 34:
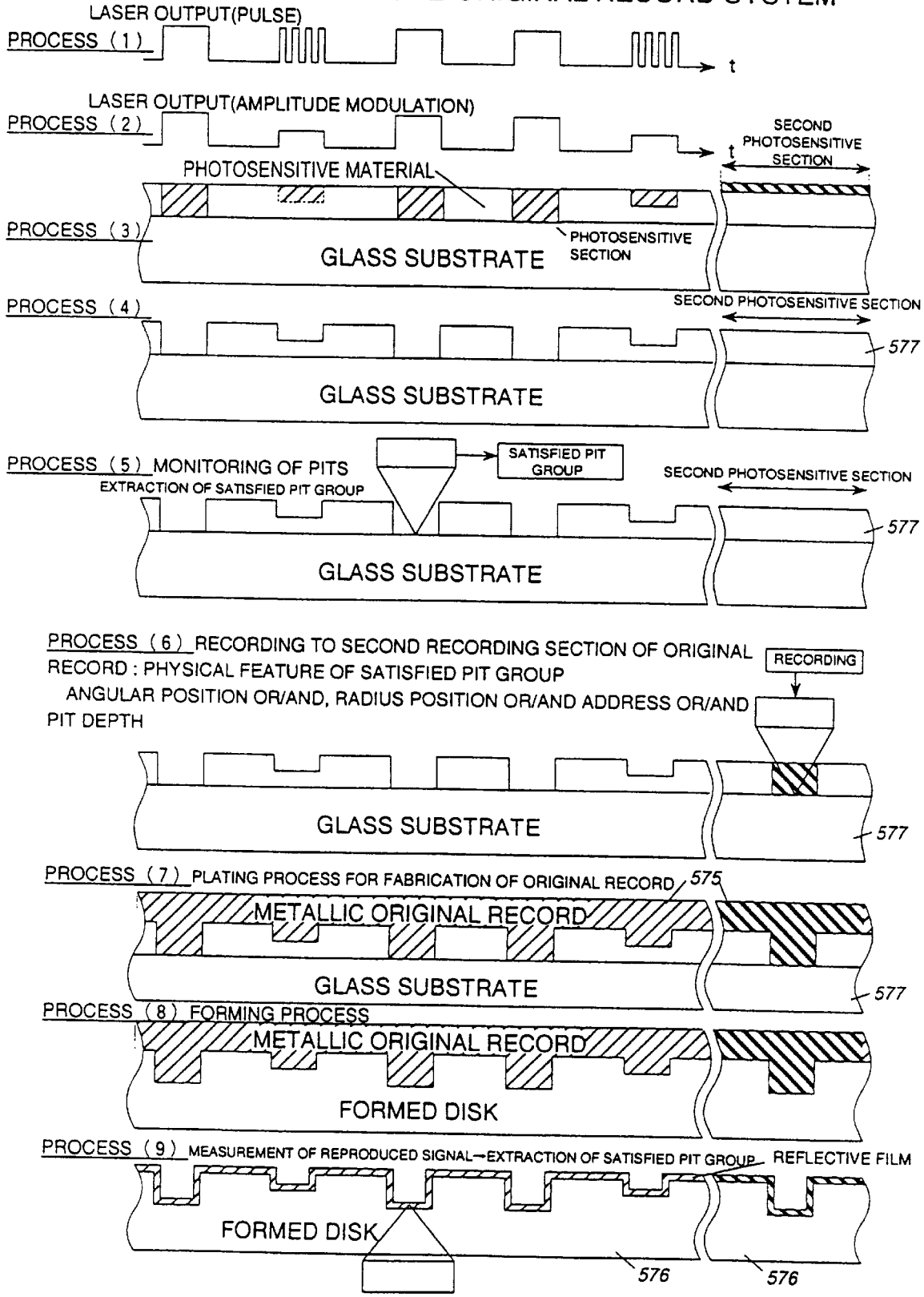
FIG. 34 illustrates a process for an original record fabrication in the third embodiment.
Figure 35A:
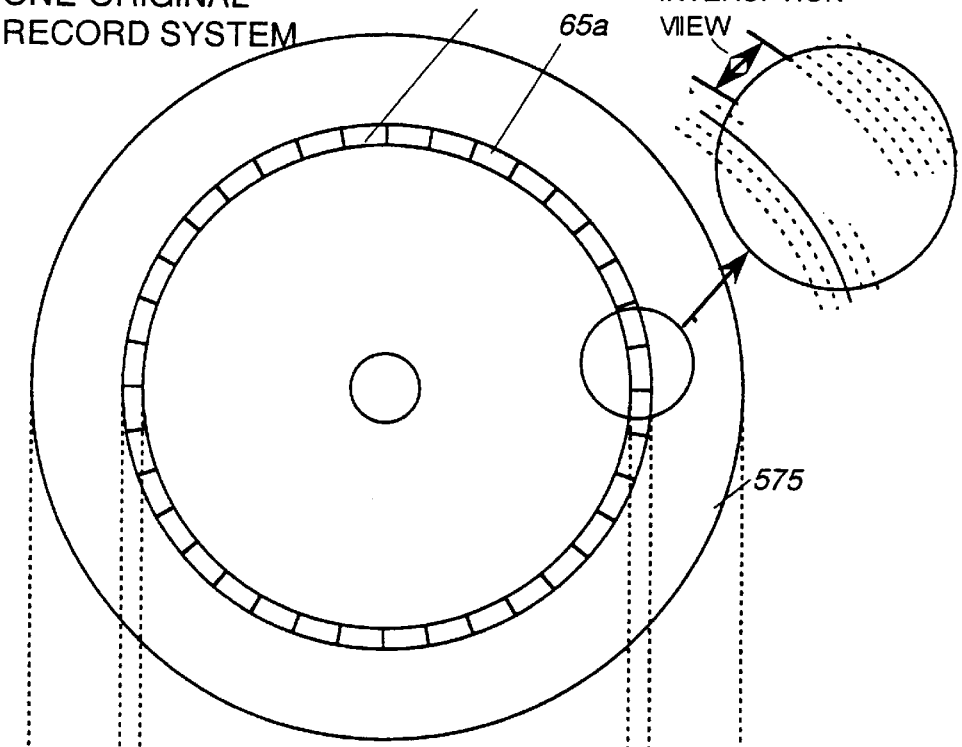
FIG. 35A is a top view showing a fabricated original record in the third embodiment.
Figure 35B:
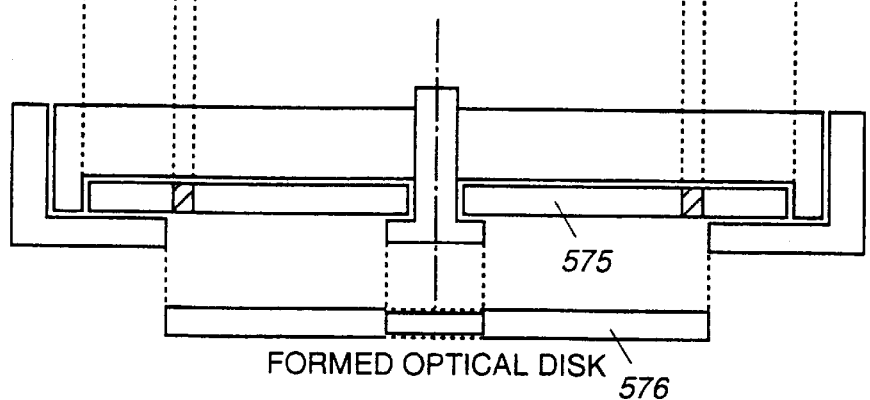
FIG. 35B is a transverse cross-sectional view showing an original record and press die in the third embodiment.

Thus, the pit depth is modulated through the optical output modulating section 567, and the pit depth information Dn is fed from the optical output modulation signal generating section 566 to a pit depth information section 32h. In the copy preventing signal generating section 565, the reference physical arrangement table 532 on the aforesaid An, Zn, Tn, Dn are drawn up and encrypted by the cipher encoder 537 and recorded on the magnetic recording layer. Or, as illustrated in FIG. 34, after the fabrication of an original record having at its outer circumferential portion a second photosensitive section 577, the pit depth and so on are measured as shown by the process (5) of FIG. 34 to a physical arrangement table which in turn, encrypted, before this cipher is recorded in the second photosensitive section 577 as shown in the process (6) of FIG. 34 and the physical arrangement table 532, together with program softs, is recorded on one original record as shown in the processes (7) to (9). In the case where disks do not have different ID numbers, the magnetic layer is not always needed, and only the optical recording section provides the copy preventing effect in accordance with this method. FIGS. 35A and 35B are a top view and cross-sectional view of an original record.

Figure 33A:
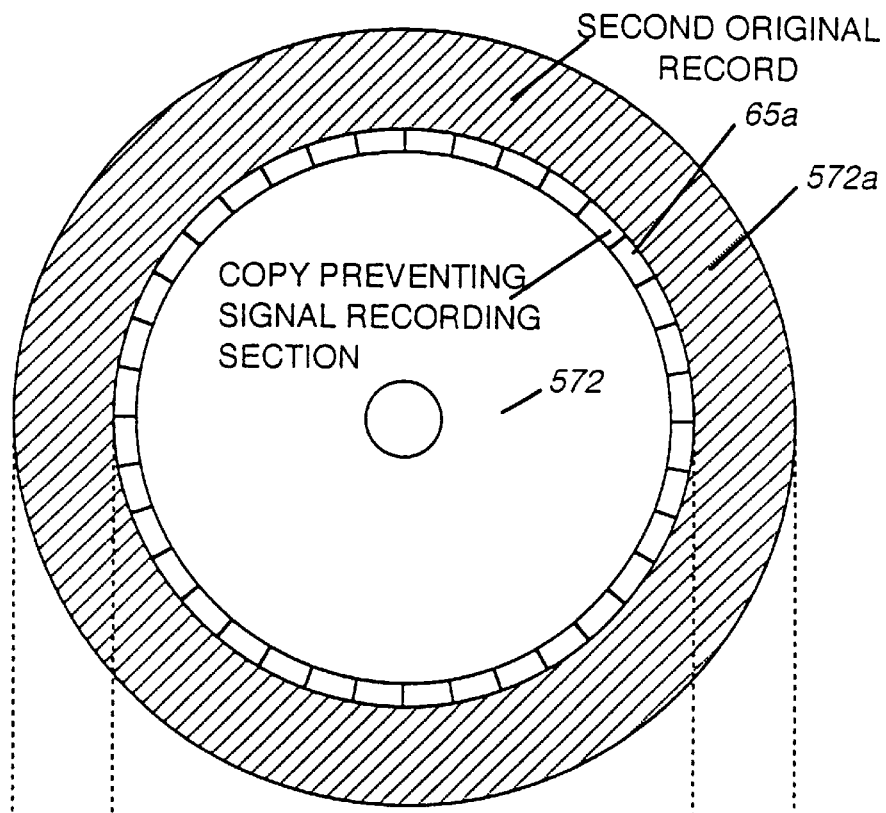
FIG. 33A is a top view showing a fabricated original record in the third embodiment.
Figure 33B:
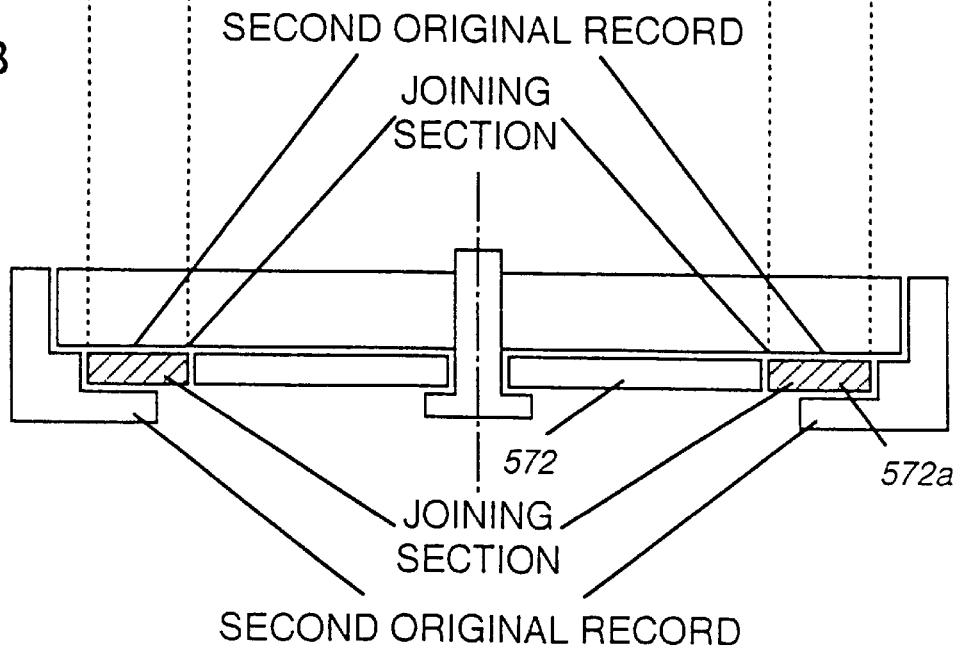
FIG. 33B is a transverse cross-sectional view showing a press die for an original record in the third embodiment.

It is also appropriate to combine two original records as shown in FIGS. 32, 33A and 33B. Further, in FIG. 24, there is provided a communication interface section 578 which allow communication with the external, whereby as shown in FIG. 29, in an external cipher encoder 579 the soft copyright owner has, the physical arrangement table is encrypted by means of a first cipher key 32d and fed back from the external cipher encoder 579 through a second communication interface 578a, a communication line and the communication interface 578 to a mastering apparatus 529 manufactured by an optical disk manufacturing company. According to this method, the first cipher key 32d belonging to the copyright owner is not given to the optical disk manufacturing company, which increases the degree of cipher security. In addition, in case that the first cipher key 32d is stolen, there is no need for the optical disk manufacturing company to take the responsibility.

Figure 22:
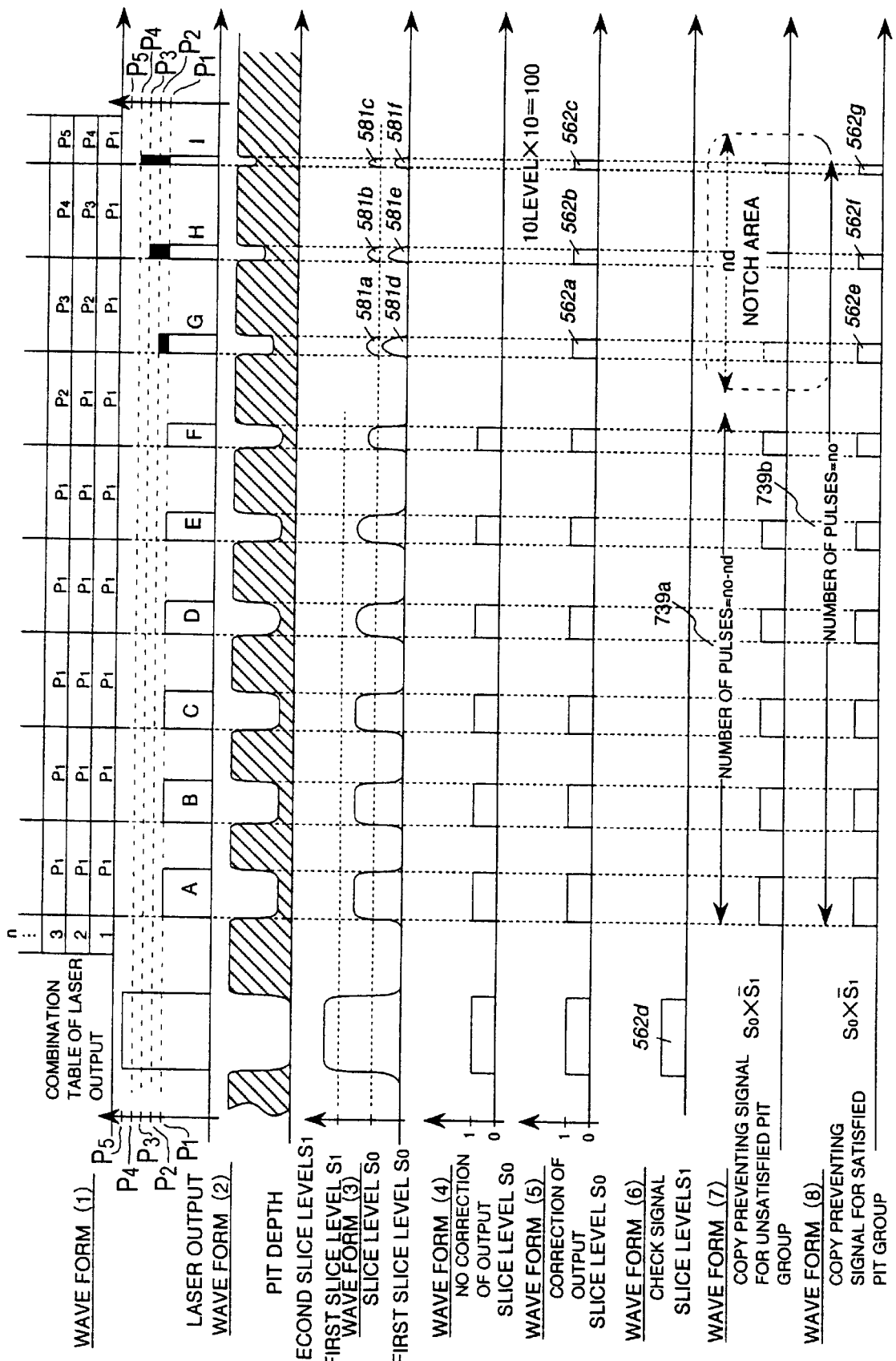
FIG. 22 is illustrative of a laser output, pit depth and regenerative signal in the third embodiment.
Figure 37:
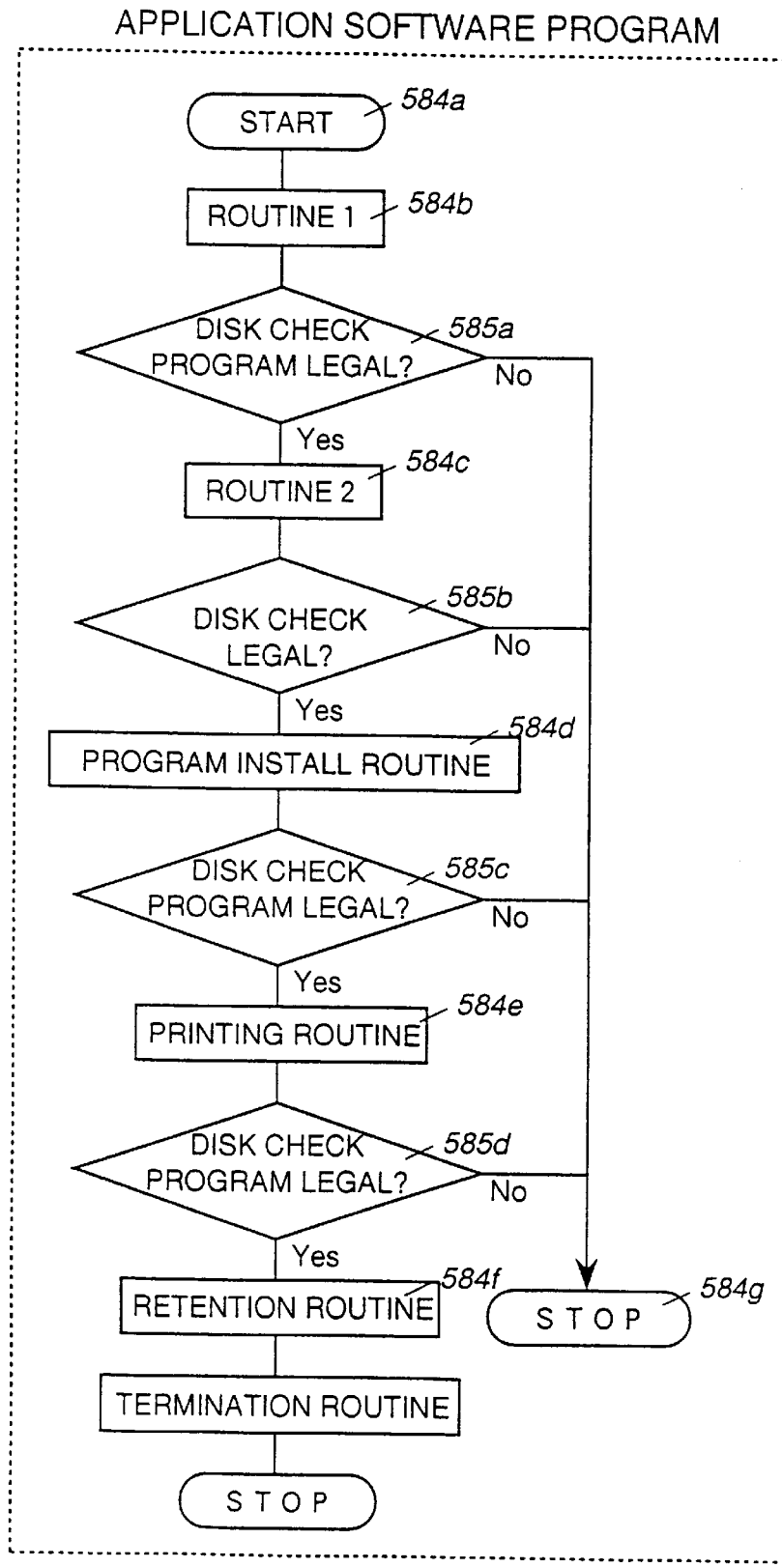
FIG. 37 is a flow chart showing a disk check method in the third embodiment.

Furthermore, the precise control for the pit machining in the depth direction is considerably difficult because of depending on varying factors such as the sensitivity of the photosensitive material, gamma characteristic, output variation and beam configuration of the laser light, thermal characteristic of the glass substrate, etching characteristic, dimensional error of the pressing formation. For example, in the case of changing the pulse duration and depths of the pits as shown in FIG. 22, the amplitude of the laser output and the most suitable condition for the pulse duration vary at every pulse duration. Accordingly, taking the gamma characteristic into consideration, n combinational conditions on the laser output value and pulse duration are made as shown in FIG. 22. For example, several hundreds of laser output combinations are made to fabricate original records several hundred times under different conditions. Of these, the original records having the most suitable pit depth can be fabricated several times. That is, of the several hundreds of the original records, several original records satisfy the conditions. In these satisfied original records there is formed a pit group whereby, as shown by portions 581a, 581c of the waveform (3) in FIG. 22, the reproduced signal reaches the reference voltage So but not reaching the detection voltage S1. However, the fabrications of several hundreds of useless original records cost a large amount of money and, therefore, this is economically impossible. Thus, this invention employs a method of forming the most suitable pits by the fabrication of one original record. As shown in FIG. 30, several hundred sets, i.e., n sets of 580a to 580d pit groups are respectively recorded under n sets of laser output conditions. The pit groups having the pit depth, pit configuration and pulse width satisfying the conditions can be obtained with the probability of some of n sets, for example, several sets of several hundred sets. As shown in FIG. 15, the physical arrangement table 532 of the pit group 580c satisfying the conditions is encrypted and recorded on the magnetic recording section of the disk 2 or recorded on the second original record or the optical recording section of the second photosensitive section original record 572, thus making to possible to fabricate the copy preventing disk using the pit depth. In this case, as the yield of the satisfied pit group becomes worse, the number of the n sets of the pit group increases, while the copy preventing ability accordingly increases. Actually, when the total number of the pits of one set of the pit group 560 and the number of the kinds of pulse durations increase, the number of combinations and the yield comes to approximately one-several hundredth. Since the physical arrangement table 532 is encrypted with a one direction function as described before, it is impossible to revise it except that the cipher key is known. Accordingly, the duplication traders can not duplicate the disks except that they produce several hundreds of expensive original records. That is, the fabrication of one duplicated original record costs a large amount of money, and therefore it is difficult economically so that the traders will give up to fabricate the original record. On the other hand, even if several hundreds of kinds of 10-bit pit groups are provided and several hundred sets of the pit groups are made, the total capacity is about several tens KB, and for example, the influence on the capacity 640 MB of a CD-ROM is $1/10000$, which results in almost no reduction of the capacity according to this invention. Although the illustration is made in terms of an example using a ROM disk such as a CD, it is also possible that a recording type optical disk such as a partial ROM is used and the physical arrangement table is encrypted and recorded on a recording layer of an optical RAM. This can offer the same effect. Moreover, as shown in the FIG. 37 flow chart, the disk check program 584 can not be revised or eliminated except that the whole application program is decrypted with the disposition at 1000 places, for example, like a program install routine 584d of a program 586 of an application soft program, a printing routine 584e and a retention routine 584f, and hence, even if a portion of the disk check program 585 is omitted, the remaining check program stops the operation. Thus, with the disk check program being divided into a plurality of portions and disposed, the illegal duplication becomes difficult.

[Fourth Embodiment]

In the fourth embodiment, a second low-reflection (low-reflectance) section is provided as the first physical feature information. The formation of the second low-reflection section allows the production of a physical ID mark and the detection thereof. More specifically, an area with no reflective layer is intentionally provided in a portion of an optical reflective layer (made of AL or the like) of a ROM optical disk such as a CD-ROM to create the physical ID. FIGS. 38, 39 and 40 are system block diagrams showing the principle of the fourth embodiment. Further, FIG. 41 shows a state of a physical ID inherent in a disk. As shown in FIG. 15D, 10 low-reflection sections 584, 584a to 584i which do not have a reflective film 48 are disposed radially and 11 reference low-reflection sections 585 are intentionally provided during the formation of the reflective film. When a light beam from the optical head 6 is focused on the low-reflection section 584, the reflected light quantity is extremely reduced as compared with the reflective section 48, Accordingly, as shown by the optically reproduced signal of FIG. 41E, the signal level extremely decreases. As shown in the block diagram of FIG. 39, a comparator 587 of a low-reflection light quantity detecting section 586 detects an optically reproduced analog signal having a lower signal level than that of an optical reference value 588 to detect the low-reflection light quantity section. A low-reflection section detection signal having a waveform as shown by (5) of FIG. 42 is outputted during the detection. an estimation is made in terms of the addresses of the start position and end position of this signal and the clock position.

The optically reproduced signal is shaped and converted into a digital signal by means of a waveform-shaping circuit 590 including an AGC 590a. A clock reproducing section 38a reproduces a clock signal on the basis of the waveform-shaped signal. An EFM demodulator 592 of a demodulating section 591 demodulates the signal and an ECC corrects errors, then outputting a digital signal. The EFM-demodulated signal is led to a physical address outputting section 593. For CDs (Q bits of subcode), an MSF address is outputted from an address outputting section 594 and a synchronizing signal such as a frame synchronizing signal is outputted from a synchronizing signal outputting section 595. The clock reproducing section 38a outputs a demodulated clock.

In a low-reflection section address/clock signal position signal outputting section 596, a low-reflection section start/end position detecting section 599 precisely measures the start point and end point of the low-reflection section 584 by using an n−1 address detecting section 597 and address signal or a clock counter 598 and a synchronizing clock signal or demodulation clock. A detailed description will be made with reference to FIG. 42 in terms of this method. As shown by (1) of FIG. 42 which is a cross-sectional view of an optical disk, a low-reflection section 584 is partially provided as a mark number 1. A reflected light signal as shown by (2) of FIG. 42, i.e., an envelope signal as shown by (3) of FIG. 42, is outputted, while it becomes lower than a light quantity reference value 588. A light quantity level comparator 587 detects this fact and a low-reflection light quantity detecting section 586 outputs a low-reflection light quantity detection signal as shown by (5) of FIG. 42.

Figure 42:
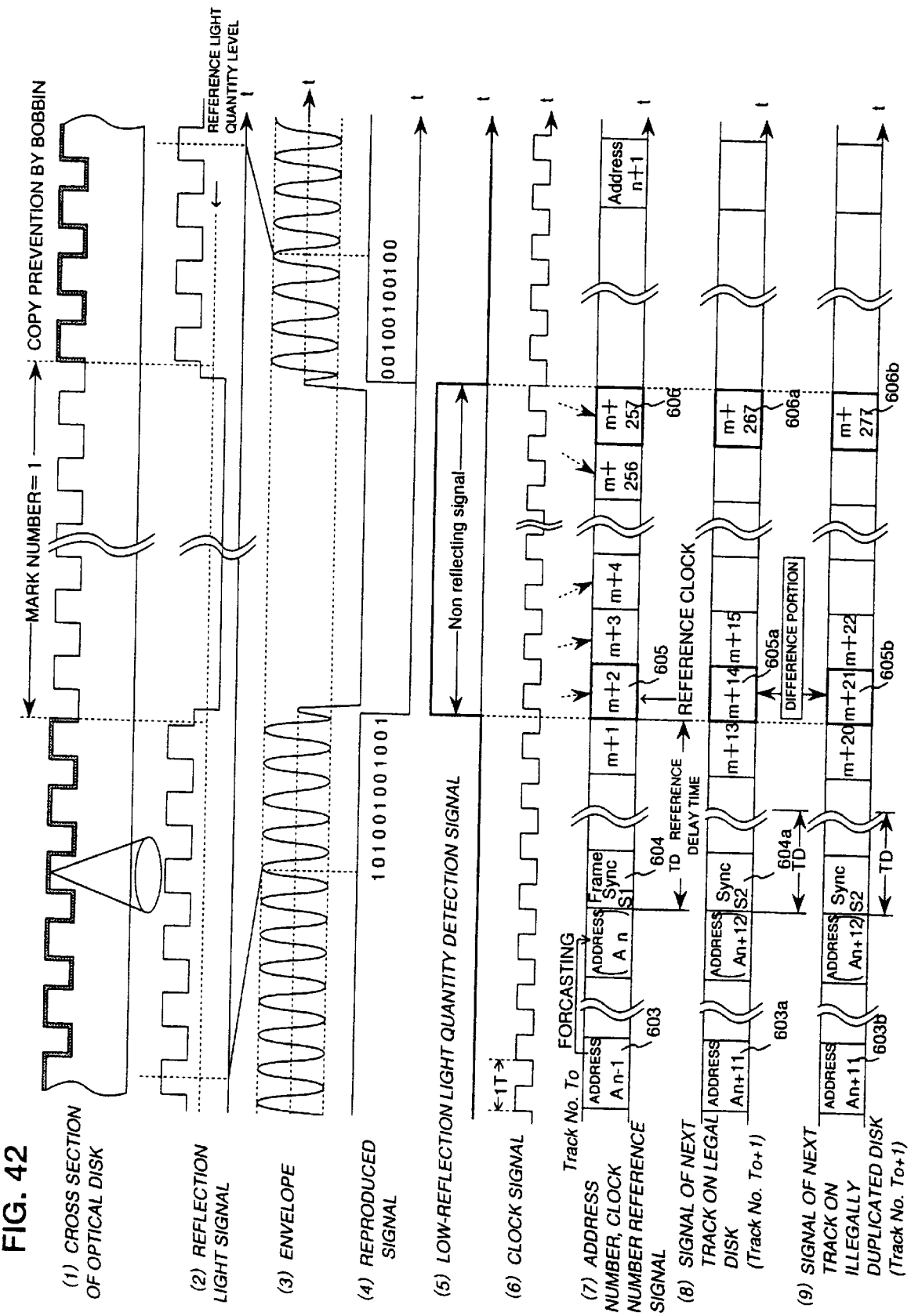
FIG. 42 illustrates a principle for position detection of an address and clock of a low-reflection portion in a fourth embodiment.

Secondly, address information and a demodulation clock shown by (6) of FIG. 42 or a synchronizing clock are used in order to the start and end positions of the low-reflection light quantity detection signal. Initially, a reference clock 605 of the address n shown by (7) of FIG. 42 is measured. If the n−1 address detecting section 597 previously detects the address immediately before the address n, it is found that the next sync 604 is a sync of the address n. The clock counter 598 counts the sync 604 and the number of clocks immediately before the reference clock 605, and this number of clocks is defined as a reference delay time TD which is measure and recorded by a reference delay time TD measuring section 608.

Since the circuit delay time varies in accordance with the reproducing system, this reference delay time TD also varies. Thus, a time delay correcting section 607 corrects the time using the reference delay time TD, whereupon it is possible to accurately measure the number of start clocks of the low-reflection section irrespective of the reproducing system. As shown by (8) of FIG. 42, by obtaining the start, end address•clock number for an optical mark No. 1 of the next track, the clock m+14 of the address n+12 is obtainable. Since TD=m+2, the number of clocks is corrected to 12, while n+14 is used for the purpose of the description.

Figure 44:
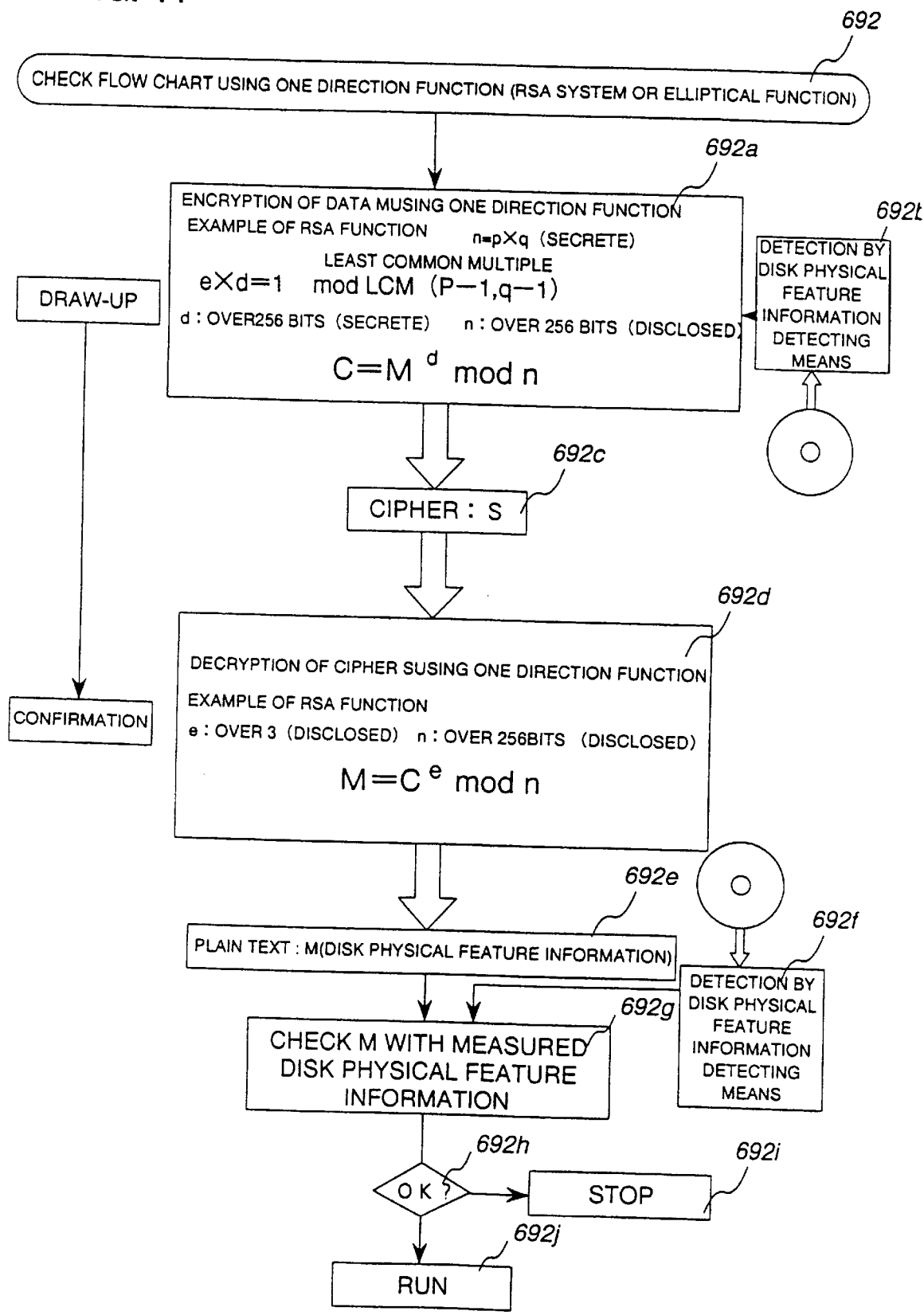
FIG. 44 is a flow chart showing a disk check using a one direction function in the second, third and fourth embodiments.
Figure 45:
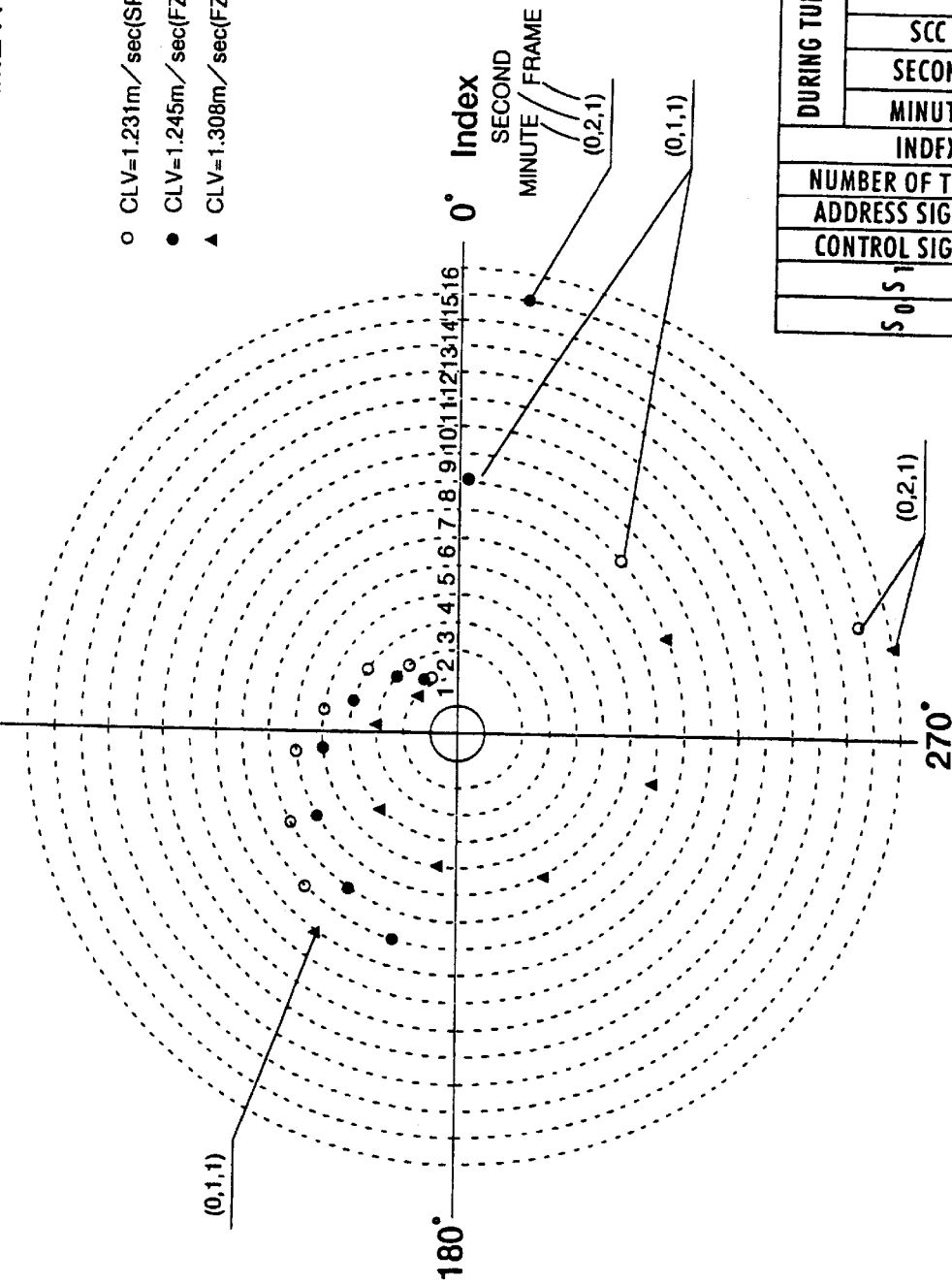
FIG. 45 is an illustration of coordinate positions of original records in the second embodiment.

A description will be made in terms of a low-reflection section address table. The low-reflection section 584 is previously measured in the factory at every disk as shown in FIGS. 3A and 3B so as to draw up a low-reflection section address table 609. This table 609 is encrypted with a one direction function as shown in FIG. 44 so that as shown in FIG. 15 a low-reflection section group having a bar code configuration and having no reflective layers is recorded at the innermost circumferential portion of the disk in the second-time reflective layer formation process. It is also appropriate that it is recorded in the magnetic recording section 67 of a CD-ROM as shown in FIG. 38. As shown in FIGS. 3A and 3B, the low-reflection section address tables 609 and 609x considerably differ from each other between the legal CD and the illegally duplicated CD. Accordingly, as shown in FIG. 38, the encrypted table is decrypted to made a normal table which is checked with a check program 535 to distinguish the legal disk from the illegally duplicated disk, thereby stopping the operation of the illegal disk. In the example shown in FIG. 42, the values of the low-reflection section address tables 609 and 609x are different from each other. As shown by (8) of FIG. 42, in the legal disk the track next to the mark 1 assumes the start and end at m+14 and m+267, respectively. On the other hand, as shown by (9) of FIG. 42, in the illegally duplicated disk, the start and end take place at m+21 and m+277 different therefrom. Thus, as shown in FIG. 43, the low-reflection section address tables 609 and 609x are different from each other, thereby allowing the discrimination of the duplicated disk. In the case of CLV, this is achieved using the fact that the address coordinate arrangement of the original record is different as described before. FIG. 45 shows the actual measurement results about the positions of the addresses of a CD. As obvious from the figure, the address coordinates are considerably different from each other. Moreover, according to the method of this invention, even if the original record is the same, since the reflective film is partially removed in the reflective film formation process, the low-reflection section differs at every disk. Accurately removing the reflective film partially in units of pits is almost impossible in the ordinary process. For this reason, duplicating the disk made according to this invention is economically satisfied, which provides a high duplication preventing effect. FIG. 30 is a flow chart for detection of a duplicated CD due to the low-reflection section address table, while the description thereof will be omitted because of repetition.

Figure 47A:
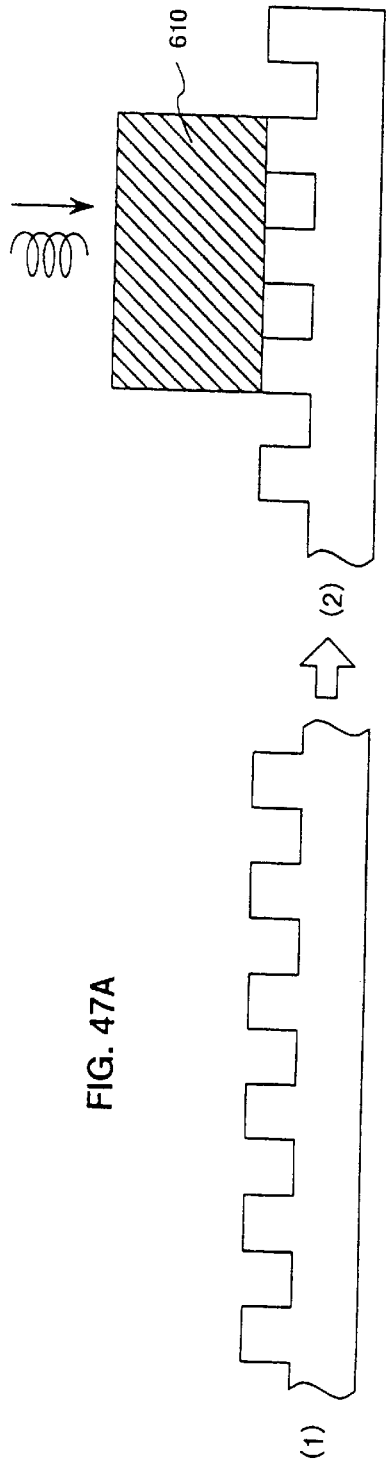
FIG. 47 is a flow illustration of a manufacturing method of a low-reflection portion in the fourth embodiment.
Figure 47B:
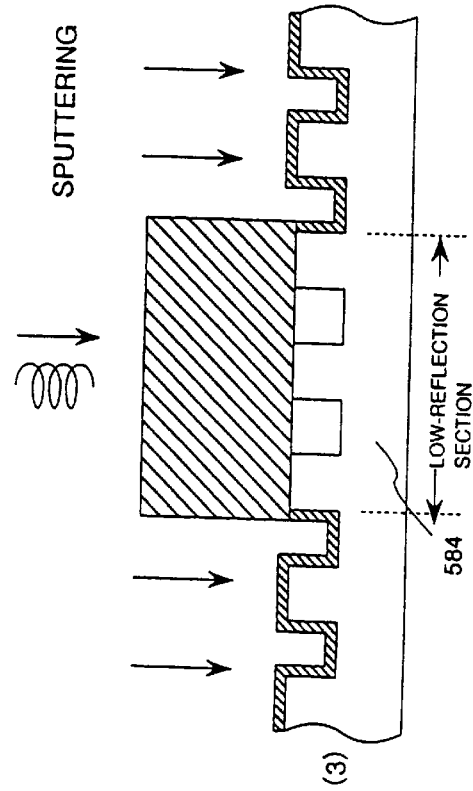
Figure 47C:
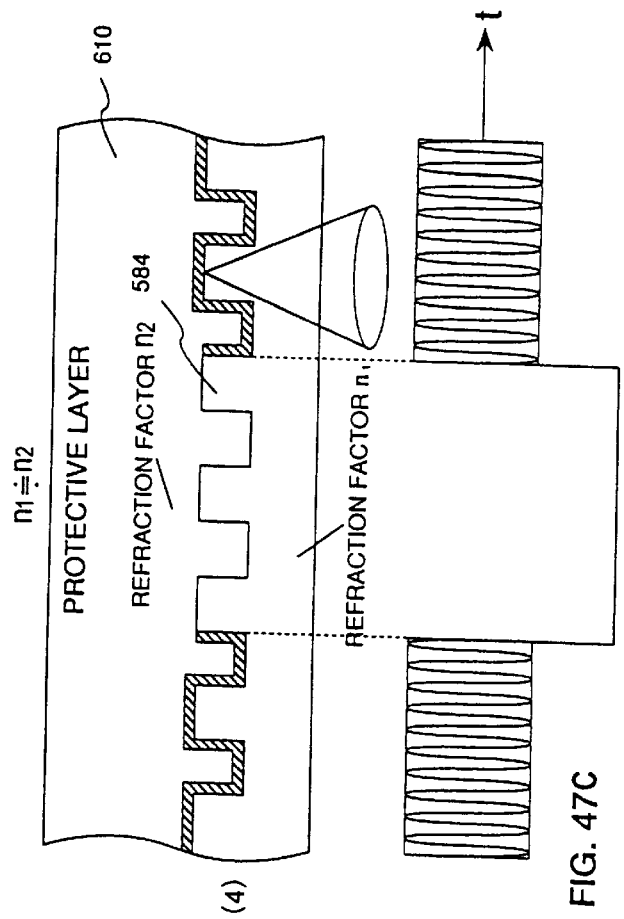

Secondly, a description will be made in terms of a formation method of the low-reflection sections. In the process (2) of FIG. 47, a deposition preventing section 610 is placed on a substrate of a disk. In the process (3) of FIG. 47, the sputtering is carried out, in which case the low-reflection section 584 with no reflective layer is available. In the process (4), the refractive index n1 of the substrate is made to be close to the refractive index n2 of a protective layer 611, thereby reducing the reflected light quantity on the low-reflection section 584. Since n1=1.55, n2 is set to $3 \leq n2 \leq 1.7$.

Figure 50:
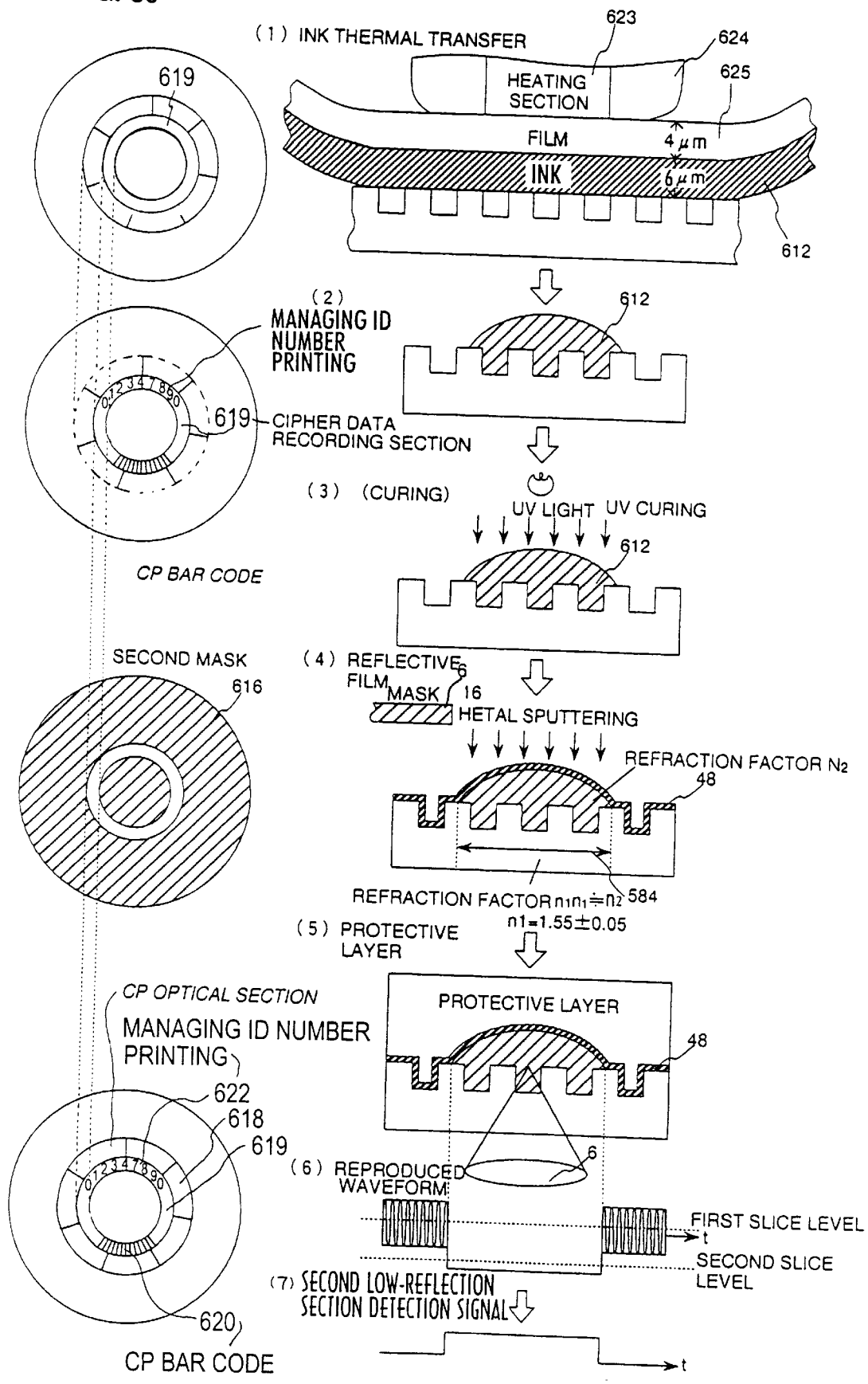
FIG. 50 is a flow illustration of a manufacturing method of a low-reflection portion in the fourth embodiment.
Figure 52:
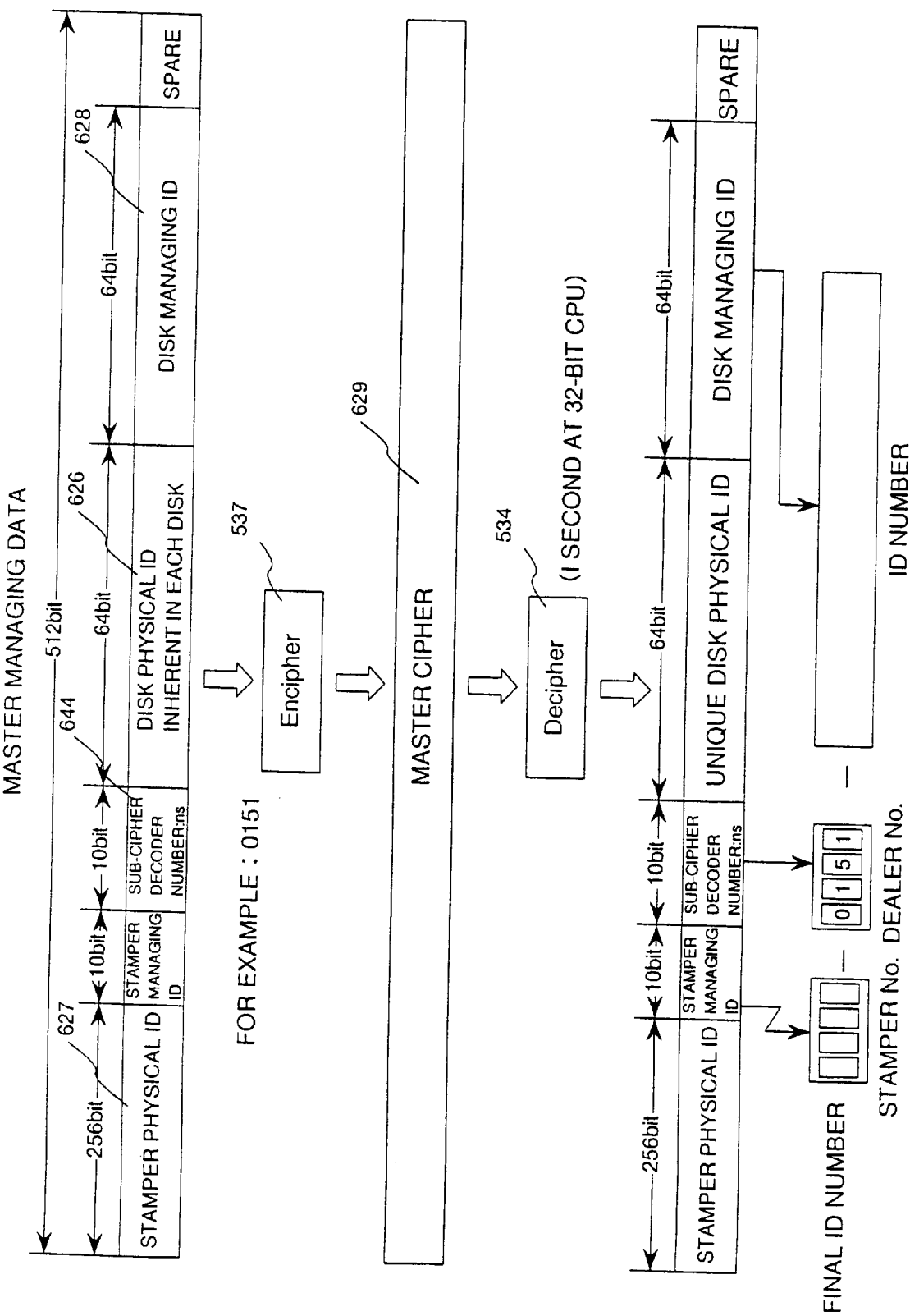
FIG. 52 shows a data structure of a master cipher in a six embodiment.

In FIG. 48, an ink 612 with a low transmission factor is applied in the process (2) and cured with UV (ultraviolet light) in the process (3). Further, in the process (4) a reflective film is given. Since the ink 612 has a low transmission factor, the low-reflection section 584 is available. In FIG. 49, in the process (2) a light shielding section 613 is adhered onto the substrate through an adhesive section 614, and in the process (3) a reflective film is formed by a first mask at a portion other than optical tracks of the inner circumferential section to make the low-reflection section 584. In addition, in the process (4) the position of the low-reflection section 584 is detected by the optical head 6 to draw up the low-reflection section address table 609, then followed by the encryption in the process (5). In the process (6), this cipher data is modulated to a modulated signal such as a bar code data and recorded as an optical mark on the substrate of a cipher data recording section 618 by means of a printing section 617 and the ink 612. Further, in the process (7) the ink 612 is cured and in the process (8) a reflective film 48 is made by the sputtering or the like using a second mask 616 which masks portions other than the cipher data recording section 618. The reflected light quantity decreases at the ink 612 portion, thereby forming the second low-reflection section 584. In the process (9), an envelope in which the light quantity partially decreases is reproduced, and in the process (10) the low-reflection section detection signal is reproduced, whereby the cipher data is reproduced by the bar code demodulating section 621. As shown by the process (11) of FIG. 49, since in addition to a bar code 620 a character pattern 622 can also be printed in the cipher data recording section 619, the characters for the ID number can be printed at every disk, which allows visible confirmation of the ID number. In FIG. 50, for printing a circular bar code 620 and character pattern 622 on the cipher data recording section 619, a heating head 624 having a thermal transfer heating section 623 is used so as to partially perform the thermal transfer of the ink 612, applied onto a film 625, onto the substrate so that the ink 612 remains on the substrate as shown by the process (2). If necessary, an UV ink is employed and UV-cured in the process (3). In the process (4), using the second mask 616 a metallic reflective film is provided only in the cipher data recording section, whereby the optical head 6 is operated in the process (5) so as to obtain a reproduced waveform as shown by (6) in which attenuation occurs only at the low-reflection section, thus obtaining a low-reflection section detection signal as shown by (7). As shown in FIG. 49, the digital data is outputted from the bar code demodulator 621 so that a CP master cipher signal generates. This signal is different at every disk, and therefore a different physical ID is obtainable at every disk. As shown in FIG. 52 the disk physical ID 626 inherent in each disk, such as the low-reflection section address table 609 being the physical information inherent in each disk as described in FIGS. 3A and 3B or a stamper physical ID 627, such as the physical arrangement table in FIGS. 3A and 3B, and a disk managing ID 628 being a serial managing number arbitrarily given by the soft making company is enciphered as one data train with a one direction function cipher encoder so as to make the master cipher 626. Accordingly, even if the user try to revise the disk managing ID 628, the change of the disk physical ID 626 is difficult, with the result that the revision becomes impossible.

Figure 53:
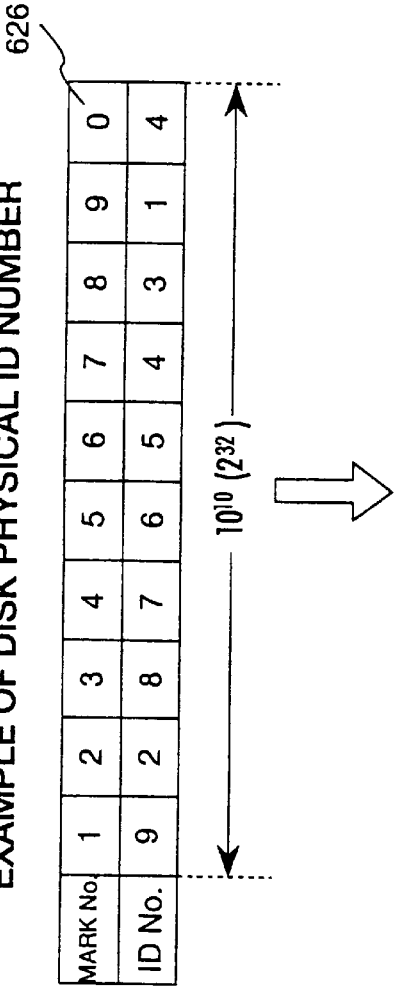
FIG. 53 is an illustration of physical formation in the six embodiment.

This disk physical ID 626 is randomly formed in the CP optical mark section 618 of the FIG. 49 disk so as to have an optical mark as shown in FIG. 41. When this signal is reproduced, as shown in FIG. 53, The address is divided into 10 angular numbers from 0 to 9 for each optical mark to obtain 10 data so that the disk physical ID 626 of 10 figures, i.e., 32 bits, can be defined. Moreover, as described above the disk physical ID varies at every disk irrespective of the same original record, and corresponds to a specific disk managing ID 628, whereby it is possible to prevent the revision of the disk managing ID. This can greatly improve the password security against the release of the program. In addition, although a description was made in terms of the embodiment in which the position of the optical mark is detected by the address and the number of clocks, the disk physical table 609 as shown in FIG. 53 can be drawn up with a low-reflection section angular position detecting section 602 of a low-reflection section angular position signal outputting section 601 outputting a low-reflection section angular position signal on the basis of a low-reflection light quantity detection signal and disk rotational angle information of a disk rotational angle detecting section 335 in FIG. 38.

Figure 51:
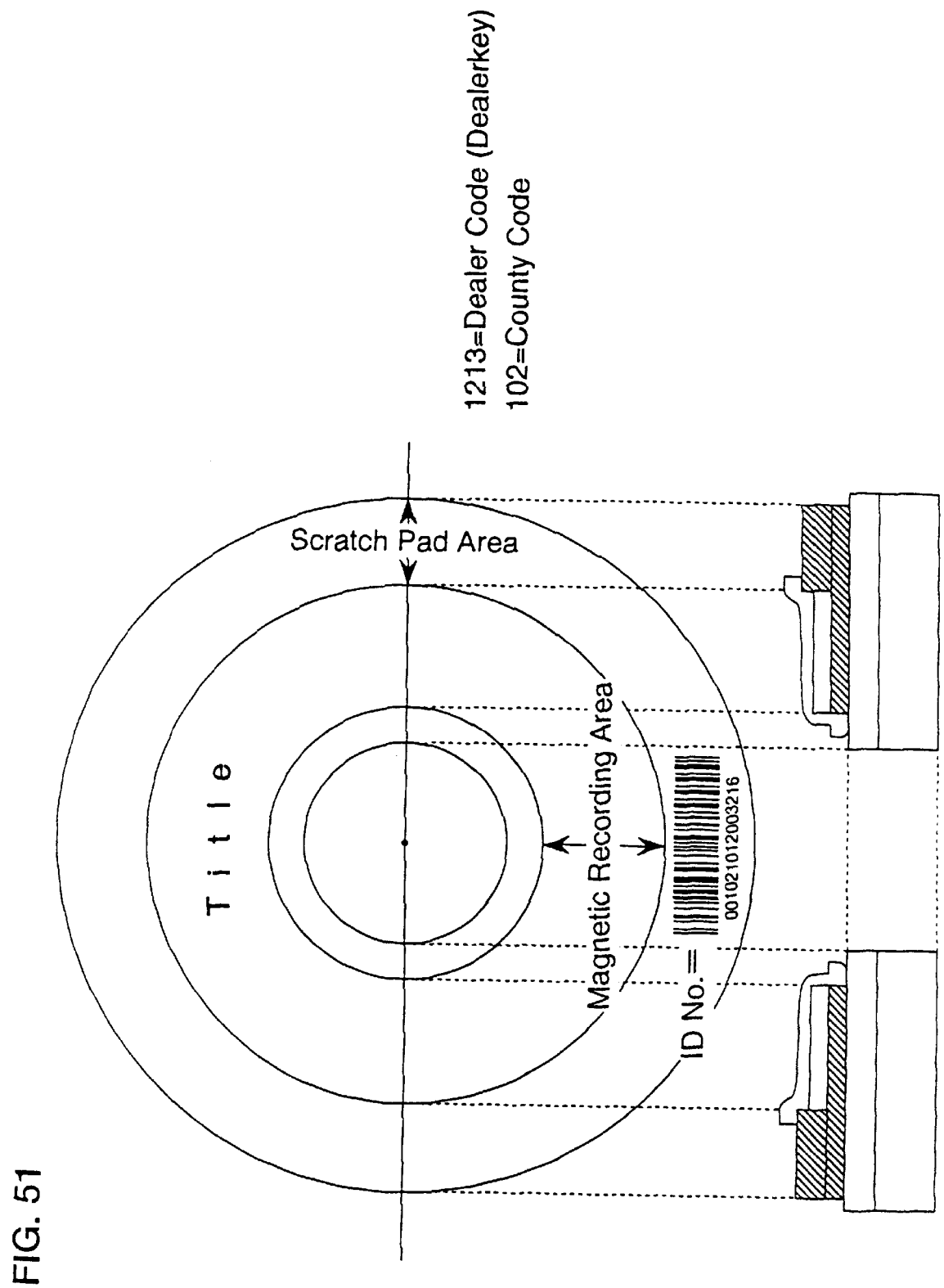
FIG. 51 is a top view showing a disk in the fourth embodiment.

When a writable layer 630 is provided as shown in FIG. 51, in addition to write a password and the like by a pen, it is possible to prevent the magnetic recording section from being damaged because the writable layer 630 becomes thicker. With the characters and bar code for the disk managing ID 628 being printed on the writable layer 630, the ID is checkable at selling agents.

[Fifth Embodiment]

The fifth embodiment relates to a method in which an error signal is intentionally disposed as a duplication preventing signal on a disk. As shown in FIG. 54, a specific error sign 632 is arranged in a specific address•clock section of a legal disk 2. This arrangement information is enciphered and recorded as an error sign-address table 631 on the disk 2. This encryption information is supplied through a cipher encoder 534 to a physical ID outputting section 633. On the other hand, a CP error sign 632 "11011001" is parity-checked with an error sign list 634 in an error CP sign detector 633, and the address•clock for the error CP sign is outputted from an address•clock position outputting section 635 and checked with the error sign-address table 631 by a check program 535. If the coincidence number n1 is above a given rate, a decision can be made such that it is a legal disk. This error CP sign "11011001" is corrected in an ECC decoder 36e to be outputted as "11011011". Thus, the output data provides no problem. On the other hand, in an illegally duplicated disk 2a, since an ordinary sign 635 after the error correction is duplicated, it differs from the CP error sign of the legal disk 2. In this case, the output data is the same "11011011 as the that of the legal disk 2. However, the number of the error signs to be detected by the error CP sign detector 633 is small and the error-sign-address table and the arrangement of the error signs do not coincide, and hence the check program 535 decides that it is a duplicated disk, which stops its operation. Thus, it is possible to realize a duplication preventing disk. In this case, since the duplication preventing desk is made only with the change of the signal and the addition of the error CP sign detecting section 633, the system can have a simplified structure.

Secondly, a description will be made with reference to FIG. 56 in terms of a method of accomplishing the copy protection (CP) using a special EFM translation table 636. In the EFM translation, the original data 637 is modulated to the standard sign 635 "00100001000010" which in turn, is decoded to the modulated data 638 in an EFM decoder 592. In the duplication preventing disk 2, a CP special sign 639 is recorded in place of the standard sign 635 for a specific address only. In the case of the EFM demodulation, the sign is decoded to the ordinary data 638 "01101111". For this reason, distinguishing can not be made with only the output data.

A detailed arrangement will be described with reference to a block diagram of FIG. 55. For the legal disk 2, a CP special sign detecting section 646 detects a CP special sign 6639 and a CP special sign address outputting section 641 outputs the CP special sign address. In a legal disk checking section 535, it is checked with a CP special sign-address table 642 decoded by the cipher decoder 534. If the checked value exceeds a reference value n0, a decision is made such that it is the legal disk. Since only the standard signal 635 is recorded in the illegally duplicated disk 2a, the CP special sign detecting section 640 does not generate the CP special sign detection signal except that an error occurs. Accordingly, a legal disk check section decides that it is an illegal disk, thus stopping the operation.

Thus, the employment of the EFM special translation table 636 allows the copy prevention at the stage of the modulation signal. As compared with FIG. 54 error special sign method, the duplication becomes more difficult. In addition, the structure becomes simple because of the change of the signal only.

[Sixth Embodiment]

A description will be made in terms of the sixth embodiment which involves an install managing method using the master cipher 629 and a dealer code. FIG. 58 illustrates an entire operational flow of a sub-cipher decoder 643. This flow chart is composed of three main steps of a soft company process step 405a, a dealer process step 405 and a user process step 405c. First, in the soft company process step 405a, as described in the FIG. 52 first embodiment, a master cipher encoder 537 in the lump enciphers an original record ID 627 inherent in the original record, a disk physical ID 626, a disk managing ID 628 such as a serial number, and a sub-cipher decoder number ns, for example, ns=151, to make a master cipher 629. With this operation, the prevention of revision is possible. One dealer number ns is given to each dealer or service center. In each disk, a sub-cipher decoder number ns 644 (for example, ns=151) is set in the master cipher 629. Accordingly, a sub-cipher 645 in the FIG. 57 disk can be encodeed only by a sub-cipher encoder 646 whose dealer number is 151. In this disk, the sub-cipher decoder 647 is set with the ns (for example, ns=151) and the master cipher 629. Accordingly, even if the encoding is tried with a sub-cipher encoder 646 different in number, the operation does not start. Thus, only the dealer whose ns=151 can treat the ns=151 cipher encoder 646a for the disk control such as the release of the program and setting of the number of machines to which the install is allowable.

Furthermore, in the dealer process step 405b, a sub-management data is produced which includes the disk physical ID 626 and further includes the disk managing ID 628, the number 650 of machines to which the install is limited, the time limit 651 for use, the service password and so on. The ns=151 dealer makes a secrete of the sub-management data 649 and encrypts it with his ns=151 sub-cipher encoder 646a to make a sub-cipher 645. This sub-cipher 645 is recorded in the magnetic recording section of the disk 2.

Still further, in the user process step 405c, the master cipher 629 is reproduced so that the master managing data 648 is decoded with the master cipher decoder 534. The original record duplication is checked with the original record physical ID thereof, and the revision of the ID number is checked with the disk physical ID 626 and the disk managing ID 628. The sub-cipher decoder number 644 is decoded, and in a step 405d the sub-cipher decoder number ns (for example, ns=151) is selected. In the optical ROM section of the disk 2 there are recorded the sub-cipher decode programs (for example 001 to 999) and data enciphered. The specific, i.e., ns=151, data is reproduced therefrom and the ns=151 sub-cipher decoder 647 is decoded through the master cipher decoder 534. In this case, since the sub-cipher decoder is enciphered, the revision is impossible. The sub-cipher decoder 647 decodes the sub-management data 549 on the basis of the sub-cipher. Since the physical ID 626 is included in the sub-management data 549, the data revision is checkable. In addition, since the number 650 of the install-done machines, the time limit 651 in use and the release program number 652 are recorded, it is possible to limit the program number released and the number of the install-allowable machines. This setting can arbitrarily be carried out by the dealer. Accordingly, taking the selling situation of disks and softs into consideration, the dealers staying in areas of countries can perform the most suitable setting.

Figure 57A:
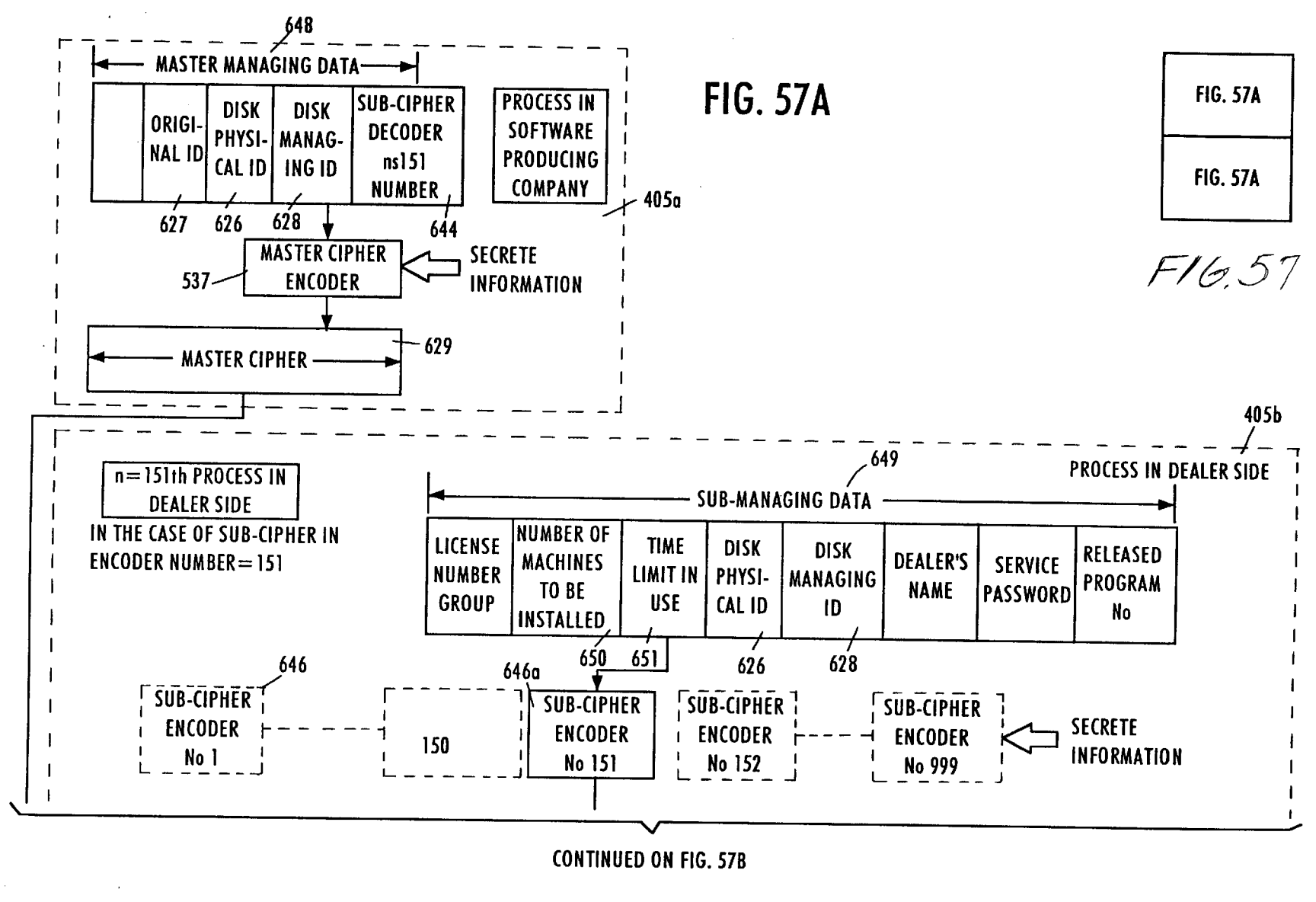
Figure 57B:
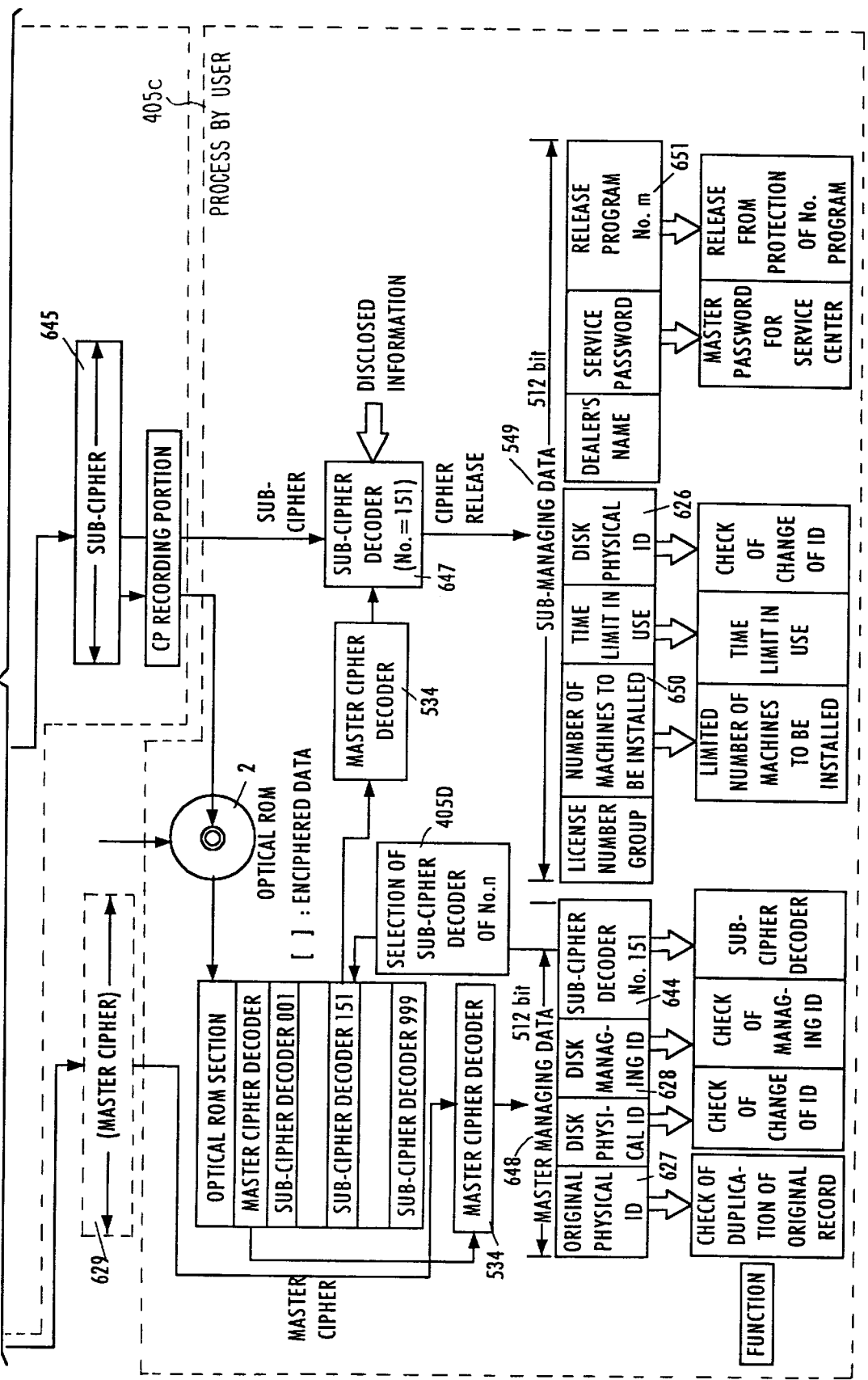
FIG. 57 is a flow chart showing a selection method of a plurality of sub-cipher encoders in the sixth embodiment.

The FIG. 57 operational flow will further be described with reference to a flow chart of FIG. 58. In FIG. 58, in addition to a disk fabricating routine 405a for the soft company and a disk use limit routine 405b for a dealer, there are newly provided a program use-allowing routine 405d for the dealer and an install routine 405c for the user. First, in the disk fabricating routine 405a, an original record is fabricated in an original record fabricating step 410a and the original record physical ID such as the address-coordinate table and error-address table are extracted. A disk substrate is made on the basis of the original record and in a first metallic reflective film producing step 410b a physical feature different at every disk is made, for example, in such a manner as intermittently providing low-reflection sections with no reflective layer as described above, before the disk physical ID being extracted.

A serial number generating step 410c is executed to generate a disk managing ID with a serial number different at every disk and designates a sub-cipher decoder number ns, and a step 410d is executed to encipher it with a master cipher decoder to make a disk master cipher, and further a step 410e is implemented to record on each disk a recording number such as a circular bar code, different at every disk, in a second metallic reflective film process. Or, in a step 410f it is recorded in the magnetic recording layer before the fabrication of the disk 2. In the dealer step 405b for the next number ns, a step 410g is executed to make a dealer sub-management data 649, and a step 410h is implemented to make a disk sub-cipher by a sub-cipher encoder 646 with the number ns, and further a step 410i is executed to record it in the magnetic recording layer.

In the next user install routine 405c, a machine ID is read out and registered in a machine ID recording area 655 of an install managing data 654, then followed by a step 410k to record the machine ID in an HDD and to confirm an install-allowable flag 653 with a basic program number that the install is permitted in the disk 2. Flags 653a, 653b and 653c show the install permissions to the machines with ID1, ID2 and ID3, respectively. In the illustration, the install is allowed to the machine ID1 and machine ID3. After the install, a step 410m follows to record all the install managing data 653. Subsequently, a step 410n is executed to perform the operation for a new program np being installed for a fee, then followed by a step 410p to make additional install managing data 654a when the new program np is newly installed the machine ID1 and machine ID3. In the data, the install allowing flag 653 rises on install allowing flags 653f and 653h. This data is transmitted to the dealer. In the dealer use allowing routine 405d, a step 410u is for the dealer to check the receipt of the fee for the program install. If "YES", the operational flow goes to a step 410v to encipher the additional install managing data 654a with the sub-cipher encoder No. ns, and then advances to a step 410w to make an install managing number, which in turn, is delivered to the user. The user receives the install managing number 655 in a step 410q, and decodes the cipher with the sub-cipher decoder No. ns to decode the additional install managing data 645a in a step 410s, and further install the new program in a step 410t. At this time, in a step 410x, the decoded physical ID data is checked with the physical ID data measured from the disk. If OK, the operational flow proceeds to a step 410z to start to install the program np. If the revision has been made, the physical IDs are not coincident with each other, thereby preventing the illegal revision. In this case, of the additional program np, the instal allowing flags 653a and 653c assume "1", which permits the program install for the machine ID1 and machine ID3.

[Seventh Embodiment]

Figure 46:
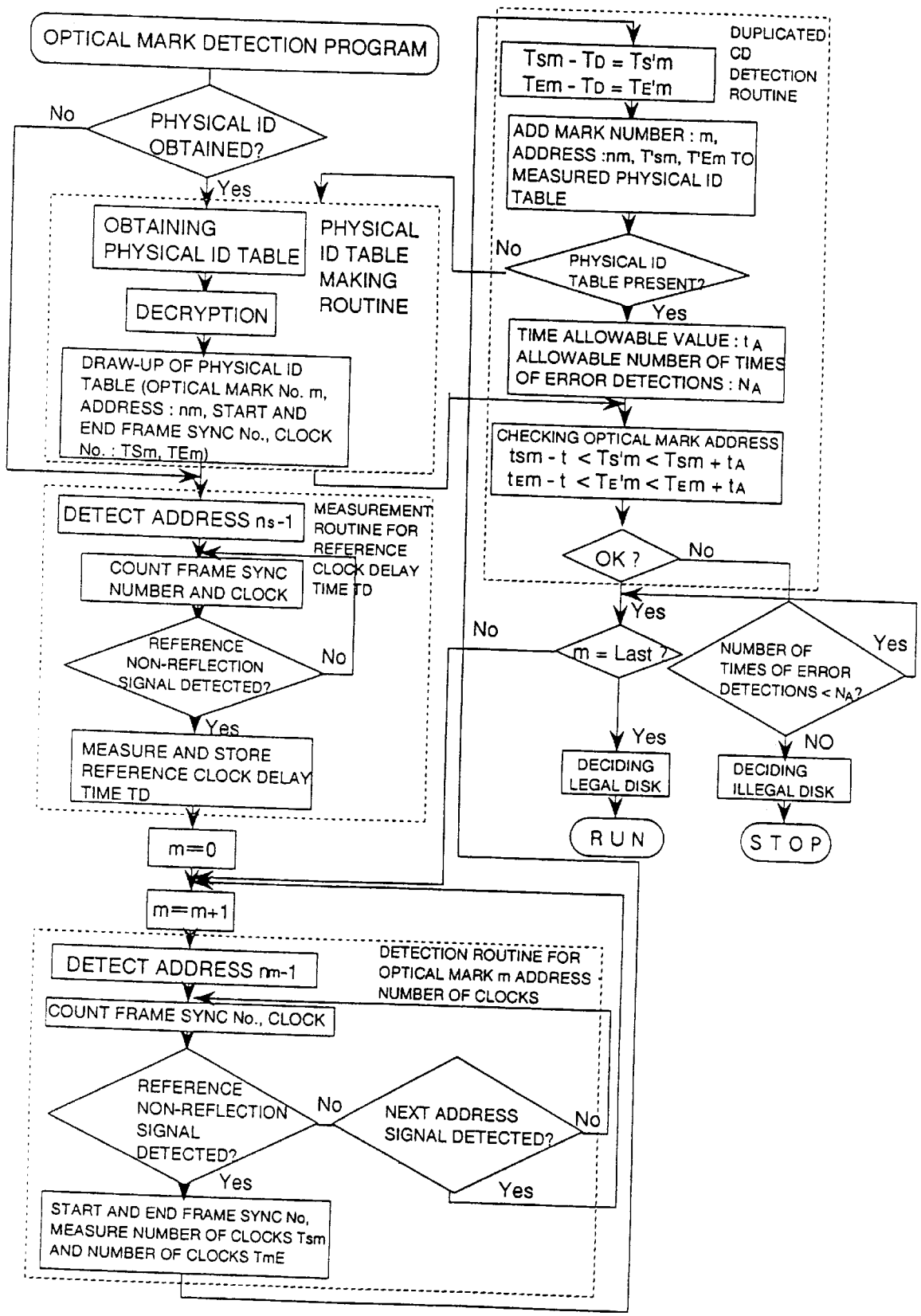
FIG. 46 is a flow chart of a low-reflection position detection program in the fourth embodiment.

Furthermore, as the seventh embodiment, there are described a method of recording data by the second low-reflection section described in the fourth embodiment and a fabricating method. FIG. 5 shows a method of enciphering the address-coordinate position information 532 to record it in the optical recording section of the original record. On the other hand, when as shown in FIG. 15 the address-coordinate position information 532 is encrypted to make a bar code like mask pattern to form a reflective film including a bar code like non-reflective portion, the bar code pattern is reproducible through the optical head 6. In this case, for the reproduction of the duplication preventing signal, it is also possible that the optical reproduction surface and the protective layer 610 opposite thereto are made to be transparent and, in addition to the optical head 6, an optical sensor is provided at the opposite surface side to read out the bar code. Further, when the clock signal is designed to be reproduced from the bar code to perform the rotational control of the motor, a constant speed rotation of the motor is possible at recording to the magnetic recording section. As shown in FIG. 46 the address position of the copy protect optical mark and the pit arrangement are detected to distinguish between the legal disk and the illegally duplicated disk to remove the illegal disk. Although an RSA function is employed as the cipher function, it is also appropriate to use an elliptical curve function or DES function instead. In FIG. 59, the angular position relationship between the optical mark 387 and the address position vary at every disk. Therefore, it is also possible that the angular difference is treated as the disk physical ID.

The seventh embodiment employs a method different from the fabricating method of the fourth embodiment. That is, as shown in FIG. 60 the bar code like low-reflection section 584 is made by means of a laser trimming device. In a first laser trimming process shown by (3) and (4), a light beam from a laser 643 is operated to take a scanning movement through a laser scanner 644 to make a non-linear pattern 653 so that a low-reflection section 584 is formed in the process (4). According to this invention, as shown by (3) the laser cutting is made zigzag but not linearly. For this reason, in this invention the low-reflection section is detected in units of 1T, and for the duplication of the disk according to this invention, it is required that the cutting be made in units of pits, i.e., with accuracy below 0.8 $\mu$m in both the vertical and horizontal directions. On the other hand, since the accuracy of the general-use laser scanner is above 10 $\mu$m, the duplication of the non-reflective section 584 is impossible through the equipment commercially available.

Figure 61:
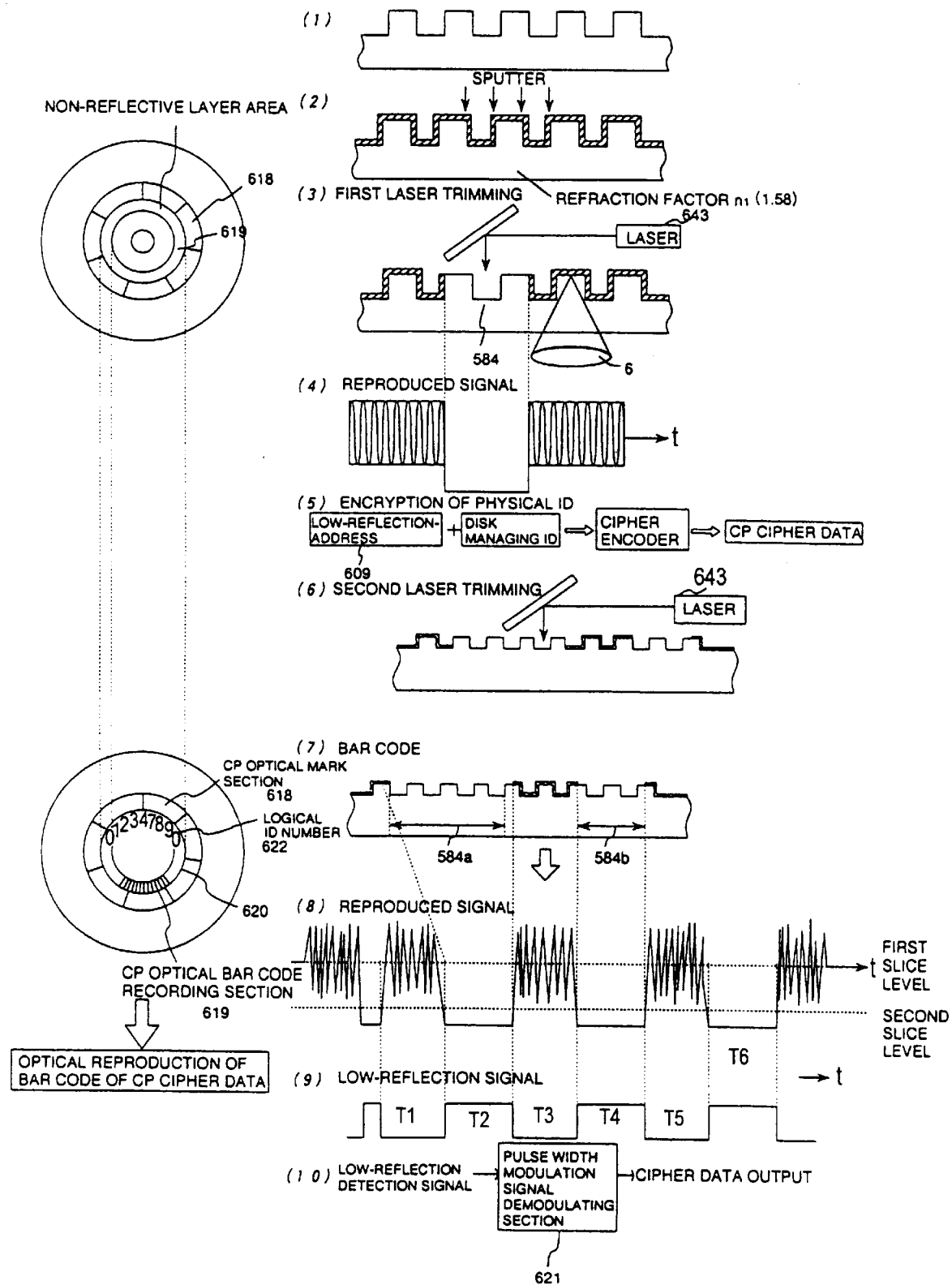
FIG. 61 illustrates a manufacturing process of first and second low-reflection portions in the seventh embodiment.
Figure 67:
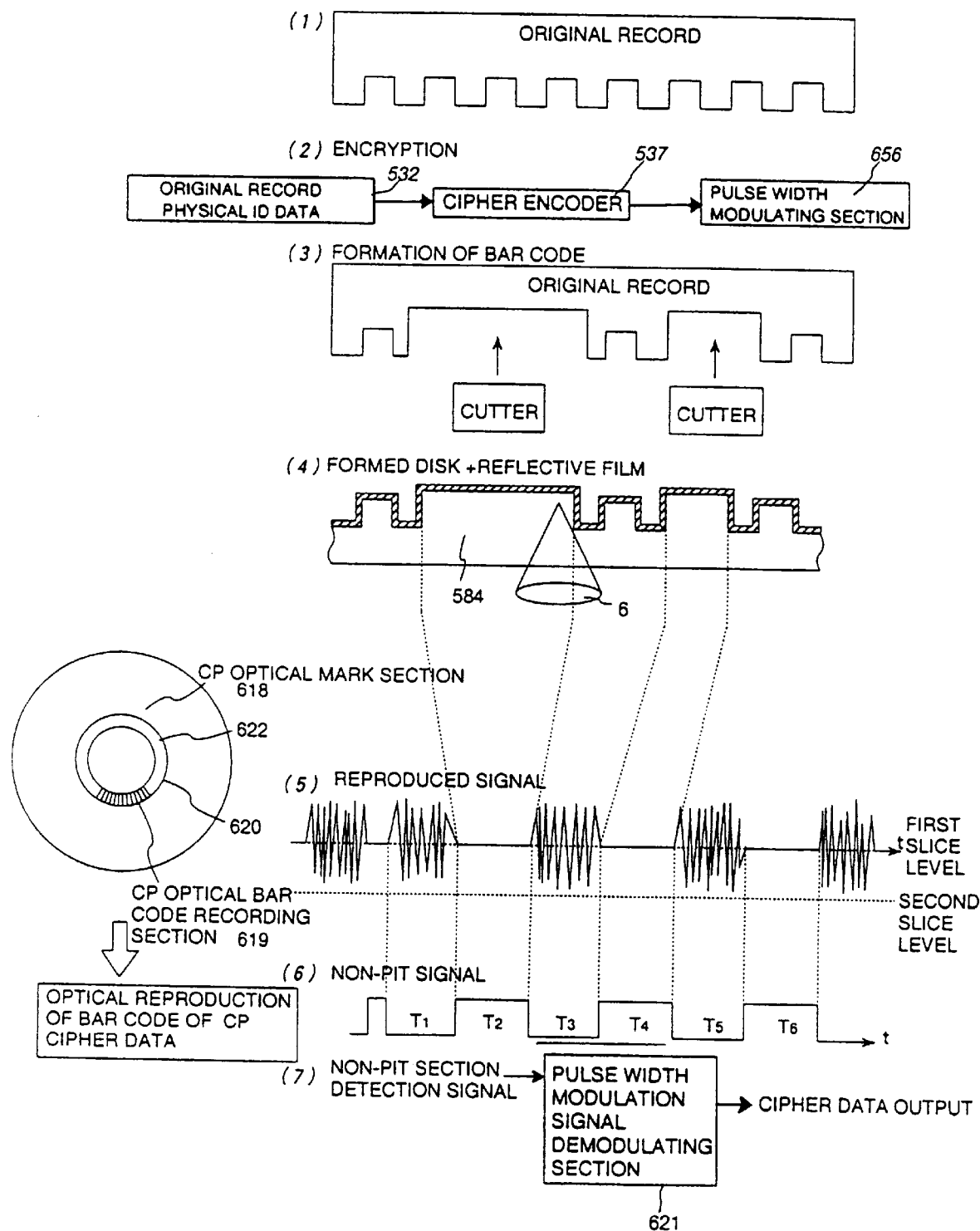
FIG. 67 is an illustration of a manufacturing process of a bar code due to cutting in the seventh embodiment.
Figure 68:
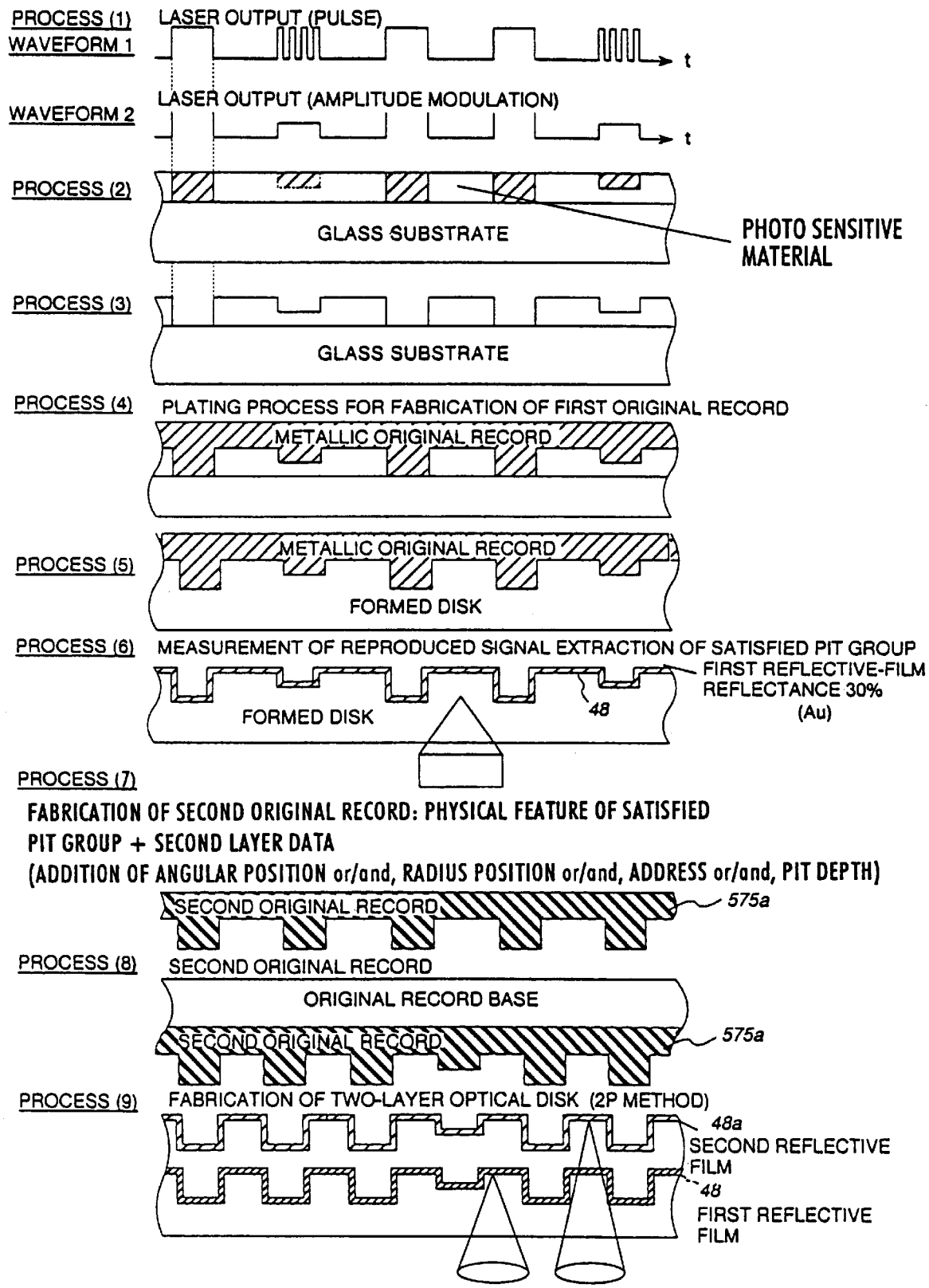
FIG. 68 is an illustration of a manufacturing process of first and second reflection films in the seventh embodiment.

As well as in FIG. 49, as shown in FIG. 61 an ID mark is made at random by the laser trimming in the process (3) and the address of the ID mark and the clock number are detected in the process (5) and these data and the logical ID are enciphered in the lump. In the second laser trimming process (6) this cipher is recorded as a pulse width modulated signal such a bar code, with the result that the disk ID number different at every disk and impossible in revision is formed in the optical recording section of a CD. As shown in FIG. 67, in the process (2) the physical arrangement information 532 of the original record is in advance detected and encrypted through the cipher encoder 537 so that a CP bar code signal is made in a pulse width modulating section 656. Further, in the process (3) a portion of the inner circumferential section or outer circumferential section of the original record completed is removed by means of the laser trimming to provide a portion with no pit at the pulse width of the CP bar code signal. Only data comprising 0s arranged successively is reproduced from this area. In the process (7) the bar code pulse duration is measured in a PWM demodulating section 621, thus demodulating the copy protect data. The user can detect the duplicated disk in this way. Further, as well as in FIG. 32, as shown in FIG. 68 the disk 2 is completed from the first original record 573 in the process (6), and the physical arrangement information 532 of the first original record 575 is encrypted and recorded so as to fabricate a second original record 575a. In addition, in the process (8) a transparent layer whose thickness is 30 $\mu$m is provided on the first reflective film 48, and pits are formed on the basis of the second original record 575a in accordance with the well-known 2P method before the second reflective film 48a is formed. Thus, the physical arrangement information 532 of the first reflective film 48 is recorded on the second reflective film 48a, which can realize a highly duplication preventing disk.

A detailed description will be made with reference to FIGS. 39 and 97 in terms of a recording method and detecting method for the second low-reflection section 751a recorded in the recording medium 2. First, as shown in FIG. 97 a plurality of second low-reflection sections 751 are set in a TOC area 752 of the recording medium 2. Due to the presence of the second low-reflection sections 751, data error takes place. That is, the area of the second low-reflection sections 751 is excessively large, there is a possibility that the normal signal does not develop. As means to avoid this, this invention employs two ways. The first way is, as shown in FIG. 97, to provide an area 758 with no second low-reflection sections on a track including the second low-reflection section area 759. In this case, the area 758 with no second low-reflection sections is required to be larger than a 1-track TOC information area 760. Thus, even if the data is not decoded at all from the second low-reflection section area 759, the data is completely reproducible from the second low-reflection are 760. Accordingly, assuming that the length of the area 758 on the track is taken as dN and the length of the 1-track TOC information area on the track is taken to be dT, if dN>dT, the TOC data corresponding to one track is reproducible. If the reproduction is surely made with one revolution, only dN>2dY is required as a condition. Since for CD-ROMs only the data corresponding to one track is recorded in TOC, if dN>2dT, the TOC data can surely be reproduced with one revolution. In the case of the CD-ROM, since dt=approximately 15 mm, as long as the portion not having second low-reflection section is provided by length of about 3 cm in one revolution, all the remaining portions can be used for the bar code serving as the second reflection section.

Secondly, a description will be made in terms of the interval dr between the second low-reflection sections 751a and the like in the second low-reflection section area. If the interval is excessively made narrow, the frame synchronizing signal is difficult to detect, so that the rotational control becomes impossible. For instance, the second reflective section is about 10 microns in width. For Cds the interval between the frame synchronizing signals is 180 microns, and therefore, if dr is 36 microns, the probability that the frame synchronizing signal is broken is ¼ so that the rotation servo operates. One of two frame synchronizing signals is needed. Accordingly, assuming that the average width of the second reflective section is taken as dw, if at least dw<dr, the rotational control becomes possible.

The second way is that, in the case where the data amount to be recorded in the second low-reflection section 751 is small, the interval 753, i.e., dr, between the second low-reflection sections 751 is set to be larger than the interleaving length dI, i.e., dr>dI. This allows the correction of the data error.

Moreover, a description will be made with reference to FIG. 97 in terms of a method of recording the ID number and a secrete key 771 such as the RSA cipher for the cipher communication. In the FIG. 97 recording system, a mixing means 548 mixes the first physical feature information, ID number, and the secrete key 771 from a secrete key generating means 761, which the mixture is in the lump enciphered in an encryption means and modulated in a PWM, or bar code, modulating means 763. In addition, a portion of the reflective film is removed by means of a recording means 762 such as the aforesaid laser trimming device, thereby creating the bar code-like second low-reflection section 751 as shown in FIG. 61. For the reproduction, the reproduced signal from the optical head is demodulated by a PWM, or bar code, demodulating means 763 and the secrete key is separated therefrom in a secrete key outputting section 765 so that the secrete information such as the code figure of a credit card to be transmitted is outputted from a communication data outputting section 767. The secrete information is enciphered with the secrete key 771 in a cipher encoder 767 having a one direction function such as the RSA function to create the second cipher, which is transmitted from a communication section 768 through a communication line 774 such as an internet to a second computer 770.

In the second computer 770, a communication section 769 receives the second cipher and a cipher decoder 774 searches the secrete key 771 from an ID number 776 of a corresponding table 775 to decode the second cipher on the basis of the secrete key 771. In this way, the code figure of credit card of the user is available in the second computer 770. The internet provides a problem in that the data security is low. However, according to this invention, a unique ID number and the communication secrete key independent of the ID number are recorded in the CD-ROM delivered to the user, whereupon the user can order a product to the second computer in accordance with a catalogue for shopping or the like included in the CD-ROM and, when giving the code figure of the credit card, send the information enciphered with the secrete key. On the other hand, the second computer can surely decode it with the secrete key 771 of the corresponding table 775. In the case of using the CD-ROM, the internet security drastically improves.

[Eighth Embodiment]

In the eighth embodiment, the inphase and negative-phase (antiphase) pits are detected as the second physical feature information. As shown in FIG. 62A, when detecting the address An, a control section 10 supplies an on-track switching signal to a tracking control circuit 24, and a track servo polarity inverting circuit 646 inverts the polarity of a tracking servo circuit 24a, there results in the change from the on-tracking state, i.e., traveling state on pits 46, as shown in FIG. 62B to the reverse polarity servo state as shown in FIG. 62C. Further, since a pattern comprising pits 46a and 46b is controlled to be located at ends of optical sensors 648a and 648b, the light beam travels between the two adjacent tracks. As shown in FIG. 62C, when the pits 46a and 46b of the adjacent tracks are in phase with each other, the crosstalk signals thereof are emphasized to produce an inphase reproduced signal 650. When being not in phase with each other, the normal signal does not occur. In particular, in the case of being 180-degree out-of-phase, the crosstalk signals are cancelled each other so that a signal whose amplitude does not vary is reproduced.

Figure 62:
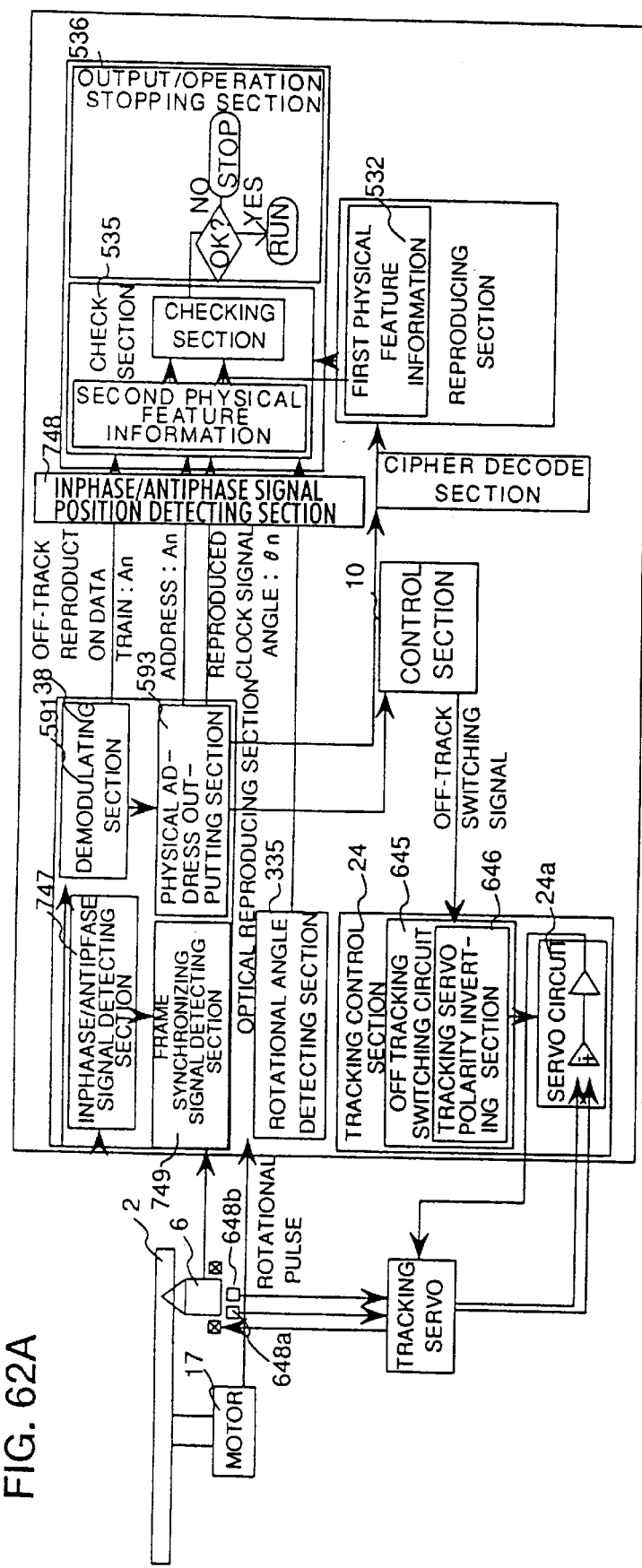
FIG. 62A is a block diagram showing a recording and reproducing system based on an off-track method in an eighth embodiment.
FIG. 62B is an illustration of tracking in an on-track condition according to an off-track method in the eighth embodiment.
FIG. 62C is an illustration of tracking in an off-track condition due to an off-track method in the eighth embodiment.
Figure 63:
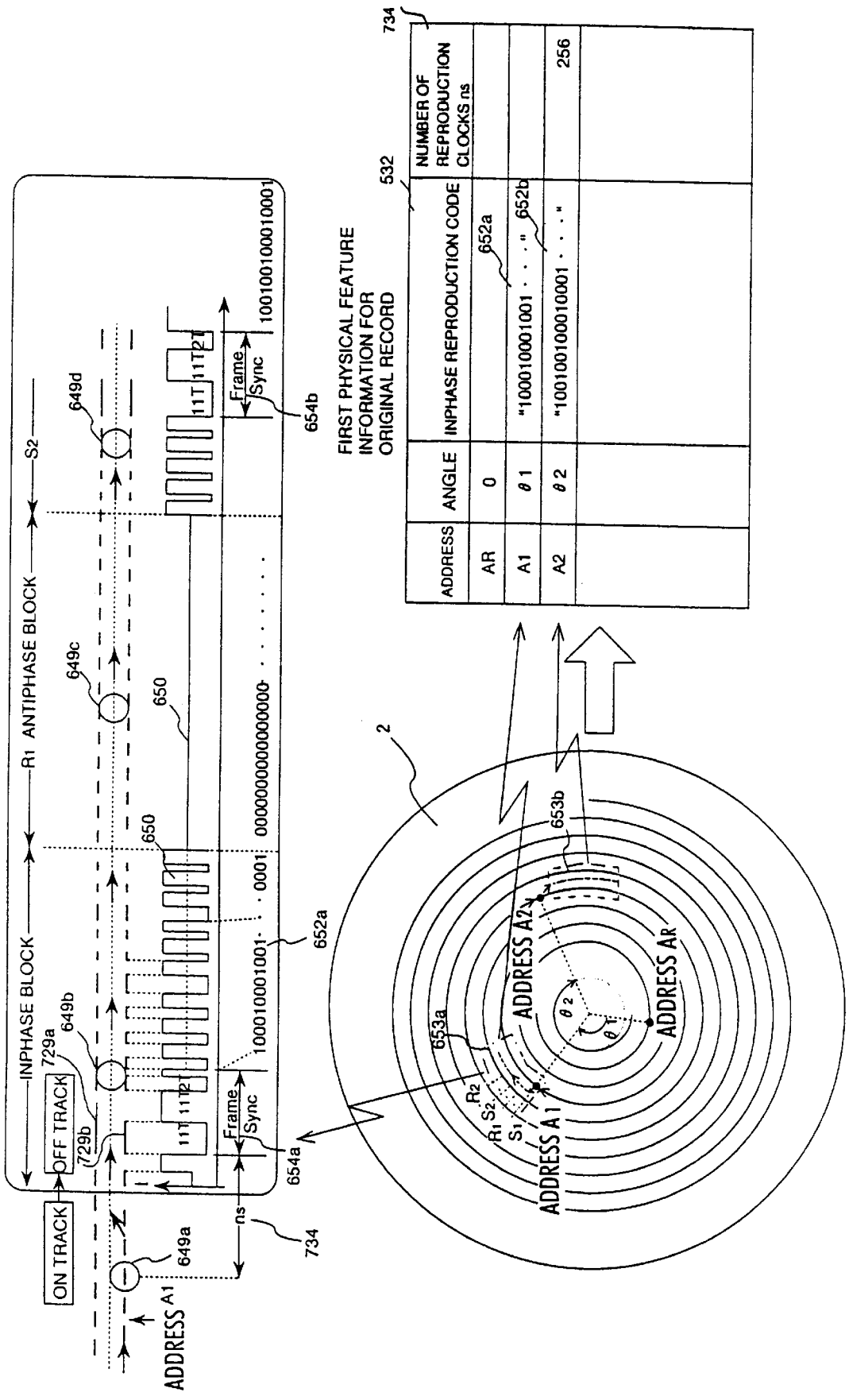
FIG. 63 is an principle illustration of a duplicate preventing method based on a combination of an arrangement angle detecting method and an off-track signal method in the eighth embodiment.

As shown in FIG. 63, when the off-track signal of all the data is reproduced from a CD, a plurality of pits 46 of the adjacent tracks are completely coincident and in phase with each other at an extremely low probability. In this area the continuous inphase signal blocks 653a, 653b and 653c are detectable for a given time period Ts. When jumping from a specific address An to an off-track, only the inphase blocks 653 are selected and extracted which reach the frame sync signal 654a of the inphase block S1. Further, the address An, arrangement angle θn and inphase reproduction codes 652a, 652b are stored in the original record physical ID table 532. This table is recorded in a bar code-like non-reflective section of an optical ROM section of the CD, or recorded in the magnetic recording section. For the reproduction of the CD, the original record physical arrangement table 532 is reproduced from the magnetic reproducing section of optical reproducing section in FIG. 62 and fed to the checking section 535. As shown in FIG. 63, on the basis of this data, the angle is set to 0 at the address Ak and then the jumping to the off-track is made at the address A1. The frame sync signal 654a is detected and at this time the angle θ1 is measured. Simultaneously, the inphase reproduction code 652a "100010001001" and the negative-phase reproduction code "0000000" are reproduced. The checking section 535 checks whether or not the measurement data is coincident with the original record physical ID table 532. If not coincident therewith, the output/operation stopping section 536 stops the operation or output of the program. A similar check is made to the inphase block 653b of the address A2 so as to check whether or not the angle θ2 of the frame sync signal of the inphase reproduction signal and the inphase reproduction code 652 "10010010001" coincide with the original record physical ID table 532.

In FIG. 63 method, the check is made as to whether or not the inphase reproduction code 652 of the inphase block is in coincidence. For duplicating this portion, the pit positions of the adjacent tracks are needed to be precisely formed with the accuracy of period T=0.5T at a frequency of 4.3 MHz. This accuracy is impossible except that the original record is cut at CAV. At the same time, the angular position On of the frame sync signal 654a is measured. The portion between the inphase blocks 653a and 653b is recorded with CLV. Accordingly, the high-accuracy recording is required with CLV for the coincidence of the angular position θn. That is, for the angle θn being completely coincident with the inphase reproduction code, CLV control is made with the accuracy of 0.5T to fabricate the original record. Thus, realizing this by the existing systems is impossible, and the combination of the angle θn and the inphase reproduction code allows the prevention of duplication of the original record.

Figure 93A:
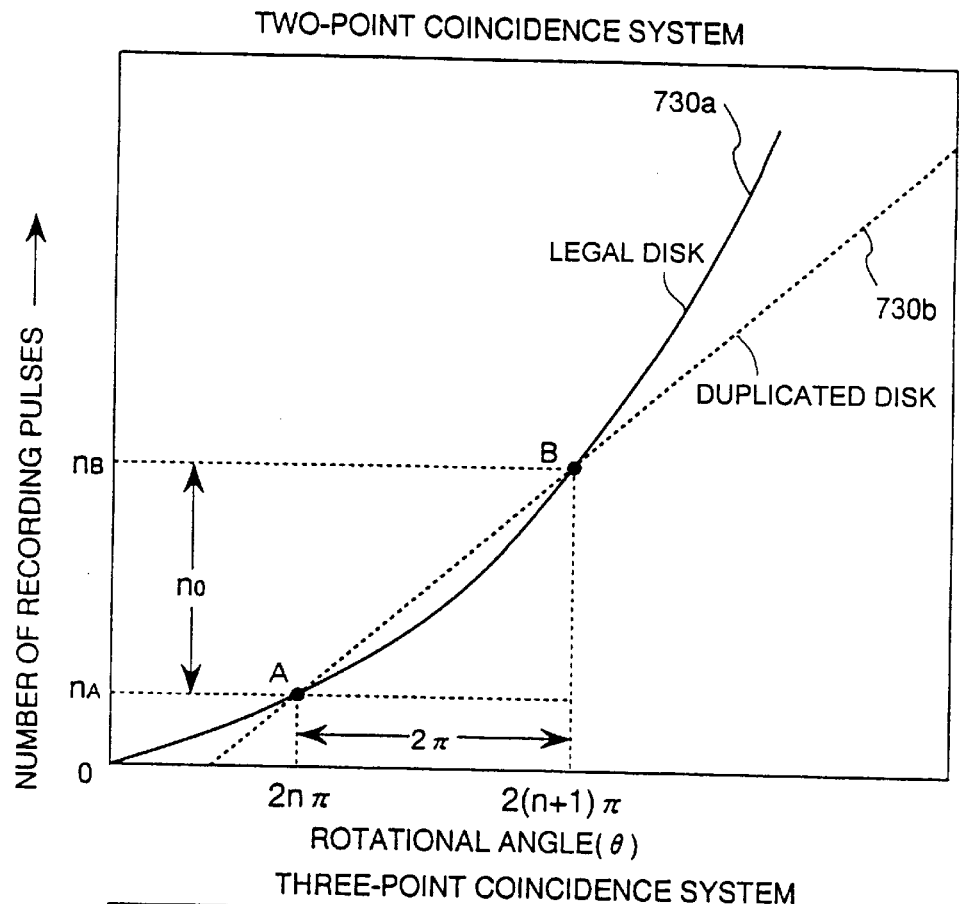

In FIG. 63, the frame synchronizing signals 729a and 729b of the two adjacent tracks become in phase with each other, and the area in which the inphase frame synchronizing signal 654a is detectable is found and used as the first physical feature information. As shown in FIG. 93A, because of CLV recording, as the rotational angle θ increases, the number of the recording pulses per one revolution increases as indicated by a curve 730a. In the case of the disk manufactured with CAV, the motor rotates at a constant speed, which allows the duplication of the recording signal with accuracy of 0.5T. On the other hand, in the case of the disk manufactured with CLV, the operation is performed at a constant linear velocity, and hence it is impossible to accurately duplicate the angles at which the pits are arranged. Since the disk of this invention is manufactured with CLV, it is impossible to achieve the high angular accuracy by the ordinary original record fabricating apparatus for CLV or CAV when manufacturing the disk. However, in FIG. 93A, if, taking note of the fact that the number of the recording pulses between a pair of inphase recording signals 731a and 731b at the points A and B separated by one revolution is n0, a constant rotational angular velocity by which the number of recording pulses per revolution becomes just n0 is calculated and the system is switched from CLV to CAV only in the A-B area so that the motor rotates at a speed for CAV and the CAV recording is made only in the A-B area, the recording corresponding to the curve 730b becomes possible. That is, if a CLV/CAV switching type original record fabricating apparatus is devel-oped in future, the duplication of the points A and B would be possible with accuracy of 0.5T in the two-point system, while the life, i.e., the time period from the elimination of the protect to the release of a pirate edition, lengthens from 3 years to 5 years.

Figure 92:
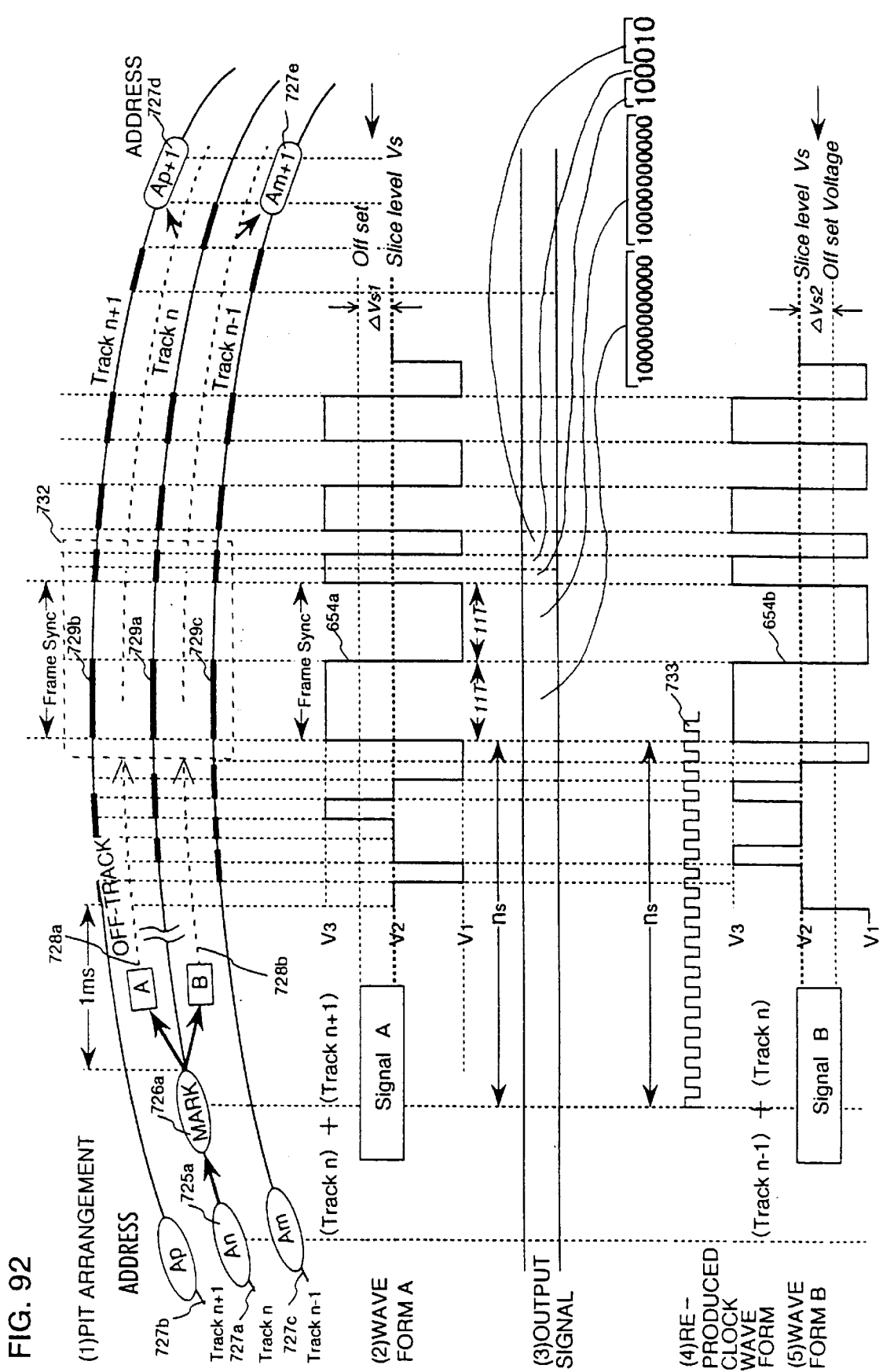

FIG. 92 illustrates a three-point coincidence system taken when there is a need for a higher protect level. In the three-point coincidence system, the first physical feature information is obtained from an inphase area 732 in which three frame synchronizing signals 729a, 729b, 729c of the adjacent tracks 727a, 727b, 727c are arranged in phase with each other. Although the probability that the three frame synchronizing signals are in phase with each other is low, according to the probability calculation, there are 63 areas per disk in the case of CD-ROM. In other words, there are several areas on any CD-ROM. Thus, it is possible to use the three-point coincidence system, i.e., employ the two inphase frame signals as the first physical feature information.

A description will be made in terms of a detection method similar to the FIG. 63 method. In the pit arrangement shown by (1) of FIG. 92, In response to the detection of a mark signal 726a subsequent to a specific An address 725a in a track 727a, the tracking is jumped toward the outer circumferential side and the polarity of the track servo is inverted as shown in FIG. 62 to carry out the off-track travelling, thereby jumping to an off-track 728a between the track 727a and a track 727b. Thus, the off-track section of the inphase signal area 732 is reached so that an inphase frame synchronizing signal 654a is outputted as shown by a waveform A in (2) of FIG. 92. The frame synchronizing signal has a maximum pit length of 11T and, hence, is easily distinguishable from other pits. In a reproduced clock waveform shown by (4) of FIG. 92, checking is made as to whether or not the count number ns of pulses from a mark signal 726a of a reproduced clock signal 733 is coincident with the number of pulses 734 in advance included in the first physical feature information in FIG. 63, whereby it is possible to prevent another inphase frame synchronizing signal from being detected in error. After the detection of the inphase frame synchronizing signal 654a, the jumping is made from an on-track 728a to an on-track 727a at the outer circumferential portion to confirm an address 727d, i.e., Ap+1, whereby confirmation can be made such that the detected inphase frame synchronizing signal 654a is an inphase signal of the tracks 727a and 727b, thus improving the security.

Furthermore, a description will be made in terms of a method of detecting an inphase frame synchronizing signal 654b between the tracks 727a and 727c. After the detection of the address 725a in the pit arrangement shown by (1) of FIG. 92, the jumping is made to a track in the inner circumferential side and the polarity of the track servo is reversed and the travelling is made on the off-track 728b, whereby as shown by a waveform B in (5) of FIG. 92 the inphase frame synchronizing signal 654b is detectable as long as it is a legal disk. Subsequently, the jumping is further made to a track 727c closer to the outermost circumferential portion and a given address 727e is detected, whereby it is possible to confirm the off-tracking between the tracks 727a and 727c. This permits the detection of the inphase frame synchronizing signals at three points.

Figure 93B:
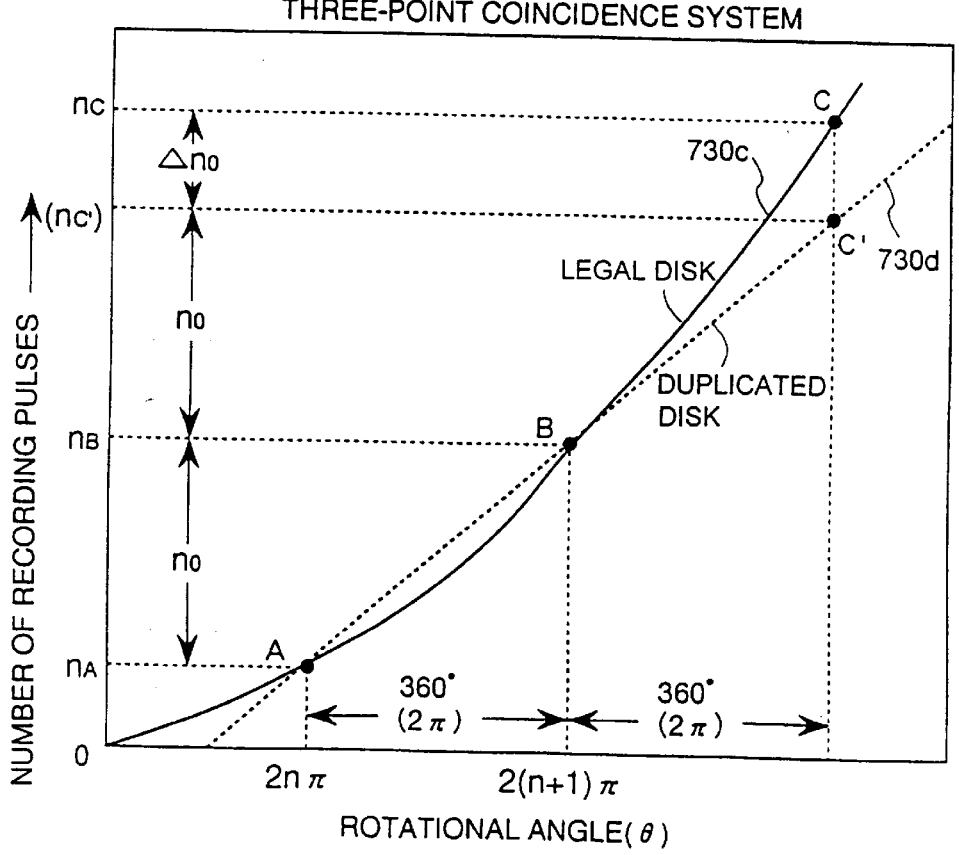

As shown by a curve 730c in FIG. 93B, the inphase signals are arranged at three points at an interval of 360 degrees with accuracy in unit of submicron, while the number of recording pulses is n0 between A and B and n0+Δn0 between B and C. Accordingly, in the case of performing the CAV recording, although the portion between A and B is duplicable, the portion between B and C takes the curve 730d whereby the point C is not duplicable (only the point C' is duplicable). That is, the number of recording pulses lacks by ΔnO and hence difficulty is encountered to duplicate this by the CAV/CLV switching type original record fabricating apparatus. Thus, the three-point coincidence method increases the degree of difficulty in duplication to more effectively prevent the fabrication of the pirate optical disk.

FIG. 94 is an illustration for describing the degree of difficulty in duplication in the case that a track in which two inphase recording signal areas exist in one revolution is used as the first physical feature information, which is higher than the degree of difficulty in the two-point coincidence system. In the case of the three-point coincidence system shown in FIG. 93B, the degree of difficulty in duplication becomes high, while the duplication may be possible with a clock control system being incorporated into the CAV/CLV switching type. However, in FIG. 94, if in addition the points A and B, the points C and D are provided in one revolution as indicated on a curve 730e to constitute a four-point coincidence system, a technique is required which measures the point C with angular accuracy of 10-7, whereby the duplication becomes extremely difficult. In addition to the aforementioned clock control system there is needed an angle detecting means with an extremely high accuracy, which relies on a technique which would be developed in future. Thus, if as shown in FIG. 94 the four-point coincidence system is employed, i.e., two or more areas including the inphase recording pits are provided in one revolution and used as the first physical feature information, the duplication becomes extremely difficult.

[Ninth Embodiment]

Figure 65:
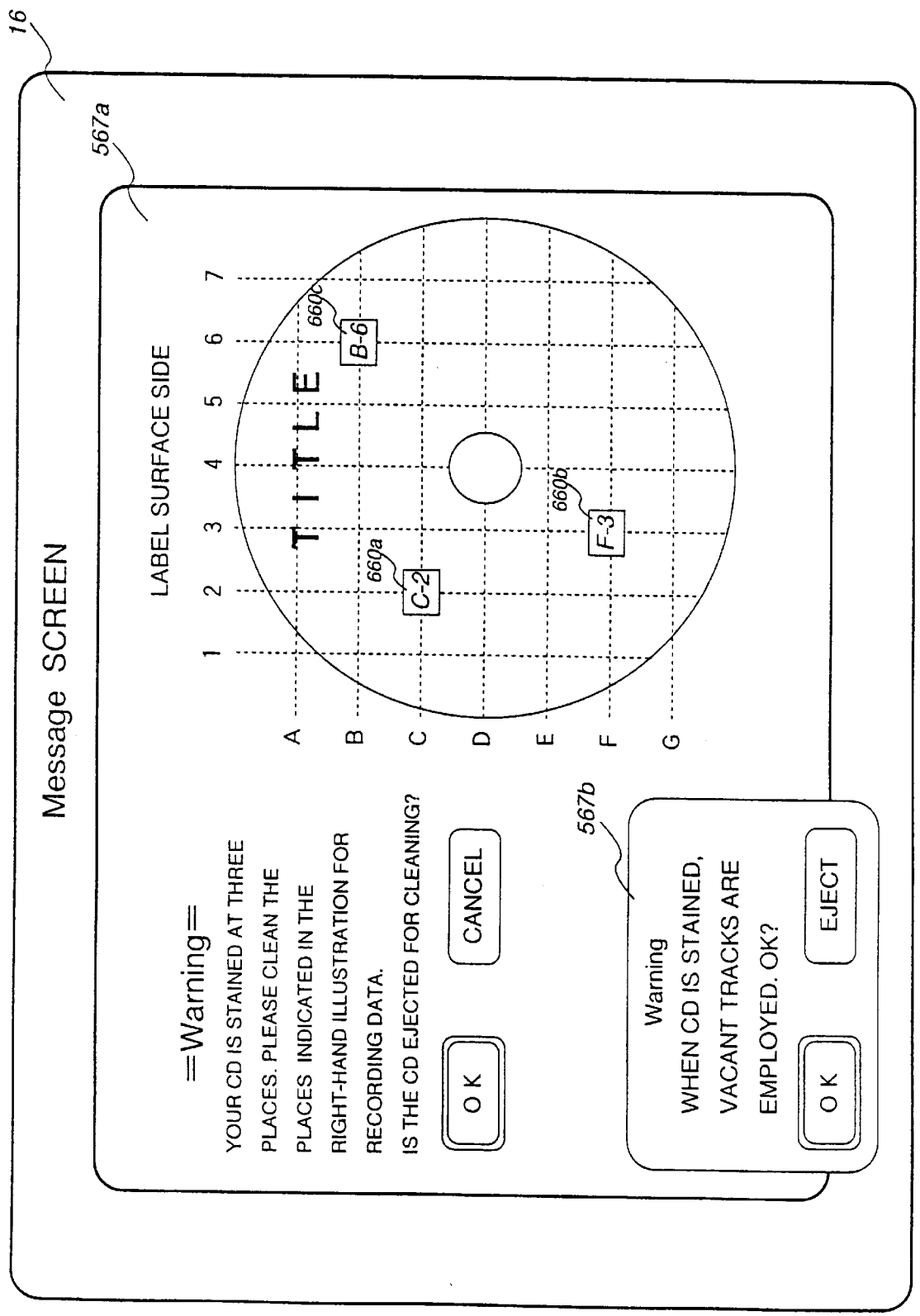
FIG. 65 illustrates a displaying state state of an error message in a display section in the ninth embodiment.
Figure 66:
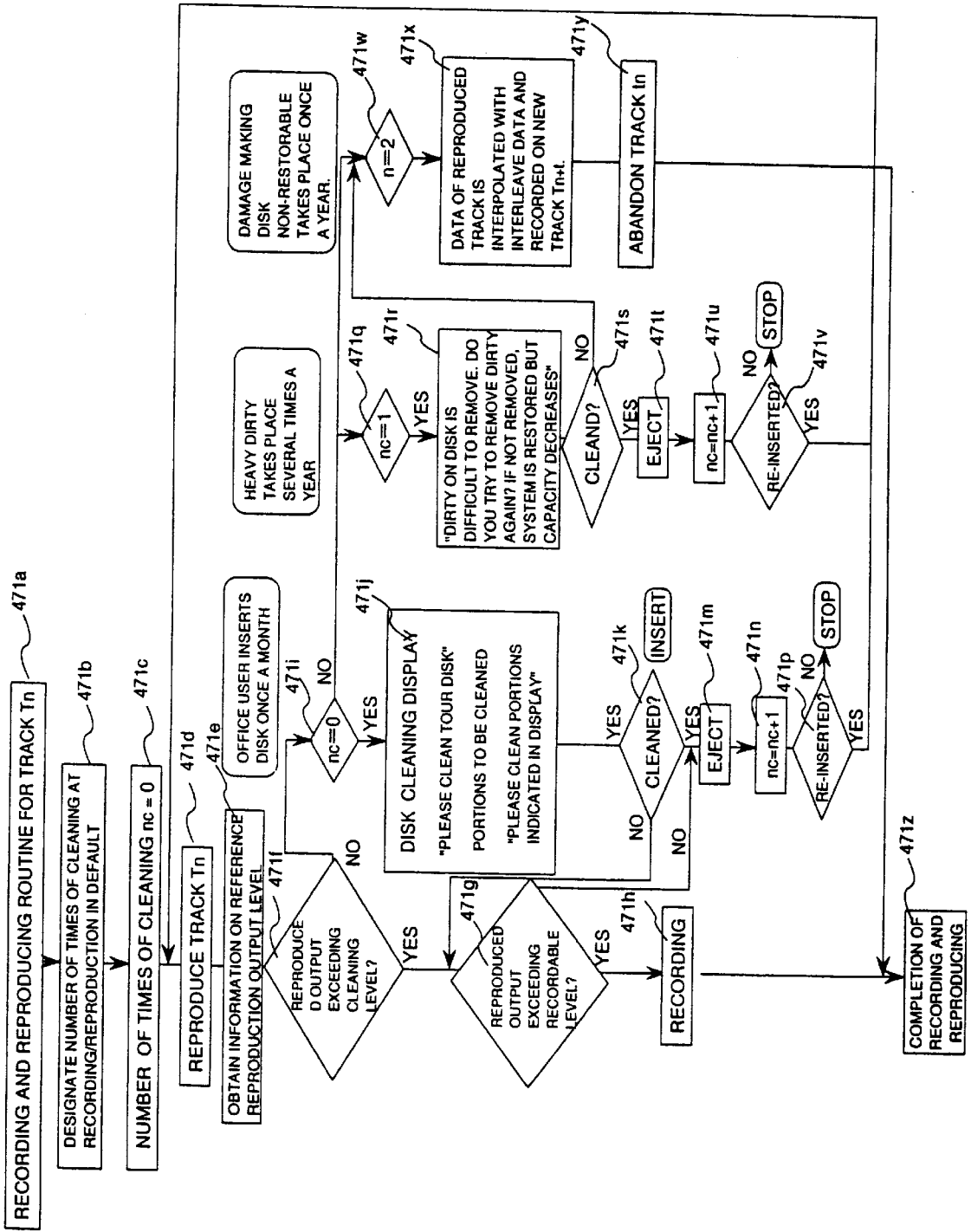
FIG. 66 is a flow chart showing a cleaning display in the ninth embodiment.

The ninth embodiment involves the detection of dirt or dust on a disk. As described above, a disk such as a CD according to the embodiment of this invention has a magnetic recording layer on its label surface. When as shown in FIG. 64A foreign substances 655a, 655b, 655c such as dust exist on the magnetic recording layer, the recording characteristic deteriorates, In a reproduction output detecting section 657 in FIG. 40, the reproduced output and a reproduction output reference value 658 are compared with each other, by which comparison the deteriorating state is detectable. In this case, since the relative angle is found by a disk rotational angle detecting section 335, the position of the track, on which the foreign substances 655 are present, and the angular position OD are detectable. With the position of the optical surface and angular deviation of the printed label being recorded on the magnetic recording layer, it is possible to calculate the angle of the output-lowering portion on the label-printed surface. In addition to the label-printing angles, the reproduced-output lowering sections 659 are displayed as the output-lowering marks 660a, 660b, 660c on a window 567 of a display section 16 as shown in FIG. 64B, whereby the user can recognize the places at which the foreign substances 655 exist and can easily remove the foreign substances 655. If the coordinates defined by vertical lines 1 to 7 and horizontal lines A to G are set in both the disk 2 and the display section window 567. FIG. 65 illustrates an example of an error message to the users on the windows 567a and 567b. FIG. 66 illustrates a foreign substance cleaning instruction routine in detail. In FIG. 66, in the case of recording a track Tn in a step 471a, a step 471d is executed to reproduce the track Tn and a step 471f is then executed to check whether or not the output of a reproduced-output detecting section 657 is above a reference value. If being below the reference value, the operational flow goes to a step 471i. If this is the first time, a step 471j is implemented to display the FIG. 65 error message for disk cleaning, before the disk is ejected. Further, the operational flow returns to the step 471d. If the output level is above the reference value, the recording is performed. On the other hand, if not above the reference value, the operational flow advances to a step 471r to have the disk again cleaned by the user. If the reproduced output is not restored irrespective of cleaning it three times, the operational flow proceeds to a step 471x to abandon the track Tn. At the same time, the data is recreated from the interleave data on another track and recorded on a new track Tn+t. Thereafter, the recording or reproduction is completed in a step 471z.

[Tenth Embodiment]

In the tenth embodiment, an offset signal is detected as the second physical feature information. As shown by a waveform (2) of FIG. 31, the pulse width of the signal is changed on the basis of the offset signal during the cutting of the original record for change of the duty ratio, whereby an offset voltage ΔVs develops as shown in a waveform (5). This is detectable by detecting the difference, i.e., the offset voltage ΔVs, between the reference slice level voltage and the slice level voltage from a slice level Vs outputting section 38b of a waveform-shaping circuit 38a in FIG. 40. In FIG. 38, the offset voltage arrangement information of the disk physical configuration table 532 is checked with the angular position or address arrangement from an offset voltage detecting section 660, whereby the detection of an illegally duplicated disk is possible.

[Eleventh Embodiment

A description will be made in terms of a method of stopping the operation of a program on a pirate disk and a method of stopping the operation of a program illegally copied. Since it is designed to be treated in a CPU 665 of a personal computer 676 including a disk drive as shown in FIG. 69, the description is made of the difference in hardware from FIG. 40. In FIG. 69, a second demodulator 662 different in system from an MFM demodulator 30d is provided as a demodulator of the magnetic reproducing circuit. The switching between the second demodulator 662 and the MFM demodulator 30d is made through a switching section 661. Since the corresponding modulator is placed only in the factory, the reproduction is possible but the complete recording is impossible. For this reason, in the case where the area specially modulated in the factory is recorded, the specially modulated signal is not recorded. In the drive side, the control is made by the CPU 665 such that the recording is impossible except that the specially modulated signal in the area is reproduced. Accordingly, it can be considered as a logical "write once" area and the recording can be done once. If the machine ID is recorded in this area, it becomes difficult to revise it by the user's drive. This prevents the install from being made to machines whose number is larger than the number of the machines allowed. In addition, the prevention of the start-up or operation of the program with the same ID number is monitored through an HDD of a second personal computer 663 connected through an interface 14 to a network 664, thereby preventing the operation of the soft illegally copied. The operation of the CPU 665 including the foregoing operation will be described with reference to a flow chart.

Figure 70:
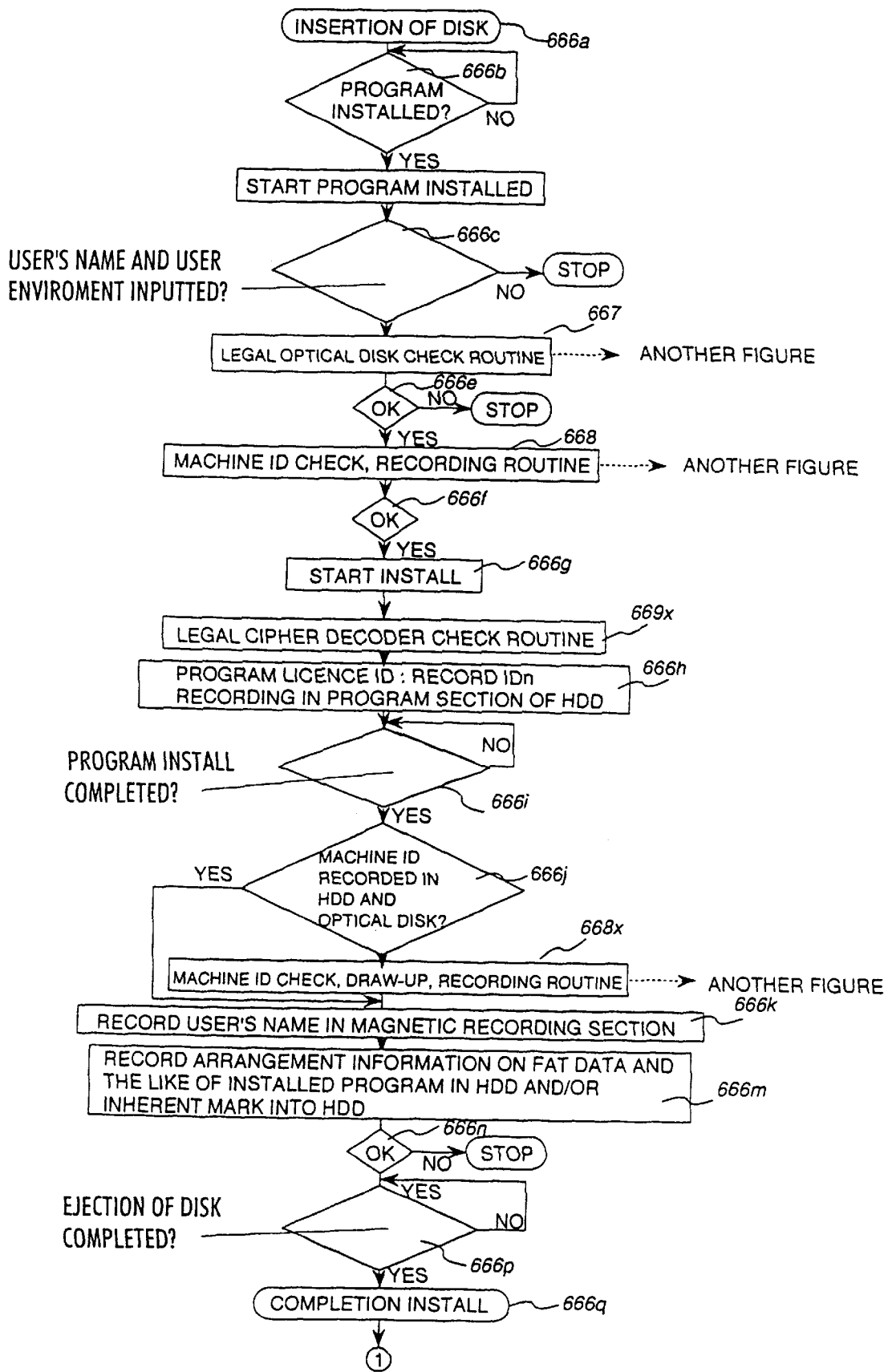
FIG. 70 is a flow chart showing an operation of the eleventh embodiment.
Figure 76:
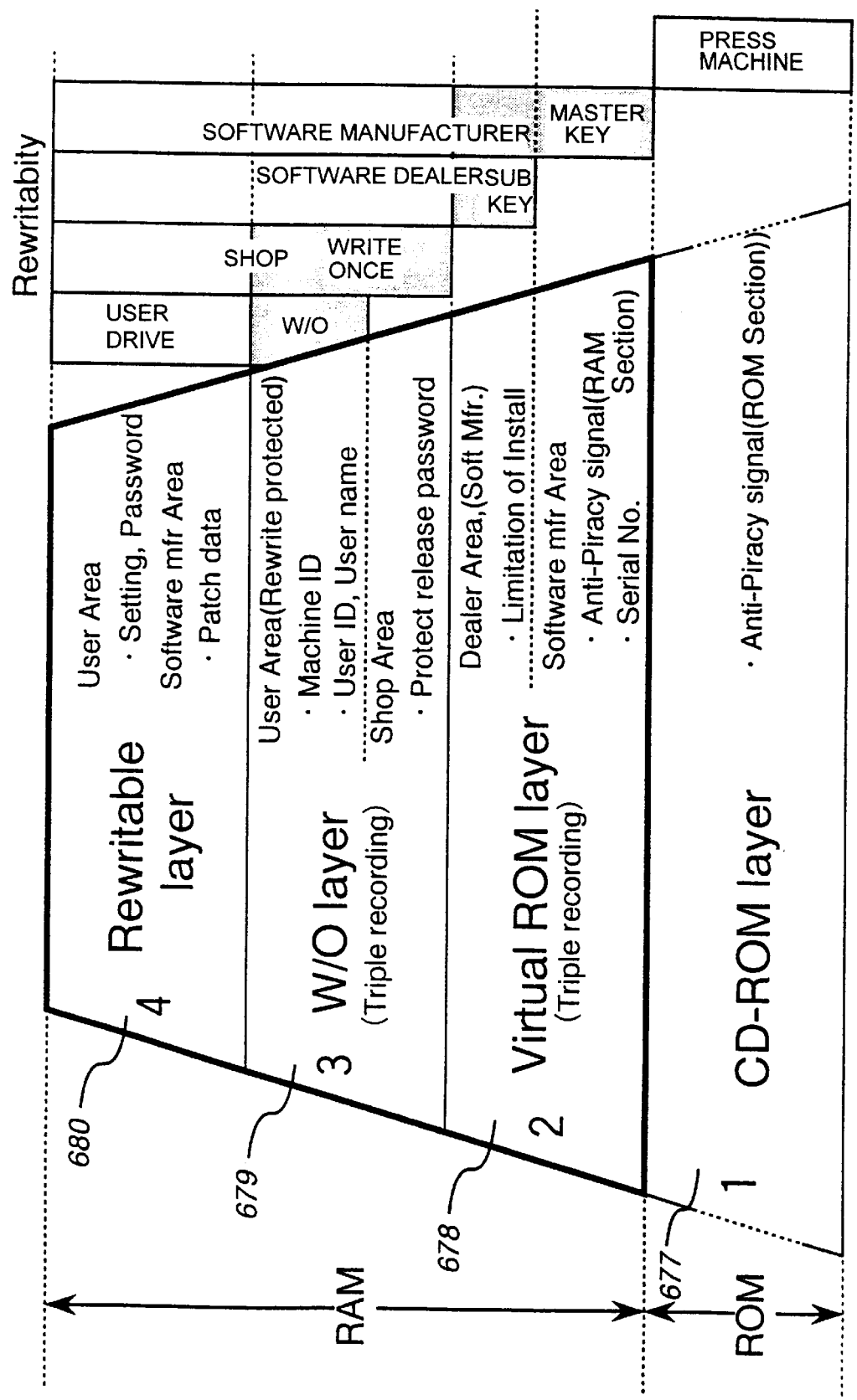
FIG. 76 is an illustration of a data hierarchical structure of a ROM section and RAM section of an optical disk in the eleventh embodiment.

FIG. 70 is a flow chart for describing the operation for installing a program. After the confirmation of the insertion of a disk in a step 666a, in a step 666b the install starts in response to an install instruction. In a step 666c the display on the user's name and user's environment is made on an input screen so that the user inputs at least the user's name. If inputted, the operational flow goes to a step 667, acting as a legal disk checking routine, where check is made as to whether it is a leal disk or a pirate disk. A detailed description will be made with reference to FIG. 72. The control enters into a check routine 667*a*, then followed by a step 667*b* to reproduce the optical disk, more specifically, to reproduce a serial number enciphered with a one direction function and recorded in the optical disk and different at every disk, and the information on the cipher decoder. In a step 667*c*, this cipher is converted into a plain text (nonciphered text) through the cipher decoder so as to obtain the ID number and physical feature information designated at 532 in FIG. 38. In a step 667*d* the disk physical feature information is measured to obtain the measured physical feature information which in turn, is checked with the aforesaid plain-text physical feature information. The detailed description will be omitted because of being made above. A step 667*e* is for checking whether or not the check result shows the coincidence. If not, in a step 667*f* the display indicative of "duplicated disk" is made on the screen and the program is stopped. On the other hand, if "YES", the operational flow proceeds to a step 668 to implement the machine ID check•fabrication•recording routine. A detailed description of this step will be made with reference to a flow chart of FIG. 73. First, in a step 668*a* all the machine ID numbers installed are read out from the magnetic recording section, i.e., a write once layer 679 in FIG. 76, of an optical disk, and then the ID number inherent in a personal computer and recorded in an HDD or ROMIC of the personal computer is read out so as to be checked with the machine ID numbers. If the decision result of a step 668*b* indicates the coincidence, the operational flow goes to a step 668*m* to exit from this routine. On the other hand, if no coincidence, a step 668*c* is executed to confirm, from the magnetic recording section, whether or not there is still present the flag indicating the remaining number of times of install to machines. If the answer of a step 668*d* is "NO", the operational flow goes to a step 668*e* so that the operation stops. On the other hand, if the answer is "YES", the operational flow proceeds to a step 668*f* to check whether or not the machine ID is present in the personal computer body or HDD. If "YES", the control jumps to a step 668*h*. If "NO", a step 668*g* is implemented so that the random number generator generates the machine ID which is recorded in the HDD. The next step 668*h* is executed for checking whether or not the install of the soft into the HDD has been completed. If "NO", the control jumps to the step 668*m*. In this case, there is no pass. On the other hand, if "YES", a new machine ID for this personal computer is recorded in the magnetic recording section, i.e., write once layer 679, of the optical disk. If OK in a step 668*j*, the operational flow goes to the step 668*m* to exit from this routine. In this routine, because of the use of the write once layer 679, the user's drive can not revise the machine ID, which prevents the illegal dubbing. Thereafter, the operational flow goes to a step 666*f* in FIG. 70. The install operation starts in a step 666*g* and the legal cipher decoder checking routine is implemented in a step 669*x*. This routine will be described in detail with reference to FIG. 74. A step 669*a* is executed to read out the cipher decode program recorded in the program installed and a step 669*b* is subsequently executed to read out specific encrypted data from the program or HDD, then followed by a step 669*c* to convert the data into a plain text through the cipher decode program. A step 669*d* is implemented in order to check whether or not it is right. If right, in a step 669*f* the plain-texted data is incorporated as a portion into the program <u>a</u> for operation. The operation is checked in a step 669*g*. If it is not good, the operational flow advances to a step 669*h* to stop the program. If OK, the control advances through a step 669*i*. In this case, the operational flow returns to a step 666*h* in FIG. 70 wherein, checking the install-allowable flag 653 described with reference to FIG. 58, and if, for example, the third install-allowable flag is vacant, the figure of the basic program number "00000001" is taken up one place so as to issue the program licence ID number IDn "000000013" which in turn, is given to the program to be installed in the HDD before recorded. When the install of the program is completed in a step 666*i*, a step 666*j* follows to check whether or not the machine ID for this personal computer has been recorded in the HDD and optical disk. If "YES", the operational flow proceeds to a step 666*k*. If "NO", the operational flow advances to a step 668*x* to perform the machine ID check•Drawing-up•recording routine and then carry out the operation which has already described with reference to FIG. 73. Although the same explanation will be omitted, since at this time the basic install has been completed, the answer of the step 668*h* turns YES whereby the new machine ID is recorded in the magnetic recording section of the optical disk in the step 668*i*. In addition, when the step 668*j* decides the completion, the control passes through the step 668*m* to exit from this routine. Thereafter, the operational flow returns to the step 666*k* to record the user's name on the write once layer 679 in FIG. 76 and to record the environment setting information on a rewritable layer 680. Since the user side drive can not revise the user's name as described above, it is possible to expose the illegally copying person and hence to provide the copy preventing effect. In a step 666*m*, the physical address arrangement of the installed program in the HDD, for example, the start/end FAT information and/or the mark information of the install ID, is recorded in the HDD and used as the copy detection information afterwards. If OK in a step 666*n*, the operational flow goes to a step 666*p* to eject the disk and then to a step 666*q* to complete all the install. According to this invention, the disk check allows the elimination of the pirate edition, and the check on the replacement of the cipher decoder improves its security.

Figure 71:
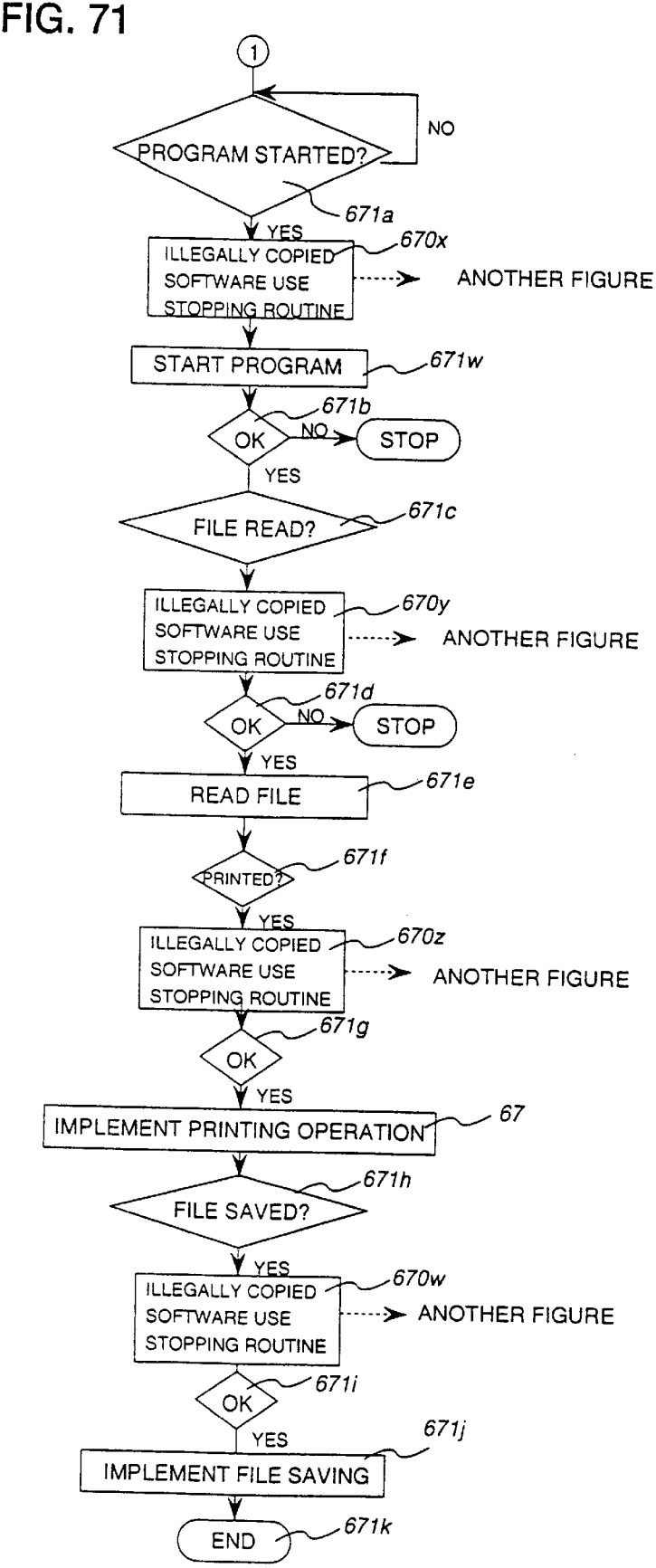
FIG. 71 is a flow chart showing an operation of the eleventh embodiment.
Figure 72:
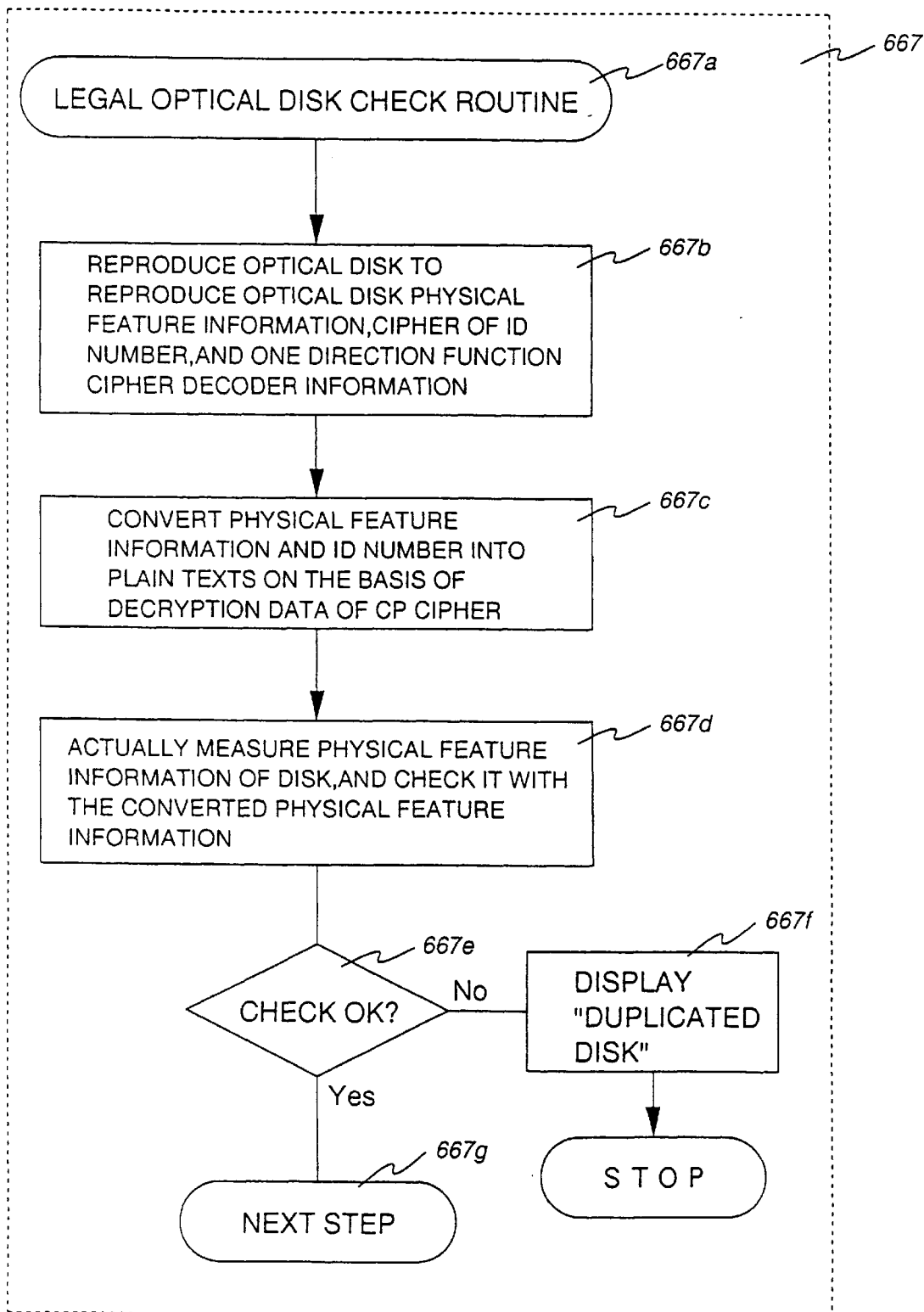
FIG. 72 is a flow chart showing an operation of the eleventh embodiment.
Figure 73:
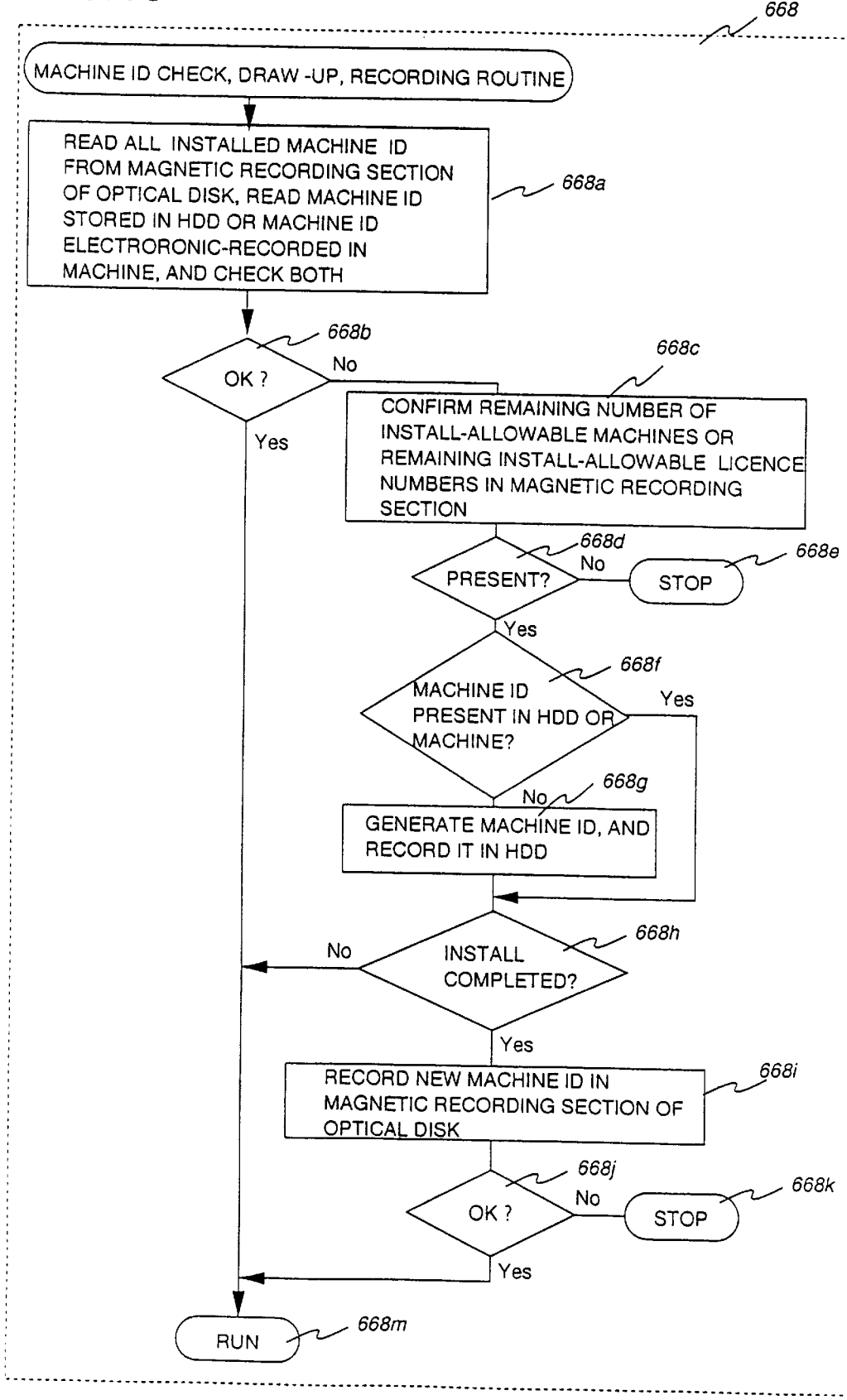
FIG. 73 is a flow chart showing an operation of the eleventh embodiment.
Figure 75:
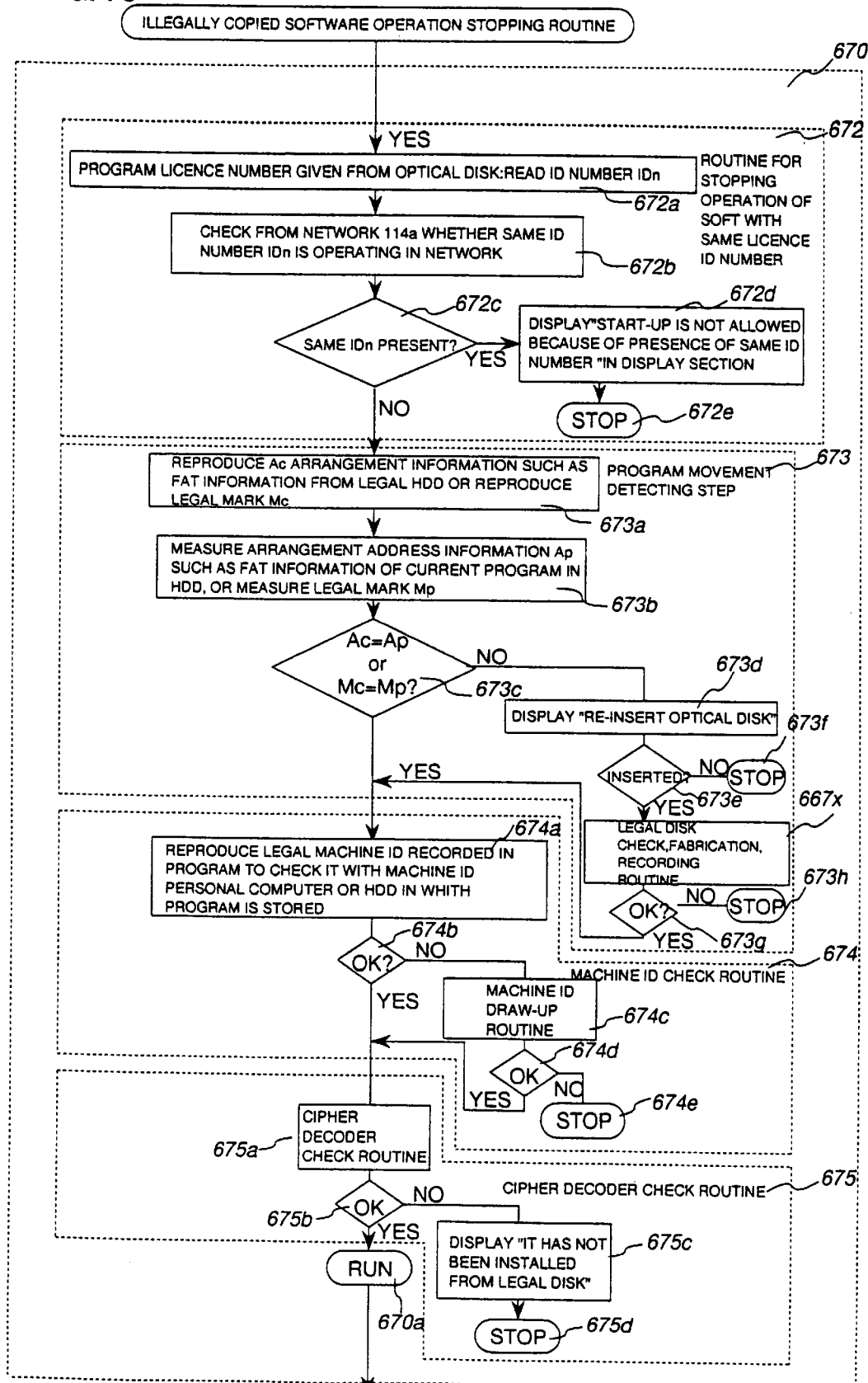
FIG. 75 is a flow chart showing an operation of the eleventh embodiment.

The operational flow subsequent to FIG. 70 will be described with reference to FIG. 71. With the above operation, the program is once installed in the HDD 682 in FIG. 69. When the start-up instruction for this program is inputted in a step 671*a*, an illegal copied-soft use stopping routine is operated in a step 670*x*. A detailed description of this sub-routine will be made with reference to FIG. 75. The operation comprises four blocks: a routine 672 for stopping the operation of the soft with the same ID number, a program movement detecting step 673, a machine ID checking routine 674 and a cipher decoder checking step 675. First, a description is made in terms of the block 672. A step 672*a* is executed to read out the licence IDn of the program previously given from the optical disk, and a step 672*b* is implemented to check, from the network 664 by the network section 14 in FIG. 69, whether or not the program with the same IDn is in operation in the HDD of the second personal computer 663. If the program with the same IDn is found in a step 672*c*, the operational flow goes to a step 672*d* to display the massage "operation is not allowed because the soft with the same ID number is in operation" on the display section 16 and to stop it. On the other hand, if "NO" indicative of no same ID, the operational flow advances to a step 673*a* to reproduce the arrangement information Ac such as the FAT information of the program in the legal HDD or a legal mark Mc recorded at a portion other than the program area during the legal install. In a step 673b, the arrangement address such as the FAT of the program in the HDD is measured to obtain Ap or reproduce the legal mark Mp, then followed by a step 673c to check Ac=Ap or Mc=Mp. If the answer is "NO", since at least it is considered that the program is moved to another HDD, a step 673d follows to display "re-insertion of optical disk. If the optical disk is not inserted in a step 673e, the operation stops. On the other hand, if inserted, the legal disk checking routine described with reference to FIG. 72 is implemented in order to check whether it is a legal disk. In addition, in a step 673g check is made as to whether the ID number of the program is coincident with the ID number of the optical disk. If OK, the operational flow goes to a step 674a to reproduce the legal machine ID given to the program, which is checked with the machine ID of the personal computer in which the program is stored or the machine ID of the HDD. If "NO", the control enters into a step 674c, i.e., the machine ID check•draw-up•recording routine 668 described with reference to FIG. 73. The machine ID is checked and newly recorded. If the answer of a step 674d is "NO", the operation stops. If OK, the operational flow goes to a step 675a to check the cipher encoder. This routine is the same as that of FIG. 74, and the description thereof will be omitted. When the answer of the step 674b is "NO", this means that the cipher decoder is replaced. Accordingly, a step 675c is executed to display "no install from legal disk" and the operation stops. If the answer of the step 674b is OK, the operational flow goes to a step 670a and further advances to the next step 671b in FIG. 71. The program is started in a step 671w. If OK, in response to a file reading instruction in a step 671c, the illegal copy use stopping routine is also activated in a step 670y. If OK, the file is read out in a step 671e. Further, when a step 671f decides a print instruction and a step 671h decides a file save instruction, the illegal copy soft use stopping routine comes into operation. If OK, the printing or file save operation is put into practice. Thus, since the soft copy is checked at the time of each instruction, it is possible to stop the use of the soft illegally copied into another personal computer in a network. The combination of the copy preventing method and pirate edition preventing method based on a one direction function in this invention provides a high degree of security.

[Twelfth Embodiment]

The twelfth embodiment is made in connection with an MPEG scramble release key. FIG. 77 illustrates an MPEG scramble encoder. The MPEG image compressed signal is divided into a variable length sign section 683 of an AC component and a fixed length sign section 684 which are respectively equipped with random number adding sections 686a and 686b for scrambling. In this embodiment, a scramble release signal of a key 687 is enciphered through an cipher encoder 689a. In addition, a portion of a compression program of an image compression control section 689b is compressed by an cipher encoder 689b. For this reason, it becomes difficult that the duplication traders replace the cipher encoders.

FIG. 78 illustrates an enciphering arrangement for a parameter of a compression parameter section 691. FIG. 79 is a flow chart for a reproducing system. In steps 681a and 681b the cipher encoder on the one direction function and the cipher are reproduced from a TOC section of the optical disk, and in a step 681c the cipher is converted into a plain text by means of a decoder to obtain the physical feature data. In addition, the disk physical feature is measured. If OK, the reproduction starts in a step 681f. Then, a step 681g follows to reproduce the cipher of the scramble key and expansion key, and a step 681h further follows to convert the ciphers and the image expansion program into a plain text. If a step 681i decides that these are right, a step 681j is implemented to scramble-release a scramble image signal, and a step 681k is executed to expand a compressed image signal. If a step 681m decides that the expansion is correct, the reproduction continues in a step 681p.

In the case of this embodiment, it is strictly required to prevent the one direction function cipher encoder from being replaced. In the FIG. 79 method, since a portion of the image compression program is encrypted by the same cipher encoder, the replacement of the cipher encoder is impossible except that the image compression program or compression parameter is released, thus improving the security.

[Thirteenth Embodiment]

The thirteenth embodiment relates to a system wherein a plurality of cipher decoders comprising one direction functions such as an elliptical function is stored in a ROM of a drive and a cipher made by keys of a plurality of cipher encoders is converted into a plain text. This will be described with reference to a flow chart of FIG. 83. In a step 693a all or a portion of the data contents are enciphered by first to mth sub-cipher encoders to produce Cs1 to Csm. In a step 693b, or in a step 693c in the case of recording before TOC, the data including this cipher is recorded in a first recording area of the original record, and in a step 693e the disk physical feature information is measure as described before. Further, in a step 693f the physical feature information and sub-cipher decode information are transmitted through an internet communication line to first to nth master encrypting apparatus. In the first master cipher center of the first to nth apparatus, the data is received in a step 694a and in a step 694b is enciphered in a main encryption routine. This operation will be described in detail with reference to FIG. 84. A plain text Mn is inputted in a step 695a and combined (synthesized) with an ID number or the like. In a step 695b, using a one direction function such as the RSA function, it is enciphered by a secrete key of d=512 bits, then followed by a step 695c to output the nth master cipher Cn. After this, the operational flow returns to a step 694c in FIG. 83 to check whether the n+1th, i.e., second, master encrypting apparatus is in operation or not. If "YES", the operational flow goes to a step 694d to transmit the first master cipher C1 to a pressing factory. On the other hand, if "NO", in a step 694e the main encryption routine M1 is enciphered using a second cipher encoder 693v the first master cipher center has as a spare, thereby producing a second master cipher C2. In a step 694f the second master cipher C2 is transmitted. In a step 693g the first to nth master ciphers are received and in a step 693h they are combined sp as to draw up an integrated cipher C1. A step 693u follows to check whether the C1 is recorded in the original record. If "YES", in a step 693i the C1 is recorded in a second recording area of the original record. On the other hand, if "NO", the operational flow goes to a step 693j to check whether the data contents are recorded or not. If not recorded, the operational flow advances to a step 693k to record them in a first recording area of the original record for the fabrication of the original record, before a disk is made and a reflective film is formed thereon. A step 693q is implemented to check whether or not the C1 is recorded ion the reflective film. If "YES", the operational flow goes through a step 693r into a reflective film C1 recording routine. This routine will be described with reference to FIG. 85. A step 696b is executed to check whether the physical feature of the reflective film is made or not. If "YES", notches (cut portions) are formed at random in the reflective film by means of a laser trimmer or the like, and the physical feature information on the notches are measured in a step 696d. If "NO", the operational flow advances to a step 696e to check whether or not to use the master cipher encoder. If "YES", a step 696f is implemented to transmit the physical feature and sub-cipher decode data to perform the first to nth master encryptions in the master encryption center. They are received in a step 696h, then followed by a step 696k. On the other hand, if "NO", the operational flow goes to a step 696i to issue the serial number IDd at every disk and encipher the IDd and the physical information by using the mth sub-cipher decoder to make a sub-cipher Cs. Subsequently, in a step 696k the Cs or CR1 to CRn are formed on the reflective film in the form of notches.

Returning back to FIG. 83, a protective layer or magnetic layer is formed in a step 693s and the disk is completed in a step 693t. In this case, in the mastering apparatus 529, the description of the external cipher encoder 579 in the network (FIGS. 1 and 10) is omitted because it has been described with reference to FIG. 29. Since different n cipher keys are present on line at different areas in the world, the risk decreases. In addition, the operation does not start except that all the n cipher keys are used for cipher coincidence, thus providing a high degree of safety.

A description will be made with reference to FIG. 86 in terms of the cipher decoder in the reproduction of this disk. The reproduction of the disk starts in a step 697a, and the integrated cipher C1 is reproduced in a step 697b and divided into the respective ciphers C1 to Cn in a step 697c which in turn, are converted into plain texts by the corresponding cipher decoders Dc(n) in the cipher-plain text converting routine of a step 697v. After setting of n=0, n is incremented by one in a step 697 before being previously recorded in the ROM section 699 of the drive of the personal computer 676 in FIG. 69. The corresponding decoders are read out from the master cipher decoders DC(1) to DC(n), and the cipher Cn is converted into a plain text. This plain text conversion routine will be described in detail with reference to FIG. 87.

Figure 87:
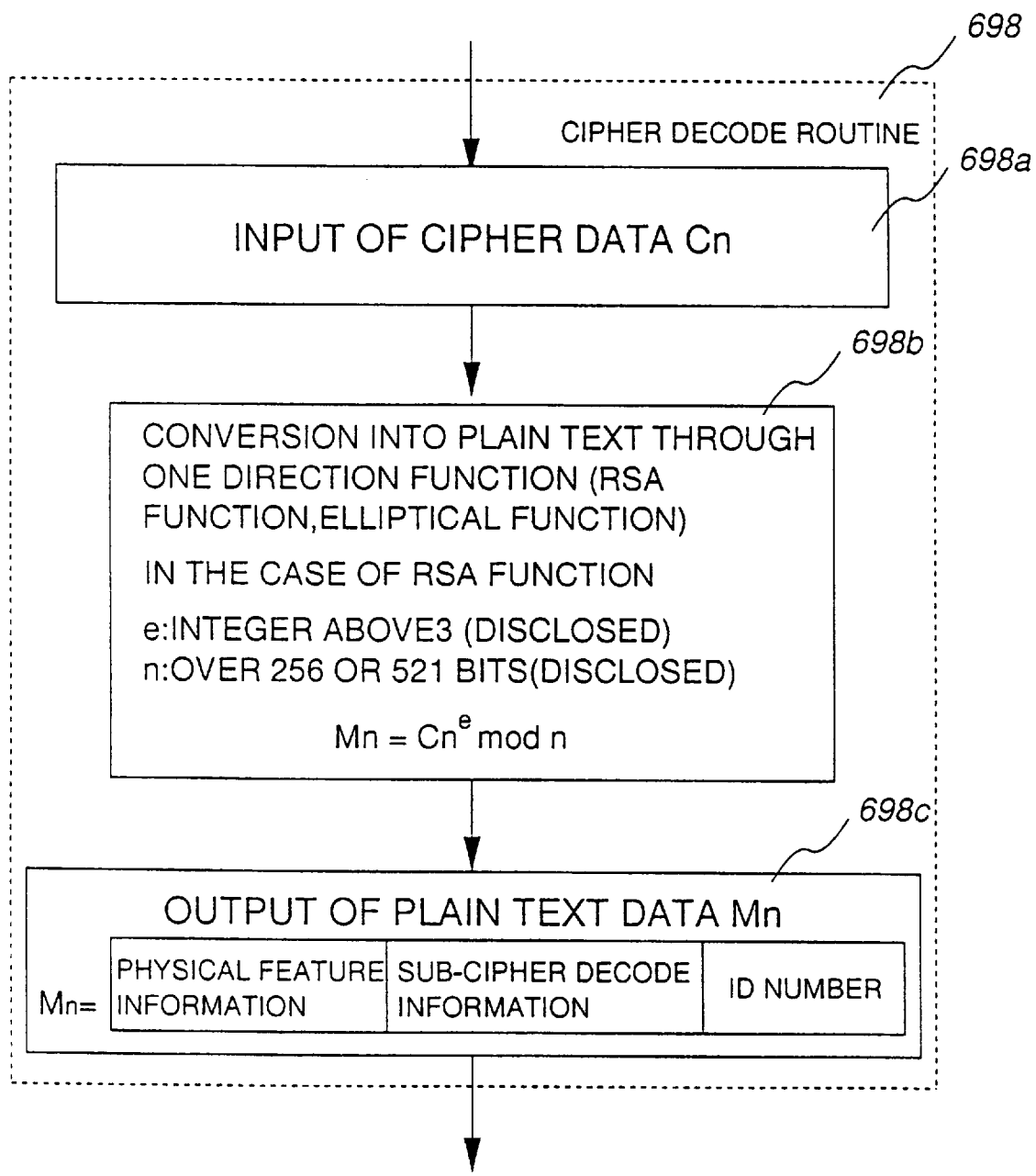

In FIG. 87, a step 698a is executed to input the cipher Cn, then followed by a step 698b to convert it into a plain text on the basis of a one direction function. In the case of RSA, the condition can be satisfied when e is above 3 and n takes a disclosed key above 256 bits. Both are disclosed data. Since in the case of RSA difficulty is experienced to obtain the encryption function on the basis of these decode functions, the secrecy can be maintained. In a step 698c the plain text data Mn is outputted.

Returning back to a step 697h in FIG. 86, checking is made as to whether the plain text is correct or not. If "YES", the operational flow goes to a step 697i to check whether n is the last. If the answer of the step 697i is "NO", the operational flow returns to the step 697f. If "YES", the operational flow advances to a step 697j to check whether the plain text data coincidence system for all the ciphers is taken or not. If so, a check is made as to whether or not all the data M1 to Mn are in coincidence. If "NO", the operation stops. If "YES", the operational flow goes to a step 697m to output the physical feature information and so on. Further, the measured physical feature information data are measured in a step 697n so as to be checked with the outputted physical feature information in a step 697p. If not coincident therewith, the operation stops. On the other hand, if "YES", the operation is permitted. Subsequently, in a step 697r the scramble key enciphered in the sub-ciphering device is converted into a plain text on the basis of the sub-cipher decode information, or the ID number and the sub-cipher of specific data are understood. If the plain text conversion is correctly carried out, the operation runs. If not correct, the operation stops.

In this case, the sub-cipher decoder is converted into a plain text by the master cipher decoder of the ROM of the drive. Accordingly, it is possible to prevent the illegal duplication traders from replacing the sub-cipher encoder with the decoder for the duplication. In addition, the pirate edition can not operate except that they have the n master cipher keys and all the keys are leaked. The security drastically improves because of the one direction function cipher key duplicated.

A description will be made with reference to FIGS. 95 and 96 in terms of the encryption based on an elliptical function different from the RSA function. Roughly describing big routines, a step 735a is executed to make the first physical feature information, a step 735f is implemented to make the attestation cipher of the first physical feature information, a step 735n is executed to attest the first physical feature information, and a step 735w is implemented to check the disk. In the step 735a, the disk physical feature is measure in a step 735b to obtain the first physical feature information. The first physical feature information is combined with the ID number and sub-cipher decoder number in a step 735b and compressed in a step 735d. The compressed information H is obtained in a step 735e. An attestation number is drawn up in a step 735f. First, in a step 735g a secrete key X (X=128 bits or more) is inputted, and in a step 735h a disclosed system parameter G is determined at a point on an elliptical curve and f(x) is set as a one direction function and k is set to be a secrete random number. In this case, R=f (Gk) is obtained and R'=f (R) is then obtained so that in a step 735i the attestation ciphers R and S are produced in accordance with an equation S=(K×R'−H)X−1 modQ. In a step 735j the attestation ciphers R, S and the plain text H including the first physical feature information are recorded on a disk or original record. The disk is put on the market in a step 735k.

On the other hand, in the reproducing system side, a step 735m is executed such that the disk is mounted, and in a step 735p the attestation ciphers R, S and plain text H are reproduced. Further, in a step q the disclosed parameters G, Q are obtained, and in a step 735r a disclosed key Y of more than 128 bits is inputted, and further the decode calculation is performed. The calculations of A=SR−1 modQ and B=HR−1 modQ are performed under the condition of Y=Gx. In a step 735t, the calculation of R=f(YAGB) is performed so as to check whether or not the right- and left-hand sides are coincident with each other. If "NO", in a step 735u a decision is made such that it is a duplicated disk, then followed by a step 735v to stop the operation. If "YES", since it indicates that the plain text is nore revised, the operational flow goes to a step 735w in FIG. 96 to expand the plain text H. Subsequently, a step 736b is implemented to output the first physical feature information, ID number and sub-cipher decoder number and a step 736c is executed to measure the disk physical feature to obtain the second physical feature information. In a step 736d, the first and second physical feature information are checked in the checking section, and in a step 736e a coincidence decision is made therebetween. If "NO", the operational flow goes to a step 736f to display "duplicated disk" and then to a step 736g to stop the program. On the other hand, if "YES", the operational flow advances to a step 736h to execute the program or output the reproduced data. In the case of the elliptical function, the plain text of the first physical feature information and attestation cipher are sent, whereby it is possible to reduce the cipher decode time because the data amount of the attestation cipher is small. The disclosed key cipher system is described in detail by "Elliptic Curve Cryptosystems", written by Kobliz, N., Mat h Comp. 48(1987), pp. 203–209.

[Fourteenth Embodiment]

A description will be made with reference to FIGS. 88A, 88B and a flow chart of FIG. 89 in terms of the fourteenth embodiment relating to a method of recording the cipher information for the pirate edition prevention in a second recording area 708 in which TOC and so on are recorded in the fabricating process of an optical disk original record. FIG. 88A shows a state in which a signal is recorded a first recording area 707 of an original record 700a which is for chiefly recording program softs or image signals. In the case of the common CD or LD, TOC is provided at an inner circumferential portion and the recording starts from the inner circumferential portion. However, in this invention, a recording signal outputting section 723 generates a signal in a direction opposite to the time-axis direction unlike the direction of the common signal. Accordingly, in a step 711b of the flow chart of FIG. 89, the optical head 6 records the signal from an outer circumferential portion and tracking-controlled toward an inner circumferential portion so that spirally arranged pits (a first recording line 709) are recorded in the first recording area 707. At this time, in the mastering apparatus, a rotational angle detecting section 17a of a motor 17 generates rotational angle data with high accuracy and a recording signal outputting section 723 outputs data such as addresses, Accordingly, These data are simulation-treated in a physical feature measuring section 703. Thus, a CPU 724 can simulate, in units of submicrons, the formation of the pits on the original record. In a step 711c all the physical feature information on the original record are measured, and in a step 711d the measurement is made as to how each pit having a given relation to an address takes an angular position on the original record so as to extract the feature section which is extremely difficult to duplicate. It is also appropriate to take the information merely indicative of the angle of the pit in a given address. Moreover, when an area in which the pits of the adjacent tracks accidentally assume the same pit table and pit arrangement is found, it is possible that the angular position or address position, track number and inphase pit data train are used as the physical feature information. The physical feature information has repeatedly been described above with reference to FIGS. 10, 18, 20, 38 and 43, and the description thereof is omitted.

Figure 84:
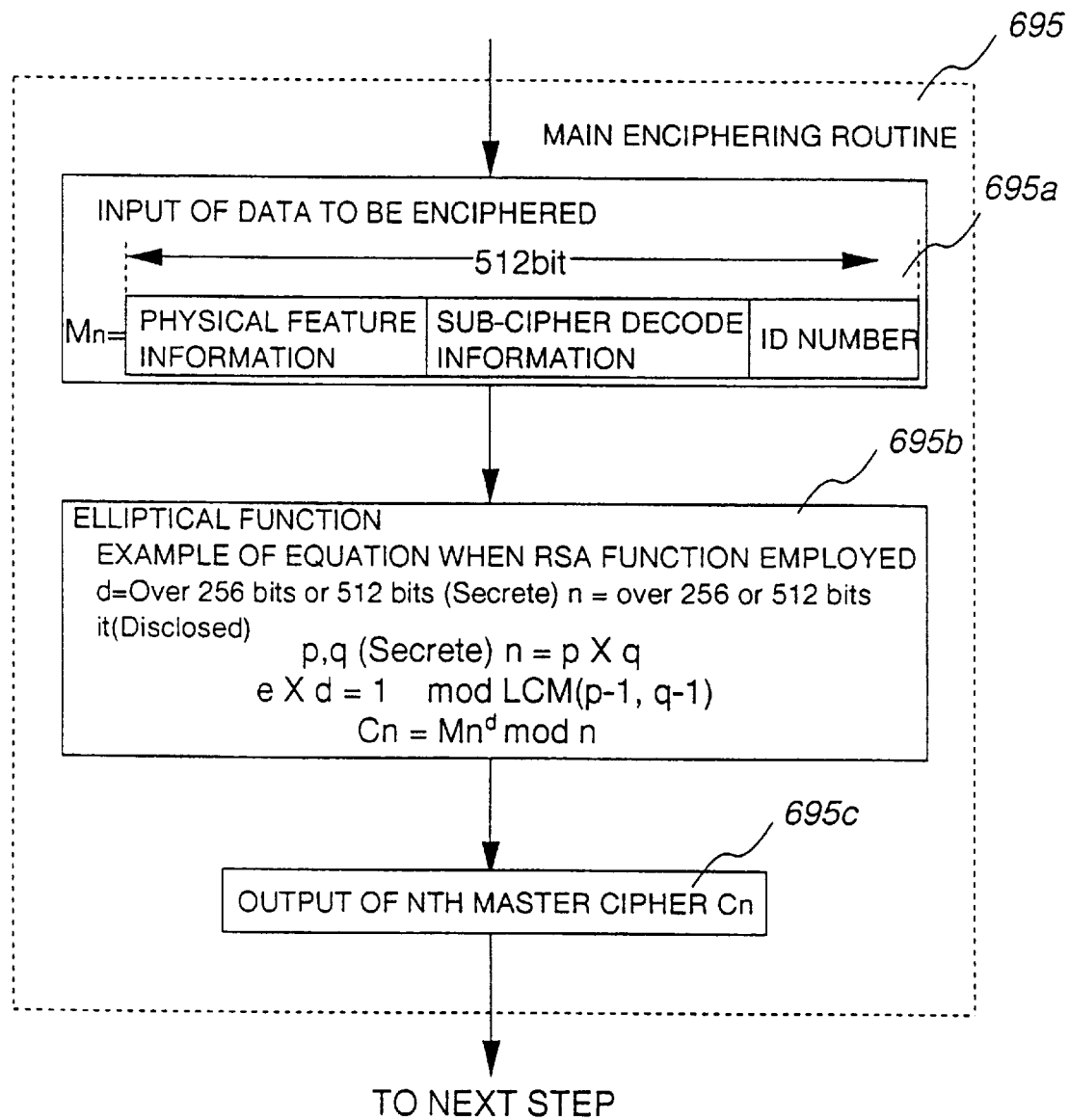
Figure 85:
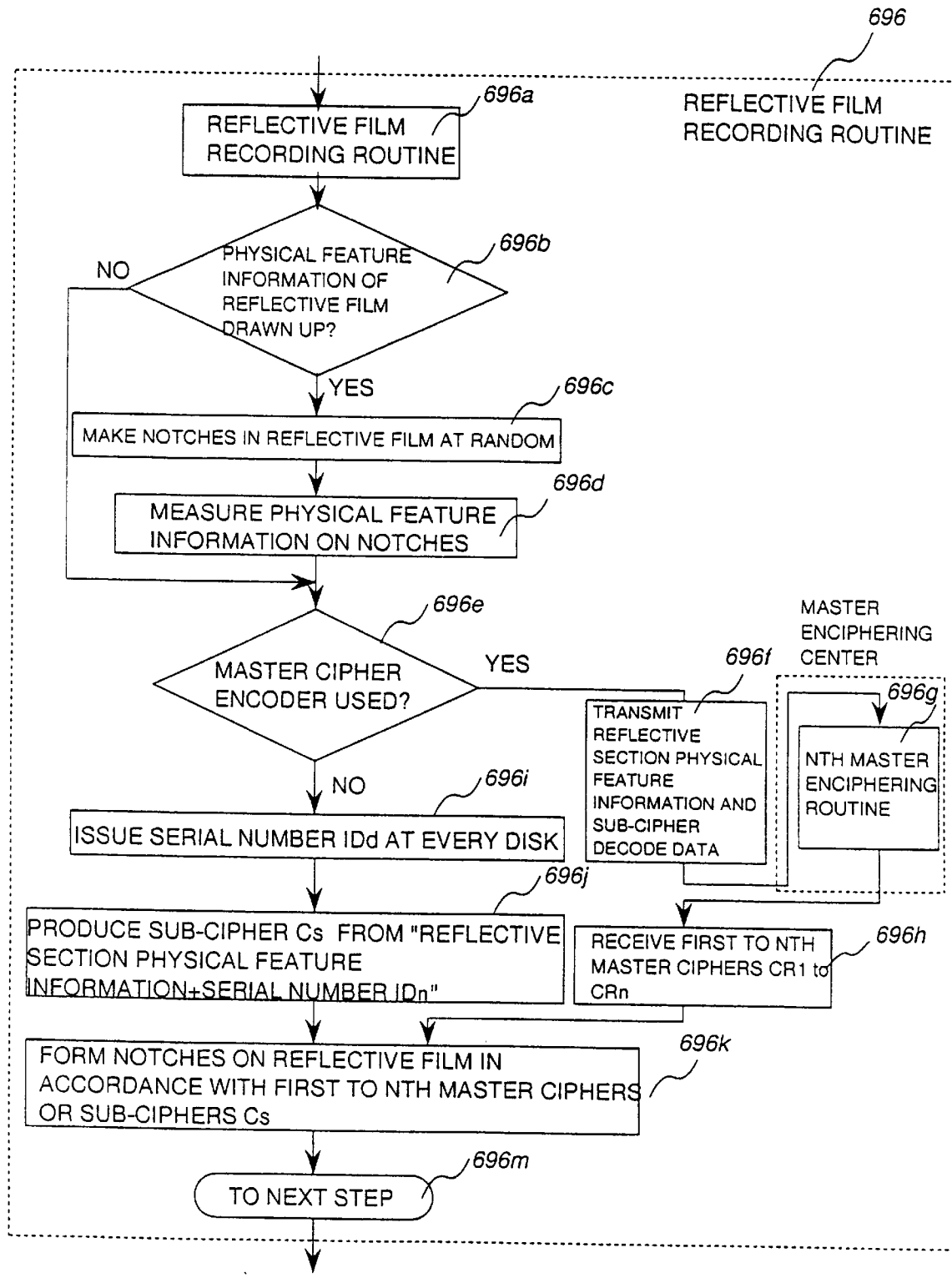

In a step 711e, the ID number or sub-cipher decode data is combined with the physical feature information and fed to a plurality of encryption devices (step 694), which data is received by the nth encryption device in a step 694i to be enciphered in a step 694j, the resulting cipher being transmitted in a step 694k. This routine is shown in FIGS. 83 and 84, and omitted. In a subsequent step 711f, the ciphers C1 to Cn enciphered by the one direction function cipher encoder 537 are received, and in a step 711g the ciphers C1 to Cn are synthesized and further combined with the second recording signal, the resulting signal being made in a recording signal processing section 723 in FIG. 88A to be subsequent to the first recording signal. The recording section 37 records pits at an inner circumferential portion of the original record 700b, which contains TOC and so on, so as to form a second recording line 710 spirally directing to the inner circumferential side. The recording is completed in a step 711h.

It is common that the original record is made from the inner circumferential side to the outer circumferential side, i.e., in the reproducing direction. Contrary to this, in this invention the time-axis direction of the recording signal is reversed so that the recording is made from the outer circumferential side to the inner circumferential side for the fabrication of the original record, and further the pirate edition preventing signal is finally recorded thereon. This method makes it possible to form pits successively arranged as one track. This can realize the pirate edition prevention in conformity with the standard of a CD or the like.

Figure 90:
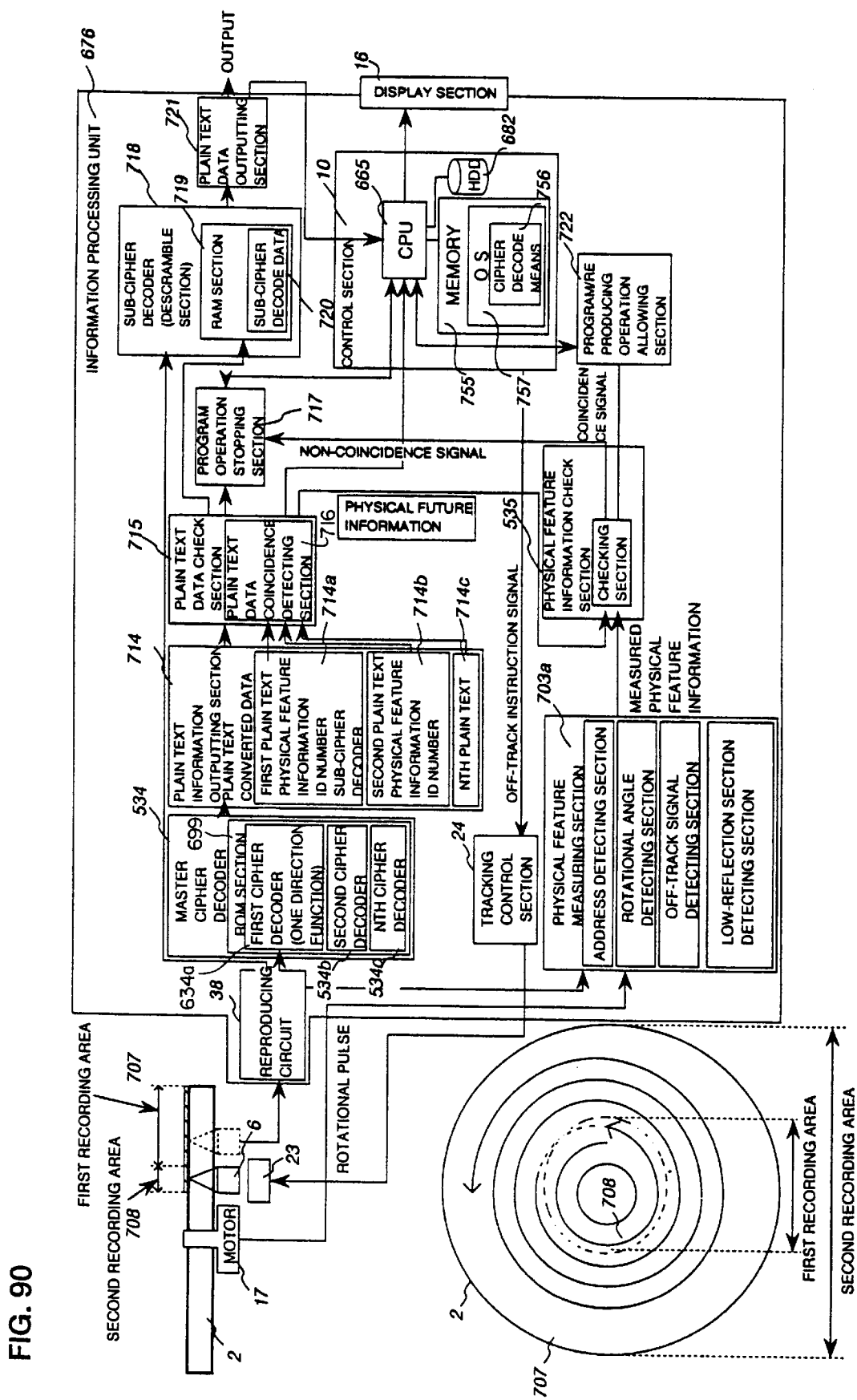
Figure 91:
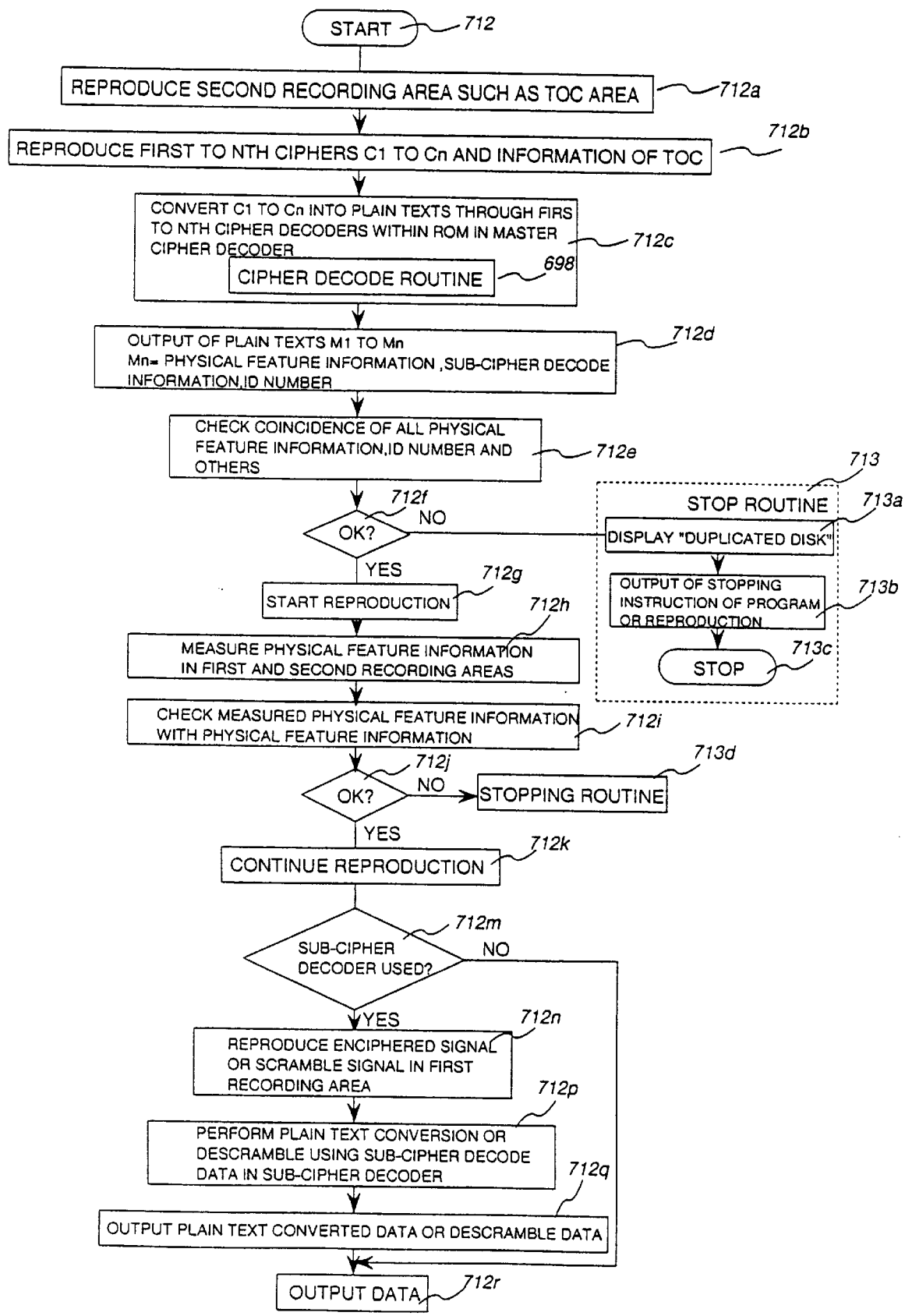

The reproducing operation will be described with reference to a block diagram of an information precessing system of FIG. 90 and a reproduction flow chart of FIG. 91. In a step 712a, the second recording area 708 including the TOC area and others is reproduced, as well as the case of CD. Subsequently, in a step 712b the first to nth ciphers C1 to Cn and information such as TOC are reproduced and in a step 712c the ciphers C1 to Cn are converted into plain texts by the first to nth cipher decoders 534a, 534b, 534c, which are fixed keys in the ROM 699 of the master cipher decoder 534, in accordance with the cipher decode routine 698 in FIG. 87, thus obtaining M1 to Mn. In a step 712d, M1 to Mn, i.e., physical feature information, sub-cipher decode information, and ID number are outputted from a plain-text information outputting section 714. A step 712e follows to check, in a plain text data checking section 715, whether all or a portion of M1 to Mn are coincident or not. If the answer of a step 712f is OK, the operational flow goes to a step 712g. If the answer of the step 712f is "NO", the operational flow goes to a step 713 to execute a stopping routine. In this routine, in a step 713a the CPU 665 displays "duplicated disk" on the display section 16, and in steps 713b and 713c, a program/reproducing operation stopping section 717 stops the program or reproducing operation.

On the other hand, if "YES", the reproduction starts in a step 712g, then followed by a step 712h to obtain the address, rotational angle and low-reflection section of the disk by a physical feature measuring section 703a. Further, an off-track instruction signal is given to a tracking control section 24 so that a light beam travels between the tracks to obtain a crosstalk signal, thereby detecting the inphase signal and obtaining a data train. The measured physical feature information of the first recording area 707 or the second recording area 708 is obtained in this way. This method has been described before with reference to FIG. 18 or others, and the description thereof is omitted. In a step 712i, the physical feature information checking section 535 checks the measured physical feature information with the physical feature information. If a step 712j decide "no coincidence", the operational flow goes to a step 713d, i.e., the foregoing stopping routine 713. On the other hand, if "OK", the operational flow advances to a step 712k so that a program/reproducing operation allowing section 722 continues the reproduction or allows the operation of the program.

In a step 712m, checking is made as to whether or not to use the sub-cipher decoder. If "NO", the operational flow jumps to a step 712r to output the data. If "YES", steps 712n and 712p are executed to reproduce the encryption signal in the first recording area to convert it into a plain text. Or the scramble release key added to the variable length sign section 683, which has been described with reference to FIG. 77, is enciphered through this sub-cipher and the scramble signal is recorded in the optical disk. In addition, in the step 681h of the reproduction flow chart of FIG. 79, the scramble release key is descrambled by the sub-cipher decoder in FIG. 91, whereby the user of the legal disk can reproduce the complete image. On the other hand, since the illegally duplicated disk can not be descrambled, only the variable length signal component, i.e., the poor image not having a high-frequency component, is reproducible. Further, in a step 712*q*, the plain text data due to the sub-cipher or the image signal obtained by descrambling the scrambled image signal is outputted and in a step 712*r* the final data is outputted from the outputting section.

Figure 88B:
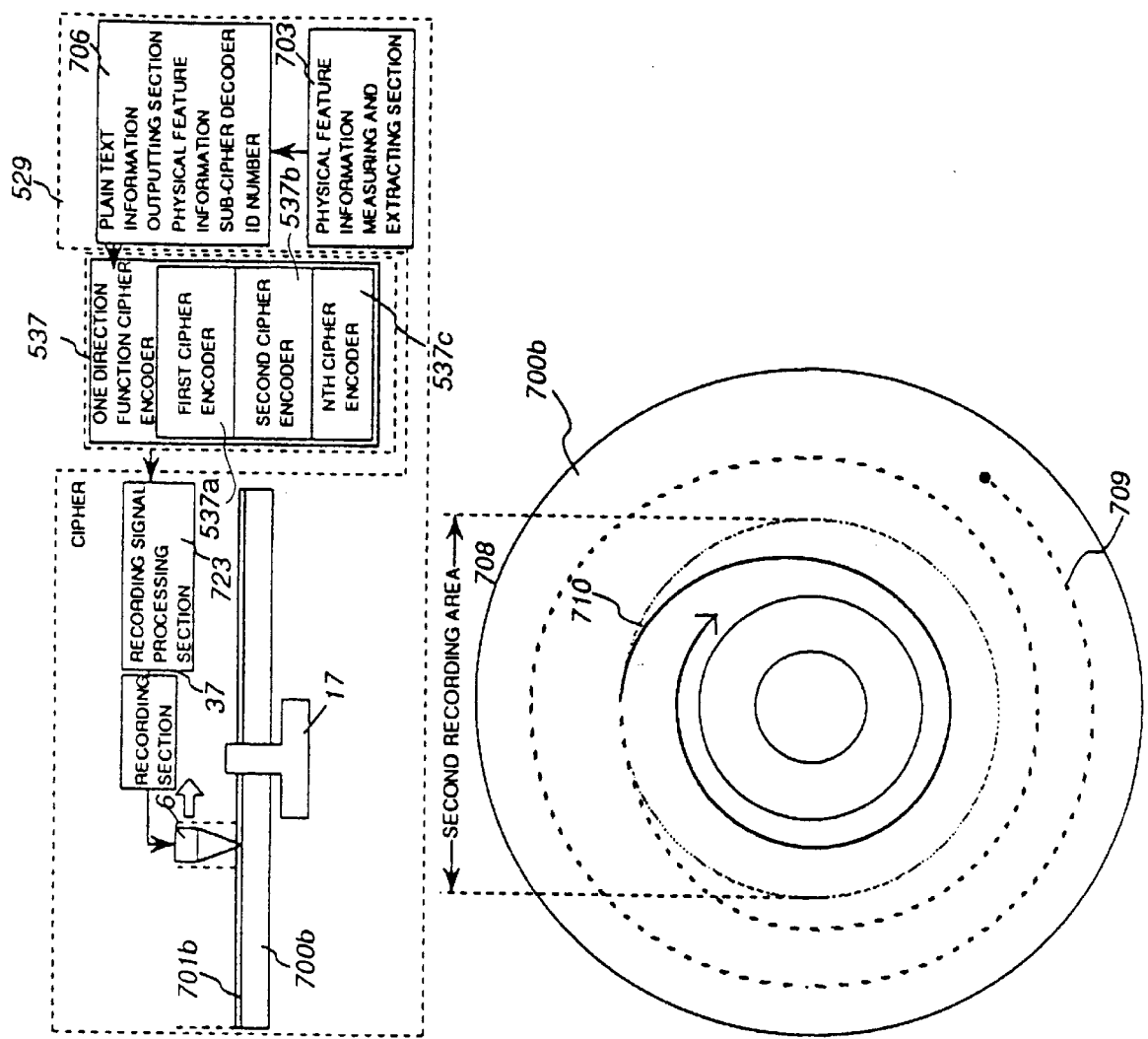
Figure 89:
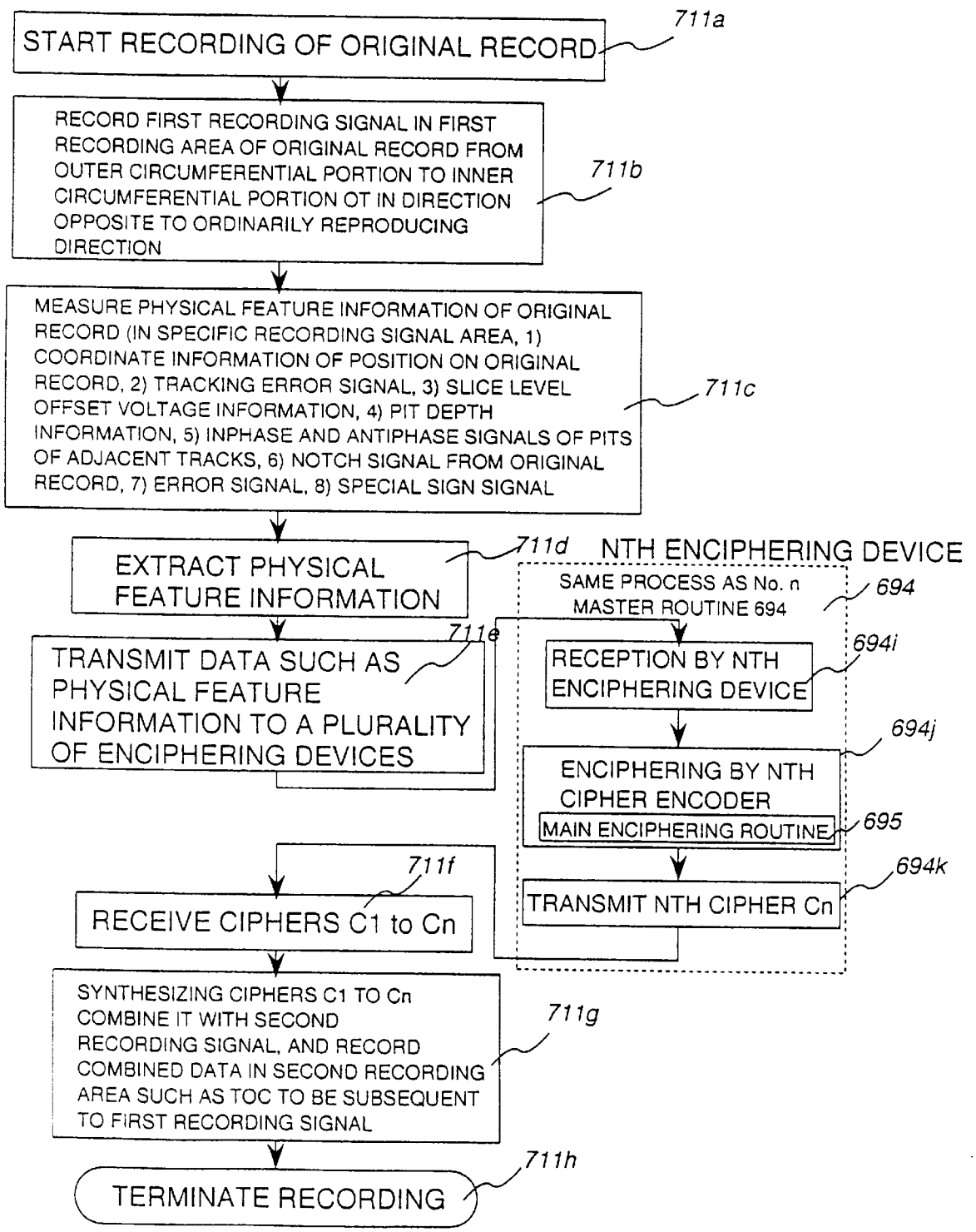

As shown in FIGS. 88A and 88B, the time axis (base) of the recording data is reversed so that the recording is made from the outer circumferential side to the inner circumferential side for the fabrication of the original record, realizing an addition type pirate edition preventing disk with one spiral track. Thus, since the added data can be reproduced by the ordinary optical head without the change of the standard, the structure becomes simplified.

As described above, according to this invention, it is possible to realize media having a magnetic recording section on its surface opposite to its optical recording surface while having the standard of CDs and the like, and further to realize a recording and reproducing system which provides reliability in the home-use environment at a cost reasonable for the home-use. In addition, since the disk physical ID is enciphered by a one-direction function cipher encoder, it is possible to improve the degree of security for duplication prevention.

What is claimed is:

1. An information reproducing system comprising means (17) for rotationally driving a disc-like optical recording medium (2) wherein information is recorded in a recording layer in the form of pits, an optical head (6) for reading out the recorded information from said optical recording medium, head-moving means (23) for making said optical head movable radially on said optical recording medium, and signal processing means for processing the information read out through said optical head, which system is characterized by including:

first physical information detecting means (743, 38, 665) for detecting, on the basis of information read out through one of said optical head and a magnetic head, first physical feature information (532) which is representative of at least one of information of a two-dimensional physical arrangement of a pit or low-reflection section and a configuration of said pit or low-reflection section of said recording layer on said optical recording medium and which is enciphered and recorded at manufacture of said optical recording medium;

decryption means (534) for decoding the first physical feature information into a plain text using disclosed key cipher system cipher function (695*b*, 698B, 735*h*);

means (17*a*, 6, 38, 703*a*) for measuring a physical feature of said optical recording medium to detect second physical feature information indicative of at least one of information of a physical arrangement of said pit or low-reflection section and a configuration of said pit or low-reflection section;

check means (535) for checking said second physical feature information with said first physical feature information already decoded into a plain text to make a decision as to whether or not both are in a specific relation to each other; and control means (717, 665) for, when the check means decides that said second physical feature information is not in the specific relation to said first physical feature information, stopping one of an operation of a specific program read out from said optical recording medium, a subsequent reading-out of information from said optical recording medium, and a given process of information, read out from the optical recording medium, the given process being practiced by said signal processing means.

2. A system as defined in claim 1, characterized in that reproducing means detects, on the basis of an internal pressure of pits, a first low-reflection section (740) in which a reflected light quantity is small and a high-reflection section (741) in which a reflectance is higher than that of said first reflection section due to a portion with no pit, and in an apparatus for reproducing a first optical recording signal, second low-reflection section detecting means (586) detects a second low-reflection section (584) provided in an optical recording signal area (742) and having a reflectance lower than that of said first low-reflection section and providing a reflected light quantity smaller than that of said first low-reflection section, and said second physical feature information detecting means obtains said second physical feature information on the basis of a detection signal of said second low-reflection section detecting means.

3. A system as defined in claim 2, characterized in that said second low-reflection section detecting means detects said second low-reflection section by slicing said first optical recording signal at a first slice level of a first level slicer (386) of level slicers having two or more slice levels and by slicing a reproduced signal at a second slice level of a second level slicer (586) which corresponds to a light quantity smaller than a light quantity for said first slice level.

4. A system as defined in claim 3, characterized by further comprising second low-reflection section position detecting means (696) for detecting at least one of a position, circumferential length and circumferential interval of said second low-reflection section on the basis of a second low-reflection section detection signal of said second low-reflection section detecting means (586) and a first optical reproduced signal detected by reproducing means (590).

5. A system as defined in claim 4, characterized in that a time correction section (607) measures a time interval between a reference mark detection signal detected by a mark signal detecting means (593) and a reference second reflective section detection signal detected by said second low-reflection section detecting means (586) to obtain a reference correction time, and further said time correction section (607) corrects a time interval between a specific mark signal detection signal and a second reflective section detection signal on the basis of said reference correction time, before said second low-reflection section position detecting means (596) detects a position of said second reflective section detection signal.

6. A system as defined in claim 4, characterized in that, when a mark signal detecting section (593) detects a specific mark signal of said first optical reproduced signal, said second low-reflection section position detecting means (596) detects one of said position, said circumferential length and said circumferential interval of said second low-reflection section on the basis of a mark detection signal of said mark signal detecting section.

7. A system as defined in claim 6, characterized in that said mark signal detecting section (593) detects an address signal as said mark signal.

8. A system as defined in claim 7, characterized in that said second low-reflection section position detecting means (596) detects one of said position, said circumferential length and said circumferential interval of said second low-reflection section on the basis of said address signal and the number of reproduction clock signal counted by a counter (598).

9. A system as defined in claim 8, characterized in that said second low-reflection section position detecting means (596) detects said position of said second low-reflection section on the basis of said address signal, the number of frame synchronizing signals counted by said counter (598) and the number of said reproduction signals counted by said counter (598).

10. A system as defined in claim 7, characterized in that said second low-reflection section position detecting means (596) detects said position of said second low-reflection section on the basis of an address signal of said first optical reproduced signal and a frame synchronizing signal.

11. A system as defined in claim 7, characterized in that said second low-reflection section position detecting means (596) detects one of said position, said circumferential length and said circumferential interval of said second low-reflection section with the number of reproduced clocks of a synchronizing signal reproducing means (38a) which obtained from said first optical reproduced being counted by a counter (598).

12. A system as defined in claim 11, characterized in that said synchronizing signal reproducing means detects as a synchronizing signal a clock signal from a synchronizing clock reproducing means (38a) of an EFM demodulating means (592).

13. A system as defined in claim 6, characterized in that said mark signal detecting section (593) detects, as said mark signal, a specific signal of a sub-code signal of a CD.

14. A system as defined in claim 2, characterized in that said second low-reflection section detecting means (586) detects only said second low-reflection section longer than said first low-reflection section in a tracking direction.

15. A system as defined in claim 2, characterized in that said second physical feature information detecting means obtains said second physical feature information by detecting an angular position of said second low-reflection section on said recording medium on the basis of a first detection signal on said second low-reflection section detected by said second low-reflection section detecting means (586) and a second detection signal detected by an angle detecting means (355) of rotating means.

16. A system as defined in claim 2, characterized in that said second physical feature information detecting means obtains said second physical feature information by measuring start and end positions of said second low-reflection section on the basis of a second low-reflection section detection signal detected by said second low-reflection section detecting means (586) and at least one of a frame synchronizing signal and clock signal of a first optical reproduced signal detected by an optical reproducing means (590).

* * * * *

UNITED STATES PATENT AND TRADEMARK OFFICE
CERTIFICATE OF CORRECTION

PATENT NO. : 5,881,038
DATED : March 9, 1999
INVENTOR(S) : Mitsuaki OSHIMA et al It is certified that error appears in the above-identified patent and that said Letters Patent is hereby corrected as shown below:

On the Title Page, [63] Related U.S. Application Data, change "Feb. 27, 1994" to --July 27, 1994--.

Signed and Sealed this

Twenty-fifth Day of January, 2000

Attest:

Attesting Officer

*Acting Commissioner of Patents and Trademarks*